US012743372B1

(12) United States Patent
Pajak et al.

(10) Patent No.: US 12,743,372 B1
(45) Date of Patent: Sep. 22, 2026

(54) FIRMWARE-CONTROLLED MEMORY BINDING AND IMPLICIT DATA PERSISTENCE FOR HARDWARE ACCELERATORS

(71) Applicant: NVIDIA Corporation, Santa Clara, CA (US)

(72) Inventors: Dawid Stanislaw Pajak, San Carlos, CA (US); Lachlan Francis Dowling, Bend, OR (US); Nan Wang, San Jose, CA (US); Rohit Goel, Noida (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 19/183,568

(22) Filed: Apr. 18, 2025

(51) Int. Cl.

| | |
|---|---|
| ***G06F 12/02*** | (2006.01) |
| ***G06F 9/50*** | (2006.01) |
| ***G06F 12/14*** | (2006.01) |
| ***G06F 13/16*** | (2006.01) |

(52) U.S. Cl.
CPC ........ *G06F 12/0246* (2013.01); *G06F 9/5016* (2013.01); *G06F 12/1491* (2013.01); *G06F 13/1642* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 11,132,146 | B2 | 9/2021 | Agarwal et al. | |
| 2013/0162661 | A1 | 6/2013 | Bolz et al. | |
| 2019/0347125 | A1* | 11/2019 | Sankaran | G06F 9/30036 |
| 2020/0379675 | A1 | 12/2020 | Agarwal et al. | |
| 2023/0124665 | A1* | 4/2023 | Hong | G06F 3/0631 711/154 |
| 2023/0131961 | A1 | 4/2023 | Perelygin et al. | |
| 2024/0176622 | A1 | 5/2024 | Ravi et al. | |
| 2024/0176679 | A1 | 5/2024 | Ravi et al. | |
| 2024/0176684 | A1 | 5/2024 | Ravi et al. | |
| 2024/0176685 | A1 | 5/2024 | Ravi et al. | |
| 2024/0289128 | A1 | 8/2024 | Ramos et al. | |
| 2025/0231769 | A1* | 7/2025 | Ranganathan | G06F 9/4806 |
| 2025/0245043 | A1 | 7/2025 | Perelygin et al. | |
| 2025/0245066 | A1 | 7/2025 | Perelygin et al. | |
| 2025/0245072 | A1 | 7/2025 | Perelygin et al. | |
| 2025/0245073 | A1 | 7/2025 | Perelygin et al. | |
| 2026/0056784 | A1* | 2/2026 | Li | G06F 9/5016 |

* cited by examiner

*Primary Examiner* — Kaushikkumar M Patel
(74) *Attorney, Agent, or Firm* — Foley & Lardner LLP

(57) ABSTRACT

Various examples, systems, and methods relate to facilitating memory use by a hardware accelerator. A system can check whether an on-chip memory region has already been set up for a given use. If it has, the system can reuse it. If not, the system can allocate a new region and connect it to a larger off-chip memory. The system can determine whether to load data into on-chip memory or save data back to off-chip memory based on various rules.

20 Claims, 28 Drawing Sheets

1606

SYNC CMD
ASYNC CMD
FW STALLS

BEGIN_CHUNK
ACQUIRE_ENGINE
SET_CURRENT_ENGINE
SET_VPU_EXECUTABLE
INIT_VPU_EXECUTABLE
PREFETCH_VPU_CODE
FETCH_DMA_CONFIGURATION<SET=0>
STALL
SET_VPU_PARAMETER
STALL
SETUP_DMA<SET=0>
STALL
RUN_DMA<SET=0>
RUN_VPU
FETCH_DMA_CONFIGURATION<SET=1>
STALL
SET_VPU_EXECUTABLE
CLEAR_VMEM
PREFETCH_VPU_CODE
SETUP_DMA<SET=1>
STALL
INIT_VPU_EXECUTABLE
STALL
SET_VPU_PARAMETER
RUN_DMA<SET=1>
RUN_VPU
RELEASE_ENGINE

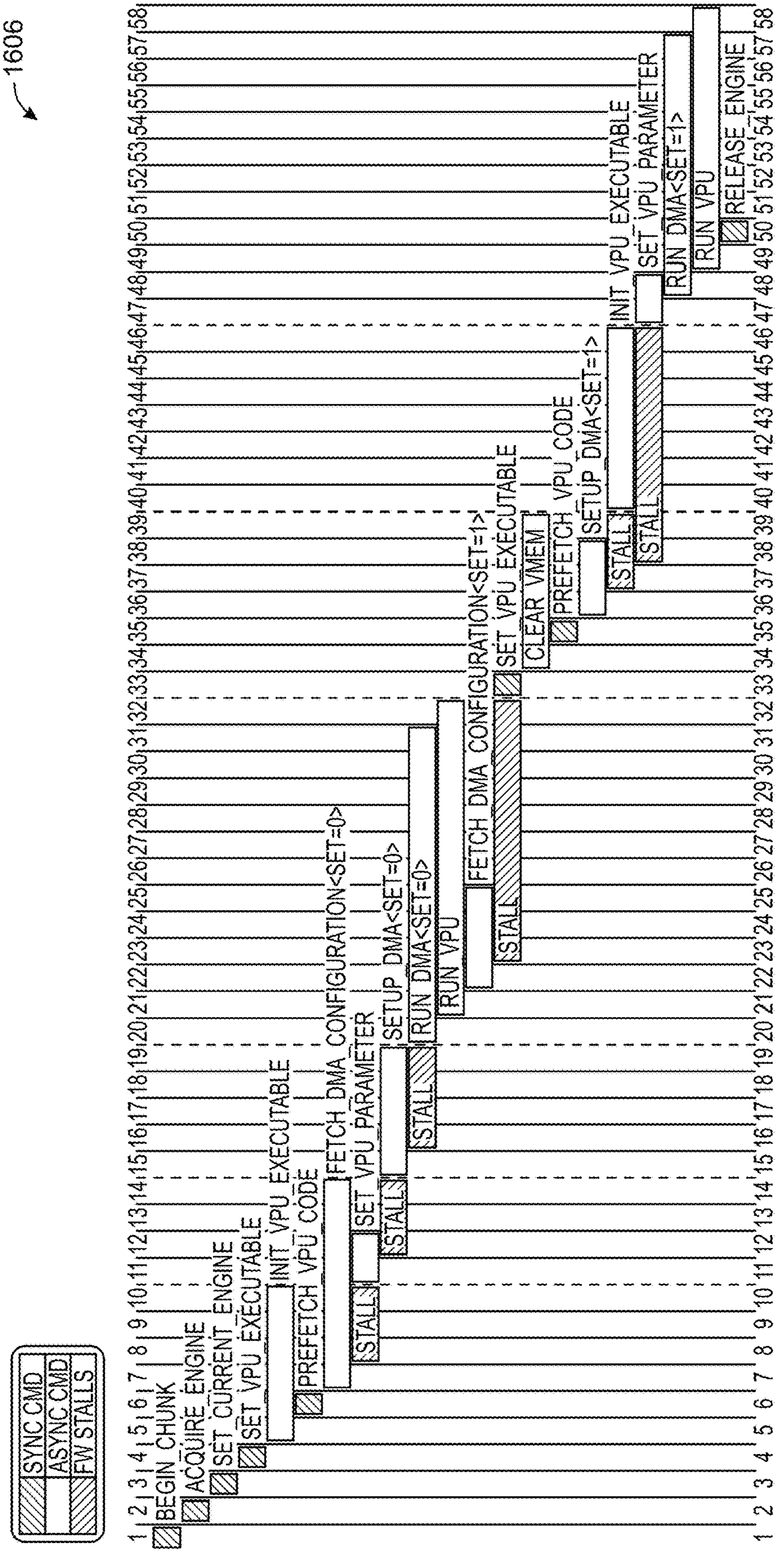

FIG. 16C

SYNC CMD
ASYNC CMD
FW STALLS

BEGIN_CHUNK
ACQUIRE_ENGINE
SET_CURRENT_ENGINE
SET_VPU_EXECUTABLE
INIT_VPU_EXECUTABLE
PREFETCH_VPU_CODE
FETCH_DMA_CONFIGURATION<SET=0>
SET_VPU_PARAMETER
SETUP_DMA<SET=0>
RUN_DMA<SET=0>
RUN_VPU
FETCH_DMA_CONFIGURATION<SET=1>
SETUP_DMA<SET=1>
RUN_DMA<SET=1>
SET_VPU_PARAMETER
FETCH_DMA_CONFIGURATION<SET=2>
SETUP_DMA<SET=2>
BARRIER
RUN_DMA<SET=2>
SET_VPU_PARAMETER
RELEASE_ENGINE
END_CHUNK
STALL

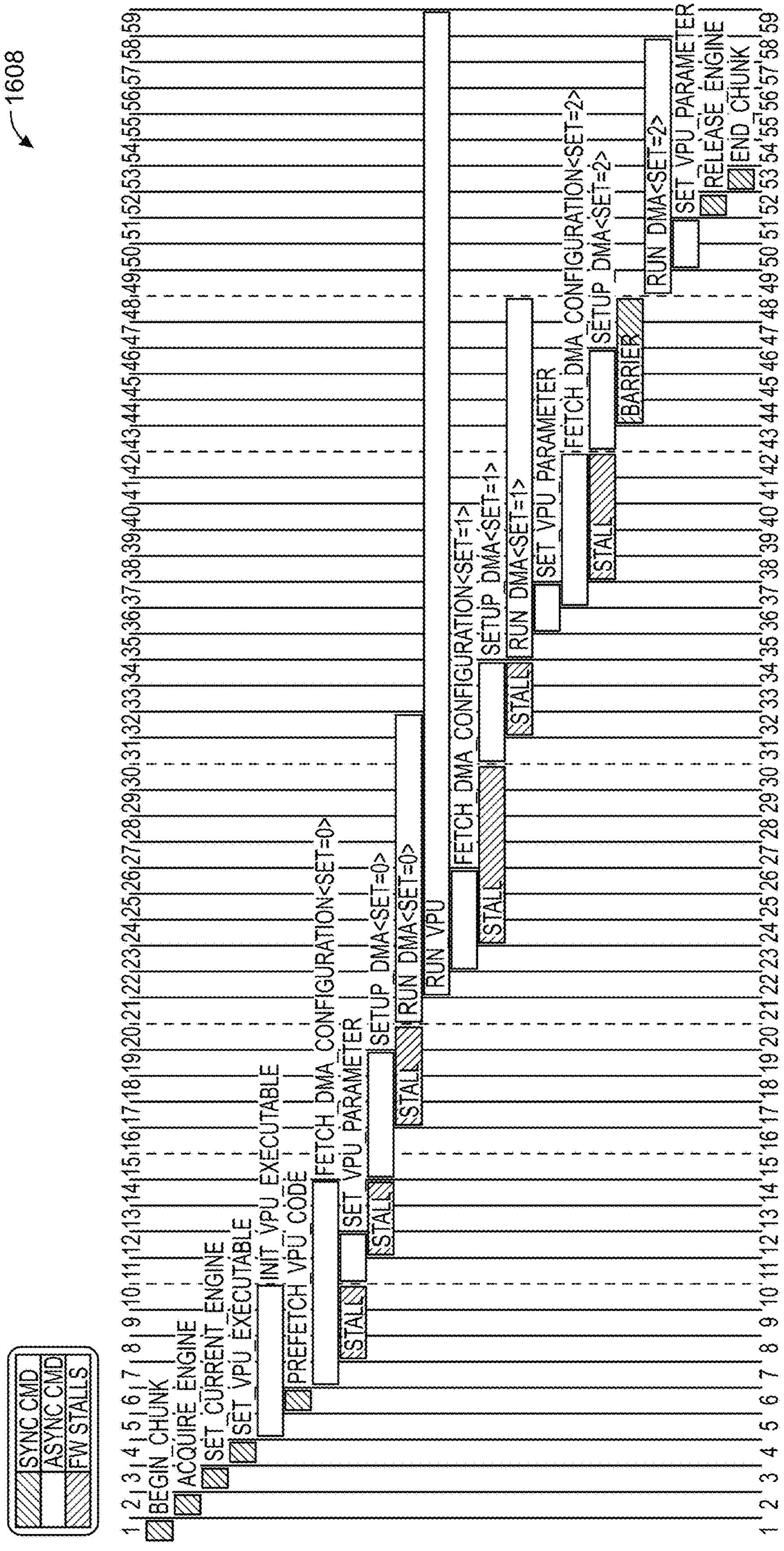

FIG. 16D

FIRMWARE-CONTROLLED MEMORY BINDING AND IMPLICIT DATA PERSISTENCE FOR HARDWARE ACCELERATORS

BACKGROUND

Implementing low-level orchestration of heterogeneous hardware accelerators that includes independently addressable components (e.g., vector processing units (VPUs), direct memory access (DMA) controllers, programmable or pixel processing engines (PPEs), and/or other components) presents technical challenges. Some existing systems rely on fixed-function firmware interfaces that use coarse-grained command structures to configure resources, sequence tasks, and/or initialize memory transactions (e.g., DRAM to SRAM transfers, SRAM eviction policies). These systems often expose monolithic task interfaces tightly coupled to specific programming models, resulting in limited flexibility and incomplete utilization of concurrent execution resources. Many existing solutions are inadequate for supporting persistent memory mappings across task windows, overlapping execution of accelerator commands, and/or user-space construction of command buffers with fine-grained hardware control, instead relying on static abstractions, firmware-level scheduling, and/or high-latency validation mechanisms. These limitations prevent systems from issuing hardware configuration and/or synchronization commands with low overhead, restrict command reuse and memory persistence across submission boundaries, and/or increase latency in runtime accelerator dispatch for performance-critical workloads.

SUMMARY

Implementations of the present disclosure relate to systems and methods for constructing, submitting, and executing accelerator command buffers in user-space with minimal and/or reduced host-side validation overhead. For example, systems and methods in accordance with the present disclosure can receive a command buffer constructed by a user-mode application referencing at least one resource identifier stored in a resource table inaccessible to the non-privileged execution context. That is, at least one (e.g., each) resource identifier can correspond to a prevalidated configuration (e.g., DMA setup, VPU parameters, and/or execution affinity data) populated by a kernel-mode driver (KMD) at initialization time. The systems and methods can be used to submit command buffers via a submission queue, signal readiness for execution, and trigger firmware-controlled dispatch to hardware components of a hardware accelerator. In some implementations, the systems and methods can validate resource usage via firmware-managed metadata and track command execution across multiple submission interfaces. Additionally, the systems and methods can reuse previously constructed buffers, divide command buffers across submissions, and/or dispatch command buffers with affinity restrictions to avoid resource interference. The implementations provide reduced validation latency, support for command buffer reuse, and/or fine-grained hardware control by exposing low-level firmware execution paths to user-mode applications.

Implementations of the present disclosure relate to systems and methods for binding local accelerator memory regions to external memory locations and maintaining persistence of data across task windows. For example, systems and methods in accordance with the present disclosure can allocate a local memory region (e.g., L2SRAM) and bind it to a DRAM-backed external memory region via firmware-level registration. That is, at least one (e.g., each) binding operation can generate a device pointer identifying the DRAM location and reference the external memory via a firmware-managed resource table. The systems and methods can be used to configure DMA operations, store binding metadata in the resource table, and/or manage transfer policies such as fill-on-miss and flush-on-eviction. In some implementations, the systems and methods can reuse active L2SRAM bindings across multiple task windows, perform reference counting for concurrent bindings, and/or lazy data initialization and lazy data eviction based on firmware state. Additionally, the firmware can handle task-level memory persistence and/or prevent redundant transfers by associating memory bindings with execution context identifiers. The implementations provide persistent access to DRAM-backed allocations, facilitate memory reuse across composable operators, and/or reduce transfer overhead during non-contiguous task submission.

Implementations of the present disclosure relate to systems and methods for dispatching command buffers including low-level commands that control independent hardware engines of a heterogeneous hardware accelerator. For example, systems and methods in accordance with the present disclosure can construct a command buffer including a sequence of hardware configuration and/or synchronization commands, at least one (e.g., each) referencing a resource identifier stored in a firmware-accessible resource table. That is, at least one (e.g., each) command can initiate DMA transfers, configure vector processing units (VPUs), initiate programmable engines, and/or synchronize execution via barrier commands. The systems and methods can be used to initiate execution in order of placement and permit overlapping execution completion based on hardware availability. In some implementations, the systems and methods can validate command sequences via firmware-managed state machines, dispatch commands out of order, and/or construct multiple DMA configurations within a single VPU execution. Additionally, the command buffers can be constructed in user space and submitted with minimal and/or reduced transformation or driver interaction. The implementations provide a flexible and improved orchestration mechanism for controlling parallel execution pipelines across hardware engines, for example, without relying on coarse-grained task sequencing.

Some implementations relate to a system, including one or more processors to allocate, via a firmware interface, a local memory region in a local memory of a hardware accelerator bound to an external memory region, the allocation returning a device pointer corresponding to a binding, the binding tracked using a resource identifier in a resource table corresponding with a non-privileged execution context. In some implementations, the processors to provide the device pointer to a memory region accessible to the non-privileged execution context for at least one subsequent construction of at least one command buffer identifying the binding of the local memory region to the external memory region.

Some implementations relate to a system, the one or more processors are to construct, in the external memory region of the hardware accelerator, the at least one command buffer including at least one command identifying the device pointer corresponding to the binding of the local memory region to the external memory region. Some implementations relate to a system, the one or more processors are to cause execution of the at least one command using the external memory region via the local memory region by a direct memory access (DMA) controller using the at least one command buffer, the at least one command corresponds to at least one of (i) reading data from the external memory region into the local memory region, or (ii) writing data from the local memory region to the external memory region.

Some implementations relate to a system, allocating includes providing, via the firmware interface, a request to allocate the local memory region in the local memory of the hardware accelerator and bind the local memory region to the external memory region. In some implementations, allocating includes receiving, via the firmware interface, the device pointer corresponding to the binding of the local memory region to the external memory region. In some implementations, the request is generated by a privileged execution context as a firmware-level configuration command using a firmware access application programming interface (API), and the firmware-level configuration command identifies the binding of the local memory region to the external memory region.

Some implementations relate to a system, the at least one command buffer includes descriptor data identifying the device pointer, and the descriptor data is updated, prior to execution, to identify a memory access path from the external memory region via the local memory region, and the memory access path corresponds to a patched physical address in the local memory region identified for the execution of at least one command. Some implementations relate to a system, the device pointer corresponds to an address indirection including the binding of the local memory region to the external memory region, the address indirection identified by a DMA controller to perform at least one memory access command during execution.

Some implementations relate to a system, the one or more processors are to construct or receive, in the external memory region of the hardware accelerator, a second command buffer including at least one second command identifying a resource corresponding to the local memory region. In some implementations, the processors are to provide, to a submission queue corresponding with the non-privileged execution context, submission information for the second command buffer. In some implementations, the processors are to provide, to a signaling interface corresponding with the submission queue, a submission indicator corresponding to the submission information. In some implementations, the processors are to cause execution of the second command buffer by at least one hardware component of the hardware accelerator.

Some implementations relate to a system, the one or more processors are to prior to allocating the local memory region, determine whether a previously allocated local memory region bound to the external memory region exists for the non-privileged execution context. In some implementations, the processors are to in response to determining that the previously allocated local memory region exists, increment a reference count corresponding to the binding. In some implementations, the processors are to in response to determining that the previously allocated local memory region does not exist, transmit, to the firmware interface, a request to allocate the local memory region in the local memory of the hardware accelerator bound to the external memory region in accordance with at least one access policy.

Some implementations relate to a system, the one or more processors are to decrement the reference count corresponding to the binding in response to a release request. In some implementations, the processors are to release the local memory region in response to determining that the reference count satisfies a release condition.

Some implementations relate to a system, the one or more processors are to initiate a flush operation to transfer data from the local memory region to the external memory region in response to a flush request, the flush operation occurs in response to a user context switch or initiate an invalidate operation marking data stored in the local memory region as invalid in response to an invalidate request to trigger reinitialization of the local memory region during a subsequent access. In some implementations, initialization of the local memory region with data from the external memory region and flushing of the local memory region to the external memory region occur in response to the user context switch, and the flushing is further performable in response to an explicit request.

Some implementations relate to a system, the binding is established in accordance with at least one access policy, the at least one access policy including a first policy to initialize the local memory region with data from the external memory region or a second policy to flush data from the local memory region to the external memory region during release. Some implementations relate to a system, the firmware interface maintains at least two concurrent bindings of a plurality of local memory regions to corresponding a plurality of external memory regions for the non-privileged execution context.

Some implementations relate to a system, the firmware interface includes a compatibility layer configured to translate memory allocation and at least one access request from at least one software application implemented for a version of the hardware accelerator, the compatibility layer updating at least one request to invoke the allocation of the local memory region and the binding to the external memory region via the firmware interface. Some implementations relate to a system, the at least one command buffer includes descriptor data identifying the device pointer, and the descriptor data is modified, by firmware, to identify a source address and a destination address for a DMA transaction by a DMA controller, the source address or destination address corresponding to the local memory region and the external memory region bound by the device pointer, the descriptor data including a transfer size and at least one access policy.

Some implementations relate to a system-on-a-chip (SoC), including processing circuitry to transmit, via a firmware interface, a request to allocate a local memory region in a local memory of a hardware accelerator and bind the local memory region to an external memory region. In some implementations, the processing circuitry to receive, via the firmware interface, a device pointer corresponding to the binding of the local memory region to the external memory region, the binding tracked using a resource identifier in a resource table corresponding with a non-privileged execution context. In some implementations, the processing circuitry store the device pointer in a memory region accessible to a non-privileged execution context for at least one subsequent construction of at least one command buffer identifying the binding of the local memory region to the external memory region.

Some implementations relate to a method, including allocating, by one or more processors via a firmware interface, a local memory region in a local memory of a hardware accelerator bound to an external memory region, the allocation returning a device pointer corresponding to a binding, the binding tracked using a resource identifier in a resource table corresponding with a non-privileged execution context. In some implementations, the method includes providing, by the one or more processors, the device pointer to a memory region accessible to the non-privileged execution context for at least one subsequent construction of at least one command buffer identifying the binding of the local memory region to the external memory region.

Some implementations relate to a method, further including constructing, by the one or more processors in the external memory region of the hardware accelerator, the at least one command buffer including at least one command identifying the device pointer corresponding to the binding of the local memory region to the external memory region. Some implementations relate to a method, further including causing, by the one or more processors, execution of the at least one command using the external memory region via the local memory region by a direct memory access (DMA) controller using the at least one command buffer, the at least one command corresponds to at least one of (i) reading data from the external memory region into the local memory region, or (ii) writing data from the local memory region to the external memory region.

Some implementations relate to a method, allocating includes providing, via the firmware interface, a request to allocate the local memory region in the local memory of the hardware accelerator and bind the local memory region to the external memory region. In some implementations, allocating includes receiving, via the firmware interface, the device pointer corresponding to the binding of the local memory region to the external memory region. In some implementations, the request is generated by a privileged execution context as a firmware-level configuration command using a firmware access application programming interface (API), and the firmware-level configuration command identifies the binding of the local memory region to the external memory region.

Some implementations relate to a system, the one or more processors are to execute operations including a system for managing memory persistence using firmware-level resource tracking, a system for binding one or more local memory regions to one or more DRAM-backed regions via the firmware interface, a system for allocating one or more memory regions using one or more access policies, a system for inserting one or more flush or invalidate operations in accordance with DRAM persistence, a system for storing one or more device pointers for command buffer reuse, a system implementing one or more multi-model language models (MMLMs), a system implementing one or more large language models (LLMs), a system implementing one or more small language models (SLMs), a system implementing one or more vision language models (VLMs), a system for generating synthetic data, a system for generating synthetic data using AI, a control system for an autonomous or semi-autonomous machine, a perception system for an autonomous or semi-autonomous machine, a system for performing digital twin operations, a system for performing light transport simulation, a system for performing remote operations, a system implemented using an edge device, a system implemented using a robot, a system for performing conversational AI operations, a system incorporating one or more virtual machines (VMs), a system implemented at least partially in a data center, or a system implemented at least partially using cloud computing resources.

BRIEF DESCRIPTION OF THE DRAWINGS

The present systems and methods for (i) user-space buffer construction and firmware-controlled execution for hardware accelerators, (ii) firmware-controlled memory binding and implicit data persistence for hardware accelerators, and/or (iii) firmware-controlled command dispatch and resource-based orchestration for hardware accelerators are described in detail below with reference to the attached drawing figures, wherein:

FIG. 16C depicts an execution timeline illustrating back-to-back dispatches of two VPU programs by the firmware component of system, in accordance with some implementations of the present disclosure;

FIG. 16D depicts an execution timeline illustrating a single VPU program utilizing three DMA configuration sets under control of firmware component of the system, in accordance with some implementations of the present disclosure;

DETAILED DESCRIPTION

Figure 1:
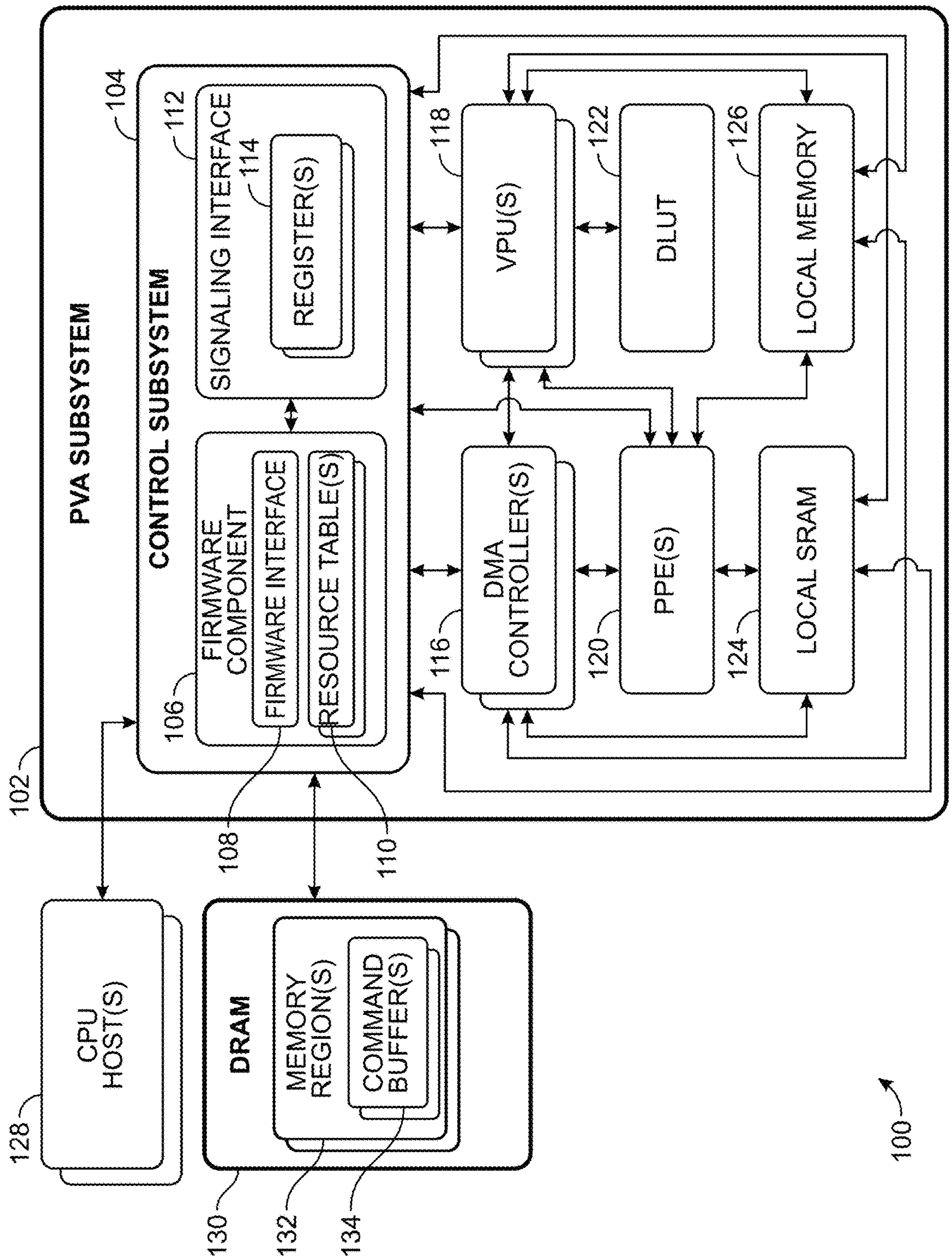
FIG. 1 is a block diagram of an example of a system, in accordance with some implementations of the present disclosure.

Systems and methods are disclosed related to (i) user-space buffer construction and firmware-controlled execution for hardware accelerators, (ii) firmware-controlled memory binding and implicit data persistence for hardware accelerators, and/or (iii) firmware-controlled command dispatch and resource-based orchestration for hardware accelerators. Although the present disclosure can be described with respect to an example autonomous or semi-autonomous vehicle, robot, and/or other machine type 1800 (alternatively referred to herein as "vehicle 1800," "ego-vehicle 1800," "machine 1800," "ego-machine 1800," "robot 1800," and/or "ego-robot 1800," an example of which is described with respect to FIGS. 18A-18E), this is not intended to be limiting. For example, the systems and methods described herein can be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms (e.g., autonomous mobile robots (AMRs), humanoid robots, robotic arms and/or end-effectors), warehouse vehicles, off-road vehicles, vehicles coupled to one or more trailers, flying vessels, watercraft, shuttles (e.g., robotaxis), emergency response vehicles, motorcycles, electric or motorized bicycles, aircraft, construction vehicles, underwater craft (e.g., piloted or unpiloted submarines), drones, and/or other vehicle, robot, or machine types. In addition, although the present disclosure can be described with respect to firmware-controlled buffer and memory management in programmable accelerator pipelines (e.g., user-space buffer construction and firmware-controlled execution for hardware accelerators, firmware-controlled memory binding and data persistence for hardware accelerators, firmware-controlled command dispatch and resource-based orchestration for hardware accelerators), this is not intended to be limiting, and the systems and methods described herein can be used in augmented reality (AR), virtual reality (VR), mixed reality (MR), robotics, security and surveillance (e.g., smart cities), autonomous or semi-autonomous machine applications, industrial manufacturing, simulation, and/or any other technology spaces where hardware-level accelerator task scheduling and memory persistence can be used. In some implementations, the systems, methods, and/or processes described herein can be executed using similar components, features, and/or functionality to those of example machine 1800 of FIGS. 18A-18E, example computing ecosystem 1900 of FIG. 19, example generative language model system 2000 of FIG. 20, and/or example computing device 2100 of FIG. 21.

This disclosure relates to systems and methods for constructing and providing (e.g., submitting) command buffers using non-privileged execution contexts to initiate hardware accelerator execution with reduced host-side complexity. For example, systems and methods in accordance with the present disclosure facilitate construction of command buffers in user-mode memory, referencing resource identifiers stored in a resource table (e.g., validated during initialization). The command buffers can be submitted to a firmware-controlled signaling and scheduling interface to cause launching of the buffer for execution using firmware-controlled hardware orchestration. That is, constructing a command buffer can include embedding references to DMA configurations, accelerator memory mappings, and/or compute programs, facilitating runtime task execution without re-validation.

Some techniques for accelerator task submission rely on fixed-function driver stacks or privileged execution contexts that validate, translate, and launch tasks, limiting flexibility and introducing latency. These approaches often require repeated transformations of task data, increasing host overhead and restricting direct interaction with firmware-level resources. Additionally, firmware implementations often rely on rigid task sequences, reducing parallelism between memory setup and task execution. The technical limitations relate to how these systems configure, validate, and/or launch compute workloads on hardware accelerators. For example, sequential validation processes prevent pipelining of memory operations and compute tasks. Fixed driver interfaces restrict the user-mode construction of valid command buffers and enforce static task submission workflows. The improved implementations described herein provide firmware-assisted launch of user-mode-constructed command buffers, allowing resource identifiers to reference pre-validated configurations with minimal and/or reduced host overhead.

Systems and methods in accordance with the present disclosure provide improvements in accelerator control pipelines by supporting direct submission of command buffers, resource table lookups for fast validation, and decoupled signaling interfaces for triggering task execution. For example, user-mode applications can construct command buffers referencing hardware configurations via resource identifiers, submit them to a firmware-controlled signaling interface, and trigger task execution without re-validation. The system supports hardware component execution based on fine-grained resource references, including memory bindings and DMA setups, reducing CPU cycles consumed during accelerator task launches. Additionally, firmware-controlled execution allows overlapping of memory setup and compute task execution, improving task throughput and utilization of heterogeneous processing units.

The systems and methods can construct, in memory, a command buffer including at least one command identifying at least one resource. In some implementations, a workload can be allocated and/or populated to an interface. In some implementations, the command buffer can be constructed in chunks and can be fetched by firmware via direct memory access (DMA) with prefetch and/or linking logic (e.g., low-level operations-VPU launch, DMA setup, memory copy operations, barrier, fences, and/or status reporting, to be executed synchronously and/or asynchronously by firmware). Additionally, resources can be maintained per context and store validated items in the resource table (e.g., DMA configuration, executable, DRAM buffer). The systems and methods can provide, to a submission queue corresponding with a non-privileged execution context, submission information of the command buffer (e.g., including fields, such as a buffer chunk offset, pre-fences, post-fences, and/or an engine affinity mask). In some implementations, the submission information can be written to a queue (e.g., user-space pushes a queue entry including the queue ID and/or the new tail index of the queue to the firmware). The systems and methods can provide, to a signaling interface (e.g., command completion queue (CCQ) register interface, exposed to the user-space) corresponding with the submission queue, a submission indicator corresponding to the submission information. In some implementations, the updated tail index can be written to a register (e.g., CCQ register). For example, the submission indicator can be written to a memory-mapped CCQ register indicating the new tail index of the submission queue. The systems and methods can cause execution of the command buffer by at least one hardware component (e.g., VPUs, DMA engines, PPEs) of a hardware accelerator, the command buffer identifying the at least one resource. In some implementations, the firmware can trigger interrupt handling to begin dequeuing and/or executing the command buffer, followed by dispatching the command buffer to available hardware units (e.g., the firmware loads VPU executables, programs DMA hardware, and/or executes commands).

The systems and methods described herein can be applied to accelerator control in embedded and edge computing environments, including applications in computer vision, real-time analytics, and low-power AI workloads. For example, the architecture can execute scheduling pipelines for heterogeneous accelerators used in object detection, safety features in autonomous vehicles, smart city infrastructure, robotics workloads, industrial automation, and/or parallel processing workloads deployed in embedded AI platforms. The system provides technical improvements in offloading control of task dispatch to firmware, constructing submission information from a user-mode context, and/or executing hardware components in a controlled manner without relying on monolithic runtime drivers. The implementations address technical limitations in traditional firmware interfaces by facilitating low-latency scheduling, reducing host-side overhead, and/or enforcing execution order using hardware-controlled queues.

This disclosure also relates to systems and methods for binding local memory regions in hardware accelerators to external memory locations via a firmware interface and exposing device pointers for command buffer construction in non-privileged contexts. For example, systems and methods in accordance with the present disclosure facilitate memory binding through firmware-based allocation commands that can track associations in a resource table and expose device pointers to user-mode applications for constructing command buffers. The bindings can be reused across user contexts using device pointers, thereby reducing latency through policy-based data handling (e.g., fill-on-miss, flush-on-eviction). That is, memory operations can be policy-driven and tracked via resource identifiers, supporting deferred data movement and persistent memory mapping.

Some techniques for managing accelerator memory rely on statically mapped local memory or repeated allocation and initialization for each task, reducing flexibility and increasing redundant data movement. These approaches often require host-side memory mapping logic and repeated flush and initialize operations, leading to inefficient accelerator context switching and increased DMA setup latency. Additionally, manual tracking of memory associations at the application level introduces inconsistencies across executions. The technical limitations relate to how these systems bind local memory regions to external memory, expose memory mappings to unprivileged applications, and/or control memory residency policies. For example, rigid memory APIs often require explicit flushes and reinitialization even for persistent allocations. Lack of firmware coordination in memory tracking leads to overhead in binding validation. The improved implementations described herein provide device-pointer-based binding access and policy-driven residency control through firmware-managed resource tables.

Systems and methods in accordance with the present disclosure provide improvements in accelerator memory allocation by providing firmware-coordinated local-to-external memory binding, memory persistence tracking via resource identifiers, and/or device-pointer-based buffer referencing. For example, local memory regions (e.g., L2SRAM) can be bound to external memory locations (e.g., DRAM) using firmware calls, with the returned device pointer stored in a memory buffer accessible to non-privileged execution contexts. The system can provide policy-based initialization and flushing of local memory during user context switches and/or on explicit request. Additionally, memory binding reference counts and residency metadata can be tracked via resource identifiers to facilitate memory sharing across user tasks and improve consistency across execution cycles.

The systems and methods can allocate, via a firmware interface, a local memory region (e.g., a segment of the L2SRAM of the hardware accelerator) in a local memory of a hardware accelerator (e.g., a programmable vector accelerator (PVA) and/or any other accelerator including VPU, DMA controller, and/or task logic) bound to an external memory region (e.g., dynamic random access memory (DRAM) and/or any system-accessible memory not co-located within the accelerator). In some implementations, a contiguous region of L2SRAM can be reserved and/or provisioned for use by an application, command buffer, and/or operator. The allocation can be logical and tracked via firmware with metadata including at least size and/or association(s) to the external memory. Additionally, the allocation can return a device pointer corresponding to a binding, the binding tracked using a resource identifier in a resource table (e.g., maintaining mappings between resource identifiers and associated metadata for binding) corresponding with a non-privileged execution context (e.g., a specific user-space application and/or task executing under a client-specific queue). The systems and methods can provide the device pointer to a memory region accessible to the non-privileged execution context for at least one subsequent construction of at least one command buffer identifying the binding of the local memory region to the external memory region. For example, the firmware-generated device pointer can be exposed to user-mode software.

The systems and methods described herein can be implemented in memory configuration pipelines for embedded accelerators in latency-sensitive environments, such as edge devices performing vision inference, autonomous vehicles, sensor fusion, smart city infrastructure, and/or robotics control. For example, the system can configure memory bindings between local scratchpad memory (e.g., L2SRAM) and DRAM using firmware-mediated command interfaces. These implementations improve the initialization and persistence of local memory across task contexts, reduce redundant memory operations, and/or facilitate runtime execution to use previously configured memory mappings. The system eliminates and/or reduces the need for manual management of DMA configuration lifecycles and introduces a firmware-controlled mapping implementation that maintains isolation across user contexts.

This disclosure also relates to systems and methods for orchestrating execution of low-level command buffers on heterogeneous hardware accelerators using firmware-controlled scheduling based on command order and/or resource availability. For example, systems and methods in accordance with the present disclosure facilitate construction of command buffers in user-mode memory, where the command buffer can contain individual commands targeting specific hardware components such as DMA engines, VPUs, and/or PPEs. The commands can reference configuration data via resource identifiers stored in a resource table validated during initialization by a kernel-mode driver (KMD). That is, the firmware can dispatch and/or validate each command using precomputed metadata in the resource table, allowing out-of-order completion of commands based on hardware readiness.

Some techniques for accelerator orchestration rely on coarse-grained command execution models where the host submits a single task that internally stages and launches hardware components in sequence. These approaches prevent low-latency pipelining and hide parallel execution potential from the user-mode software. Additionally, firmware validation and command dispatch often rely on opaque translation layers and/or fixed scheduling strategies. The limitations relate to how these systems control hardware execution order, facilitate latency hiding, and/or expose hardware-level orchestration flexibility. For example, a sequential execution model prevents preloading future DMA configurations during VPU task execution. Static firmware execution logic restricts reordering and/or fine-grained hardware usage. The improved implementations described herein provide user-controlled command buffers, firmware-level dispatch logic, and/or execution sequencing based on hardware availability (e.g., rather than strict command order).

Systems and methods in accordance with the present disclosure provide improvements in hardware accelerator orchestration by facilitating user-mode control over command buffer construction, firmware-based command validation and dispatch, and/or overlapping command execution across heterogeneous hardware units. For example, a command buffer can be constructed using individual commands to configure a DMA controller, launch a VPU kernel, and/or query timestamps before and/or after execution. The firmware component can execute commands sequentially in order of placement but can overlap execution based on hardware availability, allowing latency hiding and efficient hardware utilization. Additionally, resource identifier references to prevalidated configurations in a resource table allow the firmware to validate access without invoking driver-level intervention, reducing submission latency and/or facilitating execution of large compute graphs with minimal and/or reduced host overhead.

The systems and methods can construct, in memory of a hardware accelerator, a command buffer including a plurality of commands. In some implementations, a sequence of commands can be constructed in a memory-mapped region accessible to the firmware. The commands can represent low-level instructions corresponding to at least one firmware-consumable primitive operation. Additionally, at least one command of the plurality of commands can identify at least one resource via a resource identifier (e.g., abstract-opaque references indexed in a resource table and maintained by the kernel-mode driver (KMD). In some implementations, the resource table can be inaccessible to a non-privileged execution context (e.g., protected by the KMD and not directly accessible to an application-layer software and/or user). The systems and methods can provide, to at least one submission interface (e.g., submission queue and/or signaling mechanism, such as a register to facilitate host-to-firmware handoff) corresponding with the non-privileged execution context, submission information of the command buffer and a submission indicator corresponding to the submission information. The systems and methods can cause execution of the command buffer by a firmware component to (i) initiate (e.g., fetch and/or perform execution) execution of the plurality of commands in order of placement in the command buffer and (ii) issue at least one subsequent command for execution prior to completion of at least one previously issued command (e.g., start in order, complete out of order) based on an availability of the at least one resource. For example, even if Command A is still in progress, Command B can be issued if it targets non-conflicting hardware resources. In some implementations, a new command buffer can be made available in a submission queue. The firmware can be triggered and/or invoked to process the command buffer.

The systems and methods described herein can be applied to orchestrating pipelines across hardware components within heterogeneous accelerators, including use cases involving pipelined execution in computer vision tasks, robotics workloads, autonomous vehicles, medical imaging, smart city infrastructure, edge computing, and/or machine learning inference at the edge. For example, the system can control command buffer execution involving DMA, VPU, PPE, reducing latency between tasks by initiating next-task configuration during active task execution. The architecture improves the capability of user-mode software to assemble task pipelines using granular commands and/or resource identifiers validated by firmware-managed resource tables. The implementations remove and/or reduce dependencies on coarse-grained task control models and provide improvements in out-of-order command completion, low-level memory configuration, and/or latency hiding across parallel accelerators.

In some implementations, the systems and methods described herein can be performed within a simulation environment (e.g., NVIDIA's DriveSIM, ISAAC Sim, ISAAC Gym, ISAAC Lab, etc.) using simulated data (e.g., simulated environmental data and simulated sensor data of simulated sensors of a virtual or simulated vehicle, robot, or machine within the simulated environment). For example, simulated input data (e.g., map data, perception data, ego-motion data, tactile data, and/or any other data described herein) can be used to perform (i) user-space buffer construction and firmware-controlled execution for hardware accelerators, (ii) firmware-controlled memory binding and implicit data persistence for hardware accelerators, and/or (iii) firmware-controlled command dispatch and resource-based orchestration for hardware accelerators, etc., and this information can be used to perform operations associated with the virtual machine within the simulation environment. These simulated operations can be used to test performance of the underlying algorithms, systems, and/or processes prior to deploying them in the real-world. In some instances, the simulation can be used to generate synthetic training data—e.g., user-space buffer construction and firmware-controlled execution for hardware accelerators, firmware-controlled memory binding and implicit data persistence for hardware accelerators, and/or firmware-controlled command dispatch and resource-based orchestration for hardware accelerators can generate annotated accelerator traces, memory binding patterns, and command scheduling sequences from within the simulation. The synthetic training data (in addition to or alternatively from real-world data) can then be used or processed to train performance models, validate command buffer construction pipelines, and test resource management policies prior to real-world deployment.

In any example, such as where a simulation environment is used for testing, validation, training, etc., the simulation environment and/or associated training data can be rendered or otherwise generated using one or more light transport simulation algorithms—such as one or more ray-tracing and/or path-tracing algorithms. Where light transport simulation is used, the simulation system can employ one or more dedicated ray-tracing hardware accelerators and/or processors (e.g., NVIDIA's RTX, or another real-time ray-tracing GPU, such as those that include one or more ray tracing (RT) cores) optimized for performing real-time or near real-time light transport simulation operations in conjunction with one or more other processors of the system (e.g., GPUs, CPUs, accelerators, etc.). In some implementations, the simulation environment and/or one or more objects, features, or components thereof can be generated or managed within a three-dimensional (3D) content collaboration platform (e.g., NVIDIA's OMNIVERSE) that can be optimized or suitable for industrial digitalization, generative physical artificial intelligence, and/or other use cases, applications, and/or services. For example, the content collaboration platform or system can include a system for using or developing universal scene descriptor (USD) (e.g., OpenUSD) data for managing objects, features, scenes, etc. within a simulated environment, digital environment, etc. The platform can include real physics simulation (e.g., using NVIDIA's PhysX software developer kit (SDK)), in order to simulate real physics and physical interactions with simulations hosted by the platform. The platform can integrate OpenUSD along with ray tracing/path tracing/light transport simulation (e.g., NVIDIA's RTX rendering technologies) into software tools and simulation workflows for building, training, deploying, and/or testing AI systems—such as systems for testing, validating, training (e.g., machine learning models, neural networks, etc.), and/or other tasks related to automobiles, robots, other machine types, and/or other systems and applications. In some examples, the simulation environment can include a digital twin of a real environment, such as a digital twin of a specific stretch of roadway, a warehouse, a data center, an airport, a geographic area, a marine area, and/or any other real environment where autonomous or semi-autonomous vehicles or machines can operate.

In some implementations, teleoperation or remote control of a vehicle, robot, and/or other machine can be performed using a remote control or teleoperation system. For example, the systems and methods described herein can be used to perform (i) user-space buffer construction and firmware-controlled execution for hardware accelerators, (ii) firmware-controlled memory binding and implicit data persistence for hardware accelerators, and/or (iii) firmware-controlled command dispatch and resource-based orchestration for hardware accelerators that can be included in a visualization or mapping of an environment to aid a remote operator in controlling—or providing waypoints or other indications of control or navigation—an autonomous or semi-autonomous machine through an environment. As such, the remote operator can use the visual, audible, textual, and/or other clues or indicators generated using the systems and methods described herein to aid in navigating the vehicle, robot, machine, etc. through a real-world environment using the teleoperation system.

In some implementations, the system and methods described herein can be deployed in a robotics application. For example, a robot or robotic system can include one or more onboard processors (e.g., CPUs, GPUs, hardware-based deep learning accelerators (DLAs), deep learning accelerator clusters (XNNs), neural processing units (NPUs), neural network accelerators (NNAs), hardware-based programmable vision accelerators (PVAs)—which can include one or more vector processing units (VPUs), direct memory access (DMA) systems, and/or pixel processing engines (PPEs), hardware-based optical flow accelerators (OFAs), SoCs, etc.) and memory and/or storage (e.g., for storing control algorithms, sensor data, and one or more machine learning models). The robotic system can use these processors to execute one or more machine learning models (e.g., language models, vision language models (VLMs), large language models (LLMs), vision-language-action (VLA) models, multi-modal language models (MMLMs), etc.) that allow it to perform complex tasks autonomously or semi-autonomously, such as interacting with and/or manipulating static and/or dynamic objects, or navigating environments using sensors such as cameras, LiDAR, RADAR, ultrasonic sensors, and more. The system can use sensor fusion techniques to combine data from multiple sensors (e.g., cameras, infrared, LiDAR, RADAR, accelerometers) to create a comprehensive model of the robot's surroundings. This data can be processed locally on the robot or sent to remote servers for more computationally intensive tasks, such as 3D mapping or SLAM (Simultaneous Localization and Mapping). In one or more implementations, data from individual robots (e.g., sensor data, task status, or environmental conditions) can be uploaded to the cloud, where centralized AI models can analyze and distribute optimized commands to an entire fleet. In some implementations, the machine learning model(s) (e.g., language models, VLMs, VLAs, LLMs, MMLMs, diffusion models, NeRF models, DNNs, etc.) described herein can be used to allow the robot to perceive and reason about the environment and/or communicate with one or more other robots and/or persons in an environment. In some implementations, the robot can communicate (e.g., using one or more network interface cards (NICs) and/or data processing units (DPUs)) with one or more locally hosted servers/computing devices and/or with one or more remotely located servers/computing devices (e.g., in one or more data centers).

In some implementations, the system and methods described herein can be deployed in an in-vehicle infotainment (IVI) system or in-cabin experience (IX) application. For example, the infotainment system within a vehicle (e.g., cars, trucks, drones, construction equipment, robots, semi-autonomous vehicles, or autonomous vehicles) can include one or more onboard processors (e.g., CPUs, GPUs, hardware-based deep learning accelerators (DLAs), deep learning accelerator cluster (XNNs), neural processing units (NPUs), neural network accelerators (NNAs), hardware-based programmable vision accelerators (PVAs)—which can include one or more vector processing units (VPUs), direct memory access (DMA) systems, and/or pixel processing engines (PPEs), hardware-based optical flow accelerators (OFAs), SoCs, etc.) and memory and/or storage (e.g., for storing control algorithms, sensor data, and one or more machine learning models). and memory and/or storage (e.g., for storing entertainment content, navigation data, and user preferences). The system can use these processors to execute one or more machine learning models (e.g., language models) to enable features such as voice control, personalized media recommendations, dynamic navigation, and real-time communication with other services through network connectivity. The in-vehicle infotainment system can also use natural language processing (NLP) models to enable voice-based interaction. The one or more machine learning models can be stored locally or accessed through one or more APIs that connect to cloud services, enabling the system to process requests in real time or near real-time.

In some examples, the machine learning model(s) (e.g., deep neural networks, language models, LLMs, VLMs, multi-modal language models, vision-language-action (VLA) models, perception models, tracking models, fusion models, transformer models, diffusion models, encoder-only models, decoder-only models, encoder-decoder models, neural rendering field (NERF) models, etc.) described herein can be packaged as a microservice—such an inference microservice (e.g., NVIDIA NIMs)—which can include a container (e.g., an operating system (OS)-level virtualization package) that can include an application programming interface (API) layer, a server layer, a runtime layer, and/or a model "engine." For example, the inference microservice can include the container itself and the model(s) (e.g., weights and biases). In some instances, such as where the machine learning model(s) is small enough (e.g., has a small enough number of parameters), the model(s) can be included within the container itself. In other examples—such as where the model(s) is large—the model(s) can be hosted/stored in the cloud (e.g., in a data center) and/or can be hosted on-premises and/or at the edge (e.g., on a local server or computing device, but outside of the container). In such implementations, the model(s) can be accessible via one or more APIs—such as REST APIs. As such, and in some implementations, the machine learning model(s) described herein can be deployed as an inference microservice to accelerate deployment of a model(s) on any cloud, data center, or edge computing system, while ensuring the data is secure. For example, the inference microservice can include one or more APIs, a pre-configured container for simplified deployment, an optimized inference engine (e.g., built using a standardized AI model deployment an execution software, such as NVIDIA's Triton Inference Server, and/or one or more APIs for high performance deep learning inference, which can include an inference runtime and model optimizations that deliver low latency and high throughput for production applications—such as NVIDIA's TensorRT), and/or enterprise management data for telemetry (e.g., including identity, metrics, health checks, and/or monitoring). The machine learning model(s) described herein can be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice can include the machine learning model(s) (e.g., that has been optimized for high performance inference), an inference runtime software to execute the machine learning model(s) and provide outputs/responses to inputs (e.g., user queries, prompts, etc.), and enterprise management software to provide health checks, identity, and/or other monitoring. In some implementations, the inference microservice can include software to perform in-place replacement and/or updating to the machine learning model (s). When replacing or updating, the software that performs the replacement/updating can maintain user configurations of the inference runtime software and enterprise management software.

Although examples can be described herein with respect to using machine learning models, such as neural networks, this is not intended to be limiting. For example, and without limitation, any of the various machine learning models and/or neural networks described herein can include any type of machine learning model, such as a machine learning model(s) using linear regression, logistic regression, decision trees, support vector machines (SVM), Naive Bayes, k-nearest neighbor (Knn), K means clustering, random forest, dimensionality reduction algorithms, gradient boosting algorithms, neural networks (e.g., auto-encoder neural networks, artificial neural networks (ANNs), convolutional neural networks (CNNs), recurrent neural networks (RNNs), perceptrons, Long/Short Term Memory (LSTM) networks, multi-layer perceptron (MLP) networks, deep stacking networks (DSNs), generative pre-training (GPT) models or networks, feed forward networks, radial basis function ANNs, self-organizing maps (SOMs), Kohonen maps, Hopfield networks, Boltzmann machine, deep belief neural networks, deconvolutional neural networks, generative adversarial networks (GANs), liquid state machines, modular neural networks, liquid state machines, sequence-to-sequence models, networks using transformer architectures, state space models (SSMs) (e.g., networks using Mamba architectures (e.g., Mamba-1, Mamba 2, etc.), networks using selective state space models, networks using structured state space sequence models, etc.), diffusion models (e.g., diffusion probabilistic models, score-based generative models, etc.), neural radiance field (NeRF) models, Gaussian splat models, Kolmogorov-Arnold networks (KANs), models with encoder-only architectures, models with decoder-only architectures, models with encoder-decoder architectures, generative machine learning models, language models, large language models (LLMs), vision language models (VLMs), multi-modal language models (MMLMs), large action models (LAMs), vision-language-action (VLA) models, etc.), and/or other types of machine learning models.

The systems and s described herein can be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, watercraft, shuttles (e.g., robotaxis), emergency response vehicles, motorcycles, electric or motorized bicycles, aircraft, construction vehicles, underwater craft (e.g., piloted or unpiloted submarines), drones, and/or other vehicle types. Further, the systems and methods described herein can be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets (e.g., NVIDIA's Omniverse), cloud computing, and/or any other suitable applications.

Disclosed implementations can be include in a variety of different systems such as automotive systems (e.g., a control system for an autonomous or semi-autonomous machine, a perception system for an autonomous or semi-autonomous machine, etc.), systems implemented using a robot, aerial systems, medial systems, boating systems, smart area monitoring systems, systems for performing deep learning operations, systems for performing simulation operations, systems for performing digital twin operations, systems implemented using an edge device, systems implementing language models—such as large language models (LLMs), vision language models (VLMs), vision-language-action (VLA) models, and/or multi-modal language models, systems using or deploying one or more inference microservices, systems that incorporate deploy one or more machine learning models in a service or microservice along with an OS-level virtualization package (e.g., a container), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 is a block diagram of an example of a system 100, in accordance with some implementations of the present disclosure. It should be understood that this and other arrangements described herein are set forth only as examples. Other arrangements, components, features, and elements (e.g., machines, interfaces, functions, orders, groupings of functions, etc.) can be used in addition to or instead of those shown, and some elements can be omitted altogether. Further, many of the arrangements, components, features, elements, etc. described herein are functional entities that can be implemented as discrete or distributed components or in conjunction with other components, and in any suitable combination and location (e.g., on a local device, vehicle, or machine at the edge, on-premises—such as locally hosted servers, remotely located—such as in one or more computing or server devices in one or more data centers in the cloud, and/or at other locations). Various functions described herein as being performed by entities can be carried out by hardware, firmware, and/or software. For instance, various functions can be carried out using one or more processors (e.g., central processing units (CPU(s)), graphics processing units (GPU (s)), microprocessors, microcontrollers, embedded processors, digital signal processors (DSPs), image signal processors (ISPs), physics processing units (PPUs), field-programmable gate arrays (FPGAs), accelerator(s) (e.g., deep learning accelerators (DLAs), deep learning accelerator cluster (XNNs), neural network accelerators (NNAs), and/or neural processing units (NPUs), programmable vision accelerators (PVAs), optical flow accelerators (OFAs), etc.), application specific integrated circuits (ASICs), data processing units (DPUs), quantum processors, etc.) executing instructions stored in memory. In some implementations, the systems, methods, and processes described herein can be executed using similar components, features, and/or functionality to those of example machine 1800 of FIGS. 18A-18E, example computing ecosystem 1900 of FIG. 19, example generative language model system 2000 of FIG. 20, and/or example computing device 2100 of FIG. 21.

The system 100 can implement at least a portion of accelerator pipeline, such as but not limited to a command scheduling pipeline, a memory binding pipeline, a task orchestration pipeline, a hardware configuration pipeline, a resource validation pipeline, and/or a task execution pipeline. The system 100 can be used to construct command buffers, bind local memory to external memory, and/or dispatch tasks using firmware-managed scheduling by any of various systems described herein, including but not limited to computer vision systems, robotics systems, autonomous vehicle systems, embedded edge systems, smart city systems, medical imaging systems, low-power AI systems, and/or industrial automation systems.

Generally, the accelerator pipeline can include operations performed by the system 100. For example, the accelerator pipeline can include any one or more of a command submission and execution (CSE) stage, a memory binding and persistence (MBP) stage, and/or a firmware scheduling and dispatch (FWSD) stage. Each stage of the accelerator pipeline includes one or more components of the system 100 that perform the functions described herein. In some implementations, one or more of the stages can be performed during the training of AI models. Additionally, one or more of the stages can be performed during the inference phase using the AI models.

The system 100 (e.g., implementing the accelerator pipeline) can construct, in memory, a command buffer including at least one command identifying at least one resource. That is, the system 100 can allocate and populate a workload (e.g., a DSP kernel invocation, a DMA transfer descriptor, a memory fence operation, and/or any sequence of primitive operations executable by firmware). The command buffers can be used as and/or represent an interface between the user-space software layer (e.g., C-language User-space Programmable Vision Accelerator (CUPVA), non-privileged software layer, host-side runtime for programmable accelerators, firmware-backed accelerator programming interface, and/or any user-space DSP kernel execution framework) and the firmware (FW) of, for example, a programmable vision accelerator (PVA) and/or any hardware accelerator. The user-space software layer can construct command buffers and submit them to firmware without modifications and/or updates by a user-mode driver (e.g., a lightweight CUPVA runtime library and/or any user-space runtime translation layer) and/or kernel-mode driver (e.g., a PVA scheduler driver and/or any low-level privileged submission interface). That is, by constructing and submitting command buffers to the firmware without modification, the system 100 can reduce driver complexity, improve determinism of execution, and minimize host-side processing overhead.

Additionally, the system 100 can construct the commands in chunks and can be fetched by firmware (e.g., the firmware component 106) via direct memory access (DMA) using prefetch and linking logic to issue low-level operations (e.g., VPU launch, DMA configuration, memory copy, barriers, fences, and status updates) for synchronous and/or asynchronous execution by firmware. The resource can be a reference to a memory allocation, a handle to a DSP-executable kernel, a buffer identifier for input/output data, and/or any identifier corresponding to a firmware-accessible object used during accelerator task execution. In some implementations, the resource can be validated and stored in a resource table maintained in DRAM, where the resource table can include entries such as DMA configurations, executables, and/or DRAM buffers identified by resource IDs. The resource table can be maintained per context (e.g., per accelerator client, execution stream, user context, non-privileged execution context, or process isolation domain). Additionally, the resource table can be accessed by the firmware and kernel-mode driver, while the resource can be referenced in command buffers indirectly via its corresponding resource ID.

In some implementations, implementing the accelerator pipeline can include the system 100 providing, to a submission queue corresponding with a non-privileged execution context, submission information of the command buffer. For example, submission information can be a queue identifier, a new tail index, a command buffer handle, a resource identifier referencing the command buffer, a pre-fence identifier, a post-fence identifier, a synchronization token, an execution affinity mask, a client context identifier, an encoded pointer to command buffer metadata, and/or any submission parameter used to identify, locate, and/or trigger execution of a command buffer. That is, the system 100 can write the submission information to a queue (e.g., non-privileged execution context can push a controlled command queue (CCQ) entry (e.g., representing a unit of work or instruction the firmware can fetch, decode, and/or execute)) including the queue ID and the new tail index of the queue. In some implementations, the submission queue can be stored in DRAM 130 as a circular buffer and/or another buffer accessible by both the UMD (e.g., as part of the software stack running in user space on the host processor—the CPU host(s) 128) and the firmware. That is, the submission queue can be written to by the UMD and later read by the firmware (e.g., the firmware interface 108) once notified via a signaling register (e.g., the register(s) 114). For example, the firmware can interpret the new tail index as a trigger to begin dequeuing commands, where at least one (e.g., each) entry can remain opaque to the firmware until the submission indicator is received. Additionally, at least one (e.g., each) entry can include fields (e.g., buffer chunk offset, pre-fences, post-fences, and/or an engine affinity mask) used by the firmware to determine scheduling behavior, select hardware components for execution, control synchronization across tasks, and/or manage execution parameters (e.g., chunk size, command type, and/or memory usage conditions).

In some implementations, the submission queue (e.g., in the memory region(s) 132) in DRAM 130 can be written to by one or more user-mode components (e.g., UMD threads, application-layer command construction routines, and/or any user-space software issuing accelerator tasks, instructions, and/or actions) operating within a non-privileged execution context. That is, a UMD and/or application executing in the non-privileged execution context can write an entry to the circular buffer and/or update the tail index, where the entries can remain uninterpreted by the firmware until a corresponding submission indicator is written and/or provided to a signaling register (e.g., the register(s) 114). For example, the firmware can begin reading entries from the updated tail index once the signaling interface 112 receives the submission indicator, facilitating firmware-controlled decoding and/or execution. Generally, a "non-privileged execution context" can be any software process, application, or thread executing without direct access to kernel-level system resources, memory-mapped device control regions, or firmware-maintained data structures, such as user-mode drivers, application-layer programs, or isolated compute threads running in a restricted address space.

Additionally, implementing the accelerator pipeline can include the system 100 providing, to a signaling interface 112 (e.g., exposed to the user-space) corresponding with the submission queue, a submission indicator corresponding to the submission information. For example, the submission indicator can be an updated tail index that can be stored in a register (e.g., the register(s) 114, such as a CCQ register and/or any memory-mapped signaling register). Generally, the submission indicator can be a notification used to trigger firmware processing of a new submission queue entry. That is, the submission indicator can reference a tail index value that signals availability of at least one command buffer entry for firmware consumption. In some implementations, the system 100 can write to a memory-mapped CCQ register indicating the new tail index of the submission queue. Additionally, the tail index can be increased and when a tail is not increased (e.g., from a previous tail index, such as a repeated tail index or an invalid value) the firmware (e.g., firmware component 106) can mask the register 114 (e.g., disable interrupt generation from the corresponding queue), preventing further interrupts from that non-privileged execution context until reset, re-armed by the firmware, and/or reinitialized by privileged software.

In some implementations, implementing the accelerator pipeline can include the system 100 causing execution of the command buffer by at least one hardware component of a hardware accelerator, the command buffer identifying the at least one resource. The hardware component can be the vector processing units (VPUs) 118, the direct memory access (DMA) controllers 116 (also referred to herein as a "DMA engine"), and/or the programmable or pixel processing engines (PPEs) 220.

In some implementations, the DMA controller 116 of the system 100 can manage direct memory access operations between external DRAM and local memory resources such as L2SRAM. It should be understood that the DMA controller 116 can be referred to interchangeably as a DMA engine. That is, references to the DMA engine correspond to the same DMA controller circuitry used to issue and process memory transfers. In various implementations, the firmware component 106 can construct DMA configurations referencing slots and descriptors that are executed by the DMA controller 116 to transfer data without host CPU intervention. For example, firmware can configure the DMA controller 116 to transfer input images from DRAM to local L2SRAM for processing by a vector processing unit (VPU) 118. In another example, the DMA controller 116 can transfer processed output from L2SRAM (e.g., the local SRAM 124) back to the DRAM 130. In some implementations, firmware can use channel 0 of the DMA controller 116 to load configurations or descriptors into TCM, while additional user channels can be explicitly allocated via command parameters (e.g., struct pva_user_dma_allowance). That is, direct memory transfers referenced in the command buffers can be executed by the DMA controller 116 (also referred to as the "DMA engine") using the assigned configuration and descriptor state for a corresponding DMA set.

At least one (e.g., each) component can be acquired and released via commands in the command buffer (e.g., pva_cmd_acquire_engine, pva_cmd_release_engine, etc.). That is, a firmware interrupt can be triggered to cause dequeuing and execution of the command buffer. The system 100 can dispatch the command buffer onto available hardware units and/or systems. For example, the firmware component 106 can load an executable associated with a VPU 118 and configure runtime parameters using values referenced from the resource table 110. In another example, the firmware component 106 can program register settings for a DMA controller 116 based on a previously validated DMA configuration identified by a resource identifier in the command buffer 134. In yet another example, the firmware component 106 can schedule instructions for the PPEs 220 to perform fixed-function processing routines identified in the command buffer 134. In yet another example, the firmware component 106 can issue synchronization commands to enforce sequencing or completion dependencies between the VPU 118 and the DMA controller 116 operations. In these examples, the causing of the execution can be facilitated by the firmware component 106 interpreting and issuing commands (e.g., using the firmware interface 108) in order of placement and/or out of order placement within the command buffer and completing execution based on availability of the targeted hardware components. That is, command dispatch and completion can occur in a partially overlapping manner, facilitating parallel hardware utilization without requiring completion of previously dispatched commands. For example, execution can be performed under the control of the firmware component 106 resource metadata stored in the resource table 110 and triggered based on resource availability and/or execution order.

Generally, systems and methods in accordance with the present disclosure can perform firmware-controlled execution of command buffers that reference validated resources in a shared resource table. That is, the system 100 can dispatch commands in order of buffer placement and/or permit out-of-order completion based on resource availability, allowing the firmware component 106 to manage parallel execution across hardware components such as the VPUs 118, DMA controllers 116, and/or PPEs 220. The command buffers can be submitted via submission interfaces that decouple queue writing and firmware notification, improving command throughput and reducing host-side latency. These implementations facilitate firmware dispatch of compute workloads while reducing reliance on monolithic task sequences and improving utilization of independently schedulable hardware systems and/or engines.

The system 100 (e.g., implementing the accelerator pipeline) can allocate, via a firmware interface (e.g., the firmware interface 108), a local memory region in a local memory (e.g., the local SRAM 124, such as L1/L2SRAM, and/or any other on-chip memory) of a hardware accelerator (e.g., PVA subsystem 102) bound to an external memory region (e.g., the memory regions(s) 132). The allocation can return a device pointer corresponding to a binding. In some implementations, binding can be tracked using a resource identifier in a resource table 110 corresponding with a non-privileged execution context (e.g., for a specific user-space application or task executing under a specific client queue (CCQ)). The firmware component 106 can reserve and/or provision a contiguous region of L2SRAM (e.g., the local SRAM 124) for use by an application, command buffer, and/or operator. The allocation can be logical and/or tracked via the firmware component 106 with metadata stored in the resource table 110, including size, association to the external memory (e.g., the DRAM 130), binding state, reference count, residency policy, and/or any firmware-managed memory attribute.

In some implementations, the firmware interface 108 can be a submission pathway where a kernel-mode driver (KMD) issues initialization commands, registers resource configurations, and/or allocates accelerator memory regions for use by non-privileged execution contexts. Generally, the KMD can operate on the host processor of the CPU host 128 and interact and/or otherwise interface with the control subsystem 104 of the PVA subsystem 102 to perform privileged operations such as resource registration and firmware-level memory binding. That is, the KMD can interface with the firmware component 106 via the firmware interface 108 and can update entries in the resource table 110 during system initialization. The KMD can also coordinate with UMDs by provisioning memory mappings, assigning resource identifiers, and/or managing access policies enforced by the firmware component 106.

In some implementations, the system 100 can request a segment of the local SRAM 124 (e.g., L2SRAM) to be reserved for use. The PVA subsystem 102 can include the VPU(s) 118, DMA controller(s) 116, and/or PPE(s) 120, and/or other task and/or execution logic. The system 100 can associate (e.g., bind) the allocated L2SRAM region (e.g., the local SRAM 124) with a DRAM buffer (e.g., the command buffer(s) 134). The firmware component 106 can manage a mapping between the L2SRAM and a DRAM-based memory location to form a persistent data-binding. That is, the firmware component 106 can manage the mapping by maintaining metadata in the resource table 110 to associate the L2SRAM region with its corresponding DRAM region, track residency state, and/or enforce memory access policies. For example, the firmware component 106 can track reference counts, access frequency, and/or data freshness between the local and external memory regions. In this example, the L2SRAM memory region can be allocated without an explicit location designation (i.e., without requiring a fixed physical address), and the firmware interface 108 can select and/or assign a memory region based on a best-fit policy (e.g., selecting a region based on available space and alignment requirements). In another example, the firmware interface 108 can select and/or assign a memory region based on memory type, priority level, and/or any firmware-defined resource allocation constraint.

In some implementations, after the binding is created, the firmware can generate the resource identifier (e.g., unique identifier) referring to the local-to-external memory binding. That is, an opaque handle can be created and used by the user-space software and/or any other firmware layer to refer to the binding without knowledge of low-level implementation details (e.g., without exposing internal memory addresses, such as physical DRAM address, memory-mapped offsets, residency flags, and/or any firmware-controlled access states). The resource table 110 can be used to maintain mappings between resource identifiers and associated metadata for binding (e.g., local memory region address, external memory region backing address, access policies, binding state, reference count, and/or any memory allocation enforced by the firmware component 106). Additionally, the external memory region can be the DRAM 130 and/or any system-accessible memory not co-located with the hardware accelerator (e.g., the PVA subsystem 102). Generally, the device pointer can be a logical identifier given to the non-privileged execution context to represent the mapped DRAM location. That is, it does not represent a direct memory address, but can represent an abstracted handle and/or opaque value used by firmware component 106 to construct DMA descriptors (e.g., memory transfer instructions including source and destination addresses, transfer size, and binding attributes).

In some implementations, implementing the accelerator pipeline can include the system 100 providing the device pointer to a memory region accessible (e.g., a DRAM-based buffer mapped to user space) to the non-privileged execution context for at least one subsequent construction of at least one command buffer (e.g., the command buffer 134) identifying the binding of the local memory region to the external memory region. That is, the system 100 can write the device pointer to a DRAM location mapped to a user-mode address space associated with the execution context. The memory region accessible to the non-privileged execution context can be a user-mode memory region allocated in system DRAM (e.g., the DRAM 130), accessible by user-mode software (e.g., a user-mode driver (UMD) or application). For example, the system 100 can expose the firmware-generated device pointer to user-mode software (e.g., via CUPVA) by writing the device pointer to a known offset in a DRAM buffer preallocated for inter-context communication.

In some implementations, a command buffer 134 can be constructed in user space to reference the device pointer provided in the accessible memory region, where the device pointer identifies a binding between the local memory region and the external memory region (L2SRAM-to-DRAM). The user-mode context can initiate construction of the command buffer 134 using the device pointer as a reference (e.g., without requiring additional binding metadata). Additionally, at least one (e.g., each) UMD context can be associated with a corresponding KMD context and a dedicated command completion queue (CCQ) (e.g., FIFO, LIFO), representing an isolated execution context for a specific user application. That is, the UMD-KMD context pairing can define the logical interface of the application to the PVA subsystem 102, maintaining isolation by associating at least one (e.g., each) command stream with its own submission pathway and/or firmware-accessible resource scope. In some implementations, the device pointer can represent a logical reference to a binding between a local memory region (e.g., L2SRAM) and an external memory region (e.g., DRAM), encapsulating metadata that identifies the local-to-external memory association without exposing underlying physical addresses.

Generally, systems and methods in accordance with the present disclosure can allocate local memory regions in accelerator memory (e.g., L2SRAM) and bind them to external memory regions (e.g., DRAM) using firmware-managed mappings referenced via device pointers. That is, the system 100 can track bindings using resource identifiers in a firmware-maintained resource table and expose device pointers to user-mode software for use in command buffer construction. The bindings can persist across execution windows and facilitate memory residency policies such as fill-on-miss and flush-on-eviction. The implementations reduce redundant memory allocation and copying operations, improve data persistence, and/or abstract binding metadata into opaque handles usable by user-space applications without exposing privileged memory access logic.

The system 100 (e.g., implementing the accelerator pipeline) can construct, in memory of a hardware accelerator, a command buffer 134 including a plurality of commands. The at least one command of the plurality commands can identify at least one resource via a resource identifier (e.g., abstract-opaque reference indexed in a resource table 110 and maintained by the KMD) in a resource table 110 inaccessible to a non-privileged execution context. That is, the system 100 can construct a sequence of commands in a memory-mapped region accessible to the firmware. For example, the memory-mapped region accessible to the firmware can be the memory region(s) 132 of the DRAM 130. The command buffer 134 can encode and/or otherwise represent hardware control operations (e.g., set CPU parameters, load DMA configuration, trigger barrier synchronization). The system 100 can establish command buffers 134 as a direct interface between CUPVA and FW. That is, the user-mode software (e.g., CUPVA) and/or user-mode application can be used to construct the command buffers 134 and submit them to firmware (e.g., the firmware component 106) without modifications by the UMD or KMD. The resource table 110 can store metadata in a firmware-managed memory region. For example, the metadata can be memory address bounds, DMA descriptors, VPU code pointers, engine affinity masks, and/or any firmware-defined configuration property.

In some implementations, the commands can be primitives and/or instruction encodings representing low-level instruction corresponding to a firmware-consumable operation (e.g., primitive operation). For example, the command be to initialize a VPU program, prefetch DMA configuration, trigger a DMA transfer, configure an engine register, invoke a barrier group, record a timestamp, and/or any firmware-detectable execution trigger. Additionally, at least one (e.g., each) command can independently address hardware blocks (e.g., configure DMA controller and/or engine, trigger VPU code execution, program a PPE stage, issue a memory copy operation, initiate query buffer write, and/or any targetable compute or memory component). The resource table 110 can be protected by the KMD (e.g., inaccessible) and not directly accessible (e.g., not mapped into the virtual memory space of the user application) to a user application layer and/or software application layer executing on the CPU host(s) 128.

In some implementations, implementing the accelerator pipeline can include the system 100 providing, to at least one submission interface corresponding with the non-privileged execution context, submission information of the command buffer and a submission indicator (e.g., notifying firmware a new command buffer is available in the submission queue) corresponding to the submission information. Generally, the "submission interface" can be a set of communication components (e.g., logical construct) including a memory-mapped command queue and a signaling register used for host-to-firmware coordination. That is, the submission interface can include the submission queue (e.g., circular buffer with head/tail indices) and a signaling mechanism (e.g., register) allowing host-to-firmware handoff. For example, the system 100 can provide, to a submission queue (e.g., a circular buffer allocated in DRAM 130 as part of the memory region(s) 132 of the submission interface) corresponding with a non-privileged execution context, submission information of the command buffer. In another example, the system 100 can provide, to a signaling interface (e.g., a memory-mapped control register of the submission interface, such as a CCQ register within the register(s) 114 of the control subsystem 104) corresponding with the submission queue, a submission indicator corresponding to the submission information.

Additionally, the implementing the accelerator pipeline can include the system 100 causing execution of the command buffer by a firmware component to (i) initiate execution of the plurality of commands in order of placement in the command buffer and (ii) issue at least one subsequent command for execution prior to completion of at least one previously issued command based on an availability of the at least one resource. That is, the firmware component 106 can be triggered and/or invoked (e.g., via an interrupt or register write received through the signaling interface 112 of the control subsystem 104) to process the command buffer 134 (e.g., stored in a memory region of DRAM 130 and written by a user-mode component such as CUPVA, with a submission indicator provided to firmware via the signaling interface 112).

In some implementations, initiating can include fetching a first command from the command buffer 134 and decoding the command to identify a target hardware component and/or corresponding resource identifier (e.g., in the resource table 110). That is, the system 100 can fetch and/or perform execution of at least one (e.g., each) command in the sequence based on sequential traversal of the command buffer entries using head and tail index metadata. The execution can be in order of placement such that the head points to the next command to fetch and the tail marks the boundary for submitted but unexecuted commands. In some implementations, issuing the at least one subsequent command can include dispatching a command from the command buffer 134 to a hardware component prior to completion of a previously dispatched command. That is, the system 100 can evaluate resource dependencies between commands and selectively issue non-conflicting commands. The system 100 can support and/or otherwise facilitate out-of-order completion of commands with respect to the dispatch order. For example, even if Command A is still in progress, Command B can be issued if it targets non-conflicting hardware resources (e.g., one of n number of independent DMA channels, VPU pipelines, local memory regions). In this example, the firmware component 106 can track active and completed commands using internal state machines referencing resource usage and completion status. Thus, the system 100 can start in order but complete out of order. That is, command issue order can follow buffer placement, but actual hardware-level completion can depend on the availability and readiness of the targeted components.

Generally, systems and methods in accordance with the present disclosure can implement user-mode construction of accelerator command buffers using opaque resource identifiers stored in a firmware-managed resource table. The command buffers can encode granular hardware instructions (e.g., VPU program invocations, DMA transfers, and/or PPE synchronizations) and/or can be submitted to firmware via abstracted submission interfaces including queues and signaling registers. The implementations reduce driver complexity by facilitating direct user-mode submission of hardware instructions and decoupling firmware resource validation from host-side resource configuration. Execution can be initiated in buffer order and complete out-of-order based on hardware readiness, allowing high-throughput task scheduling without requiring and/or using kernel-mode translation layers.

Referring to FIG. 1 in more detail, the system 100 can include a programmable vision accelerator (PVA) subsystem 102, CPU host(s) 128, and dynamic random access memory (DRAM) 130. The PVA subsystem 102 can perform image perception tasks, digital signal processing tasks, execution of firmware-controlled command buffers, memory region binding and data persistence operations, low-level orchestration of heterogeneous compute engines, and/or any other task that involves interaction between user-space constructed workloads and firmware-managed hardware components. For example, any task that requires moving large amounts of image data from a source location to a target location. In another example, any task that requires coordinating memory transfers and compute workloads across multiple accelerator units. In yet another example, any task that involves interpreting user-defined command sequences using pre-validated hardware resource configurations.

The PVA subsystem 102 can include a control subsystem 104, one or more DMA controllers 116, one or more vector processing units (VPUs) 118, one or more programmable or pixel processing engines (PPEs) 120, one or more instruction caches (e.g., stored in the local memory 126), one or more decoupled lookup tables (DLUTs) 122, local SRAM 124, local memory 126 (sometimes referred to herein as "vector memory"), and/or other components. In some implementations, the PVA subsystem 102 includes a level 1 (L1), level 2 (L2), level 3 (L3), and/or level x (Lx) buffer and/or SRAM, referred to local SRAM 124. The local SRAM 124 can be dedicated memory for the one or more DMA controllers 116, VPUs 118, and/or PPEs 120.

The control subsystem 104 can receive commands from the CPU host 128 related to various tasks and/or operations (e.g., command buffer submission, resource registration, memory binding, signaling coordination, validation requests, and/or any firmware-controlled interaction with accelerator resources). The control subsystem 104 can send commands to the one or more DMA controllers 116, VPUs 118, and/or PPEs 120. The control subsystem 104 can send coordinated commands to the one or more DMA controllers 116, VPUs 118, and/or PPEs 120 for performing memory transfer tasks, program execution tasks, post-processing tasks, synchronization tasks, and/or any firmware-dispatched accelerator operation.

In some implementations, at least one (e.g., each) DMA channel can independently (and concurrently with respect to other DMA channels) execute a sequential list (e.g., linked list, ring buffer, and/or any firmware-managed command sequence) of transfers, where at least one (e.g., each) transfer can contain up to n number (e.g., 5, 8, and/or any number of nested) of nested data movements loops, conditionally gated memory accesses, address strides, and/or can perform automatic data padding (e.g., to implement boundary condition in 2D data movements, zero padding, tiling alignment, and/or any structured memory layout adjustment) and can be triggered at various looping dimensions. The DMA channels can work in parallel and share input-output buffers to memory interfaces, such as the DRAM 130 and/or the local memory 126. An example of input buffers and output buffers can be referred AXI data buffers (ADBs) and VMEM data buffers (VDBs). Buffer allocation (e.g., ADB and VDB allocation) can be static and/or directly translates to memory bandwidth available to each DMA channel.

The one or more DMA controllers 116 can control the DMA engines to perform data movements. The one or more DMA controllers 116 can receive commands from the control subsystem 104 for controlling the one or more DMA controllers 116. In some implementations, the control subsystem 104 can generate hardware-specific commands based on higher-level instructions received from the CPU host 128. In some implementations, the CPU host 128 can perform an API call (e.g., via a CUPVA) to the control subsystem 104 which can translate the API call to device code for execution by the DMA channels.

The local memory 126 (e.g., VMEM) can be memory dedicated to the PVA subsystem 102. The one or more DMA controllers 116, VPUs 118, and/or PPEs 120 can create one or more buffers within the local memory 126. The one or more DMA controllers 116, VPUs 118, and/or PPEs 120 can move data into and out of one or more buffers within the local memory 126.

In some implementations, the DLUT 122 can be a hardware component of the system 100 implemented to process memory-resident data using firmware-controlled execution logic. For example, the DLUT 122 can operate on data stored in the local memory 126 and/or external memory (e.g., DRAM 130), where access to the memory can be coordinated using DMA transfers and/or local memory bindings. In some implementations, a command buffer 134 can include at least one command identifying the DLUT 122 as a target hardware component, for example, to perform a data transformation, lookup operation, and/or other memory access operation based on one or more resource identifiers. The firmware component 106 can initiate execution of the DLUT 122 by decoding the command buffer 134 entries and issuing configuration and control signals based on the command content and metadata stored in the resource table 110. Additionally, execution by the DLUT 122 can occur in sequence or overlap with other hardware components, depending on availability and system scheduling. In some implementations, the DLUT 122 can be integrated into accelerator task pipelines including command construction, memory binding, and/or firmware dispatch executions.

The local memory 126 can store and/or otherwise maintain an instruction cache. The instruction cache can cache instructions for the one or more VPUs 118 to execute. That is, the instruction cache can be a memory structure used to store VPU program instructions fetched by firmware for execution. For example, the instruction cache can store instruction streams referenced by a resource identifier in the command buffer 134, loaded by the firmware component 106 during command processing. In some implementations, the instructions cache is part of the one or more VPUs 118. In some implementations, at least one (e.g., each) of the one or more VPUs 118 includes an instructions cache.

In some implementations, the command submission and execution (CSE) stage can be the stage in the accelerator pipeline in which the system 100 can provide a task execution layer to schedule units of work for a hardware accelerator. The system 100 can include at least one control subsystem 104. The firmware component 106 of the control subsystem 104 can construct, in DRAM 130, a command buffer 134 including at least one command identifying at least one resource. The firmware interface 108 can interface with the DRAM 130 to write command buffer data structures using direct memory access. That is, the firmware component 106 can construct the command buffer 134 to be stored in DRAM 130 by populating buffer chunks with encoded commands referencing resource identifiers. For example, constructing in DRAM 130 can include using the firmware interface 108 to allocate, initialize, and/or format command buffer regions aligned to firmware-defined boundaries. In this example, buffer format and chunk descriptors can be written in order of execution to the memory region. In some implementations, the command buffer 134 can be constructed by the firmware component 106 and provided to a memory region 132 of the DRAM 130 to store the command buffer 134. That is, the firmware component 106 can allocate a region in DRAM 130 and write command sequences using prefetch metadata and command field encodings. For example, the firmware component 106 can link buffer chunks by embedding next-chunk resource identifiers. In this example, the firmware interface 108 can populate command headers and link fields as part of firmware-controlled construction.

Generally, the firmware component 106 (also referred to herein as "firmware" and/or a "firmware system") can include a firmware interface 108 and a resource table 110. The firmware component 106 can be implemented as a software-controlled task management and execution module running on microcontroller logic within the control subsystem 104. That is, the firmware component 106 can execute from on-chip memory and manage execution sequencing across hardware units. For example, the firmware component 106 can construct, validate, and/or dispatch commands in DRAM 130 using stored metadata and execution context. Additionally, the firmware interface 108 can access shared memory (e.g., local SRAM 124 and/or local memory 126) and signaling registers (e.g., the register(s) 114) to coordinate submission and execution. In some implementations, the firmware interface 108 can be implemented as a microcontroller-executed instruction path including DMA handlers and resource mapping logic. That is, the firmware interface 108 can receive command buffer submission indicators and decode command sequences based on tail pointer movement. For example, the firmware interface 108 can fetch and interpret command buffer entries from DRAM memory regions 132 in response to queue tail index updates. Furthermore, the resource table 110 can store validation metadata, DMA bindings, and/or executable references. In some implementations, the resource table 110 can be implemented as a firmware-managed data structure indexed by resource identifiers. That is, the resource table 110 can be updated by the firmware based on initialization inputs from the KMD. For example, the resource table 110 can store executable code locations, input/output memory handles, and/or binding policies per user context.

Additionally, in some implementations, the DRAM 130 can receive, via the firmware interface 108, a command buffer 134 constructed by the non-privileged execution context. That is, the firmware interface 108 can write the command buffer 134 to a memory region 132 in the DRAM 130 allocated for storing command buffers corresponding to a given user context. For example, the firmware interface 108 can receive a pointer to the command buffer 134 via a submission queue entry, the queue entry written by CUPVA to a memory-mapped submission interface. In this example, the submission queue can be a DRAM-based memory region 132 accessible to both the firmware interface 108 and the non-privileged execution context. The firmware interface 108 can detect a submission indicator written to a register 114 of the signaling interface 112 and use it to retrieve the corresponding queue entry. In response to the submission, the firmware interface 108 can fetch the command buffer 134 from the specified location in DRAM 130. The firmware component 106 can validate resource identifiers in the command buffer 134 against entries in the resource table 110. The firmware component 106 can then decode and issue commands to hardware in sequence or out-of-order based on hardware resource availability.

In some implementations, the at least one resource can be identified by a resource identifier (e.g., references to executables, DMA configs, and/or DRAM buffers). The command buffer 134 can include the at least one command identifying the at least one resource by the resource identifier. Additionally, the command buffer can include a plurality of command buffer chunks (e.g., split into sized units to allow chaining across multiple buffer chunks). At least one command buffer chunk of the plurality of command buffer chunks can include a bounded size. For example, a first command buffer chunk can include a command identifying a second command buffer chunk (e.g., cross-chunking). In this example, the second command buffer chunk can be retrievable using a resource identifier identified in the command. In some implementations, at least one of the plurality of command buffer chunks can include a next-chunk descriptor indicating a resource identifier corresponding to a subsequent command buffer chunk of the plurality of command buffer chunks. That is, the next-chunk descriptor can be used by the firmware component 106 to perform prefetching during execution.

In some implementations, the firmware component 106 can receive at least one command buffer 134 from a kernel-mode driver (KMD) (e.g., host software stack) corresponding with a privileged execution context via a dedicated signaling path (e.g., signaling interface between the KMD and the firmware) distinct from the signaling interface corresponding with the non-privileged execution context. For example, the command buffer 134 can correspond to a resource table init, queue creation, and/or a registration of global resources (e.g., VPU executables, memory segments, and/or DMA configs). In some implementations, CCQ0 of the register(s) 114 can be reserved for kernel-only signaling. Additionally, the firmware component 106 perform at least one management operation (e.g., init and/or deinit command, append new entries to a resource table 110 with validated IOVA ranges and/or executable symbol mappings) updating a resource table 110 based on the at least one command buffer 134 received from the KMD.

In some implementations, the firmware component 106 can facilitate and/or allow interfacing between privilege layers. For example, the firmware component 106 can register (e.g., initialization phase), with the privileged execution context, a resource configuration for the hardware accelerator (e.g. the PVA subsystem 102). In this example, the resource configuration can include a DMA configuration stored in the resource table corresponding with the non-privileged execution context (e.g., validated configs can be stored in a resource table 110 that is logically tied to a user context). The resource configuration can be identified using a resource identifier (e.g., indirect ID) assigned during registration.

Additionally, the at least one resource can include a direct memory access (DMA) configuration including at least one static slot placeholder and at least one dynamic slot placeholder. The at least one static slot placeholder can identify at least one memory binding at registration time. That is, static slots can be concrete buffers provided at the time of registration. For example, the KMD can validate access to the statically bound buffers and embed the actual addresses into the descriptors. The at least one dynamic slot placeholder can identify a memory binding at execution time. That is, the dynamic slot placeholders often do not have concrete buffers at the time of registration. For example, the KMD can calculate access ranges for dynamic slots. In this example, the firmware component 106 can validate the ranges when binding slots to buffers during the execution of the command buffer. In some implementations, the firmware component 106 can bind the at least one dynamic slot placeholder to at least one memory buffer identified by at least one resource identifier in a resource table 110 corresponding with the non-privileged execution context during execution of the command buffer 134 (e.g., stored in the memory region(s) 132 of the DRAM 130). That is, the firmware component 106 can allow a DMA config to be used across different DRAM buffers.

In some implementations, the firmware component 106 can perform validation of the DMA configuration prior to registration by validating conformance with at least one access bound (e.g., constraint on size, offset of DMA transfers within a buffer, at least one memory address range (e.g., I/O virtual address (IOVA) ranges of DRAM buffers registered with the KMD), and/or at least one descriptor formatting parameter (e.g., structure defining valid DMA descriptors). That is, the firmware component 106 can compare the configuration parameters against predefined access policies encoded in the firmware logic. Additionally, the firmware component 106 can store validation metadata (e.g., access ranges, slot types, transfer size constraints, and/or any descriptor format validation outcome) in the resource table 110 corresponding with the non-privileged execution context prior to assigning the resource identifier for the DMA configuration. That is, the firmware component 106 can preserve validated configuration constraints for reference during future command buffer execution.

The CSE stage can further include the firmware component 106 providing, to a submission queue corresponding with a non-privileged execution context, submission information of the command buffer. The non-privileged execution context can be any software process, application, or thread executing without direct access to kernel-level system resources, memory-mapped device control regions, and/or firmware-maintained data structures, such as user-mode drivers, application-layer programs, or isolated compute threads running in a restricted address space. The submission queue can be stored and/or otherwise maintained in DRAM 130. The submission queue can be implemented as a circular buffer. The submission information can include a tail index (e.g., e.g., where the next submission is to be written) identifying an insertion point of the command buffer in the circular buffer. The submission queue can correspond to a non-privileged execution context in that the queue is mapped into a memory region accessible by the UMD. In some implementations, the submission queue can be written to by user-mode software via memory-mapped address space. That is, the submission queue can contain opaque entries that are fetched by the firmware component 106 upon signaling.

Additionally, the firmware component 106 and/or signaling interface 112 detect, based on the submission indicator, an update corresponding with a current tail value of the submission queue. That is, the firmware component 106 can check at least one (e.g., each) new CCQ write (e.g., the registers 114) includes an incremented tail value. In some implementations, the firmware component 106 can disable (e.g., mask the CCQ interrupt) the signaling interface 112 from receiving subsequent submission indicators in response to detecting that the current tail value is less than or equal to a previously processed tail value. That is, the firmware component 106 can suppress further interrupts from a context if the submission does not indicate progress. For example, the firmware component 106 disabling can be performed responsive to detecting a non-monotonic tail value (e.g., the tail value did not monotonically increase). In some implementations, the signaling interface 112 can be re-enabled in response to closure of the non-privileged execution context and/or creation of a new non-privileged execution context. For example, when KMD (e.g., operating on the host processor of the CPU host 128) notifies the firmware component 106 that a new context was created and assigned a CCQ, the signaling interface 112 can be re-enabled.

In some implementations, metadata can correspond with a resource identifier stored in a resource table 110. The metadata can correspond with the non-privileged execution context (e.g., each user and/or UMD context can maintain its own resource table). For example, the metadata can include locations for executables (e.g., for the VPUs 118 and/or PPEs 120), access ranges, DMA configurations, buffers and buffer sizes of the DRAM 130, next-chunk descriptors, and/or any memory configuration parameter referenced by firmware during execution). Additionally, the firmware component 106 can validate the command buffer 134 based on the metadata stored in the resource table 110 prior to causing the execution of the command buffer 134. That is, the firmware component perform the validation at submission time, increasing runtime safety without invoking the kernel (e.g., relieving the KMD from runtime validation duties).

In some implementations, the firmware component 106 can store and/or cache, in the DRAM 130, at least one previously constructed command buffer for reuse. That is, the firmware component 106 can maintain a reference to the buffer in the resource table 110 to support multi-use submissions. Additionally, the firmware component 106 can reference and/or otherwise retrieve the at least one previously constructed command buffer in the submission information using a resource identifier stored in a resource table 110 corresponding with the non-privileged execution context. That is, the firmware component 106 can match the command buffer handle to metadata previously stored in the resource table 110. For example, DMA configurations can be registered with the KMD and can be reused by referencing them with resource IDs. In some implementations, the firmware component 106 can reuse the at least one previously constructed command buffer for execution by the at least one hardware component of a hardware accelerator (e.g., the PVA subsystem 102). That is, the firmware component 106 can reissue execution logic for already-validated buffers. For example, the firmware component 106 can bypass re-parsing of DMA descriptors if the configuration remains unchanged. The at least one hardware component can include a vector processing unit (VPU) 118 (e.g., executing user-submitted kernels), a direct memory access (DMA) controller 116 (e.g., handling the DRAM 130 and the local memory 126 (e.g., VMEM) transfers), and/or a programmable or pixel processing engine (PPE) 120 (e.g., co-processor for post-processing stages).

The CSE stage can further include the firmware component 106 providing, to a signaling interface 112 corresponding with the submission queue, a submission indicator corresponding to the submission information. That is, the firmware component 106 can write updated tail index to the register 114 (e.g., CCQ register). For example, the firmware interface 108 of the firmware component 106 can write the tail value into a memory-mapped register (e.g., the register(s) 114) corresponding to the CCQ slot assigned to the UMD. The signaling interface 112 can be a command competition queue (CCQ) register interface exposed to the user-space. In some implementations, the submission indicator can be provided to and/or stored in a memory-mapped CCQ register (e.g., the register(s) 114) indicating a new tail index of the submission queue. For example, the tail can be increased (e.g., if firmware component 106 detects repeated or invalid values, it can mask the CCQ, preventing further interrupts from that context until, for example, a reset).

Generally, the signaling interface 112 can include a plurality of register(s) 114. The signaling interface 112 can be implemented as a memory-mapped interface managed by firmware to interpret user-triggered execution requests. In some implementations, the signaling interface 112 can monitor CCQ entries for state transitions. That is, the signaling interface 112 can detect changes to head/tail pointers as submission triggers. For example, the signaling interface 112 can notify the firmware component 106 (e.g., via the firmware interface 108) when a new submission arrives by raising an internal interrupt. Additionally, the register(s) 114 can store control values indicating queue state.

In some implementations, the register(s) 114 can be implemented per-context. That is, the register(s) 114 can be statically assigned per UMD context during initialization. For example, the register(s) 114 can provide isolation across multiple command queues by partitioning interrupt signals and queue access metadata. Additionally, the register(s) 114 can store control values indicating queue state, including tail and head indices, status flags, interrupt enable or mask bits, and error indicators used by the firmware component 106 to track processing progress, determine availability of new entries, and/or control signaling behavior for the corresponding submission queue. In some implementations, the firmware component 106 of the control subsystem 104 can create and/or otherwise instantiate user contexts with dedicated queues and resource tables. For example, the firmware component 106 instantiate a plurality of non-privileged execution contexts, at least one of the plurality of non-privileged execution contexts corresponding with a distinct submission queue and a distinct resource table. In this example, up to 7 non-privileged UMD contexts (e.g., or any n number of contexts) can be instantiated, each context can be mapped to one register 114 (e.g., CCQ) and a distinct resource table 110. The unique submission queue of at least one of the plurality of non-privileged execution contexts can correspond with a distinct signaling interface 112. That is, at least one (e.g., each) context can be isolated with a dedicated queue, CCQ register, and/or resource mapping in firmware. In some implementations, the submission queues and CCQs can be used to prevent cross-context interference.

In some implementations, the command buffer 134 can include an affinity mask indicating at least one of the at least one hardware component of the hardware accelerator permitted to execute the command buffer 134. The affinity mask can be a bitmask or identifier indicating which hardware component are permitted to execute the command buffer 134. That is, the affinity mask can be used by the firmware component 106 to restrict execution of the command buffer 134 to a subset of the at least one hardware component (e.g., the DMA controller(s) 116, VPU(s) 118, PPE(s) 120) to prevent interference with at least one additional command buffer of at least one additional non-privileged execution context. For example, if a hardware accelerator includes two PVAs, the affinity mask can restrict the command buffer to PVE0 and/or PVE1. In this example, execution contexts can be isolated, each having its own queue and CCQ.

The CSE stage can further include the firmware component 106 causing execution of the command buffer by at least one hardware component of a hardware accelerator, the command buffer identifying the at least one resource. That is, the firmware component 106 can issue commands from the command buffer 134 in order of placement and perform overlapping execution based on hardware availability. In some implementations, the firmware component 106 can trigger firmware interrupt handling to begin dequeuing and/or executing the command buffer. The firmware component 106 can dispatch the command buffer 134 onto available hardware units (e.g., FW loads VPU executables, programs DMA hardware, and/or executes commands). The hardware component can be DMA controller(s) 116, VPUs 118, PPE(s) 120. For example, at least one (e.g., each) component can be acquired and released via commands in the buffer (e.g., pva_cmd_acquire_engine, pva_cmd_release_engine). In this example, the firmware component 106 can perform command decoding and manage dispatch sequencing based on resource availability and component readiness.

In some implementations, the memory binding and persistence (MBP) stage can be the stage in the accelerator pipeline in which the system 100 can provide a data path configuration layer to create and/or manage resource bindings and/or access policies in a hardware accelerator. The firmware component 106 of the control subsystem 104 can allocate, via a firmware interface 108 (e.g., submission pathway, via a KMD, that sends structured command buffers to firmware), a local memory region in a local memory (e.g., the local SRAM 124, such as L1/L2 SRAM, and/or any other on-chip memory) of a hardware accelerator (e.g., the PVA subsystem 102, including VPU, DMA controller, PPE and task logic) bound to an external memory region (e.g., the DRAM 130 and/or or any system-accessible memory not co-located with the hardware accelerator). That is, allocating can return a device pointer corresponding to a binding. The binding can be tracked using a resource identifier in a resource table 110 corresponding with a non-privileged execution context (e.g., for a user-space application and/or task executing under a specific CCQ). The firmware component 106 can reserve and/or provision a contiguous region of L2SRAM (e.g., local SRAM 124) for use by an application, command buffer, and/or operator. The allocation can be logical and/or tracked via the firmware component 106 with metadata (e.g., size and association to the external memory).

In some implementations, the firmware component 106 can request a segment of L2SRAM to be reserved for use. Binding can include associating the allocated L2SRAM region with a DRAM buffer (e.g., memory region(s) 132 of DRAM 130). In some implementations, the firmware component 106 can facilitate a mapping between the L2SRAM and a DRAM-based memory location to form a persistent data-binding. The device pointer can be a logical identifier given to user space to represent the mapped DRAM location (e.g., it is not a direct memory address, but an abstracted handle used by software to construct DMA descriptors). The L2SRAM memory region can be allocated without an explicit location designation and the firmware interface 108 can select a memory region based on a best-fit policy. After the binding is created, the firmware component 106 can generate a unique identifier that refers to the specific local-to-external memory binding (e.g., an opaque handle used by the user-space software or other FW layer to refer to the binding without knowledge of low-level implementation details). In some implementations, the resource table 110 can maintain mappings between resource identifiers and associated metadata for binding (e.g., local memory region address, external memory region backing address, access policies, binding state, reference count).

In some implementations, the firmware component 106 can exploit the binding during execution that allows shared memory (L2SRAM) to work with DRAM across task windows. For example, the firmware component 106 can construct, in the external memory region (e.g., the DRAM 130) of the hardware accelerator, the at least one command buffer 134 including at least one command identifying the device pointer corresponding to the binding of the local memory region (e.g., the local SRAM 124) to the external memory region (e.g., the memory region(s) 132. That is, the firmware component 106 can use the DRAM-mapped device pointers to configure DMA transaction as any other DRAM buffer pointer would be used. In some implementations, the firmware component 106 can insert the device pointer in a DMA descriptor (e.g., DMA read or write, Bind L2SRAM, Flush L2SRAM, or Invalidate L2SRAM, compute operation including convolution). In this example, the device pointer can be embedded but used as a typical DRAM address by the application and/or during runtime.

In some implementations, the firmware component 106 can invoke the DMA controller(s) 116 to use the command buffer 134. For example, the firmware component 106 can patch DMA descriptors with a physical address in L2SRAM, apply access policies, and/or initiate a transfer between the DRAM 130 and the local SRAM 124. That is, the firmware component 106 can cause execution (e.g., submission to the firmware or work queue, resulting in the hardware (e.g., the DMA controller 116) performing the requested operations) of the at least one command using the external memory region via the local memory region by a direct memory access (DMA) controller 116 (e.g., perform transfers between the DRAM 130 and the local SRAM 124) using the at least one command buffer. In some implementations, the at least one command can correspond to at least one of (i) reading data (e.g., load: FILL_ON_MISS command (beginning of runtime)) from the external memory region into the local memory region, or (ii) writing (e.g., flush: FLUSH_ON_EVICTION command (end of runtime)) data from the local memory region to the external memory region. For example, the DMA controller 116 can read CNN layer weights from the DRAM 130 into the local SRAM 124 (e.g., input load). In another example, the DMA controller 116 can write computed image feature maps from the local SRAM 124 (e.g., L2SRAM) back to the DRAM 130 (e.g., output flush). In some implementations, multiple VPUs can share common data buffers that can be loaded and/or flushed.

In some implementations, allocating can include providing, to the firmware interface 108, a request to allocate the local memory region in the local memory (e.g., local SRAM 124) of the hardware accelerator and bind the local memory region to the external memory region (e.g., memory region 132). For example, the request can initiate at least one action. For example, the request can include an action to allocate a local memory region (e.g., a block of L2SRAM) in the hardware accelerator. In another example, the request can include an action to bind that local memory region to an external memory region (e.g., DRAM-backed buffer). In some implementations, allocating can include the firmware component 106 receiving, from the firmware interface 108, the device pointer corresponding to the binding of the local memory region to the external memory region. The device pointer can represent an indirect reference to the binding and used during DMA configuration. In some implementations, the request can be generated by a privileged execution context (e.g., a trusted OS kernel, system firmware, and/or during CUPVA runtime, in the runtime or system-level environment with authority to issue low-level hardware control commands) as a firmware-level configuration command using a firmware access application programming interface (API) (e.g., exposed by the CUPVA). For example, the firmware-level configuration command can identify the binding of the local memory region to the external memory region (e.g., local SRAM 124 to memory region 132).

In some implementations, the at least one command buffer 134 can include descriptor data (e.g., metadata) identifying the device pointer. For example, the descriptor data can be updated, prior to execution, to identify a memory access path from the external memory region via the local memory region. Additionally, the memory access path can correspond to a patched physical address (e.g., result of the firmware component 106 rewriting the descriptor data of the command buffer 134 to point to a valid hardware address in L2SRAM (e.g., in local SRAM 124)) in the local memory region identified for the execution of at least one command. The device pointer can correspond to an address indirection including the binding of the local memory region to the external memory region. In some implementations, the address indirection can be identified by a DMA controller 116 to perform at least one memory access command during execution. For example, the L2SRAM memory region (e.g., in the local SRAM 124) can be accessible by a direct memory access (DMA) engine and/or a vector processing unit (VPU). In this example, the device pointer can be usable for configuration of the DMA engine.

In some implementations, the control subsystem 104 can perform task submission. The firmware component 106 can construct, in the external memory region (e.g., the memory region(s) 132 of DRAM 130) of the hardware accelerator, a command buffer 134 including at least one command identifying a resource corresponding to the local memory region (e.g., in the logical SRAM 124). The firmware component 106 can provide, to a submission queue (e.g., stored in the DRAM 130) corresponding with the non-privileged execution context, submission information for the command buffer 134. The firmware component 106 can provide, to a signaling interface 112 corresponding with the submission queue, a submission indicator (e.g., to store in the register(s) 114) corresponding to the submission information. For example, the firmware component 106 can notify the hardware that new work (e.g., the command buffer 134) is ready for execution. In some implementations, the firmware component 106 can cause execution of the command buffer 134 by at least one hardware component of the hardware accelerator.

In some implementations, the firmware component 106 can reuse a previously allocated L2 region for the given user context with same DRAM backed location. For example, a reference to the L2 region can be looked up in the local SRAM 124 based on the resource identifier where a reference count stored in the memory region 132 can indicate whether the DRAM binding is already valid for reuse. Otherwise, the firmware component 106 can reserve a new region in L2 and associates this region to DRAM backing, initialize L2 (policy based) and increment the reference count to track concurrent bindings. For example, the firmware interface 108 can allocate a new local memory region in the L2 memory and initialize its contents from the external memory according to the FILL_ON_MISS policy.

Prior to allocating the local memory region, the firmware component 106 can determine whether a previously allocated local memory region (e.g., in local SRAM 124) bound to the external memory region (e.g., the memory region(s) 132) exists for the non-privileged execution context. That is, the firmware component 106 can reuse the L2SRAM memory region without flushing and/or reloading data between command buffer executions when, for example the user context remains unswitched. In response to determining that the previously allocated local memory region exists, the firmware component 106 can increment a reference count corresponding to the binding. For example, the firmware component 106 can detect that a subsequent task window is associated with a same user context as a preceding task window and maintain data in the L2SRAM memory region between task windows without redundant transfers. Additionally, in response to determining that the previously allocated local memory region does not exist, the firmware component 106 can transmit, by invoking the firmware interface 108, a request to allocate the local memory region in the local memory of the hardware accelerator bound to the external memory region in accordance with at least one access policy.

In some implementations, the firmware component 106 of the control subsystem 104 can determine whether a previously allocated local memory region bound to the external memory region exists for a non-privileged execution context by querying metadata maintained in a resource table 110. For example, the resource table 110 can store bindings between L2SRAM allocations and DRAM buffers, each associated with a reference count and one or more access policies (e.g., FILL_ON_MISS, FLUSH_ON_EVICTION). In response to determining that a previously allocated local memory region exists for the same DRAM buffer, the firmware component 106 can increment the corresponding reference count, allowing the same L2SRAM allocation to be reused across commands within the execution context. In response to determining that no such binding exists, the firmware component 106 can invoke the firmware interface 108 to allocate a new local memory region (e.g., in L2SRAM) and bind it to the DRAM buffer based on the specified access policy. In this example, the firmware interface 108 can manage the allocation request and update the resource table 110 with a new binding and initialized reference count. Additionally, the firmware component 106 can provide a device pointer corresponding to the local memory region to a memory location accessible by the non-privileged execution context for subsequent construction of command buffers referencing the binding. That is, the firmware component 106 can internally manage reuse and allocation of local memory resources via the firmware interface 108 based on execution context state.

In some implementations, the firmware component 106 of the system 100 can manage L2SRAM memory lifecycle by tracking reference counts associated with bindings between local memory and external DRAM. For example, in response to receiving a release request from a non-privileged execution context via the signaling interface 112, the firmware component 106 can identify the corresponding L2SRAM region in the local SRAM 124 based on a resource identifier and decrement a reference count stored in the memory region 132 of the DRAM 130. In this example, the reference count tracks the number of active bindings to the same external DRAM region by different command buffers or execution contexts. If the reference count satisfies a release condition (e.g., reaches zero), the firmware interface 108 can mark the corresponding L2SRAM region as free and remove the associated DRAM backing entry from the resource table 110. That is, the local memory region can be released when all referencing command buffers have completed or been deallocated. In some implementations, the firmware component 106 can issue a pva_cmd_release_12sram command to finalize release of the L2SRAM region, which can be performed asynchronously following completion of dependent commands.

In some implementations, the firmware component 106 can force a flush of local SRAM 124 to DRAM backings in the DRAM 130. The firmware component 106 can initiate a flush operation to transfer data from the local memory region to the external memory region in response to a flush request. For example, the flush operation can occur in response to a user context switch. The firmware component 106 can initiate an invalidate operation marking data stored in the local memory region as invalid in response to an invalidate request to trigger reinitialization of the local memory region during a subsequent access. For example, the firmware component 106 can invalidate data by marking (e.g., metadata bits in a per-region control structure) L2 data as dirty to force re-initialization. In some implementations, data initialization (at allocation) and/or data flushing (at release) can occur at user context switch (e.g., lazy and optimal). For example, initialization of the local memory region with data from the external memory region and flushing of the local memory region to the external memory region can occur in response to the user context switch. Additionally, data flushing can be explicitly requested as well. For example, the flushing can be further performed in response to an explicit request.

In some implementations, the firmware component 106 of the system 100 can facilitate data persistence between the local SRAM 124 and DRAM 130 based on flush and invalidate operations initiated through the signaling interface 112. For example, in response to a user context switch detected at the signaling interface 112, the firmware component 106 can initiate a flush operation to transfer data from a previously bound region in the local SRAM 124 to a corresponding external memory region in DRAM 130 using a DMA controller 116. In this example, the flush operation can be triggered by an explicit flush request issued in a command buffer or implicitly as part of the firmware context switch handler. Additionally, the firmware component 106 can process an invalidate request received from a non-privileged execution context to mark the L2SRAM region as invalid. That is, the invalidate operation can remove any valid state for the local memory region in the resource table 110, requiring reinitialization of the data from DRAM 130 during the next access. In some implementations, the flush and invalidate operations can be represented in the command buffer using dedicated firmware commands (e.g., pva_cmd_release_12sram) that enforce persistence or invalidation policies based on access mode.

In some implementations, the binding can be established in accordance with at least one access policy. The at least one access policy can include a first policy to initialize the local memory region with data from the external memory region and/or a second policy to flush data from the local memory region to the external memory region during release. The firmware component 106 can manage L2SRAM persistence using access policies corresponding to initialization and eviction operations. The firmware interface 108 can apply a FILL_ON_MISS policy to allocate and initialize a region of local SRAM 124 from a corresponding DRAM-backed location in DRAM 130 when a non-privileged execution context requests access to a resource that has not been previously loaded. For example, the firmware component 106 can initiate a DMA transfer using the DMA controller 116 to populate the allocated L2 region with data from a DRAM region identified in the resource table 110. In another example, the firmware component 106 can apply a FLUSH_ON_EVICTION policy to flush data from the L2 region back to DRAM 130 when the region is released. That is, in response to a release request or a context switch, the firmware component 106 can issue a DMA transfer from the L2 region in the local SRAM 124 to the corresponding DRAM address. These access policies can be associated with a resource identifier in the resource table 110 and enforced during command buffer execution using firmware-controlled access logic.

In some implementations, the firmware component 106 can maintain multiple concurrent bindings between distinct regions of local SRAM 124 and corresponding regions of DRAM 130 for a single non-privileged execution context. For example, the firmware interface 108 can associate at least two different local memory regions with at least two different external memory regions by tracking binding information in the resource table 110. At least one (e.g., each) binding can be represented by a resource identifier and associated with a reference count to manage concurrent usage across command buffers. In another example, when a non-privileged execution context submits multiple command buffers that reference different DRAM-backed memory segments, the firmware component 106 can allocate separate regions in local SRAM 124 for at least one (e.g., each) segment and manage persistence and access behavior independently based on policy. That is, the firmware component 106 can maintain a mapping between at least one (e.g., each) L2 region and its DRAM counterpart and track their usage state to prevent conflicts or data corruption. These concurrent bindings can remain active until at least one (e.g., each) corresponding reference count is decremented to zero, at which point the firmware component 106 can release the associated local memory regions.

The firmware interface 108 can include a compatibility layer implemented to translate memory allocation and at least one access request from at least one software application implemented for a version (e.g., previous, different, old) of the hardware accelerator. The compatibility layer can be used to update at least one request to invoke the allocation of the local memory region and the binding to the external memory region via the firmware interface 108. In some implementations, the firmware interface 108 can include a compatibility layer to translate memory allocation and access requests from user-mode software targeting a previous hardware accelerator version. For example, the compatibility layer can intercept legacy API calls corresponding to DRAM-only memory allocations and update them to invoke allocation of a local memory region in SRAM 124 and binding to an external memory region in DRAM 130. In another example, an application implemented for a prior-generation accelerator without firmware-managed SRAM bindings can submit a memory access request, which can be intercepted by the compatibility layer and updated to invoke an internal request to the firmware component 106 through the firmware interface 108 to perform a bind operation. That is, the compatibility layer can rewrite at least one command buffer or memory allocation descriptor to be compliant with firmware-managed persistence policies supported by the current accelerator. In some implementations, the compatibility layer can maintain a mapping between legacy memory handles and internal resource identifiers stored in the resource table 110, allowing the firmware component 106 to manage reference counts and policy enforcement without requiring changes to the application.

In some implementations, the DMA controller 116 can use patched descriptors to perform DMA memory transaction, including a source address, destination address, size of data to be transferred, and/or control flags or policies (e.g., to perform fill-on-miss or flush-on-eviction). For example, the firmware component 106 can set a descriptor to load weights for a CNN from DRAM to L2SRAM before a compute kernel runs. In another example, the firmware component 106 can perform a flush of intermediate results from L2SRAM back to DRAM after a composable operator finishes. That is, the at least one command buffer 134 can include descriptor data identifying the device pointer. The descriptor data can be modified, by the firmware component 106, to identify a source address and a destination address for a DMA transaction by a DMA controller, the source address and/or destination address corresponding to the local memory region and the external memory region bound by the device pointer. Additionally, the descriptor data can further include a transfer size and at least one access policy.

The MBP stage can further include the firmware component 106 providing the device pointer to a memory region accessible to the non-privileged execution context for at least one subsequent construction (e.g., construction of at least one command buffer 134 that references the binding using the device pointer) of at least one command buffer 134 identifying the binding of the local memory region to the external memory region. That is, the firmware component 106 can store the device pointer in a resource table entry and separately expose the device pointer to the non-privileged execution context for later use. For example, the firmware component 106 can store the device pointer in a resource table entry for internal tracking, and it can expose the pointer separately (e.g., via return values, command buffer outputs, or mapped memory structures) to the non-privileged execution context. In some implementations, the firmware component 106 can expose the device pointer to the non-privileged execution context by embedding the pointer value into a response buffer returned from a batched resource registration operation. For example, the firmware component 106 can return the device pointer as part of a resource registration response submitted using pva_async_operations_submit. In this example, a user-mode software component (e.g., CUPVA) can initiate registration of a DMA configuration by appending the operation to an operations buffer using pva_append_ops_dma_config_register, and the firmware component 106 can assign a resource identifier corresponding to a backing DRAM region and an associated L2SRAM allocation. The pointer to the bound local memory region (e.g., device pointer) can be returned in the response buffer and extracted by the user-mode software using a parsing API (e.g., pva_parse_register_resp). Additionally, the device pointer can be reused by the non-privileged execution context in a subsequent construction of a command buffer referencing the memory binding.

In some implementations, providing can include updating a metadata structure associated with the context to reference the device pointer by a resource identifier. In some implementations, to provide the device pointer can include writing the device pointer to a DRAM buffer mapped to the user-mode software context for later use during command buffer construction. The firmware component 106 can expose the firmware-generated device pointer by writing the device pointer to a DRAM buffer that has been mapped to the user-mode software context (e.g., CUPVA), allowing the user-mode software to retrieve the pointer for use in subsequent command buffer construction. The non-privileged execution context can be a UMD-KMD context pair representing an isolated view for a user application of the PVA. At least one (e.g., each) UMD context can be associated with one KMD context and one CCQ FIFO, through which command buffer submissions can be routed. The user context can be used to build a command buffer 134 at a later point in time. That is, the subsequent construction can reference the device pointer by resource ID and construct a command to access the L2SRAM using the previously bound DRAM region. For example, a user command buffer can include a DMA binding and/or VPU parameter update referencing the device pointer associated with the allocated L2 region. The associate between local (e.g., L2SRAM) and external (e.g., DRAM) regions can be maintained using internal firmware metadata linking the resource identifier to both the local allocation and DRAM backing. For example, the resource table entry can store IOVA bounds, access policies, and/or a pointer to the L2 memory block assigned to the binding.

In some implementations, the firmware scheduling and dispatch (FWSD) stage can be the stage in the accelerator pipeline in which the system 100 can dispatch firmware-controlled commands and perform resource-based orchestration for hardware accelerators. The firmware component 106 of the control subsystem 104 can construct, in memory of a hardware accelerator, a command buffer 134 including a plurality of commands. The at least one command (e.g., initializing a VPU program, prefetching DMA configuration, triggering a DMA transfer) of the plurality commands identifies at least one resource via a resource identifier in a resource table 110 (e.g., storing metadata, such as memory address bounds, DMA descriptors, VPU code pointers) inaccessible to a non-privileged execution context. The firmware component 106 can construct a sequence of commands in a memory-mapped region accessible to the firmware (e.g., in the DRAM 130). That is, the firmware component 106 can encode hardware control operations (e.g., set CPU parameters, load DMA configuration, trigger barrier synchronization).

The command buffer(s) 134 can be used to establish a direct interface between the CPU host 128 (e.g., CUPVA) and the PVA subsystem 102 (e.g., hardware accelerator). The CUPVA can construct the command buffers 134 and submit them to firmware component 106 without modifications by the UMD and/or KMD. The commands can be primitives representing low-level instructions corresponding to firmware-consumable primitive operations. That is, the firmware component 106 can interpret and execute each command directly without requiring higher-level translation logic. For example, the firmware component 106 can dispatch a sequence of commands to initialize a VPU executable, bind resources from the resource table 110, and/or initiate VPU or DMA operations. In some implementations, at least one (e.g., each) command can independently address hardware blocks (e.g., configure DMA engine, trigger VPU code execution, etc.). The resource table 110 can be protected by the KMD and not directly accessible to an application-layer software and/or user. The non-privileged execution context can be a UMD and KMD context pair representing an isolated view of the PVA for a user application. At least one (e.g., each) UMD context corresponds to one KMD context and one CCQ FIFO, through which command buffer submissions are routed. For example, a context pair can be represented by a file descriptor identifying the UMD context and an associated kernel object handle identifying the KMD context, at least one (e.g., each) mapped to a unique CCQ index (e.g., fd=5, kctx=0x32 mapped to CCQ3).

Generally, the resource table 110 can include validation metadata corresponding with the resource identifier. The validation metadata (e.g., precomputed during initialization and/or updated during execution) can be inaccessible to the non-privileged execution context during runtime. In some implementations, the firmware component 106 can use the pre-validated metadata stored in the resource table 110 to check whether access to the resource is permitted. For example, the firmware component 106 can cause validation of access to the at least one resource identified in the command buffer 134 using the validation metadata stored in the resource table 110. In this example, the at least one command in the command buffer can correspond with a hardware configuration parameter (e.g., low-level data or control values that define how a particular hardware component of the accelerator (e.g., DMA engine, VPU, PPE)) stored in the resource table 110 and identified using the resource identifier.

Additionally, the firmware component 106 can construct the command buffer 134 within a user-mode application (e.g., the command buffer 134 can be authored in the user space) by identifying at least one resource identifier stored in the resource table 110. The construction of the command buffer 134 can be performed independently of translation by a kernel-mode driver (KMD). In some implementations, the firmware component 106 can register, during system or context initialization, a resource configuration with the KMD corresponding with a privileged execution context. In some implementations, during subsequent non-privileged command buffer submissions, the KMD is not invoked to reduce host-side validation overhead and maintain consistency of resource configuration data. That is, the KMD can act as the trusted agent to validate and register resources. During initialization, the KMD can validate the resources and/or populate the resource tables 110. Additionally, registering the resource configuration can include validating the resource configuration and population of the resource table 110 (e.g., the resource table 110 being inaccessible to the non-privileged execution context).

In some implementations, the DRAM 130 can receive, via a firmware interface 108, a command buffer including a plurality of commands. That is, the non-privileged execution context (e.g., CUPVA) can construct the command buffer 134 in a DRAM memory region 132 accessible to the firmware interface 108. For example, the command buffer 134 can be stored in a memory-mapped region allocated by the user-mode application and tracked via a CCQ submission queue. In this example, the firmware interface 108 can access the tail index of the CCQ FIFO to determine that a new command buffer 134 has been submitted. The firmware component 106 can then fetch the command buffer 134 from DRAM 130 and parse the commands in order or based on hardware availability. Each command in the command buffer 134 can include references to resource identifiers pre-registered and validated by the KMD during context initialization. The firmware interface 108 can validate access to the referenced resources using metadata in the resource table 110. In this example, the firmware interface 108 can decode command fields, track execution status, and issue commands to target components such as DMA controllers 116, VPU(s) 118, and/or PPE(s) 120.

In some implementations, the submission interface can include (i) a submission queue storing the submission information and (ii) a signaling interface 112 storing the submission indicator. The submission queue can be a firmware queue exposed (e.g., in the DRAM 130) to user mode as part of per-context CCQ FIFO. The firmware queue can be shared in memory space between the user space and firmware. For example, at least one (e.g., each) UMD context can have up to 8 queues, at least one (e.g., each) mapped to a firmware queue and entries in the queue can be opaque to the firmware until notified via the CCQ. The signaling interface 112 can represent a CCQ register interface including the register(s) 114 exposed to the user-space.

The FWSD stage can further include the firmware component 106 providing, to at least one submission interface (e.g., (i) a submission queue, such as a buffer with head and tail indices, and/or (ii) a signaling mechanism, such as the signaling interface 112 having the register(s) 114 to facilitate host-to-firmware handoff) corresponding with the non-privileged execution context, the submission information of the command buffer 134 and a submission indicator (e.g., notify the firmware a new command buffer is available in the submission queue) corresponding to the submission information. Generally, the submission interface can include a communication channel for passing command buffer references and/or execution metadata from a user-mode context to firmware. That is, the submission interface can include a submission queue located in the DRAM 130 for referencing command buffer submissions and a memory-mapped signaling register (e.g., register(s) 114) for notifying firmware of submission events. For example, a submission queue can include a circular buffer allocated in DRAM 130 as part of the memory region(s) 132 and used to queue command buffer descriptors from the non-privileged execution context. In another example, a signaling mechanism can include a memory-mapped register (e.g., one of the register(s) 114 in the control subsystem 104) used to trigger firmware processing of the submission queue.

In some implementations, the at least one submission interface can be a submission queue. That is, the firmware component 106 can read from the submission queue to obtain command buffer references associated with a particular user context. For example, providing the submission information can include writing submission metadata, including a new tail index, to the DRAM-backed circular buffer associated with the non-privileged execution context. In some implementations, the at least one submission interface can be a signaling mechanism. That is, the firmware component 106 can monitor the signaling interface 112 for updated values indicating pending submissions. For example, providing the submission information can include writing to a CCQ register to indicate availability of a new command buffer for firmware processing.

The FWSD stage can further include the firmware component 106 causing (e.g., by invoking and/or trigger the firmware component 106) execution of the command buffer 134 to (i) initiate execution of the plurality of commands in order of placement in the command buffer 134 and/or (ii) issue at least one subsequent command for execution prior to completion of at least one previously issued command based on an availability (e.g., one of n number (e.g., 16, 32, 64, 128, etc.) independent DMA channels, VPU pipelines, and/or local memory regions, at least one (e.g., all) tracked by firmware component 106) of the at least one resource. That is, the firmware component 106 can perform sequential fetch and decode operations of command headers and dispatch commands to the appropriate hardware engines based on resource readiness. For example, the firmware component 106 can determine that a DMA transfer command can be issued despite an earlier VPU command being in-flight. In some implementations, the firmware component 106 can fetch and/or perform execution of at least one (e.g., each) command in sequence (e.g., parse the command buffer 134 in linear order and invoke handlers for each command type). For example, the execution of the plurality of commands can occur from head to tail in the command buffer 134. In some implementations, the firmware component 106 can perform out-of-order completion (e.g., even if Command A is still in progress, Command B can be issued if it targets non-conflicting hardware resources). For example, the commands can be issued in order but complete out-of-order. In some implementations, the firmware component 106 can selectively parse a subset of commands based on priority or availability of hardware resources rather than in strict buffer order. For example, the firmware component 106 can skip over commands blocked on unavailable resources and temporarily proceed with execution of later commands referencing idle components.

Additionally, the at least one command can identify and/or otherwise target a single hardware block of the hardware accelerator and can be functionally incomplete in isolation. That is, the command can be a low-level primitive that depends on sequential composition with other commands to complete a functional hardware behavior. For example, at least one command of the plurality of commands controls at least one hardware component (e.g., DMA controller(s) 116, VPU(s) 118, PPE(s) 120, and/or other systems and/or components of the system 100) of the hardware accelerator and is executed in a sequence with at least one additional command of the plurality of commands to perform an operation using the hardware accelerator. In this example, controlling can include configuring DMA channels, setting VPU parameters, managing sequencing and/or dependencies, and/or any state progression defined by the firmware-managed state machines corresponding to each component. The operation can include performing a hardware task, implementing a hardware configuration, performing a set of hardware instructions, and/or effecting a multi-component accelerator behavior.

In some implementations, the firmware component 106 can include a plurality of state machines responsible and/or otherwise implemented for processing a stream of commands, facilitating parallel validation and/or dispatch of multiple commands. Generally, the state machines can be implemented for at least one the DMA controller(s) 116, VPU(s) 118, and/or PPE(s) 120. In some implementations, a first state machine can be implemented for a DMA controller 116. That is, the first state machine can manage transitions from IDLE to FETCHING, SETTING UP, READY, and RUNNING states based on DMA command execution. For example, the firmware component 106 can transition a DMA set from IDLE to FETCHING using pva_cmd_fetch_dma_configuration, acquire TCM scratch, and subsequently issue pva_cmd_setup_dma and pva_cmd_run_dma to complete transfers and return to IDLE.

In some implementations, a second state machine can be implemented for a VPU 118. That is, the second state machine can track execution states such as IDLE, BINDED, INITIALIZING, INITIALIZED, RUNNING, and CMD_RUN_VPU COMPLETED in response to VPU-related commands. For example, the firmware component 106 can execute pva_cmd_set_vpu_executable, pva_cmd_init_vpu_executable, and pva_cmd_run_vpu to drive the state machine from IDLE to RUNNING, tagging transitions (e.g., A-D) corresponding to asynchronous command execution.

In some implementations, a second state machine can be implemented for a PPE 120. That is, the state machine can drive transitions from IDLE to BINDED, CLEARING VMEM, INITIALIZING, INITIALIZED, and RUNNING in response to sequential PPE commands. For example, the firmware component 106 can execute pva_cmd_set_ppe_executable, pva_cmd_clear_vmem, pva_cmd_init_ppe_executable, and pva_cmd_run_ppe to drive PPE state progression and manage shared VMEM access. In some implementations, a general state machine can be implemented for all (collectively) the DMA controller(s) 116, VPU(s) 118, and/or PPE(s) 120. That is, a combined model can enforce execution order, mutual exclusion, and/or hardware sequencing constraints across different subsystems. For example, the firmware component 106 can prevent pva_cmd_set_vpu_executable from executing if a DMA state machine is not in a valid state, synchronizing DMA and VPU access to VMEM in system 100.

For example, at least one state machine of the plurality of state machines can validate the at least one command of the plurality of commands using a corresponding resource identifier. In this example, a command cab reference a DMA config ID, and the firmware state machine can be used to lookup and/or identify the associated metadata in the resource table 110 to verify it defines valid source-destination addresses and descriptors before proceeding. In another example, at least one state machine of the plurality of state machines can dispatch the validated at least one command for execution by a hardware component of the hardware accelerator. In this example, after validating a DMA configuration, the firmware component 106 can write the configuration into DMA engine registers and trigger execution of the transfer, where dispatching can be performed autonomously and based on internal firmware sequencing. In some implementations, commands in the command buffer can include a barrier command (e.g., synchronization primitives) to synchronize at least one hardware component of the hardware accelerator.

Figure 2:
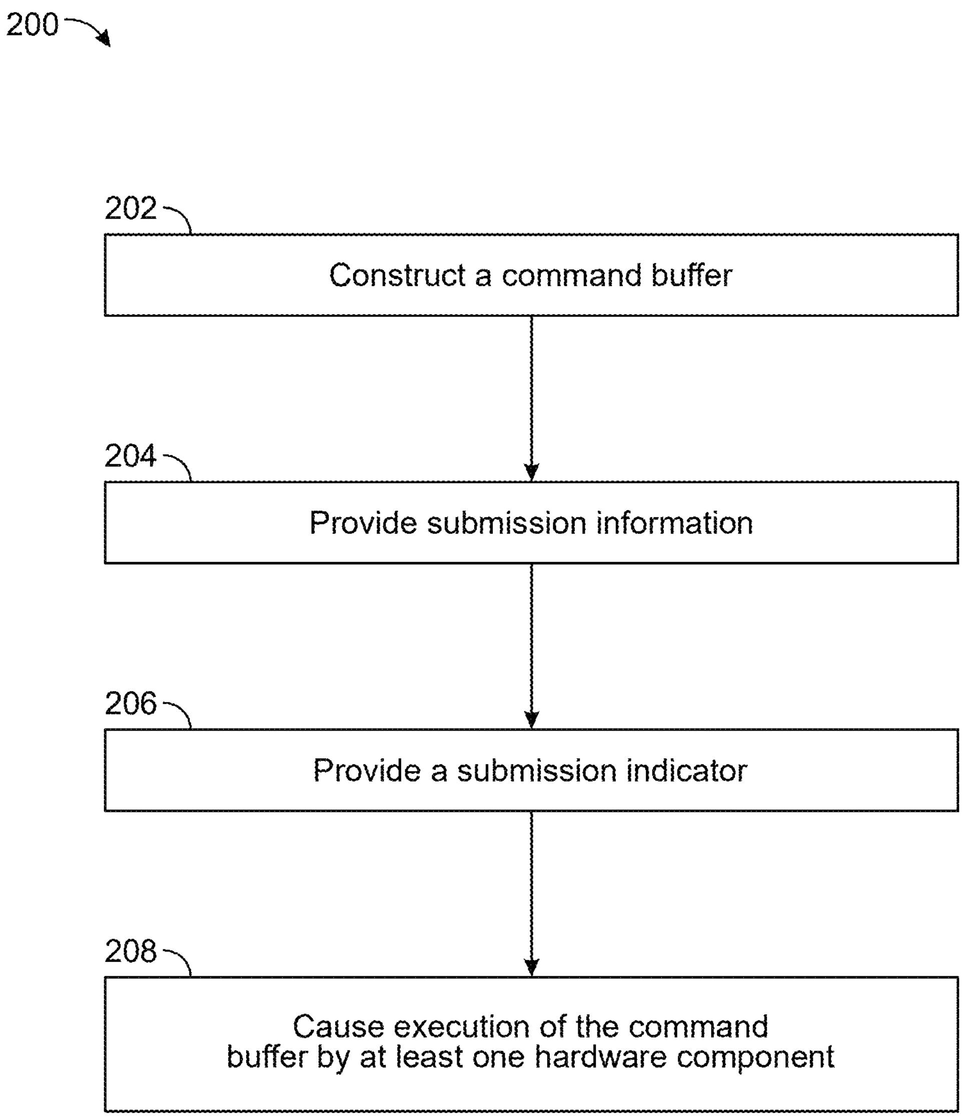
FIG. 2 is a flow diagram of an example of a method for user-space buffer construction and firmware-controlled execution for hardware accelerators in an accelerator pipeline, in accordance with some implementations of the present disclosure.

Now referring to FIG. 2, each block of method 200, described herein, includes a computing process that can be performed using any combination of hardware, firmware, and/or software. For instance, various functions can be carried out using one or more processors (such as, but not limited to, those described herein) executing instructions stored in one or more memories or memory systems. In some implementations, the computer processes can also be embodied as computer-usable instructions stored on computer storage media. The methods can be provided by a standalone application, a service or hosted service (standalone or in combination with another hosted service), an application programming interface (API) and/or a plug-in to another product, etc. In addition, method 200 is described, by way of example, with respect to FIGS. 1 and 5-21. However, these methods can additionally or alternatively be executed by any one system, or any combination of systems, including, but not limited to, those described herein.

The method 200, at block 202, can include the processing circuit constructing, in memory, a command buffer including at least one command identifying at least one resource. In some implementations, at block 202, the processing circuit can receive, in memory via a firmware interface, a command buffer including at least one command identifying at least one resource.

The method 200, at block 204, can include the processing circuit providing, to a submission queue corresponding with a non-privileged execution context, submission information of the command buffer. The method 200, at block 206, can include the processing circuit providing, to a signaling interface corresponding with the submission queue, a submission indicator corresponding to the submission information. The method 200, at block 208, can include the processing circuit causing execution of the command buffer by at least one hardware component of a hardware accelerator, the command buffer identifying the at least one resource.

In some implementations, the processing circuit can construct the command buffer such that the at least one resource can be identified by a resource identifier, and such that the at least one command identifies the at least one resource by the resource identifier. In some implementations, the processing circuit can validate the command buffer based on metadata stored in a resource table corresponding with the non-privileged execution context, the metadata corresponding with the resource identifier, and the validation occurring prior to causing the execution of the command buffer. In some implementations, the submission queue can be a circular buffer, and the submission information can include a tail index identifying an insertion point of the command buffer in the circular buffer.

In some implementations, the processing circuit can detect, based on the submission indicator, an update corresponding with a current tail value of the submission queue. In some implementations, the processing circuit can disable the signaling interface from receiving subsequent submission indicators in response to detecting that the current tail value can be less than or equal to a previously processed tail value. The signaling interface can be re-enabled in response to closure of the non-privileged execution context and creation of a new non-privileged execution context.

In some implementations, the at least one hardware component can include a vector processing unit (VPU), a direct memory access (DMA) controller, or a programmable or pixel processing engine (PPE). In some implementations, the command buffer can include a plurality of command buffer chunks, at least one command buffer chunk of the plurality of command buffer chunks including a bounded size, and a first command buffer chunk can include a command identifying a second command buffer chunk, the second command buffer chunk retrievable using a resource identifier identified in the command.

In some implementations, at least one of the plurality of command buffer chunks can include a next-chunk descriptor indicating a resource identifier corresponding to a subsequent command buffer chunk of the plurality of command buffer chunks. In some implementations, the processing circuit can store, in memory, at least one previously constructed command buffer for reuse. In some implementations, the processing circuit can reference the at least one previously constructed command buffer in the submission information using a resource identifier stored in a resource table corresponding with the non-privileged execution context. In some implementations, the processing circuit can reuse the at least one previously constructed command buffer for execution by the at least one hardware component of a hardware accelerator.

In some implementations, the at least one resource can include a direct memory access (DMA) configuration including at least one static slot placeholder and at least one dynamic slot placeholder, the at least one static slot placeholder identifying at least one memory binding at registration time, and the at least one dynamic slot placeholder identifying a memory binding at execution time, and the processing circuit can bind the at least one dynamic slot placeholder to at least one memory buffer identified by at least one resource identifier in a resource table corresponding with the non-privileged execution context during execution of the command buffer. In some implementations, the processing circuit can instantiate a plurality of non-privileged execution contexts, at least one of the plurality of non-privileged execution contexts corresponding with a distinct submission queue and a distinct resource table, and a unique submission queue of at least one of the plurality of non-privileged execution contexts corresponds with a distinct signaling interface.

In some implementations, the processing circuit can receive at least one command buffer from a kernel-mode driver (KMD) corresponding with a privileged execution context via a dedicated signaling path distinct from the signaling interface corresponding with the non-privileged execution context. In some implementations, the processing circuit can perform at least one management operation updating a resource table based on the at least one command buffer received from the KMD. In some implementations, the processing circuit can register, with the privileged execution context, a resource configuration for the hardware accelerator. The resource configuration can include a direct memory access (DMA) configuration stored in the resource table corresponding with the non-privileged execution context, and the resource configuration can be identified using a resource identifier assigned during registration.

In some implementations, the processing circuit can perform validation of the DMA configuration prior to registration by validating conformance with at least one access bound, at least one memory address range, and at least one descriptor formatting parameter. In some implementations, the processing circuit can store validation metadata in the resource table corresponding with the non-privileged execution context prior to assigning the resource identifier for the DMA configuration. In some implementations, the command buffer can include an affinity mask indicating at least one of the at least one hardware component of the hardware accelerator permitted to execute the command buffer, and the affinity mask restricts execution of the command buffer to a subset of the at least one hardware component to prevent interference with at least one additional command buffer of at least one additional non-privileged execution context.

Figure 3:
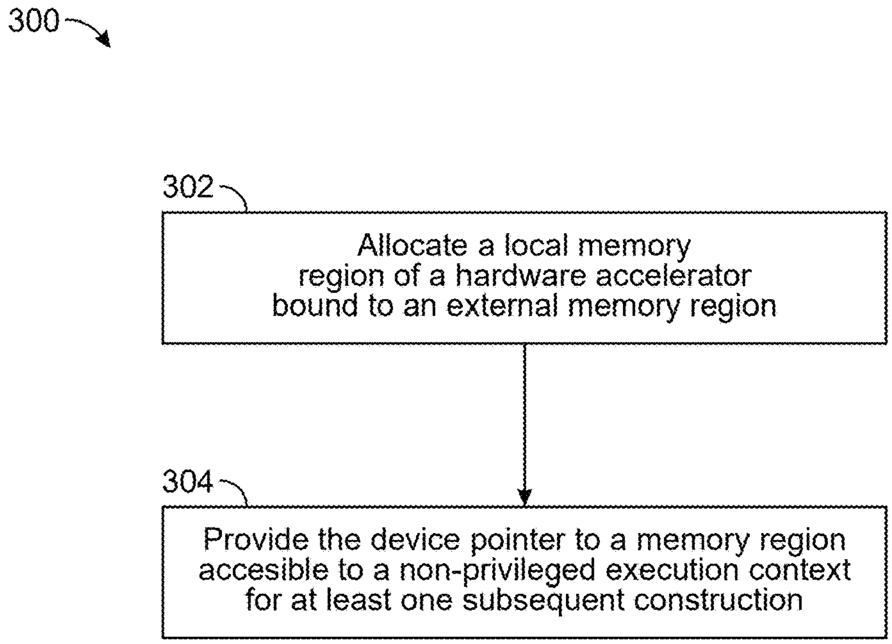
FIG. 3 is a flow diagram of an example of a method for firmware-controlled memory binding and implicit data persistence for hardware accelerators in an accelerator pipeline, in accordance with some implementations of the present disclosure.

Now referring to FIG. 3, each block of method 300, described herein, includes a computing process that can be performed using any combination of hardware, firmware, and/or software. For instance, various functions can be carried out using one or more processors (such as, but not limited to, those described herein) executing instructions stored in one or more memories or memory systems. In some implementations, the computer processes can also be embodied as computer-usable instructions stored on computer storage media. The methods can be provided by a standalone application, a service or hosted service (standalone or in combination with another hosted service), an application programming interface (API) and/or a plug-in to another product, etc. In addition, method 300 is described, by way of example, with respect to FIGS. 1 and 5-21. However, these methods can additionally or alternatively be executed by any one system, or any combination of systems, including, but not limited to, those described herein.

The method 300, at block 302, can include the processing circuit allocating, via a firmware interface, a local memory region in a local memory of a hardware accelerator bound to an external memory region, the allocation returning a device pointer corresponding to a binding, the binding tracked using a resource identifier in a resource table corresponding with a non-privileged execution context. The method 300, at block 304, can include the processing circuit providing the device pointer to a memory region accessible to the non-privileged execution context for at least one subsequent construction of at least one command buffer identifying the binding of the local memory region to the external memory region.

In some implementations, the processing circuit can construct, in the external memory region of the hardware accelerator, the at least one command buffer including at least one command identifying the device pointer corresponding to the binding of the local memory region to the external memory region. In some implementations, the processing circuit can cause execution of the at least one command using the external memory region via the local memory region by a direct memory access (DMA) controller using the at least one command buffer. In some implementations, the at least one command corresponds to at least one of (i) reading data from the external memory region into the local memory region, or (ii) writing data from the local memory region to the external memory region.

In some implementations, allocating can include providing, via the firmware interface, a request to allocate the local memory region in the local memory of the hardware accelerator and bind the local memory region to the external memory region. Allocating can include receiving, via the firmware interface, the device pointer corresponding to the binding of the local memory region to the external memory region. In some implementations, the request is generated by a privileged execution context as a firmware-level configuration command using a firmware access application programming interface (API), and the firmware-level configuration command identifies the binding of the local memory region to the external memory region.

In some implementations, the at least one command buffer can include descriptor data identifying the device pointer, and the descriptor data is updated, prior to execution, to identify a memory access path from the external memory region via the local memory region, and the memory access path corresponds to a patched physical address in the local memory region identified for the execution of at least one command. In some implementations, the device pointer corresponds to an address indirection including the binding of the local memory region to the external memory region, the address indirection identified by a DMA controller to perform at least one memory access command during execution.

In some implementations, the processing circuit can construct, in the external memory region of the hardware accelerator, a second command buffer including at least one second command identifying a resource corresponding to the local memory region. In some implementations, the processing circuit can provide, to a submission queue corresponding with the non-privileged execution context, submission information for the second command buffer. In some implementations, the processing circuit can provide, to a signaling interface corresponding with the submission queue, a submission indicator corresponding to the submission information. In some implementations, the processing circuits can cause execution of the second command buffer by at least one hardware component of the hardware accelerator.

In some implementations, the processing circuit can, prior to allocating the local memory region, determine whether a previously allocated local memory region bound to the external memory region exists for the non-privileged execution context. In some implementations, the processing circuit can in response to determining that the previously allocated local memory region exists, increment a reference count corresponding to the binding. In some implementations, the processing circuits can in response to determining that the previously allocated local memory region does not exist, transmit, to the firmware interface, a request to allocate the local memory region in the local memory of the hardware accelerator bound to the external memory region in accordance with at least one access policy.

In some implementations, the processing circuit can decrement the reference count corresponding to the binding in response to a release request. In some implementations, the processing circuits can release the local memory region in response to determining that the reference count satisfies a release condition. In some implementations, the processing circuit can initiate a flush operation to transfer data from the local memory region to the external memory region in response to a flush request. In some implementations, the flush operation occurs in response to a user context switch and/or initiate an invalidate operation marking data stored in the local memory region as invalid in response to an invalidate request to trigger reinitialization of the local memory region during a subsequent access. In some implementations, initialization of the local memory region with data from the external memory region and flushing of the local memory region to the external memory region occur in response to the user context switch. In some implementations, the flushing is further performable in response to an explicit request.

In some implementations, the binding is established in accordance with at least one access policy, the at least one access policy including a first policy to initialize the local memory region with data from the external memory region or a second policy to flush data from the local memory region to the external memory region during release. In some implementations, the firmware interface maintains at least two concurrent bindings of a plurality of local memory regions to corresponding a plurality of external memory regions for the non-privileged execution context. In some implementations, the firmware interface can include a compatibility layer implemented to translate memory allocation and at least one access request from at least one software application implemented for a version of the hardware accelerator, the compatibility layer updating at least one request to invoke the allocation of the local memory region and the binding to the external memory region via the firmware interface.

In some implementations, the at least one command buffer can include descriptor data identifying the device pointer, and the descriptor data is modified, by firmware, to identify a source address and a destination address for a DMA transaction by a DMA controller, the source address or destination address corresponding to the local memory region and the external memory region bound by the device pointer, the descriptor data including a transfer size and at least one access policy. In some implementations, the processing circuit can transmit, via a firmware interface, a request to allocate a local memory region in a local memory of a hardware accelerator and bind the local memory region to an external memory region. In some implementations, the processing circuit can receive, via the firmware interface, a device pointer corresponding to the binding of the local memory region to the external memory region, the binding tracked using a resource identifier in a resource table corresponding with a non-privileged execution context. In some implementations, the processing circuits can store the device pointer in a memory region accessible to a non-privileged execution context for at least one subsequent construction of at least one command buffer identifying the binding of the local memory region to the external memory region.

Figure 4:
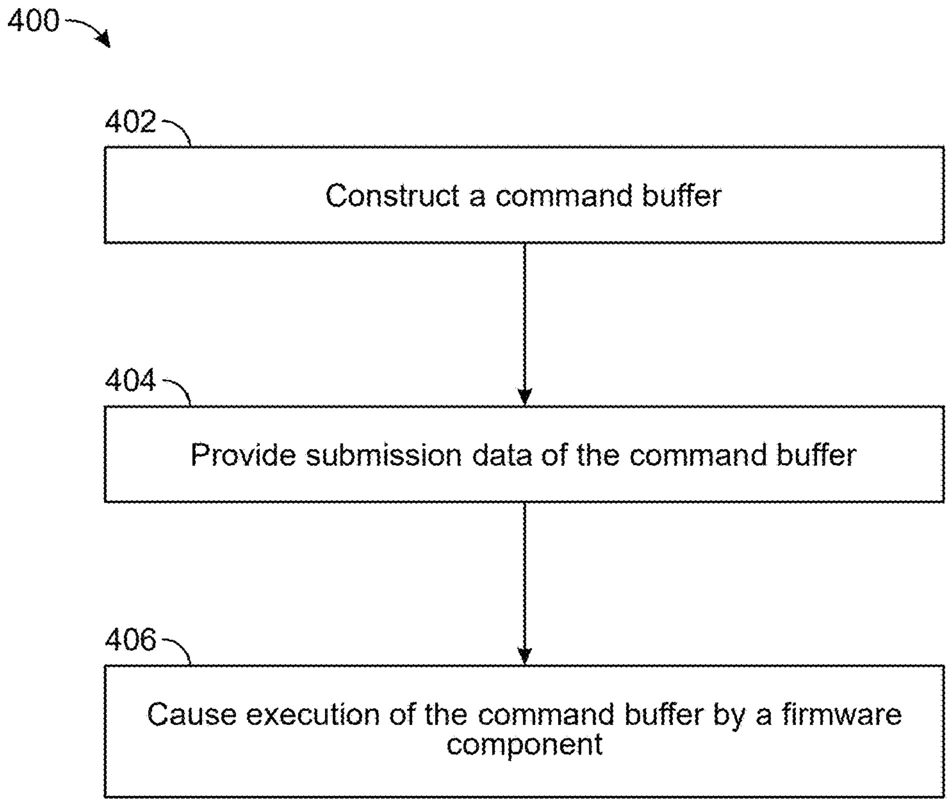
FIG. 4 is a flow diagram of an example of a method for firmware-controlled command dispatch and resource-based orchestration for hardware accelerators in an accelerator pipeline, in accordance with some implementations of the present disclosure.

Now referring to FIG. 4, each block of method 400, described herein, includes a computing process that can be performed using any combination of hardware, firmware, and/or software. For instance, various functions can be carried out using one or more processors (such as, but not limited to, those described herein) executing instructions stored in one or more memories or memory systems. In some implementations, the computer processes can also be embodied as computer-usable instructions stored on computer storage media. The methods can be provided by a standalone application, a service or hosted service (standalone or in combination with another hosted service), an application programming interface (API) and/or a plug-in to another product, etc. In addition, method 400 is described, by way of example, with respect to FIGS. 1 and 5-21. However, these methods can additionally or alternatively be executed by any one system, or any combination of systems, including, but not limited to, those described herein.

The method 400, at block 402, can include the processing circuit constructing, in memory of a hardware accelerator, a command buffer including a plurality of commands. The at least one command of the plurality of commands identifies at least one resource via a resource identifier in a resource table inaccessible to a non-privileged execution context. In some implementations, at block 402, the processing circuit can receive, in memory of a hardware accelerator via a firmware interface, a command buffer including a plurality of commands. The method 400, at block 404, can include the processing circuit providing, to at least one submission interface corresponding with the non-privileged execution context, submission information of the command buffer and a submission indicator corresponding to the submission information. The method 400, at block 406, can include the processing circuit causing execution of the command buffer by a firmware component to (i) initiate execution of the plurality of commands in order of placement in the command buffer and (ii) issue at least one subsequent command for execution prior to completion of at least one previously issued command based on an availability of the at least one resource.

In some implementations, the at least one command of the plurality of commands controls at least one hardware component of the hardware accelerator and is executed in a sequence with at least one additional command of the plurality of commands to perform an operation using the hardware accelerator. In some implementations, the firmware component can include a plurality of state machines, at least one state machine of the plurality of state machines to (i) validate the at least one command of the plurality of commands using a corresponding resource identifier and (ii) dispatch the validated at least one command for execution by a hardware component of the hardware accelerator.

In some implementations, the resource table can include validation metadata corresponding with the resource identifier, the validation metadata inaccessible to the non-privileged execution context during runtime. In some implementations, the processing circuit can cause validation of access to the at least one resource identified in the command buffer using the validation metadata stored in the resource table. The at least one command in the command buffer corresponds with a hardware configuration parameter stored in the resource table and identified using the resource identifier. In some implementations, the processing circuit can construct the command buffer within a user-mode application by identifying at least one resource identifier stored in the resource table, and the construction of the command buffer is performed independently of translation by a kernel-mode driver (KMD).

In some implementations, the processing circuit can register, during initialization, a resource configuration with the KMD corresponding with a privileged execution context. Registering the resource configuration can include validating the resource configuration and population of the resource table, the resource table being inaccessible to the non-privileged execution context. In some implementations, at least one of the plurality of commands in the command buffer can include a barrier command to synchronize at least one hardware component of the hardware accelerator. In some implementations, the at least one submission interface can include (i) a submission queue storing the submission information and (ii) a signaling interface storing the submission indicator.

In some implementations, the at least one command can include a configuration command to configure a direct memory access (DMA) controller of the hardware accelerator using a DMA configuration. In some implementations, the at least one command can include at least one configuration or synchronization command to configure, activate, or synchronize execution of a vector processing unit (VPU) of the hardware accelerator. In some implementations, the at least one command can include at least one configuration or synchronization command to configure, activate, or synchronize execution of a programmable or pixel processing engine (PPE) of the hardware accelerator. In some implementations, the at least one command can include or a query command to capture execution metadata of at least one hardware component of the hardware accelerator and store the execution metadata in a memory buffer referenced via the resource identifier in the resource table.

The systems and methods (e.g., method 200, method 300, method 400) described herein can be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, watercraft, shuttles (e.g., robotaxis), emergency response vehicles, motorcycles, electric or motorized bicycles, aircraft, construction vehicles, underwater craft (e.g., piloted or unpiloted submarines), drones, and/or other vehicle types. Further, the systems and methods described herein can be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets (e.g., NVIDIA's Omniverse), cloud computing, and/or any other suitable applications.

Disclosed implementations can be included in a variety of different systems such as automotive systems (e.g., a control system for an autonomous or semi-autonomous machine, a perception system for an autonomous or semi-autonomous machine, etc.), systems implemented using a robot, aerial systems, medial systems, boating systems, smart area monitoring systems, systems for performing deep learning operations, systems for performing simulation operations, systems for performing digital twin operations, systems implemented using an edge device, systems implementing language models—such as large language models (LLMs), vision language models (VLMs), vision-language-action (VLA) models, and/or multi-modal language models (MMLMs), systems using or deploying one or more inference microservices, systems that incorporate deploy one or more machine learning models in a service or microservice along with an OS-level virtualization package (e.g., a container), a system for performing one or more wireless cellular transmissions using a wireless cellular network, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

Figure 5:
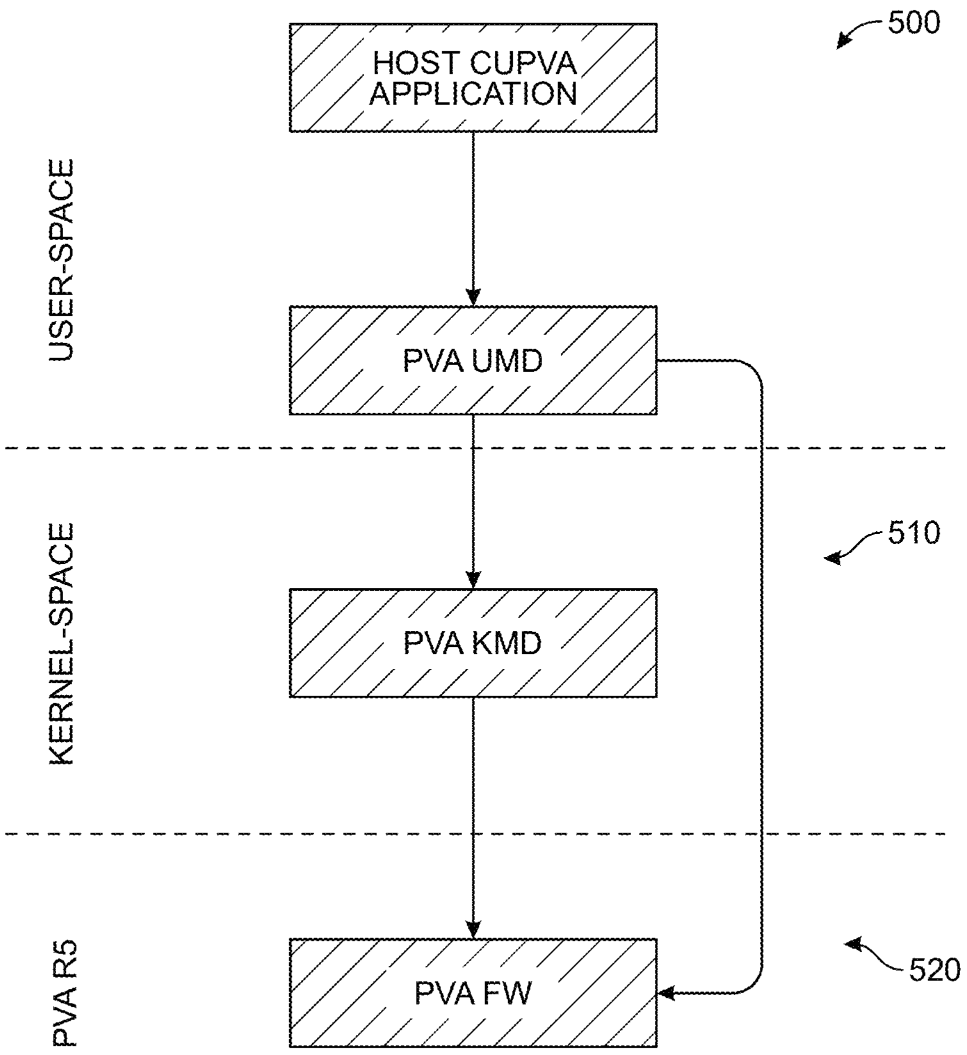
FIG. 5 depicts an interface architecture implementing command buffer-based task submission for a programmable vision accelerator (PVA), in accordance with some implementations of the present disclosure.

Referring to FIG. 5, depicting an interface architecture implementing command buffer-based task submission for a PVA, in accordance with some implementations of the present disclosure. The system 100 of FIG. 1 can implement the various features and functionalities described in FIG. 5. The architecture can include multiple layers, including user-space 500, kernel-space 510, and PVA execution space 520. The system 100 can include a host CUPVA application executing in user-space. The CUPVA application can interface with the UMA, such as PVA UMD, to construct command buffers and manage command metadata. The PVA UMD can communicate with a KMD, such as PVA KMD, to register resources, assign resource identifiers, and/or initiate memory allocation. The PVA KMD can interface with the PVA firmware (FW) (e.g., the firmware component 106), such as PVA FW, to complete resource table updates, manage command queue associations, and/or trigger execution. The PVA FW can execute in a PVA core (e.g., R5 microcontroller) and can receive commands via a command queue mapped to the user-space 500. The system 100 can facilitate communication from the PVA UMD to the PVA FW for submission of command buffers (e.g., without requiring KMD-based translation).

In some implementations, the system 100 of FIG. 1 can implement a command buffer model that decouples command construction from firmware execution semantics. That is, the CUPVA application can construct discrete commands for memory operations, engine control, synchronization, and/or signaling, without conforming to a fixed task state machine. For example, a CUPVA application can construct a command buffer including a memory copy and barrier operation (e.g., without including a VPU executable load and/or PPE teardown). The architecture of FIG. 5 supports flexibility and extensibility of the firmware component 106, where firmware logic can process individual commands based on their encoding and sequence placement. The PVA UMD can submit the buffer to the appropriate memory-mapped queue (e.g., in the DRAM 130), and the PVA FW can interpret and dispatch commands on supported hardware blocks. The control subsystem 104 of the system 100 can expose memory-mapped signaling registers (e.g., the register(s) 114) to the user-space 500, allowing the CUPVA to notify firmware of a new tail index in the submission queue (e.g., stored in the memory region(s) 132). The PVA KMD can be perform privileged operations such as global resource initialization and/or buffer registration, but execution path latency can be reduced by direct user-space submission. The command buffer interface (e.g., the firmware interface 108) can reduce and/or eliminate context switch delays and/or redundant translation logic, improving task submission efficiency for latency-sensitive applications.

For example, the command buffers 134 submitted by CUPVA can bypass the PVA KMD for runtime execution, supporting direct execution via the PVA FW. The firmware interface 108 can consume the command buffer entries based on head and tail index metadata in a circular queue (e.g., in the DRAM 130). The firmware component 106 can be invoked using a signaling interface 112 mapped to the control subsystem 104, such as a command completion queue (CCQ) register (e.g., the register(s) 114). At least one (e.g., each) CCQ can be assigned per execution context and can be used to manage independent command streams submitted from different CUPVA threads. The PVA KMD can register resource identifiers used in the command buffers, facilitating isolation and validation across CUPVA contexts. The resource table 110 can be populated with metadata for DRAM buffers, DMA configurations, and/or executable references, which can be used by the PVA FW (e.g., the firmware component 106) during execution. CUPVA can construct and submit command buffers without embedding privileged memory addresses or executable handles, referencing runtime objects via validated resource IDs.

Figure 6:
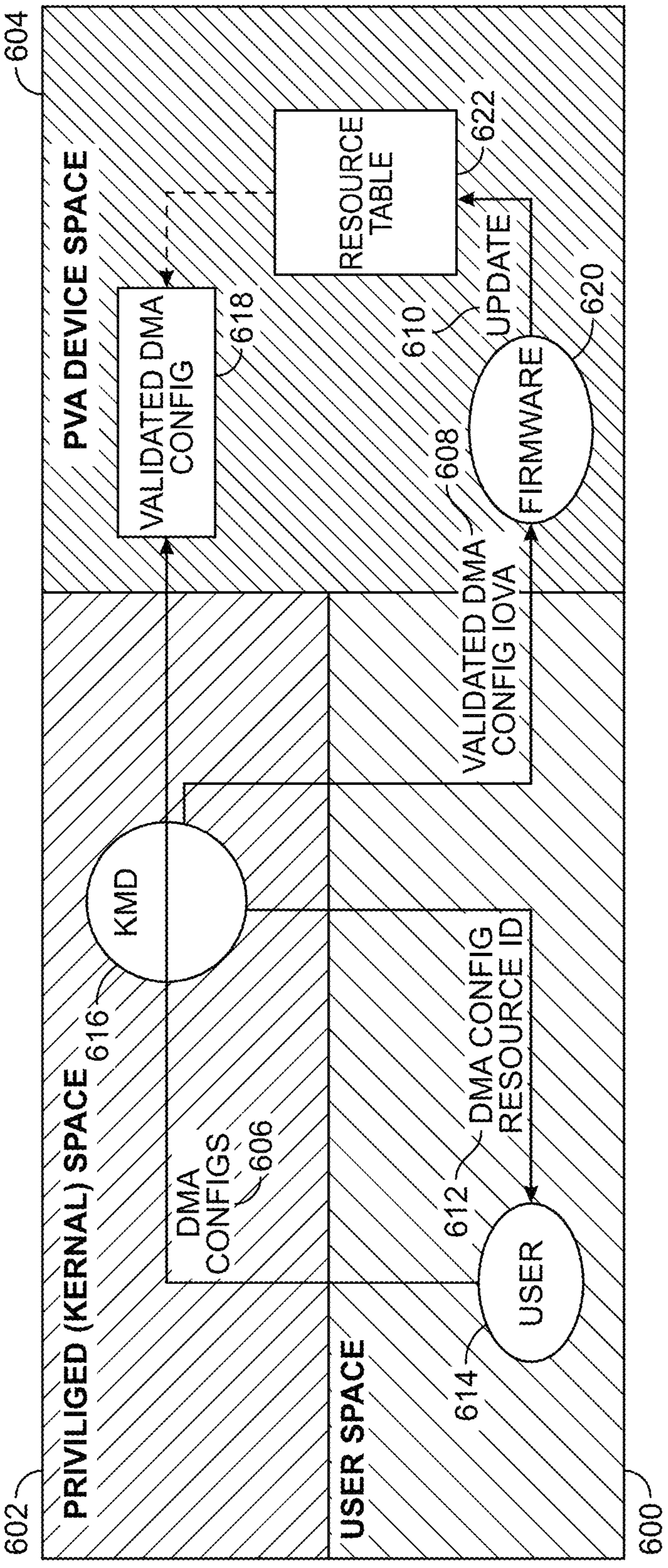
FIG. 6 depicts a system view implementing a resource registration and validation pipeline for the PVA, in accordance with some implementations of the present disclosure.

Referring to FIG. 6, depicting a system view implementing a resource registration and validation pipeline for the PVA, in accordance with some implementations of the present disclosure. The system 100 of FIG. 1 can implement the various features and functionalities described in FIG. 6. The architecture includes user space 600, privileged (kernel) space 602, and/or PVA device space 604. A user 614 operating in the user space 600 (e.g., operating the CPU host 128) can construct DMA configuration registration requests that are provided to a KMD 616. The DMA configuration 606 can be pre-validated by the KMD 616, generating a validated DMA config IOVA 608. The validated DMA config IOVA 608 can be forwarded to the firmware 620 (e.g., the firmware component 106) to complete the validation. The firmware 620 can update a resource table 622 with validated entries, such as validated DMA config 618. The user 614 can receive a DMA config resource ID 612 representing the validated entry, which can later be referenced in command buffers constructed in user space. The resource ID 612 can be an opaque handle that corresponds to internal firmware-managed resources and is not mapped into the user virtual address space.

In some implementations, the firmware 620 and KMD 616 can facilitate validation based on an access context. The KMD 616 can validate fixed parameters and bounds of a DMA configuration 606, such as transfer size, burst length, and/or descriptor formatting. For slot-based DMA configurations with placeholders, the KMD 616 can calculate access ranges and transfer limits (e.g., without resolving actual buffer addresses). The firmware 620 can finalize validation by confirming the runtime association between buffer bindings and the precomputed bounds. The validated DMA configuration 618 is not exposed to the user 614. That is, the user can interact via the DMA config resource ID 612. The indirection can enforce isolation and prevent user-constructed command buffers from including IOVA addresses and/or memory references that cannot be validated at runtime. The resource table 622 can be maintained in firmware-managed memory and updated by trusted components, such as the firmware 620 and KMD 616. In some implementations, the resource table 622 entries can include metadata that defines access bounds, memory associations, and/or policy constraints for a given DMA config. The KMD 616 can register DRAM buffers and/or kernel-generated descriptors. The firmware 620 can associate memory policies with at least one (e.g., each) binding, such as fill-on-miss or flush-on-eviction, and track reference counts per context. The user 614 can register multiple DMA configurations with reusable parameters. The firmware 620 can reference the resource table 622 during runtime command execution to resolve resource IDs into usable configurations.

Figure 7:
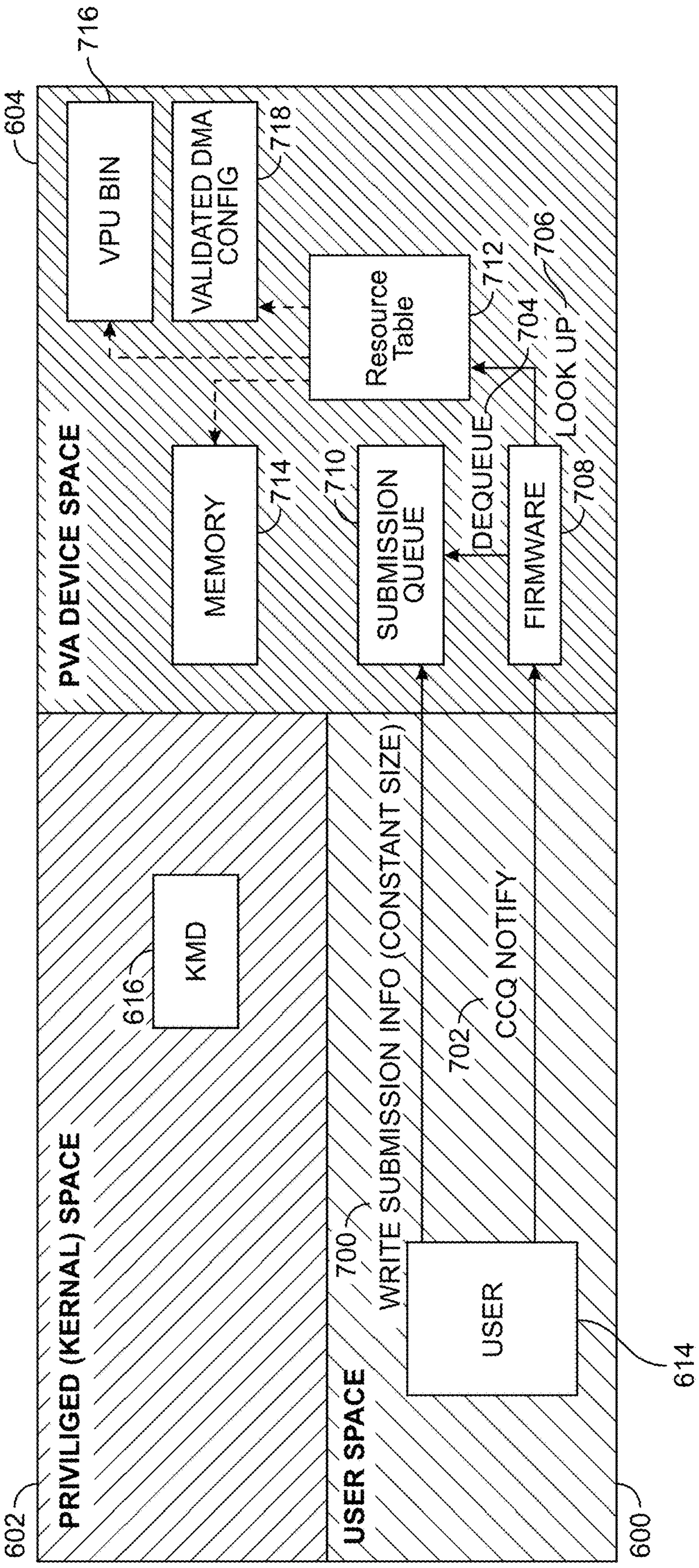
FIG. 7 depicts an execution pathway from user space to the firmware via a submission queue and a signaling interface, in accordance with some implementations of the present disclosure.

Referring to FIG. 7, depicting an execution pathway from user space to the firmware via a submission queue 710 and a signaling interface, in accordance with some implementations of the present disclosure. The system 100 of FIG. 1 can implement the various features and functionalities described in FIG. 7. The user 614 can write submission information to the submission queue 710 using a write operation 700. The submission queue 710 can be implemented in memory interface 714 accessible to both user space and firmware. The user 614 can subsequently trigger a command completion queue (CCQ) notify 702 operation, writing to a signaling register to notify the firmware 708. The firmware 708 (e.g., the firmware component 106) can read the tail index from the queue and begin dequeuing commands for execution. Each command can reference resources via resource identifiers indexed in a resource table 712 (e.g., the resource table 110). For example, the firmware 708 can perform a lookup 704 using the resource ID to retrieve metadata. The firmware 708 can then configure hardware components such as the memory interface 714, validated DMA config 718, and/or VPU bin 716.

In some implementations, the submission queue 710 can store fixed-size entries that remain opaque to the firmware until a submission indicator is received (e.g., from the signaling interface 112). At least one (e.g., each) submission entry can include command buffer metadata, such as a buffer address, execution mask, pre-fence index, and/or post-fence signal. The firmware 708 can validate the tail index and begin command buffer traversal. The command buffer (e.g., the command buffer 134) can include a sequence of primitive commands referencing the resource table 712. For example, commands can include DMA launch, VPU kernel invocation, memory synchronization, and/or register writes. The firmware 708 can prefetch command chunks into tightly coupled memory (TCM) and issue hardware instructions while overlapping command fetch with execution. The execution sequence can be determined by command order and/or hardware availability, allowing for overlapping operations across the memory interface 714, VPU bin 716, and PPEs. The memory interface 714 can move data between DRAM (e.g., the DRAM 130) and local memory (e.g., the local SRAM 124 and/or local memory 126) according to configured DMA descriptors.

Additionally, the command buffer execution can begin with the user 614 constructing and writing submission information to memory shared with the firmware. The signaling path can bypass the KMD, avoiding context switch latency and/or inefficiencies. The firmware 708 decodes command buffer entries based on resource references and command metadata. The resource table 712 provides validated information, preventing execution of unauthorized or malformed commands. The firmware 708 can use a scheduling mechanism to dispatch instructions across available engines while respecting affinity masks defined in the command buffer. The validated DMA config 718 and VPU bin 716 can represent firmware-registered resources used during execution. Commands can acquire and release hardware engines using encoded instructions, controlling access to the VPU and DMA controllers.

Figure 8:
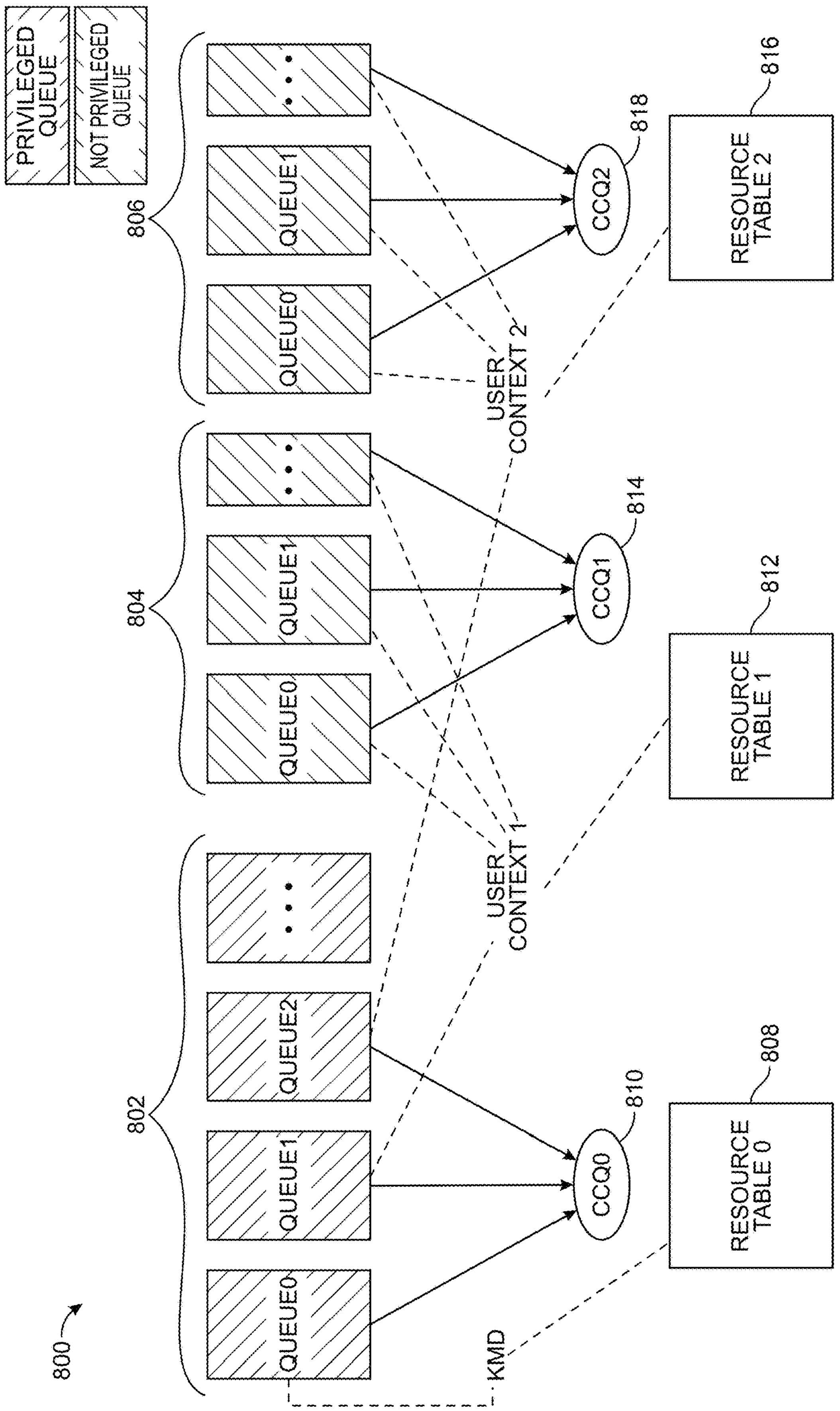
FIG. 8 depicts a system including a plurality of queues corresponding with at least one user context and/or a privileged context, in accordance with some implementations of the present disclosure.

Referring to FIG. 8, depicting a system 800 including a plurality of queues (e.g., queues 802, 804, 806) corresponding with at least one user context and/or a privileged context, in accordance with some implementations of the present disclosure. The system 100 of FIG. 1 can implement the various features and functionalities described in FIG. 8. The queues 802 can represent queues associated with a privileged execution context (e.g., a kernel-mode driver (KMD)). The queues 804 and queues 806 can represent queues associated with two respective non-privileged execution contexts (e.g., user context 1 and user context 2). The queues 802 can submit command buffers to a first command completion queue (CCQ0) 810. The queues 804 and queues 806 can submit command buffers to command completion queues CCQ1 814 and CCQ2 818, respectively. The resource table 808 (e.g., the resource table 110) can correspond with CCQ0, and similarly, the resource tables 812 and 816 (e.g., the resource table(s) 110) can correspond with CCQ1 and CCQ2. At least one (e.g., each) resource table can be isolated per user context and store metadata for resource identifiers referenced in command buffers submitted through the associated queues. The system 800 can implement one CCQ per user context, such that at least one (e.g., each) submission queue can share a signaling interface (e.g., the signaling interface 112) with firmware for submission of command buffers (e.g., the command buffer(s) 134).

In some implementations, the queues 802, 804, and 806 can be implemented as circular buffers in memory accessible to firmware (e.g., in DRAM 130) and populated by user-mode or kernel-mode software. At least one (e.g., each) queue in a user context (e.g., queues 804 and 806) can be associated with a corresponding queue ID that is included in the submission information to facilitate firmware-level demultiplexing. The submission of command buffers from queues 804 and 806 can be routed through CCQ1 814 and CCQ2 818, which can act as the signaling pathways for triggering firmware fetch and execution. The CCQ0 810 can be reserved for privileged command buffers (e.g., registration, resource table initialization, or system-wide operations) submitted by the KMD. In this example, the system 800 can support up to 7 non-privileged user contexts (and/or any number of contexts based on the implementation and/or application), each with up to 8 queues (and/or any number of queues based on the implementation and/or application), resulting in a maximum of 56 (or high or lower) user queues across the system 800. At least one (e.g., each) CCQ (e.g., 810, 814, 818) can be associated with a unique signaling register (e.g., the register(s) 114) exposed to firmware via the signaling interface 112. That is, the signaling register can be used by firmware to detect queue activity and process corresponding command buffer submissions.

In some implementations, at least one (e.g., each) user context can be instantiated with a dedicated resource table (e.g., resource table 812 or 816), a dedicated set of queues (e.g., queues 804 or 806), and a dedicated signaling register corresponding to a CCQ (e.g., CCQ1 or CCQ2). The queues in at least one (e.g., each) user context can operate independently, submitting command buffers to firmware without involvement from the KMD. That is, a submission from any queue (e.g., queue0 to queue7 in user context 2) can trigger execution via CCQ2 818 and use resource identifiers mapped in resource table 816. The isolation between contexts can prevent interference between concurrent user submissions, and/or context-specific resource tables allow validation and execution to remain within scope of at least one (e.g., each) context. The firmware can use the CCQ tail index written by user mode to identify available submissions and fetch corresponding entries. The KMD can update and manage resource table 808 (e.g., for global resources), while user-specific tables (e.g., 812 and 816) can be constructed by firmware during context creation. That is, at least one (e.g., each) CCQ functions as a per-context interface for command scheduling and execution.

In some implementations, the system 100 can perform error handling operations during execution of command buffers using the firmware component 106. That is, error handling can be performed by classifying an error associated with at least one context, command, and/or global state into recoverable, context, or global categories. For example, a recoverable error can terminate a command buffer associated with an invalid DMA configuration without affecting other commands (e.g., FW: Command buffer execution timeout, FW: VPU return non-zero exit code, KMD: Out of memory during ioctl/devctl, KMD: Failed registration due to invalid user input). In another example, a context error can place an entire user context into a permanent error state, such as a corrupted queue or invalid resource descriptor. In yet another example, a global error can invalidate all open contexts if a critical firmware fault occurs (e.g., FW: R5 SMMU fault due to FW bug, FW: Fast reset failure). That is, the firmware component 106 can receive error signals from the hardware accelerator subsystems (e.g., DMA controller 116, VPU 118, PPE 120) and propagate state transitions based on the severity and scope of the error. Additionally, the system 100 can omit recovery logic for firmware reboot scenarios, given that rebooting firmware is typically not permitted in safety environments. Errors (e.g., FW: DMA SMMU fault) that cannot be detected by the system 100 can be handled by an external hypervisor or monitoring layer.

In some implementations, the system stack of the system 100 can consolidate UMD and PVA interface layers into a unified software layer (e.g., UMD). The UMD layer can expose a user interface that removes multi-PVA management logic and eliminates and/or reduces software abstractions that previously translated between file descriptors and hardware queue mappings. That is, command buffer construction and submission can be performed without queue-to-file descriptor multiplexing logic. For example, the stack avoids mapping multiple queues to a single UMD context (e.g., no multiplexing across struct pva_queue). In some implementations, CUPVA can assume responsibility for multi-context or multi-device handling. That is, higher-level logic external to the PVA runtime can perform resource management across multiple accelerators. In another example, the stack can avoid dynamic resolution of affinity per queue and instead treat affinity as a per-submission attribute (e.g., affinity mask defined in the command buffer submission). In this example, scheduling behavior can be explicitly controlled by firmware in response to affinity values provided at submission time.

In some implementations, creating a context in system 100 can instantiate a logical execution boundary associated with a single PVA engine. For example, the firmware component 106 can create one KMD context and one UMD context per context instantiation request (e.g., via pva_context_create(uint32_t pva_index, uint32_t max_resource_count, struct pva_context ctx)). In this example, the context can be identified by a unique context handle returned by the API. That is, at least one (e.g., each) context can map to a single command queue (e.g., CCQ FIFO) interface (e.g., register 114 of signaling interface 112). In some implementations, the PVA engine index (e.g., pva_index argument) can be provided during context instantiation to specify the target accelerator. Once created, a context can maintain isolation of resources and queue state until explicitly destroyed (e.g., pva_context_destroy). For example, the firmware can enforce isolation of resource tables and submission queues across contexts (e.g., using per-context resource table 110 and queue entries in DRAM 130**). In this example, a context can only be destroyed after destroying all queues assigned to the context. Additionally, the context lifecycle can be constrained to hardware limitations on the number of CCQ and queue resources (e.g., 7 user contexts with up to 8 queues per context, 14 or 15 user contexts with up to 16 queues per context).

In some implementations, a queue in system 100 can be created within an existing context and can represent a logical stream of command buffers. At least one (e.g., each) queue can correspond to a unique firmware-managed queue identifier. For example, a queue can be created by calling a queue creation API (e.g., pva_queue_create(struct pva_context *ctx, uint32_t max_submission_count, struct pva_queue queue)) with a maximum submission count. In this example, the queue handle can be returned and used to reference the queue during command buffer submission. That is, queue affinity can be decoupled from queue instantiation and specified per submission. In another example, the queue can be destroyed using a queue destruction API (e.g., pva_queue_destroy). In some implementations, firmware (e.g., firmware component 106) can distinguish queue ownership and execution behavior based on queue ID. Additionally, queues in different contexts can reference distinct CCQ submission interfaces (e.g., submission queues in DRAM 130 with signaling via register 114**). For example, at least one (e.g., each) context can support up to 8 queues mapped to a single CCQ register. The firmware can use the queue ID to demultiplex entries in the shared CCQ FIFO.

In some implementations, memory objects in system 100 can be allocated for PVA device access using a memory allocation API (e.g., pva_memory_alloc(uint64_t size, struct pva_memory out_mem)). The allocated memory can be in DRAM 130 and can be mapped into the PVA address space. In some implementations, memory can be freed using a corresponding API (e.g., pva_memory_free). For example, memory can be imported from an external handle using pva_memory_import, allowing integration with platform-specific memory allocation schemes. In another example, memory can be mapped into CPU virtual address space using pva_memory_cpu_map and unmapped using pva_memory_cpu_unmap. That is, the memory attributes (e.g., pva_memory_attrs struct) can be queried using a dedicated API (pva_memory_get_attrs) to retrieve offset, size, access mode, and/or handle information. The firmware and KMD can enforce access permissions and reference tracking during import and mapping operations. In some implementations, memory allocation and/or import operations can be registered as resources for use in command buffer submissions (e.g., using resource table 110**).

In some implementations, the system stack of the system 100 can facilitate resource registration using batched asynchronous operations. For example, a buffer of registration operations can be initialized using a buffer preparation API (e.g., pva_async_ops_buffer_init(structpva_ops_buffer *buf_handle, void *buf, uint32_t size)). At least one (e.g., each) registration operation can then be appended to the buffer using APIs such as pva_append_ops_memory_register, pva_append_ops_executable_register, and/or pva_append_ops_dma_config_register. That is, the buffer can accumulate a sequence of operations corresponding to multiple resource types (e.g., DRAM memory, VPU executables, DMA configurations). The batched buffer can then be submitted to the KMD via pva_async_operations_submit. In this example, the response buffer can contain resource IDs assigned to the registered resources. The response can be parsed using APIs to extract assigned resource IDs (e.g., pva_parse_register_resp, pva_parse_exec_register_resp). This can allow a command buffer (e.g., stored in memory region 132) to reference resources indirectly using identifiers, facilitating validation by firmware component 106. In some implementations, the registration APIs can be used to associate DRAM buffers, VPU executables, PPE binaries, and DMA configurations with resource tables corresponding to a specific execution context (e.g., maintained per UMD context in resource table 110).

Figure 9:
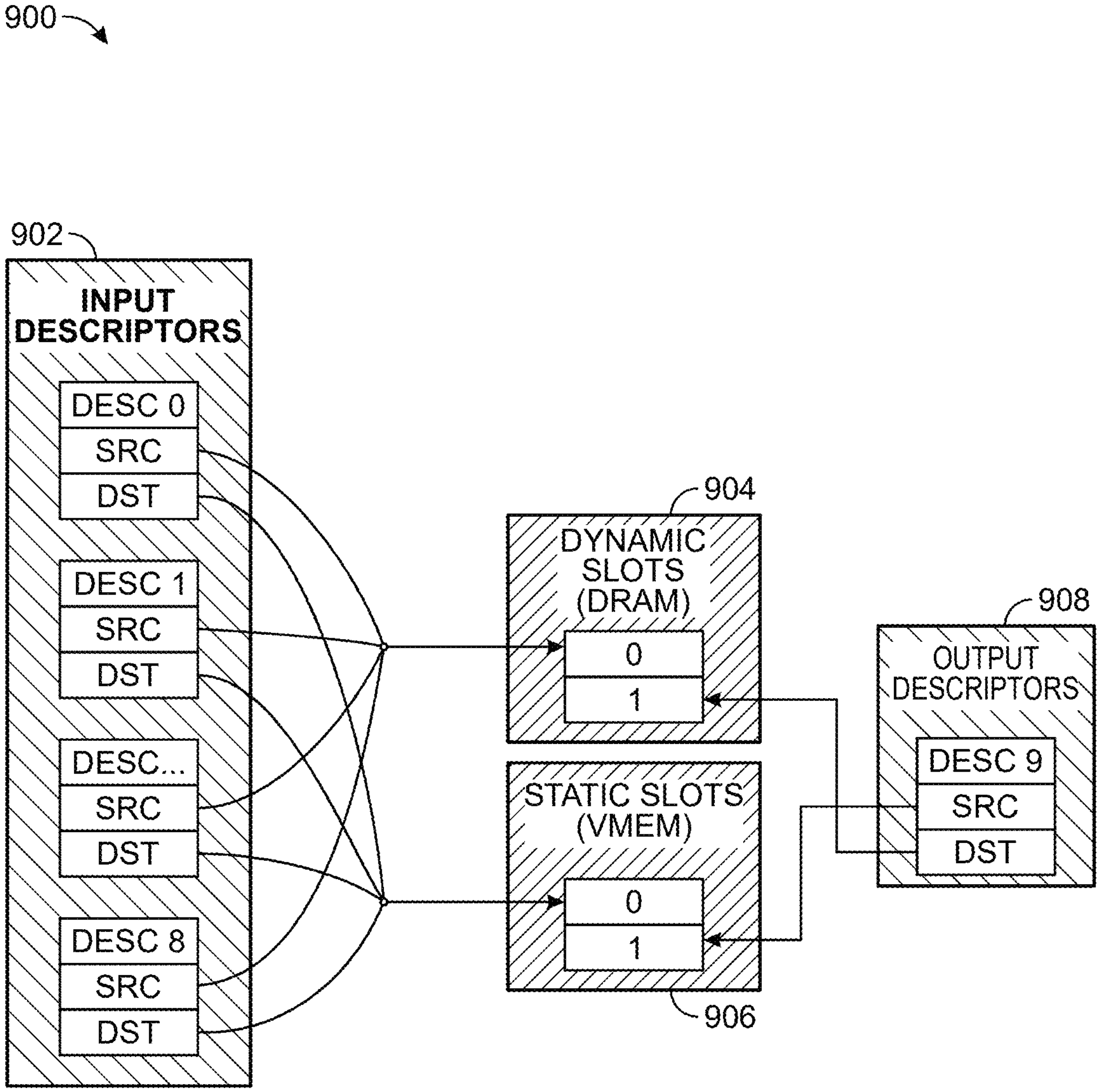
FIG. 9 depicts a system including a plurality of input descriptors, at least one (e.g., each) containing at least a source (SRC) slot and a destination (DST) slot, for use with a direct memory access (DMA) configuration, in accordance with some implementations of the present disclosure.

Referring to FIG. 9, depicting a system 900 including a plurality of input descriptors 902, at least one (e.g., each) containing at least a source (SRC) slot and a destination (DST) slot, for use with a DMA configuration, in accordance with some implementations of the present disclosure. The system 100 of FIG. 1 can implement the various features and functionalities described in FIG. 9. The source and destination slots of the descriptors can reference slot indices in a block of a dynamic slot 904 or static slot 906. The dynamic slots 904 can correspond to DRAM buffers, and/or the static slots 906 can correspond to VMEM buffers (e.g., local memory 126). The slot references in at least one (e.g., each) descriptor can be used to locate the memory buffers to which DMA transfers apply. For example, descriptor 0 can reference dynamic slot 0 as the source and static slot 0 as the destination. In another example, descriptor 9 can reference static slot 1 as the source and dynamic slot 1 as the destination. Output descriptors 908 can store the resulting transfer parameters post-execution, using resolved buffer addresses from the bound slots. The system 900 can perform validation of the slot bindings at execution time, where the firmware verifies memory address ranges using metadata stored in the resource table 110.

In some implementations, the static slots 906 can be validated by the KMD at the time of registration. That is, the static slots reference fixed memory buffers that are validated and stored during DMA config registration. The actual physical addresses for static slots can be embedded into the descriptors by the KMD (e.g., removing the need for firmware to perform runtime patching). The dynamic slots 904 can be unbound at registration time and instead assigned access ranges for later binding. For example, slot 0 can be designated for input DRAM and slot 1 for output DRAM, and the firmware can perform range checking during command buffer execution. In this example, the firmware can validate at least one (e.g., each) dynamic slot binding based on the access metadata precomputed by the KMD and stored in the resource table. The separation between dynamic and static slot validation allow DMA configs to be reused with different buffer bindings. That is, the same DMA config structure can be reused across multiple images and/or memory regions with different dynamic slot bindings.

In some implementations, the input descriptors 902 can implement sequential and/or nested DMA transfer loops for performing memory transfers with slot indirection. That is, at least one (e.g., each) descriptor can identify a source and destination slot with a memory offset and transfer length. During command buffer execution, the firmware can fetch descriptors, resolve slot references, validate bindings using resource table metadata, and/or program DMA engines accordingly. For example, for a convolutional kernel, descriptors 0 through 8 can load image tiles from DRAM into VMEM using dynamic slot 0 and static slot 0. The final output descriptor 908 can store the result of writing the convolved output tile to dynamic slot 1. The firmware can execute the same descriptors across varied input and output buffers by rebinding dynamic slots.

In some implementations, the system 100 can configure DMA operations using slot-based descriptors that abstract away direct buffer references. That is, DMA configurations in system 100 can reference source and destination slots (e.g., not explicit DRAM or VMEM addresses). The slots can be designated as static or dynamic. For example, static slots can be bound to concrete memory buffers during registration, where the KMD can validate access permissions and embed resolved physical addresses into the DMA descriptors (e.g., using pva_append_ops_dma_config_register). The dynamic slots can defer memory binding to execution time, where the firmware component 106 can validate access based on precomputed ranges stored in resource table 110. For example, a convolution application can define a DMA configuration with nine input descriptors and one output descriptor. The input file tiles in VMEM can be assigned to static slot 0, and the output tile to static slot 1. The input image in DRAM can be assigned to dynamic slot 0, and the output image in DRAM to dynamic slot 1. During execution, the command buffer 134 can include commands to bind dynamic slots to buffers referenced via resource IDs. The firmware component 106 can then execute the associated DMA transfers by evaluating slot assignments and corresponding offset metadata.

Figure 10:
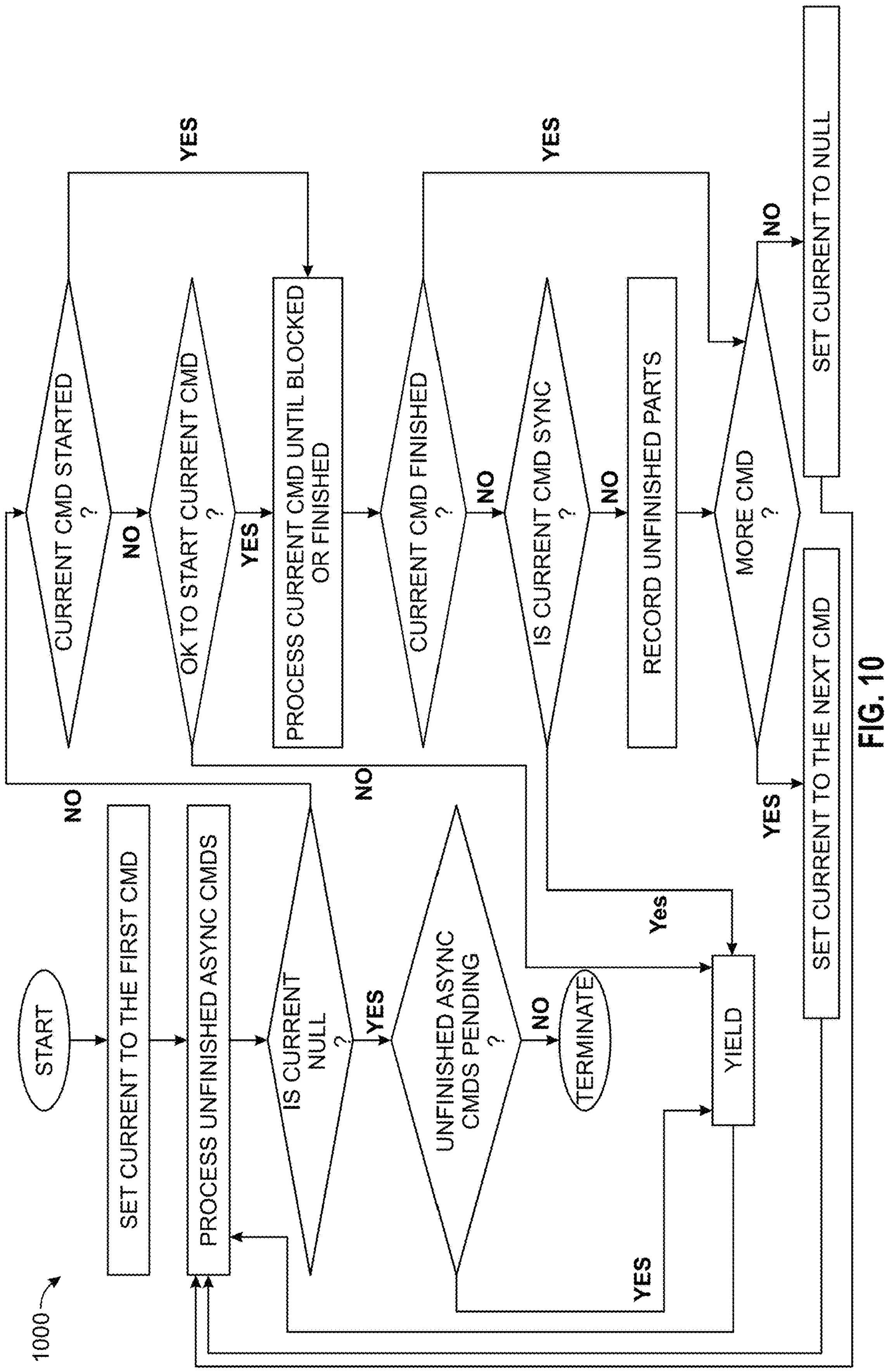
FIG. 10 depicts an example control flow for processing command buffers by the firmware of the system, in accordance with some implementations of the present disclosure.

Referring to FIG. 10, depicting an example control flow 1000 for processing command buffers by the firmware of the system 100, in accordance with some implementations of the present disclosure. The system 100 of FIG. 1 can implement the various features and functionalities described in FIG. 10. The control flow 1000 can begin with a command buffer (e.g., the command buffer 134) initialized at a first command, and proceeds sequentially across commands unless blocked. If the firmware detects unfinished asynchronous commands, it can initiate a check to determine whether execution of the current command is valid given the current system state. For example, a DMA configuration transfer can be unsafe while an ongoing DMA operation is still in progress, and firmware can defer command execution until the operation completes. In this example, firmware can enter a wait state until the system transitions into a permissible state. If the firmware determines that no valid transition is possible, it can terminate execution and abort the buffer. The firmware can continue to the next command if the current command is completed and/or marked as non-blocking. In some implementations, the firmware can track pending asynchronous commands and maintain status information.

The firmware (e.g., the firmware component 106) of the system 100 can process a command when sufficient resources are available, and the execution conditions are met. Firmware can distinguish between synchronous and asynchronous commands. For example, if a current command is asynchronous and started, but not yet completed, the firmware can skip subsequent commands until execution becomes valid. In this example, if the command is synchronous and incomplete, the firmware halts until completion. If the command has been processed but not completed, and is marked asynchronous, firmware can record unfinished parts for later resumption. In some implementations, firmware can yield if no commands are executable due to pending asynchronous operations. The firmware can reattempt execution after previously blocked commands complete and required hardware resources become available. In the control flow 1000, a command marked with struct pva_cmd_barrier can be used to enforce explicit synchronization, blocking further commands until dependent operations complete.

Firmware-managed execution in system 100 can include handling of user DMA hardware allocations when processing commands in a command buffer. For example, commands that require user DMA access can include a struct pva_user_dma_allowance field to specify allocated resources. In this example, a 32-bit value describes the allocated DMA channel (4 bits), ADB range (5 bits each for start and count), and descriptor range (7 bits each for start and count). Firmware can use the allocation to avoid conflicts with ongoing asynchronous commands. If no allocation is specified, firmware can be prohibited from using user DMA hardware for that command. Commands that do not require DMA can proceed independently, while commands requiring unavailable resources can be deferred until availability is restored.

In some implementations, the firmware of the system 100 can execute general commands that do not require privileged access and/or engine acquisition. The general commands can include no-ops, chunk linkage, barriers, DRAM writes, resource unregistration, and/or command buffer status reporting. For example, a struct pva_cmd_noop can be used as a placeholder within a command buffer. In another example, a struct pva_cmd_link_chunk can instruct the firmware to fetch the next chunk from a given resource ID and offset. The chunk linkage command can reference resource table entries by ID and define the offset using next_chunk_offset_hi and next_chunk_offset_lo fields. In yet another example, a struct pva_cmd_barrier can enforce completion of a designated group of asynchronous commands before continuing execution, where the barrier_group field matches those assigned in previous asynchronous command headers. A struct pva_cmd_write_dram can specify a DRAM resource ID and offset for writing data. Additional general commands include struct pva_cmd_unregister_resource that can remove a resource ID from the resource table and/or struct pva_cmd_request_status that can set a DRAM buffer address for firmware to report status in the event of a command buffer abort.

In some implementations, privileged commands can be issued to system 100 through CCQ0, corresponding to kernel-mode driver (KMD) interactions. The commands can include initialization and deinitialization operations for queues and resource tables. For example, a struct pva_cmd_init_resource_table can specify the resource_table_id and base address fields (e.g., resource_table_addr_hi and resource_table_addr_lo), with the resource table ID 0 corresponding to the device table and IDs 1-7 corresponding to user contexts. In another example, a struct pva_cmd_deinit_resource_table can deallocate a resource table previously initialized using the same ID. Queue control commands include struct pva_cmd_init_queue that can specify the target CCQ ID (e.g., ccq_id), queue ID (e.g., queue_id), base address, and/or submission capacity (e.g., max_n_submits). The queue deinitialization command (e.g., struct pva_cmd_deinit_queue) can reference a queue by ID and associated CCQ.

In some implementations, engine commands can be used within system 100 to explicitly control hardware acquisition and engine affinity for executing compute workloads. For example, struct pva_cmd_acquire_engine can request one or more processing engines (PVE), where at least one (e.g., each) engine includes a VPU, DMA controller, and/or PPE. The acquired engines can be tracked in firmware, and/or execution of subsequent commands can be restricted to these engines. In another example, struct pva_cmd_release_engine can release all previously acquired engines (e.g., after execution completes or mid-buffer). Firmware can maintain engine state to facilitate safe release behavior, even when the engine is still active. A struct pva_cmd_set_current_engine can designate which of the acquired engines is active for following commands.

Figure 11A:
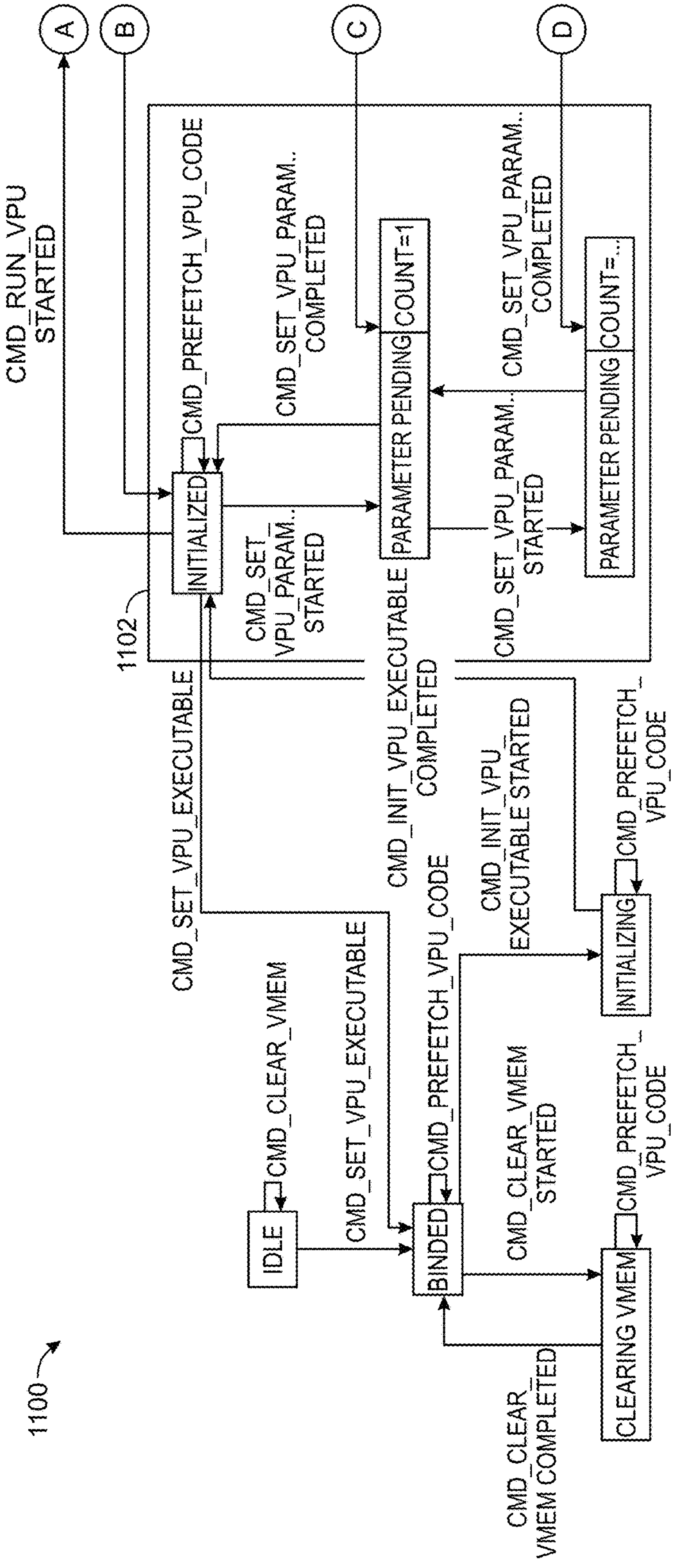
FIGS. 11A and 11B depict a vector processing unit (VPU) state machine that can be facilitated by the firmware component of the system using command buffer execution, in accordance with some implementations of the present disclosure.
Figure 11B:
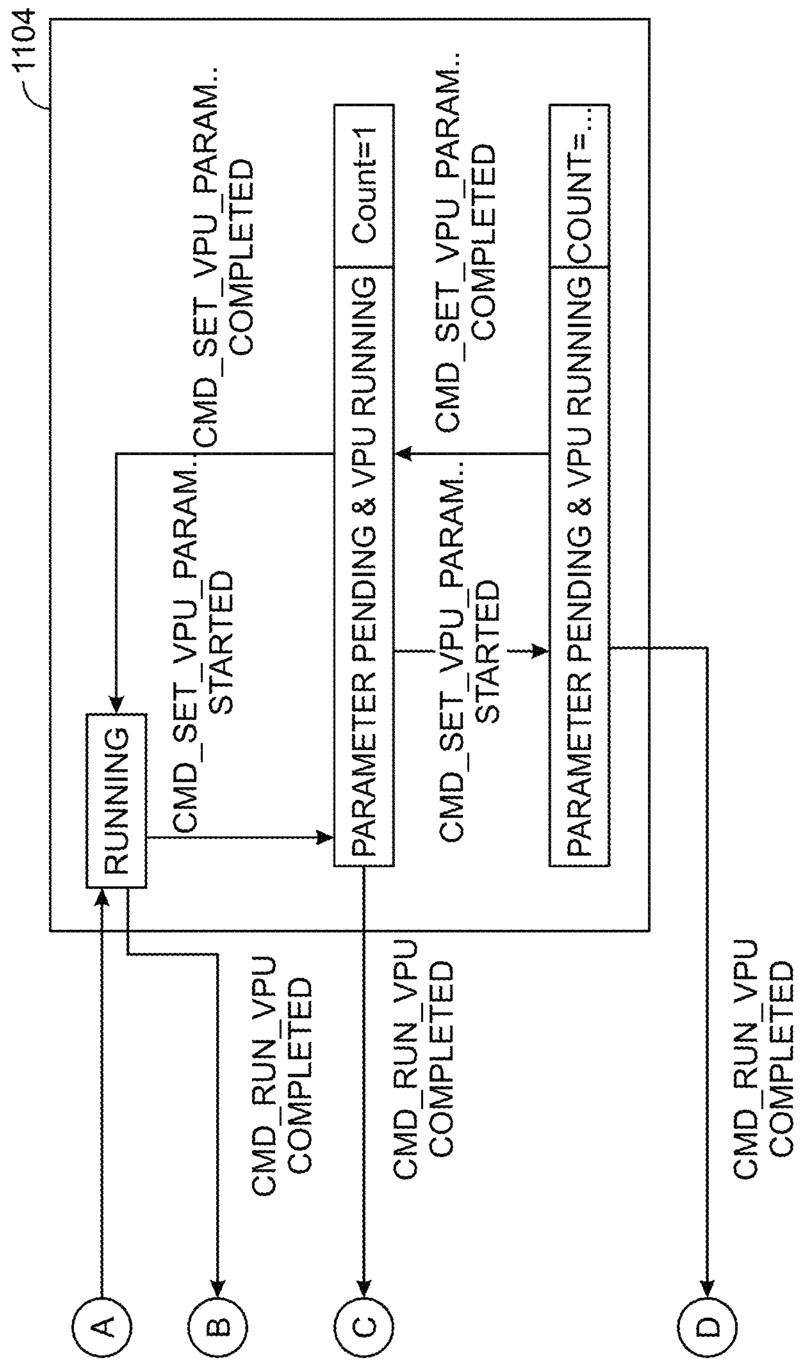

Referring to FIGS. 11A and 11B, depicting a VPU state machine 1100 that can be facilitated by the firmware component 106 of the system 100 using command buffer execution, in accordance with some implementations of the present disclosure. The system 100 of FIG. 1 can implement the various features and functionalities described in FIGS. 11A-11B. In some implementations, the VPU state machine 1100 can begin in an idle state upon acquisition of a PVE engine. For example, a command such as pva_cmd_set_vpu_executable can transition the state machine 1100 from an idle state to a binded state without initiating actual execution. In this example, the vpu_exec_resource_id field can identify the VPU executable in the resource table 110. In some implementations, the firmware can transition from the binded state to a clearing state using the pva_cmd_clear_vmem command. This command can clear VMEM in preparation for VPU initialization. The firmware can enforce that pva_cmd_clear_vmem can execute when both the VPU and PPE state machines are in states such as IDLE or BINDED. Additionally, the pva_cmd_prefetch_vpu_code command can be issued to trigger prefetching of VPU instructions from the entry point 0 while remaining in a synchronous state transition path.

Continuing with FIG. 11A, once VMEM is cleared and prefetching is complete, the firmware can transition to the INITIALIZING state using pva_cmd_init_vpu_executable. The command can configure VPU hardware, including setting the code segment registers and copying data sections. In some implementations, the command can also carry a pva_user_dma_allowance field to describe how user DMA channels and/or descriptors can be allocated for the initialization task. The initialization command can complete and cause a transition to the INITIALIZED state. The firmware can then begin setting parameters for the VPU program using commands such as pva_cmd_set_vpu_parameter, pva_cmd_set_vpu_parameter_with_buffer, and/or pva_cmd_set_vpu_parameter_with_address, at least one (e.g., each) updating a symbol or buffer mapping. At least one (e.g., each) of these commands can be asynchronous and result in state machine transitions to intermediate PARAMETER PENDING states based on the completion status and count of parameter-setting commands.

Referring again to FIG. 11A, as the parameter-setting commands complete, the firmware can track the completion using internal counters, such as COUNT=1 and COUNT= . . . , to determine when the VPU program is ready to run. Once the initialization and parameter setup are completed, the firmware can issue the pva_cmd_run_vpu command. The command transitions the system from the INITIALIZED state into the RUNNING state shown in FIG. 11B (RUNNING state 1104). Since pva_cmd_run_vpu can be asynchronous, the command buffer 134 can continue issuing other commands during VPU execution. At least one (e.g., each) transition into the RUNNING state can be tagged with identifiers A, B, C, or D to distinguish specific execution paths within the command buffer and parameter update flow.

In some implementations, while the system is in the RUNNING state 1104 (FIG. 11B), additional commands such as pva_cmd_set_vpu_parameter can be issued to update parameters mid-execution. The firmware can track parameter updates using a combination of command start/completion events and state transitions. For example, a second or third parameter-setting command can transition the system into the PARAMETER PENDING & VPU RUNNING state with count fields updated accordingly. In this example, firmware can detect that although VPU execution is ongoing, parameter injection continues asynchronously. Firmware can validate symbol IDs and memory offsets specified in the command fields (e.g., using symbol_id and vmem_offset). In another example, the command buffer can finalize execution by observing that all parameter-setting commands have completed and the VPU program has finished. In some implementations, the firmware can transition the VPU state machine 1100 at the RUNNING state 1104 to a CMD_RUN_VPU COMPLETED state. The transition can be reached through any of the marked paths B, C, and/or D depending on the number and order of in-flight parameter-setting commands. The firmware can also use pva_cmd_release_engine to release previously acquired PVE engines after the command buffer completes. In some implementations, completion of the VPU program can be used as a synchronization point for subsequent DMA operations and/or command buffer submissions. That is, the system 100 can enforce ordering based on the transitions to maintain correct runtime.

Figure 12:
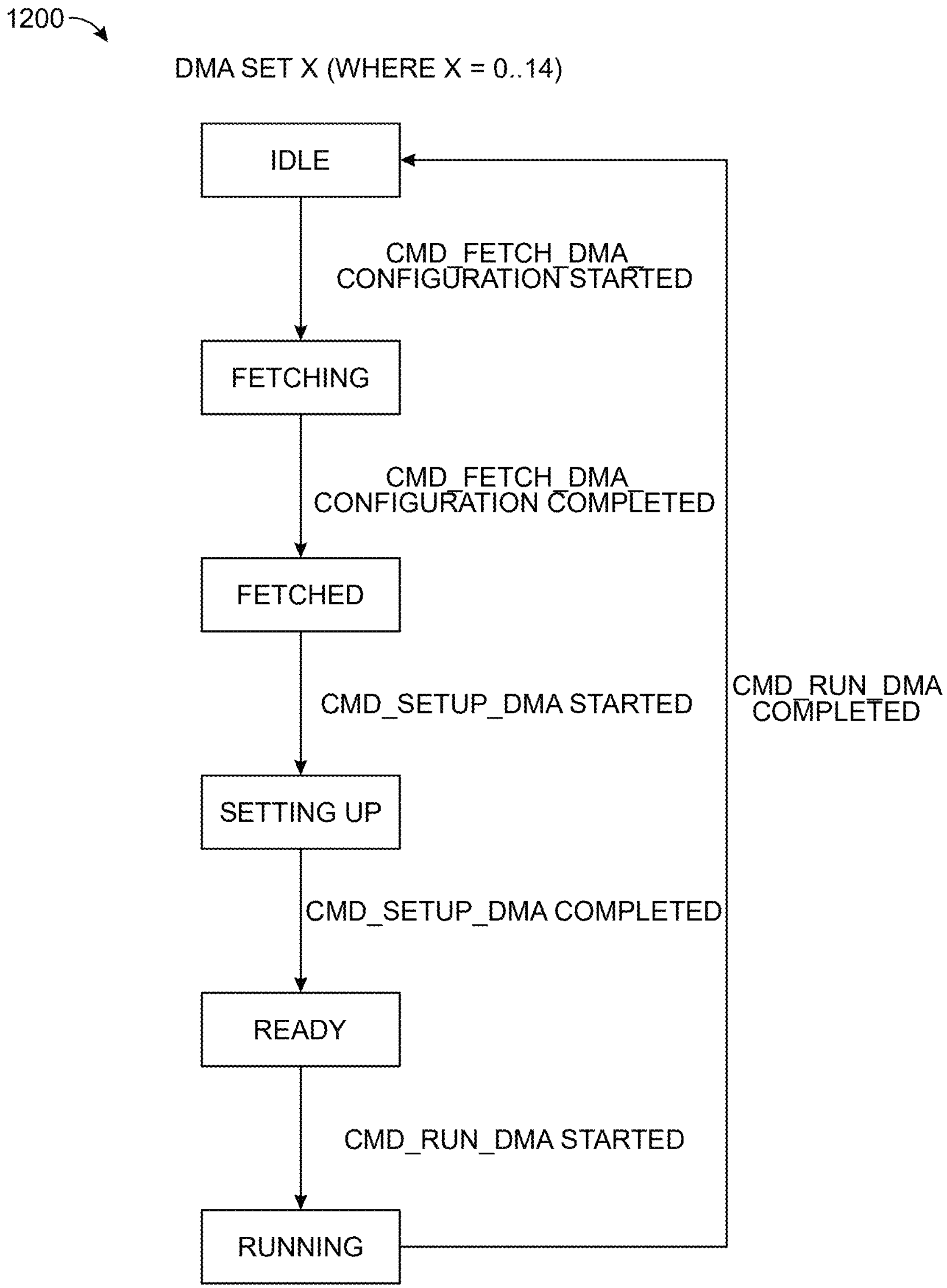
FIG. 12 depicts a DMA state machine instantiated per DMA configuration set in the system, in accordance with some implementations of the present disclosure.

Referring to FIG. 12, depicting a DMA state machine 1200 instantiated per DMA configuration set in the system 100, in accordance with some implementations of the present disclosure. The system 100 of FIG. 1 can implement the various features and functionalities described in FIG. 12. In some implementations, at least one (e.g., each) DMA set (e.g., DMA set X where X=0 . . . 14) can enter an IDLE state before the firmware initiates configuration fetch. For example, the pva_cmd_fetch_dma_configuration command can initiate a transition from the IDLE state to the FETCHING state. The command can use dma_set_id to identify the set, resource_id to specify the DMA configuration stored in DRAM, and/or a pva_user_dma_allowance struct to optionally provide user ADBs to accelerate configuration fetching. In some implementations, firmware can acquire a scratch memory area in TCM to hold the configuration. The command blocks if no scratch is available. If no other command can complete and scratch remains unavailable, firmware aborts the command buffer to prevent deadlock.

Additionally, once the DMA configuration has been fetched into TCM, the state machine 1200 can transition to the FETCHED state. From this state, firmware can issue pva_cmd_setup_dma, initiating the SETTING UP state. The command can transfer the fetched configuration into the DMA hardware registers using channel 0 (e.g., user-supplied ADBs can accelerate this step). For example, pva_cmd_setup_dma accepts the same dma_set_id and pva_user_dma_allowance fields to indicate the target configuration and available user buffers. During the setup, the firmware can validate all and/or some descriptor fields reference valid slots. Once setup completes, the state machine can transition to the READY state, marking the DMA hardware as configured.

In the READY state, firmware can execute DMA transfers using the pva_cmd_run_dma command. The command can transition the state machine to the RUNNING state and can be implemented to drive the configured DMA channels to completion. For example, pva_cmd_run_dma specifies dma_set_id for execution and blocks until all needed ADBs, VDBs, and GPIO triggers are acquired. The command can verify the DMA configuration being executed is associated with the VPU executable previously bound using pva_cmd_set_vpu_executable. If a mismatch is detected, the firmware aborts the command buffer. Once the DMA execution completes, the state machine returns to the IDLE state, and/or the scratch TCM area can be released for use by other DMA sets.

In some implementations, configuration of DMA descriptors can depend on slot-based addressing managed through binding commands. For example, pva_cmd_bind_dram_slot can bind a DRAM surface to a dynamic slot in the specified DMA set. In this example, dma_set_id, slot_id, and resource_id identify the set, the slot, and the associated DRAM resource respectively. The command can also include offset fields (slot_offset_hi, slot_offset_lo, surface_base_offset_hi, surface_base_offset_lo) that define how to calculate descriptor addresses. Surface format flags (PVA_CMD_FLAGS_SURFACE_FORMAT_MSB, PVA_CMD_FLAGS_SURFACE_FORMAT_LSB) and/or block height flags (PVA_CMD_FLAGS_LOG2_BLOCK_HEIGHT_MSB, PVA_CMD_FLAGS_LOG2_BLOCK_HEIGHT_LSB) further influence how descriptors can be resolved at runtime.

Additionally, virtual memory slots can be bound using pva_cmd_bind_vmem_slot. The command can specify a dma_set_id, a slot_id, a symbol_id, and/or an offset value to link VMEM-based targets to command buffers. During command buffer execution in system 100, the slots can be resolved using the resource table corresponding to the active context. That is, the firmware can enforce memory access permissions and/or descriptor consistency by cross-referencing bindings stored in the resource table of the context. For example, the firmware can verify that when a pva_cmd_run_dma is issued, all dynamic slots have been bound and verified prior to issuing hardware transactions.

Figure 13:
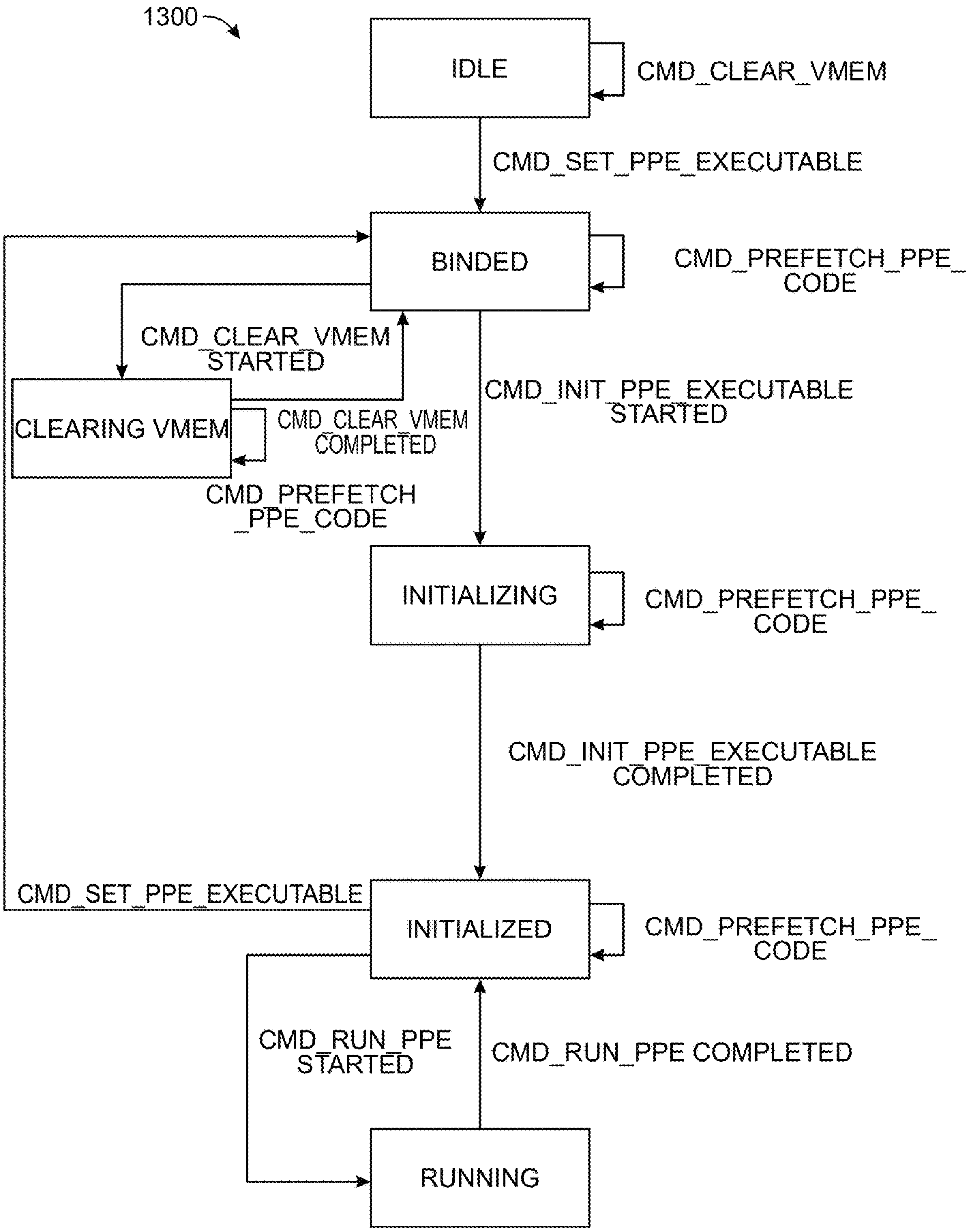
FIG. 13 depicts a pixel processing engine (PPE) state machine controlled by sequential execution of commands issued in a command buffer in system, in accordance with some implementations of the present disclosure.

Referring to FIG. 13, depicting a PPE state machine 1300 controlled by sequential execution of commands issued in a command buffer in the system 100, in accordance with some implementations of the present disclosure. The system 100 of FIG. 1 can implement the various features and functionalities described in FIG. 13. The state machine can begin in the IDLE state, where the firmware component can issue a pva_cmd_set_ppe_executable command to set the executable context for subsequent PPE operations. In this example, no additional setup is performed, and the state transitions to BINDED. From the BINDED state, the firmware component can issue a pva_cmd_clear_vmem command to drive a transition to the CLEARING VMEM state. This command clears VMEM (e.g., the local memory 126) contents and synchronizes across VPU and PPE domains, and firmware can enforce state validity by preventing VMEM updates while execution activity is ongoing. After the clear operation is completed, the state machine returns to the BINDED state.

From the BINDED state, the firmware component can issue a pva_cmd_prefetch_ppe_code command. The command can initiate instruction prefetching from an entry point (e.g., not waiting for the operation to complete), and the PPE state can remain in BINDED. The firmware component can issue a pva_cmd_init_ppe_executable command to configure PPE hardware resources. In this example, the state transitions to INITIALIZING and firmware uses pva_user_dma_allowance parameters to assign user-supplied DMA resources for loading the code and data segments. Upon completion of the initialization, the state machine transitions to INITIALIZED. The PPE hardware can be programmed, and firmware can proceed with runtime execution using command buffer instructions referencing the initialized state.

From the INITIALIZED state, the firmware component can issue a pva_cmd_run_ppe command. The command can initiate execution of the configured PPE program from the specified entry point and causes the state machine 1300 to transition to the RUNNING state. While in the RUNNING state, firmware can track asynchronous execution and maintain execution ordering based on barrier groups and/or dependent commands. When the PPE program completes, the state machine returns to the INITIALIZED state. In this example, firmware can issue a subsequent pva_cmd_set_ppe_executable or pva_cmd_run_ppe command to restart execution. The state machine can restrict transitions based on firmware-managed conditions to preserve VMEM consistency and enforce valid PPE execution orderings.

In some implementations of the system 100, the firmware component can issue query commands to store timestamps during execution of PPE programs. For example, a pva_cmd_capture_timestamp command can store an 8-byte value into a TCM-resident buffer at a designated store_index. The command can be implemented in IMMEDIATE_MODE, VPU START MODE, VPU DONE MODE, and/or DEFER MODE. In DEFER MODE, the command can capture the timestamp when all commands in the specified barrier group (e.g., defer_barrier_group) have completed. The buffer can contain up to 32 timestamp entries, and/or firmware manages access to avoid overwriting in-use slots.

Additionally, the firmware component can issue a pva_cmd_dump_queries command to write captured timestamps from TCM to DRAM. The command can specify a resource_id, a start_index, and/or a query_count to describe the destination buffer in DRAM. A defer_barrier_group_mask parameter can be used to defer execution of the dump command until barrier group conditions are satisfied. The command does not block subsequent commands and can be included in command buffers containing PPE commands. That is, query commands such as pva_cmd_capture_timestamp and pva_cmd_dump_queries can execute asynchronously and do not interfere with the PPE state machine 1300 and/or affect the control logic governing the transition between states.

In some implementations, the firmware component of the system 100 can issue query commands to capture and retrieve timestamps into a local TCM buffer for debugging or profiling purposes. For example, the firmware component can issue a pva_cmd_capture_timestamp command with capture_mode set to IMMEDIATE_MODE to record a timestamp immediately when the command is executed. In another example, the firmware component can issue the same command with capture_mode set to VPU_START_MODE or VPU_DONE_MODE to record timestamps when the VPU begins or completes execution. In yet another example, the firmware component can use DEFER_MODE with a defer_barrier_group identifier to delay capture until completion of commands assigned to the same barrier group. At least one (e.g., each) captured timestamp can be stored at a designated store_index in the TCM buffer, and the firmware component can track slot availability across up to 32 buffer locations. Subsequently, the firmware component can issue a pva_cmd_dump_queries command to write the stored timestamps to a DRAM buffer identified by resource_id, using dram_offset_lo and dram_offset_hi to compute the write location. In some implementations, the dump command can be configured with a defer_barrier_group_mask to postpone writing until dependent command groups have completed. The query commands can be included in command buffers submitted by user contexts and can be executed asynchronously.

In some implementations, the firmware component of the system 100 can manage L2SRAM allocations using dedicated L2SRAM commands. For example, the firmware component can issue a pva_cmd_bind_12sram command to acquire an L2SRAM region for use in command buffer execution. The command specifies a dram_resource_id and dram_offset_lo and dram_offset_hi values to define the backing DRAM range for persistence. A corresponding access_policy value (e.g., FILL_ON_MISS or FLUSH_ON_EVICTION) can be used by firmware to determine transfer behavior between DRAM and L2SRAM. The size of the L2SRAM allocation can be indicated in the 12sram_size field, and user DMA resources can be assigned via a pva_user_dma_allowance structure included in the command. That is, the firmware component can delay execution of subsequent commands until the L2SRAM is acquired, and enforce constraints that prevent multiple L2SRAM allocations within the same command buffer. When execution completes, the firmware component can issue a pva_cmd_release_12sram command to release the previously allocated L2SRAM. In this example, the release command can be asynchronous and take effect after all previously issued commands have completed. The firmware component can facilitate L2SRAM lifecycle tracking in coordination with resource table entries corresponding to the executing context.

Figure 14:
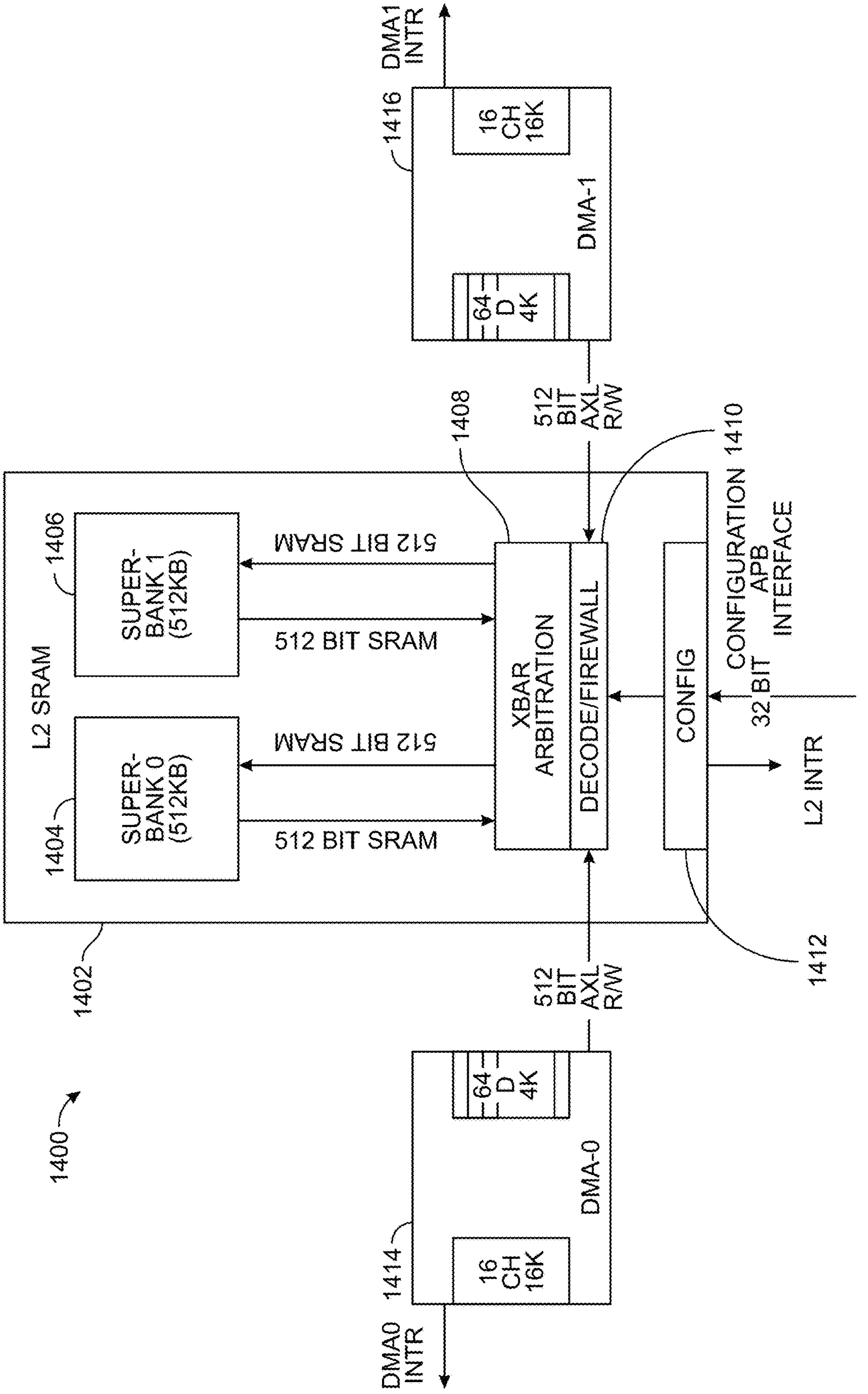
FIG. 14 depicts a system including L2SRAM implemented as a shared local memory accessible to DMA controllers, in accordance with some implementations of the present disclosure.

Referring to FIG. 14, depicting a system 1400 including L2SRAM 1402 (e.g., the local SRAM 124 of FIG. 1) implemented as a shared local memory accessible to DMA controllers 1414 and 1416 (also referred to herein as "DMA engines"), in accordance with some implementations of the present disclosure. The system 100 of FIG. 1 can implement the various features and functionalities described in FIG. 14. The L2SRAM 1402 can include two super banks, labeled SUPER-BANK 0 (1404) and SUPER-BANK 1 (1406), each having a 512 KB capacity. The L2SRAM 1402 can interface with both DMA controllers over a 512-bit SRAM interface. Accesses to the L2SRAM 1402 can be arbitrated by an XBAR arbitration component 1408, which can forward requests to the decode-firewall logic 1410. In this example, the decode-firewall logic 1410 can enforce access permissions using a configurable set of hardware registers. In response to detecting an invalid access, the decode-firewall logic 1410 can assert an interrupt signal to a control processor. Configuration of access policies and interrupt settings can be performed via a configuration interface 1412 that exposes a 32-bit APB bus. At least one (e.g., each) of the DMA controllers 1414 and 1416 can include 16 channels, 64 descriptors, and/or a 4 KB ADB pool for issuing read and write operations targeting the L2SRAM 1402. Interrupts DMA0 INTR and DMA1 INTR can be asserted from the respective DMA controllers upon completion of transfers.

In some implementations, the L2SRAM 1402 can be used as a persistent scratch space for workloads that reuse the same data across multiple operator executions. For example, data fetched from DRAM and used by a convolution operator can be stored in one of the super banks (1404 or 1406) to reduce repeated DRAM reads. In another example, intermediate results generated by one VPU can be stored in L2SRAM and consumed by another VPU without round-tripping data to DRAM. In this configuration, both super banks can be concurrently accessed by independent DMA controllers, facilitating pipelined access patterns across multiple stages of execution. The hardware firewall configuration (via the decode-firewall logic 1410) can isolate memory regions to ensure that at least one (e.g., each) user context only accesses its allocated region. Configuration writes from a host processor can update firewall and/or arbitration behavior via the configuration interface 1412.

Figure 15:
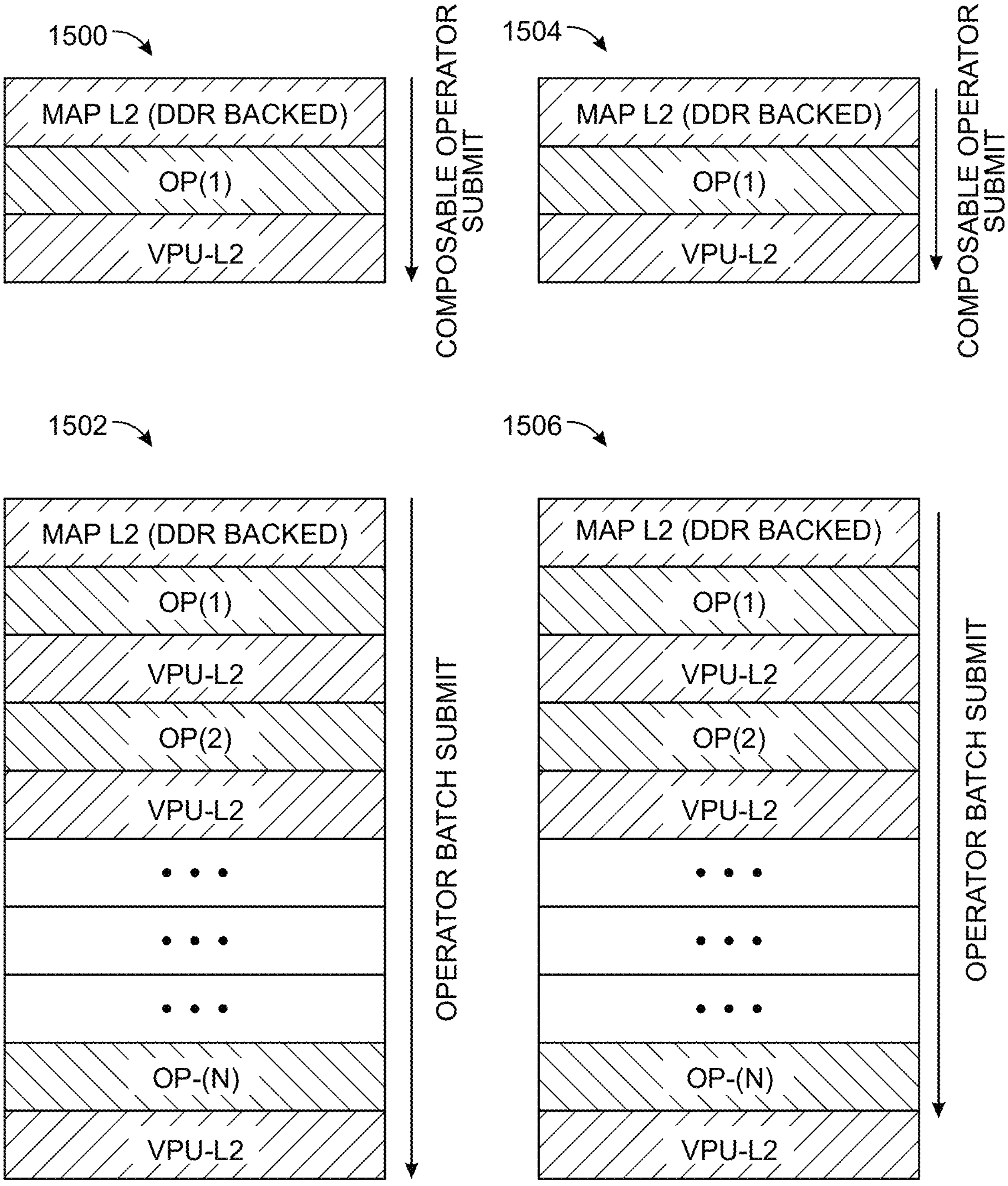
FIG. 15 depicts the facilitation of mapping local memory to device pointers for persistent usage across operator submissions, in accordance with some implementations of the present disclosure.

Referring to FIG. 15, depicting the facilitation of mapping local memory (e.g., L2SRAM) to device pointers for persistent usage across operator submissions, in accordance with some implementations of the present disclosure. The system 100 of FIG. 1 can implement the various features and functionalities described in FIG. 15. At least one (e.g., each) memory layout can include a mapped L2 region (e.g., MAP L2) backed by DRAM and at least one operator submission region (e.g., OP(1), OP(2), . . . , OP(N)) associated with a corresponding local memory region (e.g., VPU-L2). In the composable operator submission examples 1500 and 1504, individual operator submissions are allocated their own persistent VPU-L2 region. In the batch submission examples 1502 and 1506, multiple operator blocks are submitted together, and each operator can be paired with its respective VPU-L2 allocation in sequence. The firmware component 106 can reuse previously bound L2 regions across these operator submissions without requiring redundant DRAM-to-L2 copy operations. In some implementations, L2 allocations can be managed as device pointers exposed to user software and tracked in the resource table 110 corresponding to the submission context. The allocations can remain valid across multiple operator submissions without requiring explicit initialization or flush instructions from the user.

In some implementations, the firmware component 106 can associate L2SRAM allocations with DRAM backing based on access policy parameters (e.g., FILL_ON_MISS, FLUSH_ON_EVICTION) and track them across composable submissions or batch execution windows. For example, in the batch submission example 1502, OP(1) through OP(N) each use persistent VPU-L2 allocations that remain valid during the batch submission, avoiding intermediate memory transfers. In another example, as illustrated by composable operator submission example 1500, OP(1) and VPU-L2 can be configured in isolation with DRAM-backed L2, and/or subsequent operator submissions can reuse the same allocation without requiring flush or invalidate steps. The composable and batch memory layouts can both use DRAM-backed L2 mappings to reduce DRAM bandwidth usage and/or eliminate or reduce redundant copy overhead during execution.

Figure 16A:
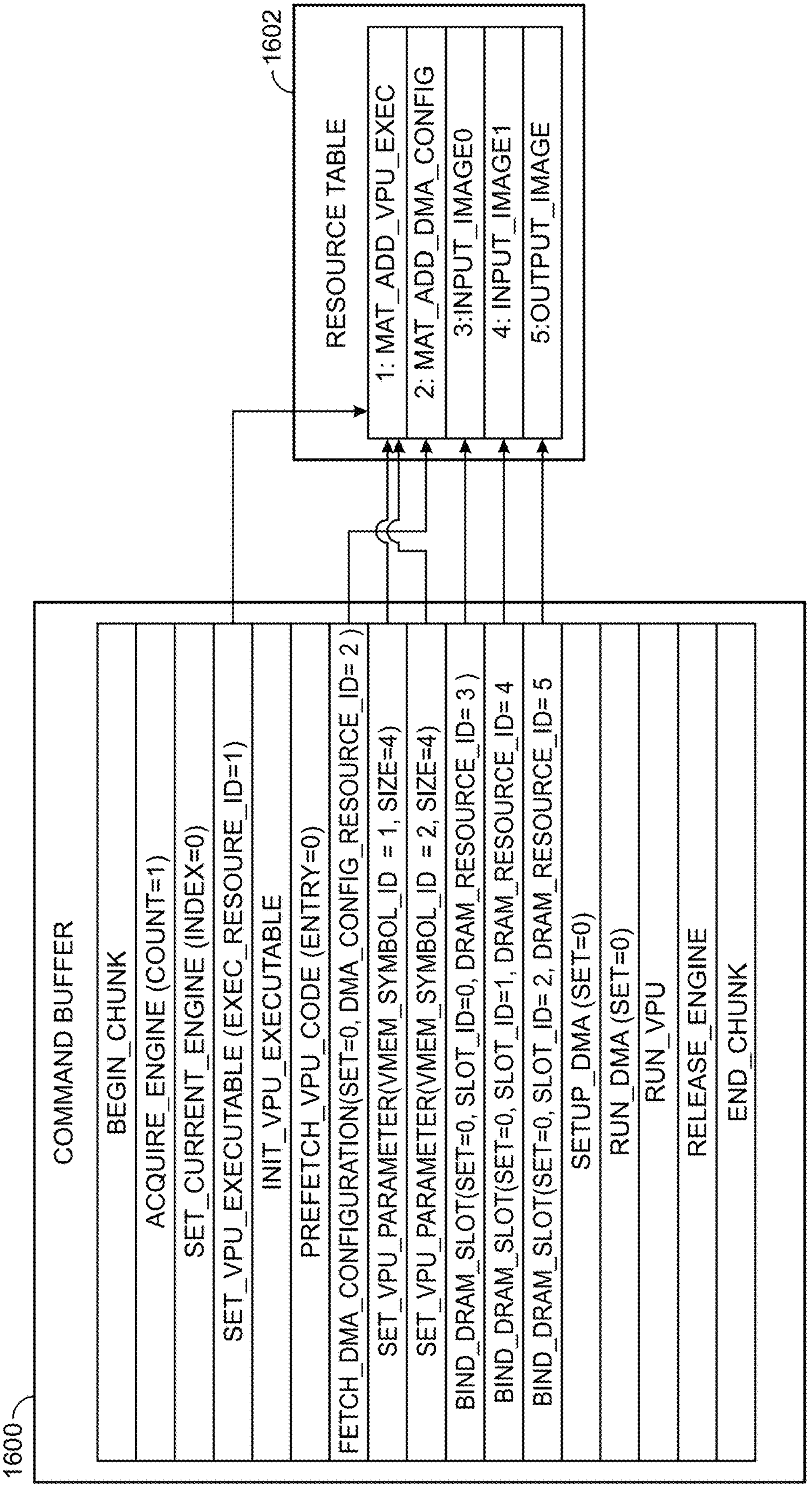
FIG. 16A depicts a command buffer executing a VPU application for matrix addition using a predefined set of resources stored in a resource table, in accordance with some implementations of the present disclosure.

Referring to FIG. 16A, depicting a command buffer 1600 executing a VPU application for matrix addition using a predefined set of resources stored in a resource table 1602, in accordance with some implementations of the present disclosure. The system 100 of FIG. 1 can implement the various features and functionalities described in FIG. 16A. The command buffer can begin with BEGIN_CHUNK and include engine acquisition (ACQUIRE_ENGINE with COUNT=1), engine selection (SET_CURRENT_ENGINE with INDEX=0), and/or executable association (SET_VPU_EXECUTABLE with EXEC_RESOURCE_ID=1). Subsequent commands initialize and implement VPU execution (INIT_VPU_EXECUTABLE), prefetch the VPU instruction stream (PREFETCH_VPU_CODE with ENTRY=0), and/or fetch the DMA configuration (FETCH_DMA_CONFIGURATION with SET=0 and DMA_CONFIG_RESOURCE_ID=2). Parameter-setting commands (SET_VPU_PARAMETER with VMEM_SYMBOL_ID=1 and 2) provide inputs to the VPU program. Input/output surfaces are bound to dynamic slots using BIND_DRAM_SLOT commands (e.g., SLOT_ID=0 with DRAM_RESOURCE_ID=3). The command buffer configures the DMA controller (SETUP_DMA), initiates DMA execution (RUN_DMA), triggers VPU execution (RUN_VPU), and/or completes execution with engine release (RELEASE_ENGINE) and END_CHUNK. At least one (e.g., each) command references entries in the resource table 1602 including the VPU executable (MAT_ADD_VPU_EXEC), DMA configuration (MAT_ADD_DMA_CONFIG), two input images (INPUT_IMAGE0 and INPUT_IMAGE1), and one output image (OUTPUT_IMAGE).

Figure 16B:
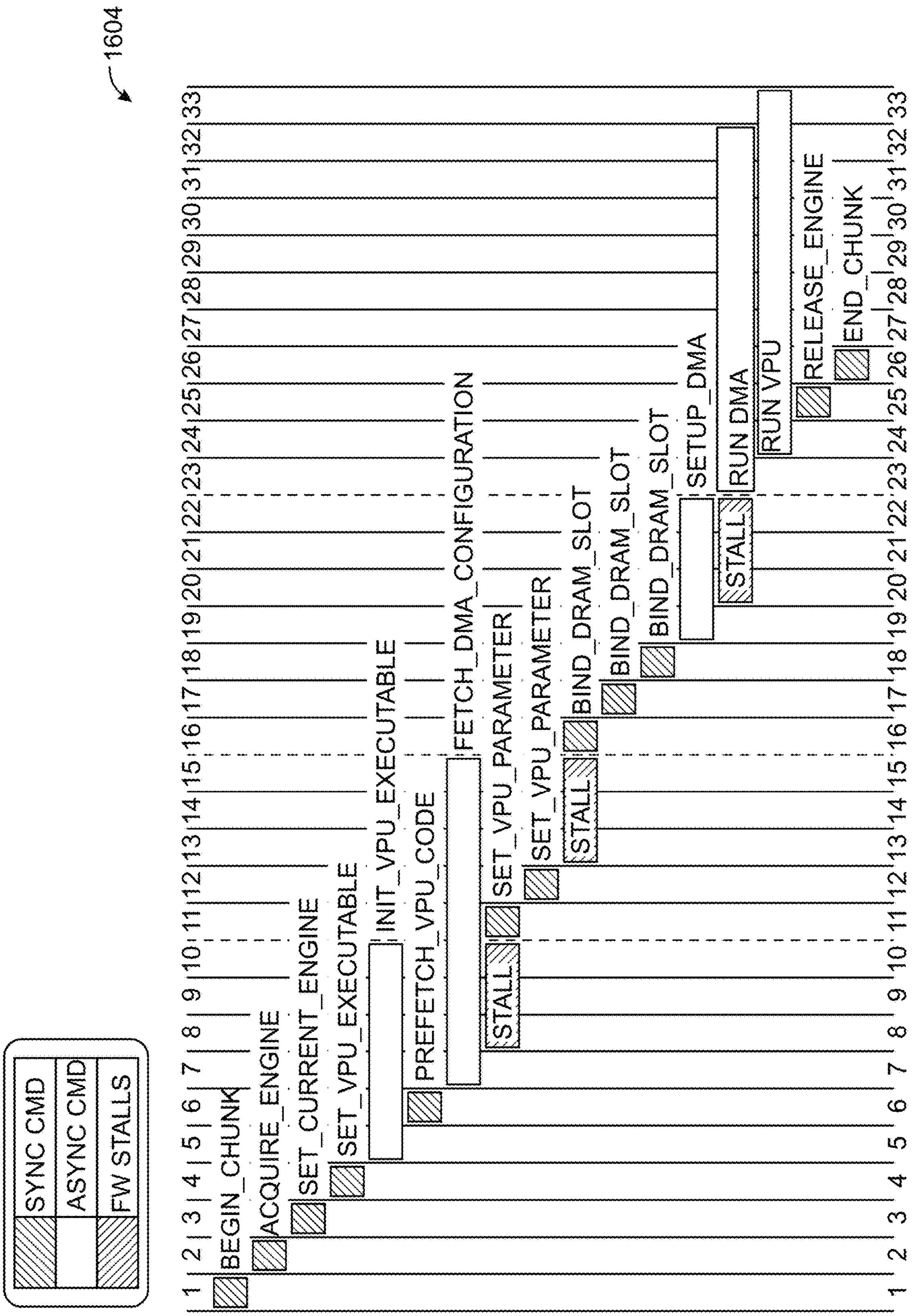
FIG. 16B depicts an execution timeline representing firmware-controlled execution of the command buffer described in FIG. 16A, in accordance with some implementations of the present disclosure.

Referring to FIG. 16B, depicting an execution timeline 1604 representing firmware-controlled execution of the command buffer described in FIG. 16A, in accordance with some implementations of the present disclosure. The system 100 of FIG. 1 can implement the various features and functionalities described in FIG. 16B. At least one (e.g., each) row represents a command, and/or time flows left to right across numbered time units. Synchronous commands (e.g., SET_CURRENT_ENGINE) can be executed sequentially and block subsequent execution until completed. Asynchronous commands (e.g., PREFETCH_VPU_CODE, RUN_DMA, RUN_VPU) allow the firmware to proceed while execution continues in parallel. The INIT_VPU_EXECUTABLE command executes synchronously and completes before parameter-setting commands. Firmware stalls (e.g., after SET_VPU_PARAMETER) occur when prerequisites such as DMA slot bindings or engine state validation are not yet satisfied. For example, firmware stalls between commands 8-10 and 13-15, among other stalls, depict dependencies on prior parameter-setting and slot-binding operations. The SETUP_DMA and RUN_DMA commands span time units 23-32 and issue after required DRAM slots have been bound and configuration is complete. RUN_VPU executes from time unit 24-33 in parallel with the tail of the DMA operation.

In some implementations, FIGS. 16A-16B collectively represent an example of a firmware-controlled execution pipeline implemented by the system 100. The command buffer 1600 defines a set of low-level commands for dispatching the mat_add application, with resource table 1602 (e.g., the resource table 110) serving as the indirection layer that provides identifiers for executables, configurations, and buffers. The execution timeline 1604 depicts sequential issuance of commands with overlapping execution driven by command dependencies and firmware-managed stalls. Firmware validation and scheduling can dynamically issue commands once slot bindings and memory states are verified, and completion ordering can remain enforced via synchronization points. For example, BIND_DRAM_SLOT commands must complete before SETUP_DMA is issued, and firmware explicitly verifies slot-to-resource associations using the resource table 1602 before triggering DMA or VPU hardware operations.

Referring to FIG. 16C, depicting an execution timeline 1606 illustrating back-to-back dispatches of two VPU programs by the firmware component of the system 100, in accordance with some implementations of the present disclosure. The system 100 of FIG. 1 can implement the various features and functionalities described in FIG. 16C. The command buffer can include (at least) two sequential sets of VPU-related commands, both executed on a single VPU pipeline. The first launch can begin with ACQUIRE_ENGINE and SET_CURRENT_ENGINE, followed by association of the first executable (SET_VPU_EXECUTABLE), initialization (INIT_VPU_EXECUTABLE), and/or instruction prefetch (PREFETCH_VPU_CODE).

Firmware triggers DMA configuration fetch (FETCH_DMA_CONFIGURATION<SET=0>), issues parameter-setting commands, and/or performs setup (SETUP_DMA<SET=0>) before initiating DMA execution (RUN_DMA<SET=0>) and VPU execution (RUN_VPU). At least one (e.g., each) of these operations can correspond to synchronous or asynchronous firmware-controlled commands. The timeline indicates firmware stalls after parameter-setting and DMA setup, where the firmware waits for prerequisite state transitions. The command sequence shows the first VPU execution extending from time 21 to 32.

The second VPU launch begins during the execution of the first VPU program. Specifically, FETCH_DMA_CONFIGURATION<SET=1> is issued during time 22-25, overlapping with the RUN_VPU command of the first launch. The overlap hides the configuration fetch latency for the second DMA set. After the first VPU program completes, firmware initiates the second executable association (SET_VPU_EXECUTABLE), clears VMEM (CLEAR_VMEM), and performs instruction prefetch (PREFETCH_VPU_CODE). The second setup (SETUP_DMA<SET=1>) and initialization (INIT_VPU_EXECUTABLE) follow in sequence. The timeline shows a VPU idle period (bubble) between time 33-48, representing a gap in active VPU execution due to delays from SETUP_DMA and parameter commands. Once prerequisites are met, firmware dispatches the second VPU execution (RUN_VPU), concluding with RELEASE_ENGINE.

In this example, the execution timeline 1606 depicts firmware-managed sequencing and resource overlap. The command buffer submitted by the CPU host can contain consecutive launches targeting the same VPU pipeline. The firmware component inserts the configuration stages for the second launch with the execution stages of the first, reducing total idle time and maintaining accelerator throughput. For example, firmware fetches the second DMA configuration while the VPU runs the first program. In this example, despite the inability to fully hide DMA setup latency, the execution schedule avoids total serialization. At least one (e.g., each) DMA and VPU command uses identifiers (e.g., SET=0, SET=1) to scope resource usage to distinct configuration sets, while firmware tracks state transitions and stalls execution only when required by hardware dependencies.

Referring now to FIG. 16D, depicting an execution timeline 1608 illustrating a single VPU program utilizing three DMA configuration sets under control of firmware component 106 of the system 100, in accordance with some implementations of the present disclosure. The system 100 of FIG. 1 can implement the various features and functionalities described in FIG. 16D. The command buffer can initiate with ACQUIRE_ENGINE, SET_CURRENT_ENGINE, and/or SET_VPU_EXECUTABLE, followed by initialization (INIT_VPU_EXECUTABLE) and instruction prefetch (PREFETCH_VPU_CODE). DMA configuration set 0 can be fetched and/or programmed via FETCH_DMA_CONFIGURATION<SET=0> and SETUP_DMA<SET=0>, respectively. In some implementations, the first DMA execution (RUN_DMA<SET=0>) can begin once the firmware verifies configuration integrity and transitions the associated DMA controller state machine. Concurrently, firmware can schedule the first VPU execution (RUN_VPU) to process inputs mapped through resource table entries. The commands depict firmware stalls following the parameter-setting and setup commands, where dependencies on DMA readiness and resource bindings delay further progression.

The firmware can fetch configuration for DMA set 1 during VPU execution of set 0. However, due to resource conflicts between DMA set 0 and set 1 (e.g., overlapping DMA channels and descriptors), firmware cannot proceed with SETUP_DMACSET=1> until RUN_DMA<SET=0> completes. The stall window spans time 24 to 30, as reflected in the execution timeline. This results in a VPU bubble, during which the VPU remains idle while firmware sets up the next DMA configuration. The second DMA execution (RUN_DMA<SET=1>) can proceed after successful setup. Concurrent with the execution of set 1, the firmware fetches configuration for DMA set 2 using FETCH_DMA_CONFIGURATION <SET=2>, beginning preemptively to overlap configuration latency. The firmware component issues SET_VPU_PARAMETER commands between setup stages to propagate updated sequence values to VMEM.

Transitioning from DMA set 1 to set 2 involves no hardware conflicts, permitting SETUP_DMA<SET=2> to be executed in parallel with RUN_DMA<SET=1>. To enforce correct sequencing, the firmware component issues a BARRIER command at time 44, blocking DMA set 2 from running until set 1 has completed. As a result, setup time for set 2 is completely hidden behind execution of set 1, minimizing idle time in the VPU pipeline. The final DMA execution (RUN_DMA<SET=2>) and a final parameter update complete before RELEASE_ENGINE is issued. This example demonstrates use of sequential DMA configuration sets within a single VPU program, where the firmware component uses explicit coordination, barrier enforcement, and/or sequence updates to facilitate execution continuity. The system 100 can track command issuance and completion across DMA and VPU hardware components and preserves runtime consistency through context-specific resource table validation.

Figure 17:
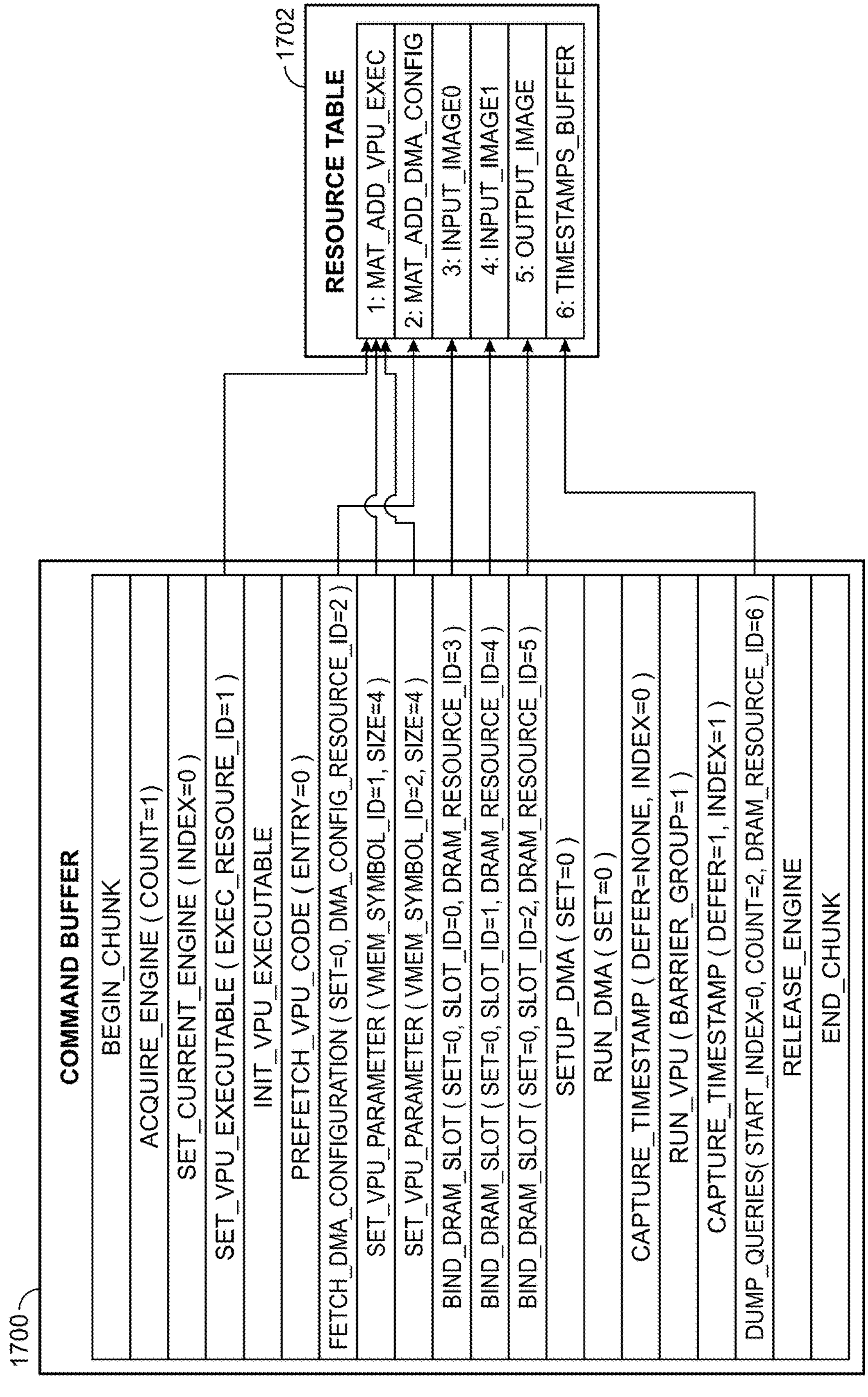
FIG. 17 depicts a command buffer executing query commands to capture and extract timestamps before and after VPU program execution using a resource table, in accordance with some implementations of the present disclosure.

Referring now to FIG. 17, depicting a command buffer 1700 executing query commands to capture and extract timestamps before and after VPU program execution using a resource table 1702, in accordance with some implementations of the present disclosure. The system 100 of FIG. 1 can implement the various features and functionalities described in FIG. 17. The command buffer can construct a VPU job for a matrix addition (MAT_ADD_VPU_EXEC) program, which can consume two inputs and an output image. Commands such as ACQUIRE_ENGINE, SET_CURRENT_ENGINE, SET_VPU_EXECUTABLE, and INIT_VPU_EXECUTABLE prepare the VPU context and initialize the executable. The DMA configuration is fetched using FETCH_DMA_CONFIGURATION<SET=0> with resource ID 2 (MAT_ADD_DMA_CONFIG), and binding by the memory slot can occur referencing resource IDs 3, 4, and 5 for the input and output images. The system 100 can use SETUP_DMA and RUN_DMA to configure and trigger the DMA controller 116 before launching the VPU program.

Prior to VPU execution, the firmware component can issue a CAPTURE_TIMESTAMP command with DEFER=NONE and INDEX=0. The capture of a timestamp can be into a TCM-resident query buffer slot 0. The action can establish a baseline for profiling and/or debugging and occurs before RUN_VPU executes the VPU program. The RUN_VPU command includes a BARRIER_GROUP=1 field, allowing firmware to reference this group during deferred query handling. Upon completion of the VPU program, the firmware component can issue a second CAPTURE_TIMESTAMP command, this time with DEFER=1 and INDEX=1. In some implementations, the firmware defers timestamp capture until all commands in barrier group 1 have completed.

Once both timestamps are stored in TCM, the firmware component can issue a DUMP_QUERIES command to transfer captured timestamps to a DRAM buffer referenced by resource ID 6 (TIMESTAMPS_BUFFER) of the resource table 1702. The command specifies START_INDEX=0 and COUNT=2, indicating both captured timestamps (before and after execution) are copied to DRAM. This can allow user-mode software and/or CUPVA to retrieve and analyze the timing data after job completion. These query commands (e.g., CAPTURE_TIMESTAMP and DUMP_QUERIES) do not interfere with the VPU state machine and can be executed asynchronously.

Example Autonomous or Semi-Autonomous Machine

Figure 18A:
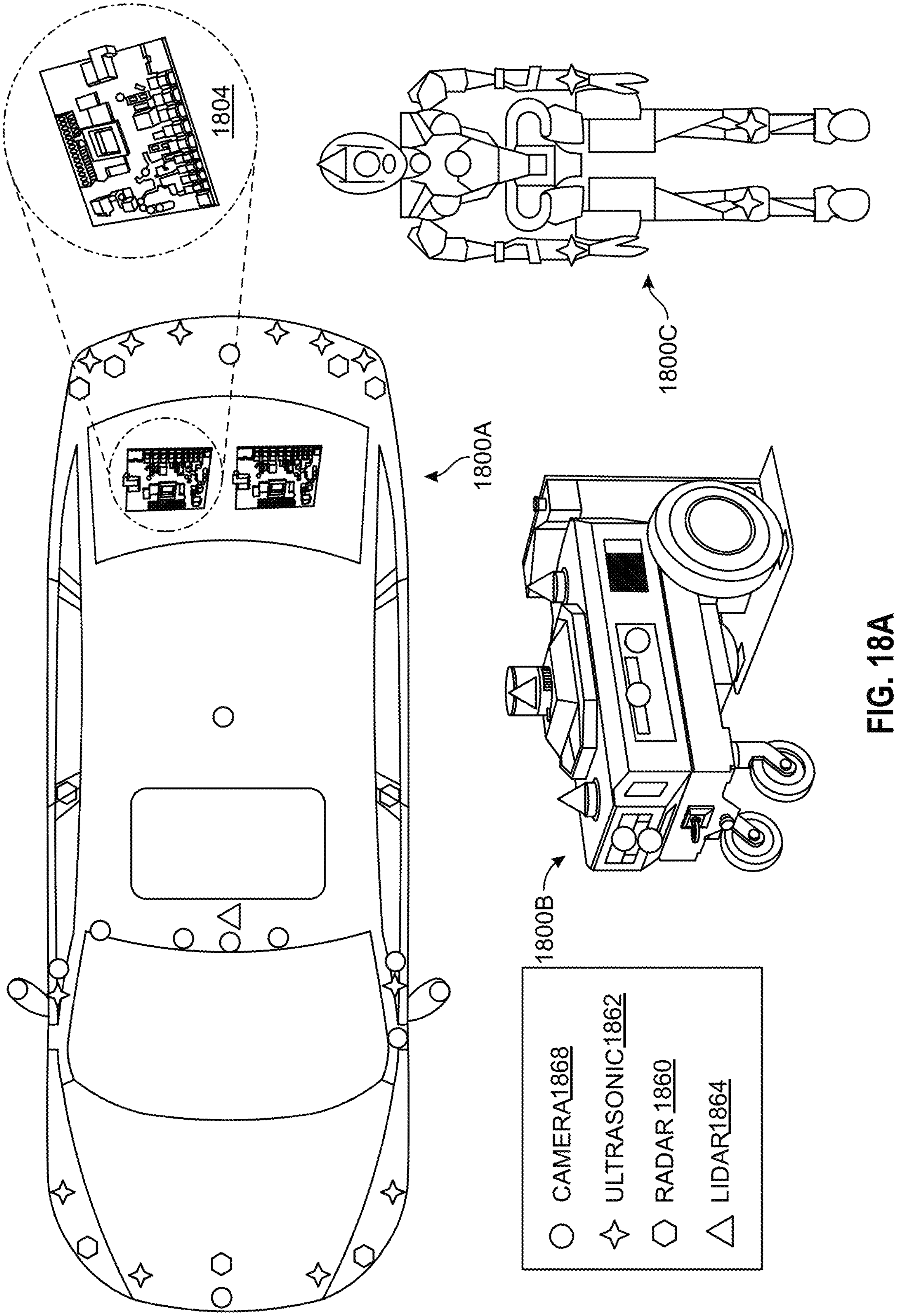
FIG. 18A is an example of sensor locations having corresponding fields of view or sensory fields for example autonomous or semi-autonomous machines, in accordance with at least some implementations of the present disclosure.

FIG. 18A is an example of sensor locations having corresponding fields of view or sensory fields for an autonomous or semi-autonomous vehicle 1800*a*, an autonomous mobile robot (AMR) 1800*b*, and a humanoid robot 1800*c*, in accordance with some implementations of the present disclosure. Although three types of machines 1800 are illustrated, this is not intended to be limiting, and the machine(s) 1800 described herein can include a vehicle, a car, a truck, a bus, a first responder vehicle, a shuttle, an electric or motorized bicycle, a motorcycle, a fire truck, a police or emergency vehicle, an ambulance, a watercraft, a construction vehicle, an underwater craft, a robot (e.g., AMR, humanoid, robotic arm, end-effector, forklift, etc.), a drone, an aircraft, a vehicle coupled to a trailer (e.g., a semi-tractor-trailer truck used for hauling cargo), and/or another type of vehicle or machine (e.g., that is unmanned and/or that accommodates one or more passengers). The vehicle 1800*a*, AMR 1800*b*, humanoid robot 1800*c*, and/or other machine types can be referred to herein collectively as machine 1800, in some instances.

With respect to vehicles 1800A, autonomous and semi-autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The machine 1800 can be capable of functionality in accordance with one or more of Level 3-Level 5 of the autonomous driving levels. The machine 1800 can be capable of functionality in accordance with one or more of Level 1-Level 5 of the autonomous driving levels. For example, the machine 1800 can be capable of driver assistance (Level 1), partial automation (Level 2, Level 2+, Level 2++), conditional automation (Level 3), high automation (Level 4), and/or full automation (Level 5), depending on the implementation. The term "autonomous," as used herein, can include any and/or all types of autonomy for the machine 1800 or other machine, such as being fully autonomous, being highly autonomous, being conditionally autonomous, being partially autonomous, providing assistive autonomy, being semi-autonomous, being primarily autonomous, or other designation.

With respect to FIG. 18A, the sensors and their respective fields of view (not illustrated for clarity purposes) or sensory fields (not illustrated for clarity purposes) are one example implementation and are not intended to be limiting. Although not illustrated, each sensor can have a corresponding field of view (e.g., a 360 degree field of view of a surround camera 1868D, a 180 degree field of view of a wide-view camera 1870, a 360 degree sensory field of a LiDAR sensor 1864, etc.). For example, only a subset of the sensors illustrated can be included, additional sensors can be included, alternative sensors can be included, the number of each sensor modality can differ, the sensor modalities can differ (e.g., can not include LiDAR or RADAR, can include SONAR, thermal sensors, etc.), the sensor locations can be different from those illustrated on the vehicle 1800*a*, AMR 1800*b*, and/or humanoid robot 1800*c*, etc. For example, with respect to the vehicle 1800*a*, depending on the type (e.g., SUV, truck, sedan, robot, motorcycle, etc.), size (e.g., 18-wheeler, moving van, small sedan, etc.), and related functionality (e.g., L2 vs. L5), the locations, numbers, modalities, and/or other sensor information can differ. Similarly, for the AMR 1800*b* and/or humanoid robot 1800*c*, the shape, size, purpose, implementation, model, etc. can dictate the number and types of sensors used.

As illustrated in FIG. 18A, the autonomous or semi-autonomous vehicle 1800A, the AMR 1800B, and the humanoid robot 1800C can include different sensor types, number, and locations. For a non-limiting example, the vehicle 1800A can include twelve cameras 1864, such as a front wide camera (e.g., 120 degree field of view (FOV)), a front telephoto camera (e.g., 30 degree FOV), a side rear left camera (e.g., 70 degree FOV), a side rear right camera (e.g., 70 degree FOV), a front fisheye camera (e.g., 200 degree FOV), a rear fisheye camera (e.g., 200 degree FOV), a left fisheye camera (e.g., 200 degree FOV), a right fisheye camera (e.g., 200 degree FOV), a front telephoto satellite camera (e.g., 30 degree FOV), a rear telephoto camera (e.g., 30 degree FOV), a cross left camera (e.g., 120 degree FOV), and a cross right camera (e.g., 120 degree FOV). The camera(s) 1864 can use, in implementations, a gigabit multimedia serial link (GMSL) interface—such as GMSL2—as input/output (I/O).

In some implementations, although not illustrated in FIG. 18A, the vehicle 1800A can include an in-cabin occupant and/or driver monitoring system, that can include various different sensors. For example, the in-cabin sensors can include various cameras 1868, such as a driver monitoring camera (e.g., 55 degree FOV positioned forward of and facing toward the driver seat), a front occupant monitoring camera (e.g., 190 degree FOV positioned forward of and facing the front occupant(s) seat(s)), and a rear occupant monitoring camera (e.g., 190 degrees positioned forward of and facing the rear occupant(s) seat(s)). Similar to the external facing camera(s) 1868, the internal camera(s) 1868 may, in implementations, use a GMSL (such as GMSL2) interface for I/O.

As another non-limiting example, the vehicle 1800A can further include nine RADAR sensors 1860. For example, the vehicle 1800A can include a front center imaging RADAR sensor (e.g., 120 degree FOV or sensory field), a corner front left RADAR sensor (e.g., 160 degree FOV or sensory field), a corner front right RADAR sensor (e.g., 160 degree FOV or sensory field), a corner rear right RADAR sensor (e.g., 160 degree FOV or sensory field), a side left RADAR sensor (e.g., 160 degree FOV or sensory field), a side right RADAR sensor (e.g., 160 degree FOV or sensory field), a rear left RADAR sensor (e.g., 50 degree FOV or sensory field), and rear right RADAR sensor (e.g., 50 degree FOV or sensory field). The RADAR sensor(s) 1860 can use, in implementations, an Ethernet interface as I/O.

The vehicle(s) 1800A can further include, as a non-limiting example, twelve ultrasonic sensors 1862. As illustrated in FIG. 18A, the ultrasonic sensors can be positioned along the front and rear bumpers of the vehicle 1800A, and along the side of the vehicle 1800A, and can be used to detect objects (static and dynamic) in close proximity to the vehicle 1800A. In some implementations, the ultrasonic sensor(s) 1862 can use a DS13 interface as I/O.

The vehicle(s) 1800A can further include, as a non-limiting example, a LiDAR sensor 1864, such as a front center LiDAR sensor (e.g., 120 degree horizontal FOV or sensory field and 30 degree vertical FOV or sensor field). In some implementations, such as where additional or alternative LiDAR sensors are used, the LiDAR sensor can have differing horizontal and vertical fields of view or sensory fields. For example, a LiDAR sensor 1864 can include a 360 degree horizontal FOV or sensory field (such as in a spinning LiDAR sensor) and a 90 degree vertical FOV or sensory field. In some implementation, the LiDAR sensor(s) 1864 can use an Ethernet interface as I/O.

The autonomous mobile robot (AMR) 1800B can include, as a non-limiting example, three LiDAR sensors 1864. For example, the top-most illustrated LiDAR sensor 1864 can include a beam or 3D LiDAR sensor (e.g., 360 degree horizontal and 90 degree vertical FOV or sensory field), and the front and rear LiDAR sensors can include planar or 2D LiDAR sensors (e.g., 180 degree horizontal FOV or sensory field).

The AMR 1800B can further include, as a non-limiting implementation, eight cameras 1868, such as a front stereo camera (e.g., 120 degree FOV), a rear stereo camera (e.g., 120 degree FOV), a left stereo camera (e.g., 120 degree FOV), a right stereo camera (e.g., 120 degree FOV), a front fisheye camera (e.g., 202 degree+/−3 degree FOV), a rear fisheye camera (e.g., 202 degree+/−3 degree FOV), a left fisheye camera (e.g., 202 degree+/−3 degree FOV), and a right fisheye camera (e.g., 202 degree+/−3 degree FOV).

The AMR 1800B can further include a charging port, charging port contacts, a status indicator light, one or more (e.g., four) RGB LEDs, one or more IMU sensors 1866, a magnetometer, and a barometer. The AMR 1800B is capable of high-precision time synchronization between sensors using hardware time stamping, and PTP over Ethernet with less than 10 microseconds for sensor acquisition time. The AMR 1800B provides simultaneous camera capture across all cameras 1868 within 100 microseconds from a single hardware trigger, in implementations, and can write to disk at 4 GB/second for sensor capture to bag writing (e.g., writing to ROSbags for the robot operation system (ROS)). As such, the AMR 1800B is capable of running the ROS (such as NVIDIA's Isaac ROS), can be teleoperated (as described herein), can map an environment, and can navigate within an environment using visual cameras 1868, LiDARs 1864, and/or other sensor types or modalities.

The humanoid robot 1800C can include, as a non-limiting example, one LiDAR sensor 1864. For example, the LiDAR sensor 1864 can include a beam or 3D LiDAR sensor (e.g., 360 degree horizontal and 90 degree vertical FOV or sensory field), or can include a planar or 2D LiDAR sensor (e.g., 180 degree horizontal FOV or sensory field).

The humanoid robot 1800C can further include, as a non-limiting implementation, four cameras 1868, such as a front stereo camera (e.g., 120 degree FOV), a rear stereo camera (e.g., 120 degree FOV), a front fisheye camera (e.g., 202 degree+/−3 degree FOV), and a rear fisheye camera (e.g., 202 degree+/−3 degree FOV).

The humanoid robot 1800C can further include, as a non-limiting implementation, four ultrasonic sensors 1862, such as a left arm ultrasonic sensor, a right arm ultrasonic sensor, a left leg ultrasonic sensor, and right leg ultrasonic sensor.

The humanoid robot 1800C can further include any number of actuators—such as to allow control and maneuverability of joints. For example, the humanoid robot 1800C can include actuators that allow for various degrees of freedom (DoF) depending on the design. In a non-limiting implementation, the humanoid robot 1800C can have 40 total degrees of freedom (DoF) (e.g., 6 DoF×2 for the arms, 6 DoF×2 for the hands, 6 DoF×2 for the legs, 2 DoF for the torso, and 2 DoF for the neck). The actuators can convert energy into physical motion, allowing for actions such as joint movements, locomotion, and gripping/manipulation. For example, joint movements can be performed using motors and servos to control the rotation of joints in an arm or manipulator, and to allow for reaching, grabbing, and manipulating objects. Locomotion can be accomplished using wheels, tracks, or other locomotion devices (robotic legs) to move around the environment. Gripping and manipulation can be performed using end-effectors or hands/fingers, which can be equipped with actuators to grip objects, apply force, and perform specific tasks. In some examples, the humanoid robot 1800C can include position and orientation sensors, such as encoders, gyroscopes, and the like, to determine the position of the robot 1800C in space, allowing for location determination and movement tracking. The humanoid robot 1800C can include force and pressure sensors, in implementations, to detect environment interactions, allowing the robot 1800C to grasp objects with the right force and to avoid obstacles along the way. The perception sensors (e.g., cameras, LiDARs, RADARs, ultrasonic, SONAR, etc.) can be used along with tactile sensors to allow the robot 1800C to perceive objects, shapes, and textures, and to understand when touch is initiated and stopped (along with force sensors that regulate the force used during touch). As a non-limiting example, the humanoid robot 1800C can have a height of about 1-2 meters (e.g., 1.7 meters or 5' 6"), a weight of 50-70 kg, be capable of moving at a speed of 8 or more km/h, and be able to carry payloads anywhere from 20-100 kg, depending on the design and requirements of the system.

The humanoid robot 1800C, in implementations, can include a conversational system—such as a conversational system powered by language models (e.g., LLMs, VLMs, MMLMs, VLAs, etc.)—in order to help understand the environment, reason, and communicate with humans, animals, devices, and/or other robots, and/or make planning, control, and navigation decisions. As such, in addition to performing various tasks, the humanoid robot 1800C can use onboard sensors, microphones, and speakers to understanding speech, audio and visual cues, etc., while also being able to communicate back to the environment.

With reference to cameras 1868 of the machine(s) 1800, the camera types for the cameras 1868 can include, but are not limited to, digital cameras that can be adapted for use with the components and/or systems of the machine 1800. For a vehicle 1800*a* implementation, the camera(s) 1868 can operate at automotive safety integrity level (ASIL) B and/or at another ASIL. The camera types can be capable of any image capture rate, such as 30 frames per second (fps), 60 fps, 120 fps, 240 fps, etc., depending on the implementation. The cameras can be capable of using rolling shutters, global shutters, another type of shutter, or a combination thereof. In some examples, the color filter array can include a red clear clear clear (RCCC) color filter array, a red clear clear blue (RCCB) color filter array, a red, blue green clear (RBGC) color filter array, a Foveon X3 color filter array, a Bayer sensors (RGGB) color filter array, a monochrome sensor color filter array, and/or another type of color filter array. In some implementations, clear pixel cameras, such as cameras with an RCCC, an RCCB, and/or an RBGC color filter array, can be used in an effort to increase light sensitivity.

Cameras with a field of view that include portions of the environment in front of the machine 1800 (e.g., front-facing cameras) can be used for surround view, to help identify forward facing paths and obstacles, as well aid in, with the help of one or more controllers 1836 and/or control SoCs, providing information critical to generating an occupancy grid and/or determining the preferred machine movements, trajectories, and/or paths. Front-facing cameras can be used to perform many of the same ADAS functions as LiDAR, including emergency braking, pedestrian detection, and collision avoidance. Front-facing cameras can also be used for ADAS functions and systems including Lane Departure Warnings ("LDW"), Autonomous Cruise Control ("ACC"), and/or other functions such as traffic sign recognition.

A variety of cameras can be used in a front-facing configuration, including, for example, a monocular camera platform that includes a complementary metal oxide semiconductor ("CMOS") color imager. Another example can be a wide-view camera(s) 1868B that can be used to perceive objects coming into view from the periphery (e.g., pedestrians, warehouse vehicles, other robots, crossing traffic, or bicycles). In addition, any number of long-range camera(s) 1868E (e.g., a long-view stereo camera pair) can be used for depth-based object detection, especially for objects for which a neural network has not yet been trained. The long-range camera(s) 1868E can also be used for object detection and classification, as well as basic object tracking.

Any number of stereo cameras 1868A can also be included in a front-facing and/or other (e.g., rear-facing) configuration. In at least one implementation, one or more of stereo camera(s) 1868A can include an integrated control unit including a scalable processing unit, which can provide a programmable logic ("FPGA") and a multi-core microprocessor with an integrated Controller Area Network ("CAN") or Ethernet interface on a single chip. Such a unit can be used to generate a 3D map of the machine's 1800 environment, including a distance estimate for points in the image (e.g., a disparity or depth image). An alternative stereo camera(s) 1868A can include a compact stereo vision sensor(s) that can include two camera lenses (one each on the left and right) and an image processing chip that can measure the distance from the vehicle to the target object and use the generated information (e.g., metadata) to activate the autonomous emergency braking and lane departure warning functions. Other types of stereo camera(s) 1868A can be used in addition to, or alternatively from, those described herein. For example, in some implementations, stereo depth estimation can be performed using other than stereo cameras, such as two monocular cameras having at least partially overlapping fields of view.

Cameras with a field of view that include portions of the environment to the side of the machine 1800 (e.g., side-view cameras) can be used, for example, for surround view, providing information used to create and update the occupancy grid, as well as to generate side impact collision warnings and/or to indicate to an AMR 1800B or humanoid robot 1800C, for example, that there are objects, features, and/or persons present to the side. For example, surround camera(s) 1868D can be positioned on the machine 1800. The surround camera(s) 1868D can include wide-view camera(s) 1868B, fisheye camera(s), 360 degree camera(s), and/or the like. For example, four fisheye cameras can be positioned on the machine's 1800 front, rear, and sides. In an alternative arrangement, the machine 1800 can use three surround camera(s) 1868D (e.g., left, right, and rear), and can leverage one or more other camera(s) (e.g., a forward-facing camera) as a fourth surround view camera.

Cameras 1868 with a field of view that include portions of the environment to the rear of the machine 1800 (e.g., rear-view cameras) can be used for gaining an understanding of objects, features, persons, and/or other information to the rear of the machine 1800, such as for park assistance, surround view, rear collision warnings, planning, control, and navigation determinations, and/or creating and updating an occupancy grid, BEV image representing the environment, height map, etc. A wide variety of cameras 1868 can be used including, but not limited to, cameras 1868 that are also suitable as a front-facing camera(s) (e.g., long-range and/or mid-range camera(s) 1868E, stereo camera(s) 1868A), infrared camera(s) 1868C, etc.), rear-facing camera(s), side-facing camera(s), downward facing camera(s), upward facing camera(s), and/or the like, as described herein.

Similarly, for LiDAR sensors 1864, RADAR sensors 1860, ultrasonic sensors 1862, and/or other sensor modalities or types, the location and placement of the sensors, and their corresponding fields of view or sensory fields can be determined based on the use case, implementation, or design of the particular machine 1800.

For example, the machine(s) 1800 include RADAR sensor(s) 1860 that can be used by the machine 1800 for long-range object detection, even in darkness and/or severe weather conditions. RADAR functional safety levels can be ASIL B, in implementations. The RADAR sensor(s) 1860 can use the CAN and/or the bus 1802 (e.g., to transmit data generated by the RADAR sensor(s) 1860) for control and to access object tracking data, with access to Ethernet to access raw data in some examples. A wide variety of RADAR sensor types can be used. For example, and without limitation, the RADAR sensor(s) 1860 can be suitable for front, rear, and side RADAR use. In some example, Pulse Doppler RADAR sensor(s) are used.

The RADAR sensor(s) 1860 can include different configurations, such as long range with narrow field of view, short range with wide field of view, short range side coverage, etc. In some examples, long-range RADAR can be used for adaptive cruise control (ACC) functionality. The long-range RADAR systems can provide a broad field of view realized by two or more independent scans, such as within a 250 m range. The RADAR sensor(s) 1860 can help in distinguishing between static and moving objects, and can be used by ADAS systems for emergency brake assist and forward collision warning, by robots for detecting dynamic objects in various environments—such as those with lower or no lighting. Long-range RADAR sensors can include monostatic multimodal RADAR with multiple (e.g., six or more) fixed RADAR antennae and a high-speed CAN and FlexRay interface. In an example with six antennae, the central four antennae can create a focused beam pattern, designed to record the machine's 1800 surroundings at higher speeds with minimal interference from the periphery (e.g., from traffic in adjacent lanes). The other two antennae can expand the field of view, making it possible to quickly detect objects entering or leaving the machine's immediate path (e.g., lane).

Mid-range RADAR systems can include, as an example, a range of up to 1860 m (front) or 80 m (rear), and a field of view of up to 42 degrees (front) or 150 degrees (rear). Short-range RADAR systems can include, without limitation, RADAR sensors designed to be installed at both ends of a lateral surface (e.g., a rear bumper) such that two beams can be used to constantly monitor the blind spot in the rear and next to the machine 1800 (e.g., vehicle, robot, etc.). As such, short-range RADAR systems can be used in an ADAS system for blind spot detection and/or lane change assist.

The machine 1800 can further include ultrasonic sensor(s) 1862. The ultrasonic sensor(s) 1862, which can be positioned at the front, back, and/or the sides of the machine 1800, can be used for assisting with near-field perception, such as for park assist, collision avoidance (e.g., for robotic parts), and/or to create and update an occupancy grid, evidence grid map (EGM), height map, BEV image, and/or other representation of objects and features in an environment of the machine 1800. A wide variety of ultrasonic sensor(s) 1862 can be used, and different ultrasonic sensor(s) 1862 can be used for different ranges of detection (e.g., 2.5 m, 4 m). The ultrasonic sensor(s) 1862 can operate at functional safety levels of ASIL B, as an example.

The machine 1800 can include LiDAR sensor(s) 1864. The LiDAR sensor(s) 1864 can be used for object and feature detection, pedestrian and other robot detection, emergency braking, collision avoidance, simultaneous localization and mapping (SLAM), free-space detection, and/or other functions. The LiDAR sensor(s) 1864 can be functional safety level ASIL B, in implementations. In some examples, the machine 1800 can include multiple LiDAR sensors 1864 (e.g., two, four, six, etc.) that can use Ethernet (e.g., to provide data to a Gigabit Ethernet switch).

In some examples, the LiDAR sensor(s) 1864 can be capable of providing a list of objects and their distances for a 360-degree field of view. Commercially available LiDAR sensor(s) 1864 can have an advertised range of approximately 1800 m, with an accuracy of 2 cm-3 cm, and with support for a 1800 Mbps Ethernet connection, for example. In some examples, one or more non-protruding LiDAR sensors 1864 can be used. In such examples, the LiDAR sensor(s) 1864 can be implemented as a small device that can be embedded into the front, rear, sides, top, and/or corners of the machine 1800. The LiDAR sensor(s) 1864, in such examples, can provide up to a 120-degree horizontal and 35-degree vertical field-of-view, with a 200 m range even for low-reflectivity objects. Front-mounted LiDAR sensor(s) 1864 can be configured for a horizontal field of view between 45 degrees and 135 degrees.

In some examples, LiDAR technologies, such as 3D flash LiDAR, can also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR can allow for highly accurate and distortion-free images of the surroundings to be generated with every laser flash. In some examples, four flash LiDAR sensors can be deployed, one at each side of the machine 1800. Available 3D flash LiDAR systems include a solid-state 3D staring array LiDAR camera with no moving parts other than a fan (e.g., a non-scanning LiDAR device). The flash LiDAR device can use a 5 nanosecond class I (eye-safe) laser pulse per frame and can capture the reflected laser light in the form of 3D range point clouds and co-registered intensity data. By using flash LiDAR, and because flash LiDAR is a solid-state device with no moving parts, the LiDAR sensor(s) 1864 can be less susceptible to motion blur, vibration, and/or shock.

Figure 18B:
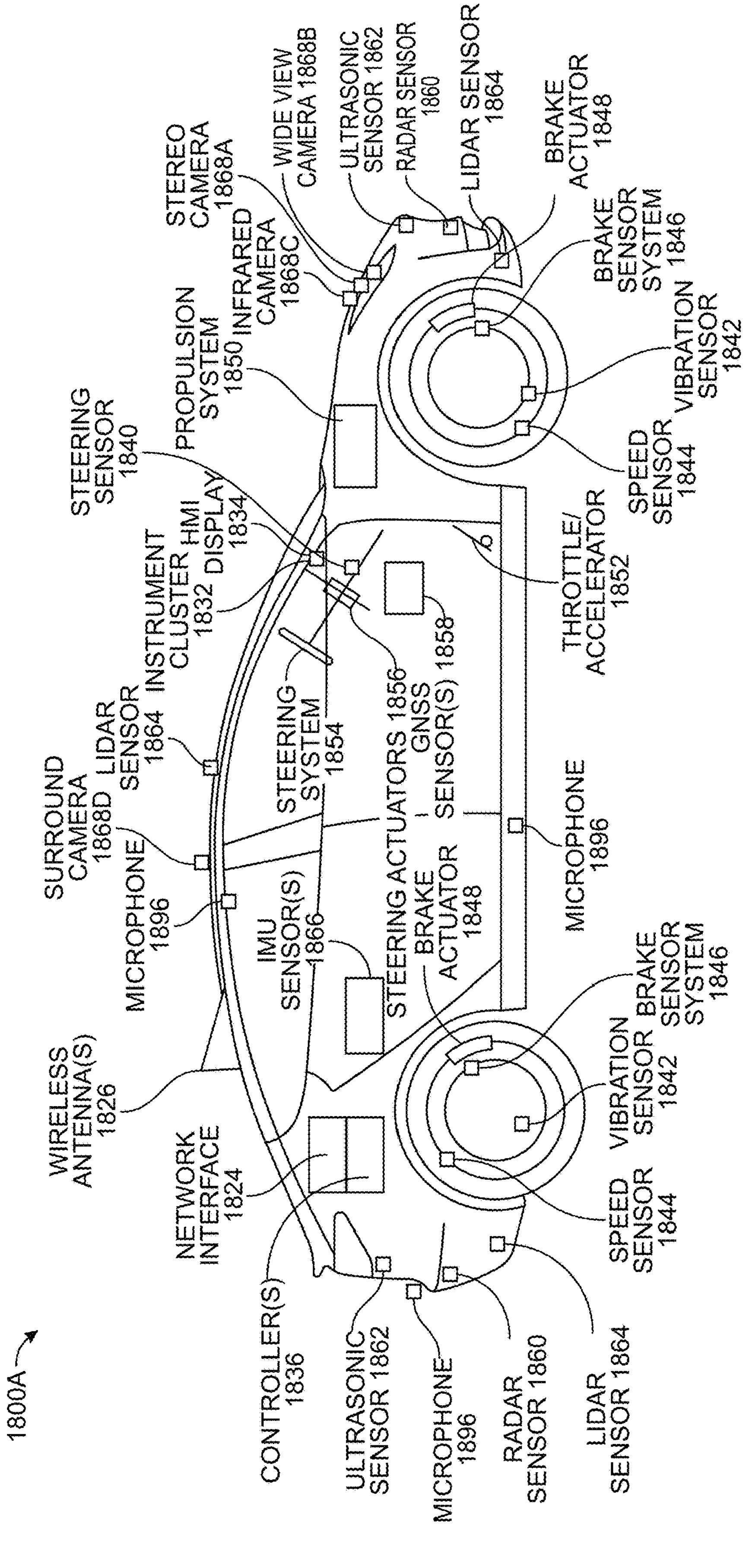
FIG. 18B is an illustration of an example of component and sensor locations on an autonomous or semi-autonomous vehicle, in accordance with at least some implementations of the present disclosure.

FIG. 18B is an illustration of sensor and component locations of an example autonomous or semi-autonomous vehicle 1800A (alternatively referred to herein as "vehicle 1800," "ego-vehicle 1800," "ego-machine 1800," or "machine 1800,"), in accordance with some implementations of the present disclosure. Although the vehicle 1800A is illustrated, this is not intended to be limiting, and similar components and/or sensors can be included on any other machine type without departing from the scope of the present disclosure. For example, similar sensors and/or components can be used for a vehicle, a car, a truck, a bus, a first responder vehicle, a shuttle, an electric or motorized bicycle, a motorcycle, a fire truck, a police vehicle, an ambulance, a watercraft, a construction vehicle, an underwater craft, a robot (e.g., AMR, humanoid, robotic arm, end-effector, forklift, etc.), a drone, an aircraft, a vehicle coupled to a trailer (e.g., a semi-tractor-trailer truck used for hauling cargo), and/or another type of vehicle or machine (e.g., that is unmanned and/or that accommodates one or more passengers).

Figure 18C:
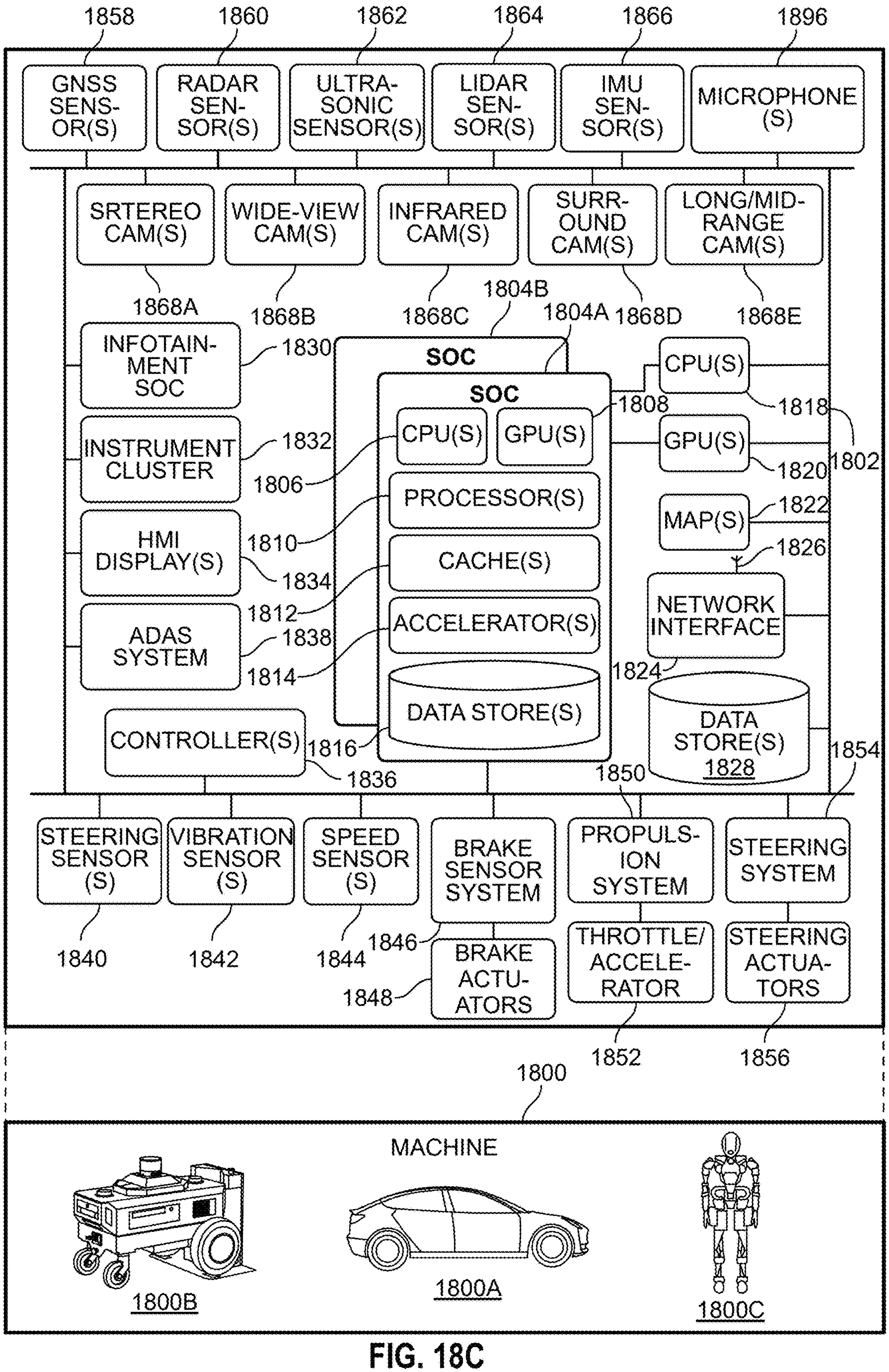
FIG. 18C is a block diagram of an example system architecture for an autonomous or semi-autonomous vehicle, robot, and/or other machine type, in accordance with at least some implementations of the present disclosure.

FIG. 18C is a block diagram of an example system architecture for a machine 1800, such as autonomous or semi-autonomous vehicle 1800A, autonomous mobile robot (AMR) 1800B, humanoid robot 1800C, and/or other types of machines, in accordance with some implementations of the present disclosure. It should be understood that this and other arrangements described herein are set forth only as examples. Other arrangements, components, features, and elements (e.g., machines, interfaces, functions, orders, groupings of functions, etc.) can be used in addition to or instead of those shown, and some elements can be omitted altogether. Further, many of the arrangements, components, features, elements, etc. described herein are functional entities that can be implemented as discrete or distributed components or in conjunction with other components, and in any suitable combination and location (e.g., on a local device, vehicle, or machine at the edge, on-premises—such as locally hosted servers, remotely located—such as in one or more computing or server devices in one or more data centers in the cloud, and/or at other locations). Various functions described herein as being performed by entities can be carried out by hardware, firmware, and/or software. For instance, various functions can be carried out using one or more processors (e.g., central processing units (CPU(s)), graphics processing units (GPU(s)), microprocessors, microcontrollers, embedded processors, digital signal processors (DSPs), image signal processors (ISPs), physics processing units (PPUs), field-programmable gate arrays (FPGAs), accelerator(s) (e.g., deep learning accelerators (DLAs, deep learning accelerator cluster (XNNs), neural network accelerators (NNAs), and/or neural processing units (NPUs), programmable vision accelerators (PVAs), optical flow accelerators (OFAs), etc.), application-specific integrated circuits (ASICs), data processing units (DPUs), quantum processors, etc.) executing instructions stored in memory. In some implementations, the systems, methods, and processes described herein can be executed using similar components, features, and/or functionality to those of example machine 1800 of FIGS. 18A-18E, example computing ecosystem 1900 of FIG. 19, example generative language model system 2000 of FIG. 20, and/or example computing device 2100 of FIG. 21.

Each of the components, features, and systems of the machine 1800 in FIG. 18C are illustrated as being connected via bus 1802 (alternatively referred to as a "machine communications network 1802," or just "communications network 1802"). The bus 1802 can include a Controller Area Network (CAN) data interface (alternatively referred to herein as a "CAN bus"). A CAN can be a network inside the machine 1800 used to aid in control of various features and functionality of the machine 1800, such as actuation of brakes, acceleration, braking, steering, windshield wipers, etc. A CAN bus can be configured to have dozens or even hundreds of nodes, each with its own unique identifier (e.g., a CAN ID). The CAN bus can be read to find steering wheel angle, ground speed, engine revolutions per minute (RPMs), button positions, and/or other vehicle status indicators. The CAN bus can be ASIL B compliant. In some implementations, in addition to or alternatively from a CAN bus, the bus 1802 can include FlexRay, an embedded bus (e.g., SPI, I2C), local interconnect link (LIN), NVIDIA's NVLink, ultra accelerator Link (UALink), USB (2.0, 3.0, onward), radio frequency (RF), Ethernet (e.g., 10BASE/100BASE, 1000BASE, 10G, etc.), and/or another communication protocol or functionality. Additionally, although a single line is used to represent the bus 1802, this is not intended to be limiting. For example, there can be any number of busses 1802, which can include one or more CAN busses, one or more FlexRay busses, one or more Ethernet busses, and/or one or more other types of busses using a different protocol. In some examples, two or more busses 1802 can be used to perform different functions, and/or can be used for redundancy. For example, a first bus 1802 can be used for collision avoidance functionality and a second bus 1802 can be used for actuation control. In any example, each bus 1802 can communicate with any of the components of the machine 1800, and two or more busses 1802 can communicate with the same components. In some examples, each SoC 1804, each controller 1836, and/or each computer or compute engine within the machine 1800 can have access to the same input data (e.g., inputs from sensors of the machine 1800), and can be connected to a common bus, such as a CAN bus.

The machine 1800 can include components such as a chassis, a vehicle body, wheels (e.g., 2, 4, 6, 8, 18, etc.), tires, axles, batteries, side-view mirrors, and/or other components of a vehicle or machine. The machine 1800 can include a propulsion system 1850, such as an internal combustion engine, hybrid electric power plant, an all-electric engine, a hydrogen-fueled engine, and/or another propulsion system type. The propulsion system 1850 can be connected to a drive train of the machine 1800, which can include a transmission, to enable the propulsion of the machine 1800. The propulsion system 1850 can be controlled in response to receiving signals from the throttle/accelerator 1852.

A steering system 1854, which can include a steering wheel and/or other steering device (e.g., remote steering and/or local steering), can be used to steer the machine 1800 (e.g., along a desired path or route) when the propulsion system 1850 is operating (e.g., when the vehicle is in motion). The steering system 1854 can receive signals from a steering actuator 1856. In some implementations, a steering wheel or other steering mechanism can not be included, such as for a machine 1800 capable of full automation (e.g., Level 5) functionality.

The brake sensor system 1846 can be used to operate the vehicle brakes in response to receiving signals from the brake actuators 1848 and/or brake sensors.

The machine 1800 can include one or more controller(s) 1836, such as those described herein with respect to FIG. 18A. The controller(s) 1836 can be used for a variety of functions, and can be coupled to any of the various other components and systems of the machine 1800. For example, the controllers 1836 can be used for control of the machine 1800, artificial intelligence executing on the machine 1800, infotainment for the machine 1800, and/or the like. For example, one controller 1836 can be used for some or all of the functionality, or different controllers 1836 can be used for different functionalities—e.g., to ensure availability and a safety separation between various controllers for different tasks. For example, the controller(s) 1836 can use plans computed by the system—e.g., paths or trajectories for vehicles 1800A or AMRs 1800B, or movements, components trajectories, movement locations or displacements, etc. for joints or components (e.g., of manipulators, end effectors, limbs, hands, fingers, legs, feet, etc.), of a humanoid robot 1800C—to control the machine(s) 1800 in the environment. In some instances, the controller(s) 1836 can include a proportional-integral-derivative (PID) controller, a fuzzy logic controller, a neural controller (e.g., a controller embodied as one or more neural networks), a force control controller, a programmable logic controller (PLC), and/or another type of controller. In a humanoid robot 1800C, for example, the controller(s) 1836 can act as the brain, responsible for analyzing sensor data, making decisions, and sending commands to the actuators. The controller(s) 1836 can include a low-level controller that handles basic motor control, ensuring accurate and precise movements of individual joints and actuators. The controller(s) 1836 can include a high-level controller to coordinate multiple actuators and sensors, planning complex motions and adapting to changing environments.

The controller(s) 1836 can include an artificial intelligence controller, in implementations, that can use AI algorithms (e.g., DNNs, MLMs, etc.) to learn, make decisions, and autonomously perform tasks for the machine 1800. In some implementations, the controller(s) 1836 can use an open-loop control algorithm that is fixed and does not adjust actions to the environment. In other implementations, closed-loop control can be used that incorporates feedback mechanisms to monitor the robot's performance and make necessary adjustments. In examples, the controller(s) 1836 can implement reactive control in order to respond directly to sensory inputs, allowing for quick reflexes and real-time changes. Further, deliberative control can be implemented in some examples, using internal models and planning algorithms to generate high-level actions, which can be suited for complex tasks that require reasoning, decision making, and long-term planning.

Controller(s) 1836, which can include one or more systems on chip (SoCs) 1804 (FIGS. 18C and 18D), CPUs, GPU(s), accelerator(s), etc., can provide signals (e.g., representative of commands or messages) to one or more components and/or systems of the machine 1800. Although the controller(s) 1836 is listed separately from the SoC(s) 1804, this is not intended to be limiting, and in some implementations one or more components of the SoC(s) 1804 can perform the operations of the controller(s) 1836. For example, the controller(s) can send signals to operate the machine brakes via one or more brake actuators 1848, to operate the steering system 1854 via one or more steering actuators 1856, to operate the propulsion system 1850 via one or more throttle/accelerators 1852, etc. The controller(s) 1836 can include one or more onboard (e.g., integrated) computing devices (e.g., supercomputers) that process sensor signals, and output operation commands (e.g., signals representing commands) to enable autonomous or semi-autonomous navigation and movement and/or to assist a human operator using the machine 1800. The controller(s) 1836 can include a first controller 1836 for autonomous control and navigation functions, a second controller 1836 for functional safety functions, a third controller 1836 for artificial intelligence functionality (e.g., computer vision), a fourth controller 1836 for infotainment functionality, a fifth controller 1836 for redundancy in emergency conditions, and/or other controllers. For example, the hardware used for safety monitoring and other safety functions (such as a functional safety island) can be discrete or partitioned (physically or via separation of processing) with respect to hardware used for processing sensor data for perception and making vehicle control decisions. Similarly, hardware (e.g., a controller, an SOC, etc.) for controlling in-vehicle infotainment and/or in-cabin monitoring can be discrete or separate from the hardware used for vehicle perception and control. In some examples, a single controller 1836 can handle two or more of the above functionalities, two or more controllers 1836 can handle a single functionality, and/or any combination thereof.

The controller(s) 1836 can provide the signals for controlling one or more components and/or systems of the machine 1800 in response to sensor data received from one or more sensors (e.g., sensor inputs). The sensor data can be received from, for example and without limitation, global navigation satellite systems ("GNSS") sensor(s) 1858 (e.g., Global Positioning System sensor(s)), RADAR sensor(s) 1860, ultrasonic sensor(s) 1862, LiDAR sensor(s) 1864, inertial measurement unit (IMU) sensor(s) 1866 (e.g., accelerometer(s), gyroscope(s), magnetic compass(es), magnetometer(s), etc.), microphone(s) 1896, camera(s) 1868 (e.g., stereo camera(s) 1868A, wide-view camera(s) 1868B (e.g., fisheye cameras), infrared camera(s) 1868C, surround camera(s) 1868D (e.g., 360 degree cameras), long-range and/or mid-range camera(s) 1868E, and/or other camera types), speed sensor(s) 1844 (e.g., for measuring the speed of the machine 1800), vibration sensor(s) 1842, steering sensor(s) 1840, brake sensor(s) (e.g., as part of the brake sensor system 1846), actuators, and/or other sensor types.

One or more of the controller(s) 1836 can receive inputs (e.g., represented by input data) from an instrument cluster 1832 of the machine 1800 and provide outputs (e.g., represented by output data, display data, etc.) via a human-machine interface (HMI) display 1834 (e.g., screen, heads-up display, mirror display, facial display, robotic display, etc.), an audible annunciator, a loudspeaker, a speaker, and/or via other components of the machine 1800. The outputs can include information such as machine velocity, speed, time, map data corresponding to a map(s) 1822 of FIG. 18C (e.g., from a navigation map, a Standard Definition (SD) map, a High Definition ("HD") map, etc.), location data (e.g., the machine's 1800 location, such as on a map 1822), direction, location of other vehicles (e.g., an occupancy map, height map, bird's eye view (BEV) image, grid, etc.), information about objects and status of objects as perceived by the system, system status information, etc. For example, the HMI display(s) 1834 can display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

Figure 18D:
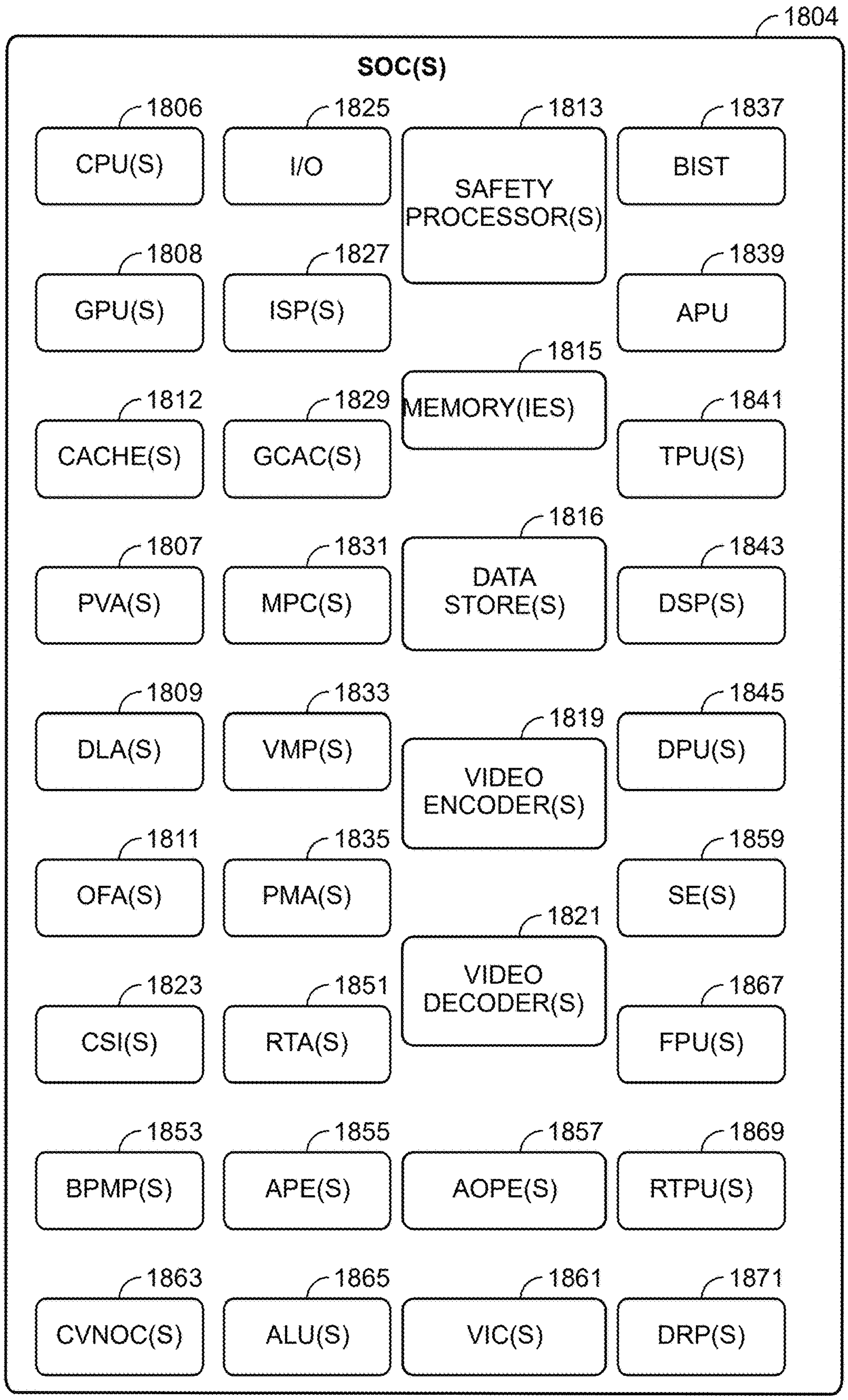
FIG. 18D is a block diagram of an example architecture of a computing system—such as a system-on-a-chip (SoC), in accordance with at least some implementations of the present disclosure.

The machine 1800 can include one or more systems on a chip (SoCs) 1804 (described in more detail in FIG. 18D). The SoC(s) 1804 can include CPU(s) 1806, GPU(s) 1808, processor(s) 1810, cache(s) 1812, accelerator(s) 1814, data store(s) 1816, and/or other components and features. The SoC(s) 1804 can be used to process and provide data for various operations, such as navigation, planning, reasoning, inference, perception, control, and/or actuation operations of the machine 1800 in a variety of platforms and systems. For example, the SoC(s) 1804 can process live perception data (e.g., from camera, LiDAR, RADAR, ultrasonic, etc.) in addition to map data corresponding to one or more maps 1822 (e.g., HD map, SD map, navigational map, occupancy map, etc.) in order to make or aid in performing various operations of the machine 1800. Where a map and/or AI is used, map and/or AI (e.g., model parameter updates, fine-tuning, etc.) refreshes and/or updates via a network interface 1824 from one or more servers (e.g., server(s) 1878 of FIG. 18E)—such as one or more servers of a cloud-based data center.

Although an SoC(s) 1804 is illustrated throughout FIGS. 18A-18E, additional or alternative components and/or architectures can be used—such as multi-chip modules (MCMs), application-specific integrated circuits (ASICs), system-in-packages (SiPs), field programmable gate arrays (FPGAs), heterogeneous integration (HI), single-board computers (SBCs)—without departing from the scope of the present disclosure. For example, depending on the type of machine 1800, use of the machine 1800, model of the machine 1800, and required capabilities of the machine 1800, one or more SoCs 1804 and/or alternative architectures and/or components can be used to satisfy the particular implementation.

The machine 1800 can include a CPU(s) 1818 (e.g., discrete CPU(s), or dCPU(s)), that can be coupled to the SoC(s) 1804 via a high-speed interconnect (e.g., PCIe). The CPU(s) 1818 can include an X86 processor, for example. The CPU(s) 1818 can be used to perform any of a variety of functions, including arbitrating potentially inconsistent results between ADAS sensors and the SoC(s) 1804, and/or monitoring the status and health of the controller(s) 1836 and/or infotainment SoC 1830, for example.

The machine 1800 can include a GPU(s) 1820 (e.g., discrete GPU(s), or dGPU(s)), that can be coupled to the SoC(s) 1804 via a high-speed interconnect (e.g., NVIDIA's NVLink, ultra accelerator Link (UALink), etc.). The GPU(s) 1820 can provide additional artificial intelligence functionality, such as by executing redundant and/or different neural networks, and can be used to train and/or update neural networks based on input (e.g., sensor data) from sensors of the machine 1800.

The machine 1800 can further include the network interface 1824 which can include one or more wireless antennas 1826 and/or modems (e.g., one or more wireless antennas for different communication protocols, such as a cellular antenna, a Bluetooth antenna, etc.). The network interface 1824 can be used to enable wireless connectivity over the Internet with the cloud (e.g., with the server(s) 1878 and/or other network devices), with other vehicles, and/or with computing devices (e.g., client devices of passengers). To communicate with other vehicles, a direct link can be established between the two vehicles and/or an indirect link can be established (e.g., across networks and over the Internet). Direct links can be provided using a vehicle-to-vehicle communication link. The vehicle-to-vehicle communication link can provide the machine 1800 information about vehicles in proximity to the machine 1800 (e.g., vehicles in front of, on the side of, and/or behind the machine 1800). This functionality can be part of a cooperative adaptive cruise control functionality of the machine 1800.

The network interface 1824 can include a SoC that provides modulation and demodulation functionality and enables the controller(s) 1836 to communicate over wireless networks. The network interface 1824 can include a radio frequency front-end for up-conversion from baseband to radio frequency, and down conversion from radio frequency to baseband. The frequency conversions can be performed through well-known processes, and/or can be performed using super-heterodyne processes. In some examples, the radio frequency front end functionality can be provided by a separate chip. For example, the network interface 1824 can be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), fifth generation of mobile communications technology (5G), sixth generation of mobile communications technology (6G), and/or other cellular and/or wireless communication standards. The wireless antenna(s) 1826 can also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

The machine 1800 can further include data store(s) 1828 which can include off-chip (e.g., off the SoC(s) 1804) storage. The data store(s) 1828 can include one or more storage elements including RAM, SRAM, DRAM, VRAM, Flash, hard disks, and/or other components and/or devices that can store at least one bit of data.

The machine 1800 can further include GNSS sensor(s) 1858. The GNSS sensor(s) 1858 (e.g., GPS, assisted GPS sensors, differential GPS (DGPS) sensors, etc.), to assist in mapping, perception, occupancy grid generation, and/or path planning functions. Any number of GNSS sensor(s) 1858 can be used, including, for example and without limitation, a GPS using a USB connector with an Ethernet to Serial (RS-232) bridge.

The machine 1800 can further include IMU sensor(s) 1866. The IMU sensor(s) 1866 can be located at a center of the rear axle of the machine 1800, in some examples. The IMU sensor(s) 1866 can include, for example and without limitation, an accelerometer(s), a magnetometer(s), a gyroscope(s), a magnetic compass(es), and/or other sensor types. In some examples, such as in six-axis applications, the IMU sensor(s) 1866 can include accelerometers and gyroscopes, while in nine-axis applications, the IMU sensor(s) 1866 can include accelerometers, gyroscopes, and magnetometers.

In some implementations, the IMU sensor(s) 1866 can be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1866 can enable the machine 1800 to estimate heading without requiring input from a magnetic sensor by directly observing and correlating the changes in velocity from GPS to the IMU sensor(s) 1866. In some examples, the IMU sensor(s) 1866 and the GNSS sensor(s) 1858 can be combined in a single integrated unit.

The vehicle can include one or more microphone 1896 placed in and/or around the machine 1800. The microphone(s) 1896 can be used for emergency vehicle detection and identification, among other things.

The machine 1800 can further include vibration sensor(s) 1842. The vibration sensor(s) 1842 can measure vibrations of components of the machine, such as the arms or legs of a humanoid robot 1800C, or the axle(s) of a vehicle 1800A or AMR 1800B. For example, changes in vibrations can indicate a change in road, walking, or traversable surfaces. In another example, when two or more vibration sensors 1842 are used, the differences between the vibrations can be used to determine friction or slippage of the surface (e.g., when the difference in vibration is between a power-driven axle and a freely rotating axle).

The machine 1800 can include an ADAS system 1838—such as when the machine 1800 is a vehicle 1800A. The ADAS system 1838 can include a dedicated SoC(s), in some examples. The ADAS system 1838 can include autonomous/adaptive/automatic cruise control (ACC), cooperative adaptive cruise control (CACC), forward crash or collision warning (FCW), automatic emergency braking (AEB), lane departure warning (LDW), lane keep assist (LKA), blind spot warning (BSW), blind spot monitoring (BSM), rear cross-traffic warning (RCTW), pedestrian detection, driver monitoring, collision warning systems (CWS), traffic sign recognition, speed limit detection, automatic parking, lane centering (LC), high beam safety system, and/or other features and functionality.

The machine 1800 can further include the infotainment SoC 1830 (e.g., an in-vehicle infotainment system (IVI)). Although illustrated and described as a SoC, the infotainment system can not be an SoC, and can include one or more discrete components, such as multi-chip modules (MCMs), application-specific integrated circuits (ASICs), system-in-packages (SiPs), heterogeneous integration (HI), single-board computers (SBCs), etc. The infotainment SoC 1830 can include a combination of hardware and software that can be used to provide audio (e.g., music, a personal digital assistant, navigational instructions, news, radio, etc.), video (e.g., TV, movies, streaming, etc.), phone (e.g., hands-free calling), network connectivity (e.g., wireless, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the machine 1800. For example, the infotainment SoC 1830 can radios, disk players, navigation systems, video players, USB and Bluetooth connectivity, carputers, in-car entertainment, Wi-Fi, steering wheel audio controls, hands free voice control, a heads-up display (HUD), an HMI display 1834, a telematics device, a control panel (e.g., for controlling and/or interacting with various components, features, and/or systems), and/or other components. The infotainment SoC 1830 can further be used to provide information (e.g., visual and/or audible) to a user(s) of the vehicle, such as information from the ADAS system 1838, autonomous driving information such as planned vehicle maneuvers, trajectories, surrounding environment information (e.g., intersection information, vehicle information, road information, etc.), and/or other information.

The infotainment SoC 1830 can include GPU functionality. The infotainment SoC 1830 can communicate over the bus 1802 (e.g., CAN bus, Ethernet, etc.) with other devices, systems, and/or components of the machine 1800. In some examples, the infotainment SoC 1830 can be coupled to a supervisory MCU such that the GPU of the infotainment system can perform some self-driving functions in the event that the primary controller(s) 1836 (e.g., the primary and/or backup computers of the machine 1800) fail. In such an example, the infotainment SoC 1830 can put the machine 1800 into a chauffeur to safe stop mode, as described herein.

In some implementations, the infotainment system can provide a digital or virtual assistant, that can be voice only, or can have a visual component (e.g., in the form of a digital human or digital avatar). The assistant can provide basic functions, like texting, adjusting vehicle settings, music or video control, navigation features, etc., and/or can provide more advanced features such as those supported by one or more language models—such as large language models (LLMs), vision language models (VLMs), multi-modal language models (MMLMs), etc. For example, the driver and/or occupants can be able to interact with the assistant similar to how a user can interact with a language model, such as to ask general questions, specific questions, to request restaurant, gas station, and/or other recommendations and/or locations, to learn about the vehicle functionality or troubleshooting (e.g., to ask tire pressure information, oil change information, battery exchange information, etc.). As such, the machine 1800—whether a vehicle 1800A, AMR 1800B, humanoid robot 1800C, and/or other type of machine—may include a locally stored language model(s) and/or communicate to a remotely hosted language model (e.g., via one or more APIs) to provide more detailed and in-depth communication features to the users of the machine (s) 1800.

In some examples, an infotainment SoC 1830, the SoC(s) 1804, and/or another SoC or computing/processing system can perform in-cabin driver and/or occupant monitoring. For example, the computing system can perform facial recognition and vehicle owner identification can use data from camera and/or other sensors to identify the presence of an authorized driver and/or owner of the machine 1800. The always on sensor processing engine can be used to unlock the vehicle when the owner approaches the driver door and turn on the lights, and, in security mode, to disable the vehicle when the owner leaves the vehicle. In this way, the SoC(s) 1804 provide for security against theft and/or carjacking.

In some implementations, an in-cabin monitoring camera sensor can be monitored using one or more neural networks running on another or dedicated SoC—such as an in-vehicle infotainment or in-vehicle monitoring SoC, configured to identify in cabin events and respond accordingly. An in-cabin system can perform lip reading to activate cellular service and place a phone call, dictate emails, change the vehicle's destination, activate or change the vehicle's infotainment system and settings, or provide voice-activated web surfing. The in-cabin system can further include one or more in-cabin AI agents or assistants, which can use one or more APIs or plug-ins to interact with one or more LLMs, VLMs, MMLMs, etc. in the cloud. For example, the in-cabin AI agents or assistants can provide directions, vehicle or machine feedback information, answer general questions, handle music/video and/or other requests, activate windows, doors, and/or other vehicle components, etc. As such, one or more dedicated SoCs and/or sets of processors can be used to perform the in-cabin infotainment and/or in-cabin monitoring (e.g., as an occupant monitoring system (OMS)) for the machine 1800.

The machine 1800 can further include an instrument cluster 1832 (e.g., a digital dash, an electronic instrument cluster, a digital instrument panel, etc.). The instrument cluster 1832 can include a controller and/or supercomputer (e.g., a discrete controller or supercomputer). The instrument cluster 1832 can include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information can be displayed and/or shared among the infotainment SoC 1830 and the instrument cluster 1832. In other words, the instrument cluster 1832 can be included as part of the infotainment SoC 1830, or vice versa.

FIG. 18D is a block diagram of an example architecture of a computing system (a subset of the system described with respect to FIG. 18C), in accordance with at least some implementations of the present disclosure. Although illustrated as an SoC(s) 1804, this is not intended to be limiting, and the computing system can additionally or instead include multi-chip modules (MCMs), application-specific integrated circuits (ASICs), system-in-packages (SiPs), heterogeneous integration (HI), single-board computers (SBCs), and/or other components and/or architectures, without departing from the scope of the present disclosure.

The SoC(s) 1804 can be an end-to-end platform with a flexible architecture that spans automation levels 2-5, or the SoC(s) 1804 can be specifically designed for a specific automation level (e.g., a first SoC 1804 for level 2 to level 2++, a second SoC 1804 for level 3, a third SoC 1804 for level 4, etc.), thereby providing a comprehensive functional safety architecture that leverages and makes efficient use of computer vision, neural network inferencing, robotic planning, control, and navigation, ADAS techniques, and the like, with diversity and redundancy, to provide a platform for a flexible, reliable driving or robotic control software stack, along with deep learning tools. The SoC(s) 1804 can be faster, more reliable, and even more energy-efficient and space-efficient than conventional systems. For example, the accelerator(s) 1814, when combined with the CPU(s) 1806, the GPU(s) 1808, and the data store(s) 1816, can provide for a fast, efficient platform for level 2-5 autonomous vehicles as well as for safe planning, navigation, and control of AMRs 1800B, humanoid robots 1800C, and/or other robot or machine types.

In some implementations, such as where the SoC(s) 1804 include a GPU 1808 with 2000 or more cores (e.g., 2048 cores), 60 or more tensor cores (e.g., 64 tensor cores), and a GPU max frequency of over 1 GHz (e.g., 1.3 GHz), a CPU 1806 including 10 or more cores (e.g., 12 cores), with 64 bits, 3 MB L2 and 6 MB L3 cache memory, and a max frequency of 2 or more GHz (e.g., 2.2 GHz), one or more deep learning accelerators (DLAs), deep learning accelerator clusters (XNNs), neural network accelerators (NNAs), or neural processing units (NPUs) 1809 (e.g., 2 DLAs/XNNs/NNAs/NPUs 1809), and a vision accelerator—such as a programmable vision accelerator (PVA) 1807, a single SoC 1804) can be capable of 275 tera operations per second (TOPS) of AI performance. For example, NVIDIA's Jetson AGX Orin 64 GB SoC satisfies these criteria, and achieves this performance.

Similarly, in implementations where the SoC(s) 1804 include a GPU 1808 with 1700 or more cores (e.g., 1792 cores), 50 or more tensor cores (e.g., 56 tensor cores), and a GPU max frequency of over 900 MHz (e.g., 930 MHz), a CPU 1806 including 8 or more cores (e.g., 8 cores), with 64 bits, 2 MB L2 and 4 MB L3 cache memory, and a max frequency of 2 or more GHz (e.g., 2.2 GHz), one or more deep learning accelerators (DLAs), deep learning accelerator clusters (XNNs), neural network accelerators (NNAs), or neural processing units (NPUs) 1809 (e.g., 2 DLAs/XNNs/NNAs/NPUs 1809), and a vision accelerator—such as a programmable vision accelerator (PVA) 1807, a single SoC 1804) can be capable of 200 tera operations per second (TOPS) of AI performance. For example, NVIDIA's Jetson AGX Orin 32 GB SoC satisfies these criteria, and achieves this performance.

In some implementations, such as where the SoC(s) 1804 include a GPU 1808 with 1000 or more cores (e.g., 1024 cores), 28 or more tensor cores (e.g., 32 tensor cores), and a GPU max frequency of over 900 MHz (e.g., 1173 MHz), a CPU 1806 including 8 or more cores (e.g., 8 cores), with 64 bits, 2 MB L2 and 4 MB L3 cache memory, and a max frequency of 2 or more GHz (e.g., 2 GHz), one or more deep learning accelerators (DLAs), deep learning accelerator clusters (XNNs), neural network accelerators (NNAs), or neural processing units (NPUs) 1809 (e.g., 1 DLA/XNN/NNA/NPU 1809), and a vision accelerator—such as a programmable vision accelerator (PVA) 1807, a single SoC 1804) can be capable of 157 tera operations per second (TOPS) of AI performance. For example, NVIDIA's Jetson AGX Orin NX 16 GB SoC satisfies these criteria, and achieves this performance.

In various implementations, such as where the SoC(s) 1804 include a GPU 1808 with 1000 or more cores (e.g., 1024 cores), 28 or more tensor cores (e.g., 32 tensor cores), and a GPU max frequency of over 900 MHz (e.g., 1020 MHz), a CPU 1806 including 6 or more cores (e.g., 6 cores), with 64 bits, 1.5 MB L2 and 4 MB L3 cache memory, and a max frequency of 1.5 or more GHz (e.g., 1.7 GHz), a single SoC 1804) can be capable of 67 tera operations per second (TOPS) of AI performance. For example, NVIDIA's Jetson Orin Nano 8 GB SoC satisfies these criteria, and achieves this performance.

The SoC(s) 1804 can include one or more CPUs 1806. The CPU(s) 1806 can include a CPU cluster or CPU complex (alternatively referred to herein as a "CCPLEX"), in implementations. The CPU(s) 1806 can include multiple cores and/or (e.g., L2, L3) caches. For example, in some implementations, the CPU(s) 1806 can include twelve cores in a coherent multi-processor configuration. In some implementations, the CPU(s) 1806 can include four dual-core clusters where each cluster has a dedicated L2 cache (e.g., a 3 MB L2 cache). The CPU(s) 1806 (e.g., the CCPLEX) can be configured to support simultaneous cluster operation enabling any combination of the clusters of the CPU(s) 1806 to be active at any given time.

The SoC(s) 1804 can include any type and number of GPUs 1808. For example, an integrated GPU(s) (alternatively referred to herein as an "iGPU(s)") can be used in some implementations. The GPU(s) 1808 can be programmable and can be efficient for parallel workloads. The GPU(s) 1808, in some examples, can use an enhanced tensor instruction set. The GPU(s) 1808 can include one or more streaming microprocessors, where each streaming microprocessor can include a cache (e.g., an L1 cache with at least 96 KB storage capacity), and two or more of the streaming microprocessors can share an L2 cache (e.g., an L2 cache with a 512 KB storage capacity). In some implementations, the GPU(s) 1808 can include at least eight streaming microprocessors. The GPU(s) 1808 can use compute application programming interface(s) (API(s)). In addition, the GPU(s) 1808 can use one or more parallel computing platforms and/or programming models (e.g., NVIDIA's CUDA).

The GPU(s) 1808 can be power-optimized for best performance in automotive, robotics, and/or other embedded use cases. For example, the GPU(s) 1808 can be fabricated on a Fin field-effect transistor (FinFET). However, this is not intended to be limiting, and the GPU(s) 1808 can be fabricated using other semiconductor manufacturing or fabrication processes. Each streaming microprocessor can incorporate a number of mixed-precision processing cores partitioned into multiple blocks. For example, and without limitation, 64 PF32 cores and 32 PF64 cores can be partitioned into four processing blocks. In such an example, each processing block can be allocated 16 FP32 cores, 8 FP64 cores, 16 INT32 cores, two mixed-precision NVIDIA TENSOR COREs for deep learning matrix arithmetic, an (e.g., L0) instruction cache, a warp scheduler, a dispatch unit, and/or a (e.g., 64 KB) register file. In addition, the streaming microprocessors can include independent parallel integer and floating-point data paths to provide for efficient execution of workloads with a mix of computation and addressing calculations. The streaming microprocessors can include independent thread scheduling capability to enable finer-grain synchronization and cooperation between parallel threads. The streaming microprocessors can include a combined L1 data cache and shared memory unit in order to improve performance while simplifying programming.

The GPU(s) 1808 can include a high bandwidth memory (HBM) and/or a (e.g., 16 GB) HBM2 memory subsystem to provide, in some examples, about 900 GB/second peak memory bandwidth. In some examples, in addition to, or alternatively from, the HBM memory, a synchronous graphics random-access memory (SGRAM) can be used, such as a graphics double data rate type five synchronous random-access memory (GDDR5).

The GPU(s) 1808 can include unified memory technology including access counters to allow for more accurate migration of memory pages to the processor that accesses them most frequently, thereby improving efficiency for memory ranges shared between processors. In some examples, address translation services (ATS) support can be used to allow the GPU(s) 1808 to access the CPU(s) 1806 page tables directly. In such examples, when the GPU(s) 1808 memory management unit (MMU) experiences a miss, an address translation request can be transmitted to the CPU(s) 1806. In response, the CPU(s) 1806 can look in its page tables for the virtual-to-physical mapping for the address and transmits the translation back to the GPU(s) 1808. As such, unified memory technology can allow a single unified virtual address space for memory of both the CPU(s) 1806 and the GPU(s) 1808, thereby simplifying the GPU(s) 1808 programming and porting of applications to the GPU(s) 1808.

The SoC(s) 1804 can include any number of cache(s) 1812, including those described herein. For example, the cache(s) 1812 can include L0 caches, L1 caches, L2 caches, L3 caches (e.g., that are available to both the CPU(s) 1806 and the GPU(s) 1808 (e.g., that is connected both the CPU(s) 1806 and the GPU(s) 1808)), etc. The cache(s) 1812 can include a write-back cache that can keep track of states of lines, such as by using one or more cache coherence protocol (e.g., MEI, MESI, MSI, etc.). The (e.g., L3) cache can include 4 MB or more, depending on the implementation, although smaller or larger cache sizes can be used.

The SoC(s) 1804 can include one or more arithmetic logic units (ALUs) 1865 which can be leveraged in performing processing with respect to any of the variety of tasks or operations of the machine 1800—such as computer vision, machine learning or deep learning processing, world model management, etc. In addition, the SoC(s) 1804 can include a floating point unit(s) (FPU(s)) 1867—or other math coprocessor or numeric coprocessor types—for performing mathematical operations within the system. For example, the SoC(s) 1804 can include one or more FPUs 1867 integrated as execution units within a CPU(s) 1806 and/or GPU(s) 1808.

The SoC(s) 1804 can include one or more accelerators 1814 (e.g., hardware accelerators, software accelerators, or a combination thereof). For example, the SoC(s) 1804 can include a hardware acceleration cluster that can include optimized hardware accelerators and/or large on-chip memory. The large on-chip memory 1815 (e.g., 4 MB of SRAM, 32 GB and/or 64 GB 256-bit LPDDR5 at 204.8 GB/s, 8 GB and/or 16 GB 128-bit LPDDR5 at 102.4 GB/s, and/or other memory types and sizes), can enable the hardware acceleration cluster to accelerate neural network processing, transformer processing, optical flow processing, vision processing, and/or other calculations or processing. The hardware acceleration cluster can be used to complement the GPU(s) 1808 and to off-load some of the tasks of the GPU(s) 1808 (e.g., to free up more cycles of the GPU(s) 1808 for performing other tasks). As an example, the accelerator(s) 1814 can be used for targeted workloads (e.g., perception, convolutional neural networks (CNNs), deep neural networks (DNNs), language models (LLMs, VLMs, MMLMs, VLAs, etc.), transformer models, diffusion models, encoder-only models, encoder-decoder models, etc. that are stable enough to be amenable to acceleration.

The accelerator(s) 1814 (e.g., the hardware acceleration cluster) can include a deep learning accelerator(s) (DLA) 1809 (alternatively referred to herein as "a deep learning accelerator cluster (XNN) 1809," "neural network accelerator (NNA) 1809," or "neural processing unit (NPU) 1809"). The DLA(s) 1809 can include one or more Tensor processing units (TPUs) 1841 that can be configured to provide an additional, e.g., ten trillion operations per second for deep learning applications and inferencing. The TPUs 1841 can be accelerators configured to, and optimized for, performing image processing functions (e.g., for CNNs, RCNNs, DNNs, etc.). The DLA(s) 1809 can further be optimized for a specific set of neural network types and floating point operations, as well as inferencing. The design of the DLA(s) can provide more performance per millimeter than a general-purpose GPU, and vastly exceeds the performance of a CPU. The TPU(s) 1841 can perform several functions, including a single-instance convolution function, supporting, for example, INT8, INT16, and FP16 data types for both features and weights, as well as post-processor functions. Although the TPU(s) 1841 are described as being included as part of the DLA(s) 1809, this is not intended to be limiting, and the TPU(s) 1841 can be included in additional or alternative accelerator(s) 1814 and/or other components, and/or can be included as a discrete processing component(s).

The DLA(s) 1809 can quickly and efficiently execute neural networks on processed or unprocessed data for any of a variety of functions, including, for example and without limitation: for object and feature identification and detection (e.g., vehicles, pedestrians, other robots, lane lines, road boundary lines, debris, potholes, boxes, warehouse items, etc.) using data from one or more sensor modalities; for distance estimation using data from one or more sensor modalities; for emergency vehicle detection and identification and detection using data from microphones and/or vision-based sensors; for facial recognition; for pick and place operations; for manipulation operations; for occupant monitoring; for vehicle owner identification; and/or other in-cabin operations using data from in-cabin cameras and/or other sensor types; and/or a for security and/or safety related events, to name a few.

The DLA(s) 1809 can perform any function of the GPU(s) 1808, and by using an inference accelerator, for example, a designer can target either the DLA(s) 1809 or the GPU(s) 1808 for any function. For example, the designer can focus processing of DNNs and floating point operations on the DLA(s) 1809 and leave other functions to the GPU(s) 1808 and/or other accelerator(s) 1814. The DLA(s) 1809 can be used to run any type of network to enhance control and safety, including for example, a neural network that outputs a measure of confidence for each object detection.

The accelerator(s) 1814 (e.g., the hardware acceleration cluster) can include a programmable vision accelerator(s) (PVA) 1807, which can alternatively be referred to herein as a computer vision accelerator or generally a vision accelerator. The PVA(s) 1807 can be designed and configured to accelerate computer vision algorithms for the advanced driver assistance systems (ADAS), semi-autonomous driving, autonomous driving, robotics applications, security and surveillance applications, augmented reality (AR), virtual reality (VR), and/or mixed reality (MR) applications, etc. The PVA(s) 1807 can provide a balance between performance and flexibility. For example, each PVA(s) 1807 can include, for example and without limitation, any number of reduced instruction set computer (RISC) cores, direct memory access (DMA) systems, pixel processing engines (PPEs), vector processors or vector processing units (VPUs), and/or other components. The PVA engine can include an advanced very long instruction word (VLIW), single instruction multiple data (SIMD) digital signal processor. The PVA(s) 1807 can be optimized for the tasks of image processing and computer vision algorithm acceleration. For example, the PVA(s) 1807 provides excellent performance with extremely low power consumption, and can be used asynchronously and concurrently with the CPU(s) 1806, GPU(s) 1808, and/or other accelerators in the system (e.g., vehicle, robot, etc.) as part of a heterogeneous compute pipeline.

The PVA(s) 1807 can include one or more (e.g., two) vector processing subsystems (VPS), where each VPS can include one or more vector processing unit (VPU) cores, one or more decoupled look-up units (DLUTs), one or more shared or vector memories (VMEMs), and one or more instruction caches (I-caches). The VPU core(s) can be the main processing unit, and can include a vector SIMD VLIW DSP 1843 optimized for computer vision. The VPU core(s) can fetch instructions through the I-cache(s), and can access data through the VMEM(s). The DLUT(s) can include a specialized hardware component that enhances the efficiency of parallel lookup operations. For example, the DLUT(s) allow parallel lookups using a single copy of the lookup table by executing these lookups in a decoupled pipeline, independent of the primary processor pipeline. By doing so, the DLUT(s) minimize or reduce memory usage and enhance throughput while avoiding data-dependent memory bank conflicts—ultimately leading to improved overall system performance. The VPU VMEM(s) can provide local data storage for the VPU, allowing efficient implementation of various image processing and computer vision algorithms. The VPU VMEM(s) can support access from outside-VPS hosts such as direct memory access (DMA) and the CPU(s) 1806 (e.g., ARM Cortex-R5 processor), facilitating data exchange with the CPU(s) 1806 and other system-level components. The VPU I-cache can supply instruction data to the VPU(s) when requested, can request missing instruction data from system memory, and/or can maintain temporary instruction storage for the VPU. For each VPU task, the CPU(s) 1806 can configures the DMA system, optionally prefetch the VPU program into VPU I-cache, and/or kick off each VPU-DMA pair to process a task. The PVA(s) 1807 can also include an L2 SRAM memory to be shared between the one or more (e.g., two) sets of VPS and DMA. In some implementations, one or more (e.g., two) DMA devices are used to move data among external memory, PVA L2 memory, the VMEMs (e.g., one in each VPS), CPU(s) tightly coupled memory (TCM), DMA descriptor memory, and/or PVA-level config registers. In a lightly loaded system, two parallel DMA accesses to DRAM can achieve a read/write bandwidth of up to 15 GB/s each and, in a heavily loaded system, this bandwidth can reach up to 10 GB/s each. With respect to compute compacity, the INT8 Giga Multiply-Accumulate Operations per Second (GMACs) can be 2048 or greater, excluding the DLUT. The FP32 GMACs can include 32 per PVA instance.

The RISC cores can interact with image sensors (e.g., the image sensors of any of the cameras described herein), image signal processor(s), and/or the like. Each of the RISC cores can include any amount of memory. The RISC cores can use any of a number of protocols, depending on the implementation. In some examples, the RISC cores can execute a real-time operating system (RTOS). The RISC cores can be implemented using one or more integrated circuit devices, application specific integrated circuits (ASICs), and/or memory devices. For example, the RISC cores can include an instruction cache and/or a tightly coupled RAM.

The DMA system can enable components of the PVA(s) 1807 to access the system memory independently of the CPU(s) 1806. The DMA can support any number of features used to provide optimization to the PVA(s) 1807 including, but not limited to, supporting multi-dimensional addressing and/or circular addressing. In some examples, the DMA can support up to six or more dimensions of addressing, which can include block width, block height, block depth, horizontal block stepping, vertical block stepping, and/or depth stepping.

The vector processors or VPUs can be programmable processors that can be designed to efficiently and flexibly execute programming for computer vision algorithms and provide signal processing capabilities. In some examples, the PVA(s) 1807 can include a PVA core and two vector processing subsystem partitions. The PVA core can include a processor subsystem, DMA engine(s) (e.g., two DMA engines), and/or other peripherals. The vector processing subsystem can operate as the primary processing engine of the PVA(s) 1807, and can include one or more vector processing units (VPUs), one or more pixel processing engines (PPEs)—which can include a 2D layout of interconnected (e.g., for north, south, east, west intercommunication) processing elements, one or more instruction caches, and/or one or more shared or vector memories (e.g., VMEMs). A VPU core can include a digital signal processor such as, for example, a single instruction, multiple data (SIMD), very long instruction word (VLIW) digital signal processor. The combination of the SIMD and VLIW can enhance throughput and speed.

In some implementations, each of the vector processors can include an instruction cache and can be coupled to dedicated memory. As a result, in some examples, each of the vector processors can be configured to execute independently of the other vector processors. In other examples, the vector processors that are included in a particular PVA(s) 1807 can be configured to employ data parallelism. For example, in some implementations, the plurality of vector processors included in a single PVA(s) 1807 can execute the same computer vision algorithm, but on different regions of an image. In other examples, the vector processors included in a particular PVA(s) 1807 can simultaneously execute different computer vision algorithms, on the same image, or even execute different algorithms on sequential images or portions of an image. Among other things, any number of PVAs 1807 can be included in the hardware acceleration cluster and any number of vector processors can be included in each of the PVAs. In addition, the PVA(s) 1807 can include additional error correcting code (ECC) memory, to enhance overall system safety.

The accelerator(s) 1814 (e.g., the hardware accelerator cluster) have a wide array of uses for autonomous and semi-autonomous machine control. The PVA(s) 1807 can be a programmable vision accelerator that can be used for key processing stages in perception, robotics understanding and reasoning, ADAS, semi-autonomous, and autonomous vehicles, etc. The PVA's 1807 capabilities are a good match for algorithmic domains needing predictable processing, at low power and low latency. In other words, the PVA(s) 1807 performs well on semi-dense or dense regular computation, even on small data sets, which need predictable run-times with low latency and low power. Thus, in the context of platforms for autonomous vehicles and robotics, the PVAs 1807 are designed to run classic computer vision algorithms, as they are efficient at object detection and operating on integer math.

For example, according to one implementation of the technology, the PVA 1807 is used to perform computer stereo vision. A semi-global matching-based algorithm can be used in some examples, although this is not intended to be limiting. Many applications for Level 3-5 autonomous driving require motion estimation/stereo matching on-the-fly (e.g., structure from motion, pedestrian recognition, lane detection, etc.). The PVA(s) 1807 can perform computer stereo vision function on inputs from two monocular cameras.

In some examples, the PVA(s) 1807 can be used to perform dense optical flow. According to process raw RADAR data (e.g., using a 4D Fast Fourier Transform) to provide Processed RADAR. In other examples, the PVA(s) 1807 is used for time-of-flight depth processing, by processing raw time of flight data to provide processed time of flight data, for example.

Although the VPU(s), DMA(s), RISC Core(s), VMEM(s), and decoupled co-processors (e.g., the DLUT(s)) are described as being included within the PVA(s) 1807, this is not intended to be limiting. In some implementations, these components can be included in alternative or additional processing components and/or accelerator(s) 1814, and/or can be included as discrete components of the SoC(s) 1804 and/or other computing system architecture(s).

In some examples, the SoC(s) 1804 can include a real-time ray-tracing hardware accelerator (RTA) 1851 that can be used to quickly and efficiently determine the positions and extents of objects (e.g., within a world model), to generate real-time or near-real time visualization simulations, for RADAR signal interpretation, for sound propagation synthesis and/or analysis, for simulation of SONAR, RADAR, LiDAR, camera, and/or other sensor modalities within a simulation, for general wave propagation simulation, for comparison to LiDAR data for purposes of localization, to generate realistic training data for training neural networks, and/or other functions and uses. In some implementations, one or more tree traversal units (TTUs) can be used for executing one or more ray-tracing related operations. For example, the machine 1800 (or another machine or device) can be simulated within a simulation environment, and the simulation environment can be generated using one or more light transport simulation algorithms (e.g., ray-tracing, path-tracing, etc.). These ray-tracing algorithms can thus be accelerated using a ray-tracing accelerator 1851 and/or a ray-tracing optimized GPU 1806—such as NVIDIA's RTX GPU.

The accelerator(s) 1814 (e.g., in the hardware acceleration cluster) can include one or more optical flow accelerators (OFAs) 1811. For example, the OFA(s) 1811 can be used for computing optical flow and stereo disparity between frames of sensor data (e.g., images). Optical flow can be accelerated on the OFA(s) 1811 for uses such as object detection and tracking, and/or for stereo depth estimation where used for computing stereo disparity between stereo image frames (e.g., two or more frames captured using two or more image sensors with at least partially overlapping fields of view).

The SoC(s) 1804 can include one or more camera serial interfaces (CSIs) 1823. For example, the CSI(s) 1823 can include a mobile industry processor interface (MIPI) camera serial interface (CSI) for receiving video and input from cameras, a high-speed interface, and/or a video input block that can be used for camera and related pixel input functions. The SoC(s) 1804 can further include an input/output controller(s) that can be controlled by software and can be used for receiving I/O signals that are uncommitted to a specific role. For example, the CSI 1823 can include a MIPI CSI-2 connector—e.g., a 16 lane MIPI CSI-2 connector, D-PHY 2.1 (up to 40 Gbps), and C-PHY 2.0 (up to 164 Gbps) for supporting 16 virtual channels and six or more cameras, an 8 lane MIPI CSI-2 connector, D-PHY 2.1 (up to 20 Gbps for supporting 8 virtual channels and 4 or more cameras, and/or a 2×MIPI CSI-2, 22 pin camera connector, depending on the implementation and implementation.

The accelerator(s) 1814 (e.g., the hardware acceleration cluster) can include a computer vision network on-chip (CVNOC) 1863 and SRAM, for providing a high-bandwidth, low latency SRAM for the accelerator(s) 1814. In some examples, the on-chip memory can include at least 4 MB SRAM, consisting of, for example and without limitation, eight field-configurable memory blocks, that can be accessible by the PVA 1807, OFA 1811, DLA 1809, and/or other accelerator(s) 1814. Each pair of memory blocks can include an advanced peripheral bus (APB) interface, configuration circuitry, a controller, and a multiplexer. Any type of memory 1815 can be used. The PVA 1807, OFA 1811, DLA 1809, and/or other accelerator(s) 1814 can access the memory via a backbone that provides the accelerator(s) 1814 with high-speed access to memory. The backbone can include a computer vision network on-chip that interconnects the accelerator(s) 1814 to the memory (e.g., using the APB).

The CVNOC 1863 can include an interface that determines, before transmission of any control signal/address/data, that the accelerator(s) 1814 provide ready and valid signals. Such an interface can provide for separate phases and separate channels for transmitting control signals/addresses/data, as well as burst-type communications for continuous data transfer. This type of interface can comply with ISO 26262 or IEC 61508 standards, although other standards and protocols can be used.

The SoC(s) 1804 can include data store(s) 1816 and/or memory 1815. The data store(s) 1816 can be on-chip memory 1815 of the SoC(s) 1804, which can store neural networks and/or other algorithms to be executed on the CPU(s) 1806, the GPU(s) 1808, and/or one or more of the accelerator(s) 1814. In some examples, the data store(s) 1816 can be large enough in capacity to store multiple instances of neural networks for redundancy and safety. The data store(s) 1812 can include L2 and/or L3 cache(s) 1812, for example. The memory(ies) 1815 can include SRAM, LPDDR5, and/or other memory types. For example, the memory(ies) 1815 can include 4 MB of SRAM, 32 GB and/or 64 GB 256-bit LPDDR5 at 204.8 GB/s, 8 GB and/or 16 GB 128-bit LPDDR5 at 102.4 GB/s, and/or other memory types and sizes. Reference to the data store(s) 1816 can include reference to the memory associated with the PVA 1807, OFA 1811, DLA 1809, and/or other accelerator(s) 1814, as described herein.

The data store(s) 1816 can include various storage types, such as eMMC, NVMe, etc. For example, the SoC(s) 1804 can include storage in the form of an embedded multimedia card (eMMC) (e.g., 64 GB eMMC 5.1) and/or an SD card slot, with external NVM express (NVMe) capability, e.g., via M.2 Key M. For example, the data store(s) 1816 and/or other storage can be accessed via, e.g., NVMe, using PCI Express (PCIe), RDMA, TCP, and/or other protocols.

The SoC(s) 1804 can include one or more processor(s) 1810 (e.g., embedded processors). The processor(s) 1810 can include a boot and power management processor (BPMP) 1853, that can be a dedicated processor and subsystem to handle boot power and management functions and related security enforcement. The BPMP 1853 can be a part of the SoC(s) 1804 boot sequence and can provide runtime power management services. The BPMP 1853 can provide clock and voltage programming, assistance in system low power state transitions, management of SoC(s) 1804 thermals and temperature sensors, and/or management of the SoC(s) 1804 power states. Each temperature sensor can be implemented as a ring-oscillator whose output frequency is proportional to temperature, and the SoC(s) 1804 can use the ring-oscillators to detect temperatures of the CPU(s) 1806, GPU(s) 1808, accelerator(s) 1814, and/or other components. If temperatures are determined to exceed a threshold, BPMP 1853 can enter a temperature fault routine and put the SoC(s) 1804 into a lower power state and/or put the machine 1800 into a chauffeur to safe stop mode (e.g., bring the machine 1800 to a safe stop).

The processor(s) 1810 can further include a set of embedded processors that can serve as an audio processing engine (APE) 1855. The APE 1855 can be an audio subsystem that enables full hardware support for multi-channel audio over multiple interfaces, and a broad and flexible range of audio I/O interfaces. In some examples, the APE 1855 is a dedicated processor core with a digital signal processor with dedicated RAM.

The processor(s) 1810 can further include an always on processor engine (AOPE) 1857 that can provide necessary hardware features to support low power sensor management and wake use cases. The AOPE 1857 can include a processor core, a tightly coupled RAM, supporting peripherals (e.g., timers and interrupt controllers), various I/O controller peripherals, and routing logic.

The processor(s) 1810 can further include a safety processor(s) 1813 (alternatively referred to as "safety island 1813"), which can include a safety cluster engine that includes a dedicated processor or processor subsystem to handle safety management for automotive, robotics, and/or other applications. The safety processor(s) 1813—and/or safety cluster engine—may include two or more processor cores, a tightly coupled RAM, support peripherals (e.g., timers, an interrupt controller, etc.), and/or routing logic. In a safety mode, the two or more cores can operate in a lockstep mode and function as a single core with comparison logic to detect any differences between their operations. In some implementations, the safety processor(s) 1813 can include a discrete processor(s), such that fault of other system components can not impact the performance and availability of the safety processor 1813.

The processor(s) 1810 can further include a real-time or near real-time sensor engine (SE) 1859 that can include a dedicated processor subsystem for handling real-time or near real-time camera, LiDAR, RADAR, and/or other sensor modality management.

The processor(s) 1810 can further include one or more image signal processors (ISPs) 1827, which can include a high-dynamic range signal processor and/or a hardware engine that is part of one or more sensor processing pipelines.

The processor(s) 1810 can include a video image compositor (VIC) 1861 that can be a processing block (e.g., implemented on a microprocessor) that implements video post-processing functions needed by a video playback application to produce the final image for the player window. The VIC 1861 can perform lens distortion correction on wide-view camera(s) 1868B, surround camera(s) 1868D, in-cabin monitoring camera sensors, and/or other camera sensors with distorted fields of view.

A VIC 1861 can include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor can use information from the previous image to reduce noise in the current image.

A VIC 1861 can also be configured to perform stereo rectification on input stereo lens frames. The video image compositor can further be used for user interface composition when the operating system desktop is in use, and the GPU(s) 1808 is not required to continuously render new surfaces. Even when the GPU(s) 1808 is powered on and active doing 3D rendering, the video image compositor can be used to offload the GPU(s) 1808 to improve performance and responsiveness.

The SoC(s) 1804 can further include a broad range of peripheral interfaces for input/output (I/O) 1825, such as to enable communication with peripherals, audio codecs, power management, and/or other devices. The SoC(s) 1804 can be used to process data from cameras (e.g., connected over Gigabit Multimedia Serial Link and/or Ethernet), sensors (e.g., LiDAR sensor(s) 1864, RADAR sensor(s) 1860, etc. that can be connected over Ethernet), data from bus 1802 (e.g., speed of machine 1800, steering wheel position, etc.), data from GNSS sensor(s) 1858 (e.g., connected over Ethernet or CAN bus). The SoC(s) 1804 can further include dedicated high-performance mass storage controllers that can include their own DMA engines, and that can be used to free the CPU(s) 1806 from routine data management tasks. In some implementations, the SoC(s) 1804 I/O 1825 can include a header (e.g., a 40 pin header, or 40 pin expansion header) with support for universal asynchronous receiver/transmitter (UART), serial peripheral interface (SPI), inter-integrated circuit sound (I2S), inter-integrated circuit (I2C), controller area network (CAN), pulse width modulation (PWM), digital microphone interface (DMIC), digital speaker station (DSPK), general purpose I/O (GPIO), etc., an automation header (e.g., 12 pin automation header), an audio panel header (e.g., a 10 pin audio panel header), a joint test action group (JTAG) header (e.g., a 10 pin JTAG header), a fan header (e.g., a 4 pin fan header), an RTC battery backup connector (e.g., a 2 pin battery backup connector), a microSD slot, a DC power jack, power, force, recovery, and reset buttons, one or more display connectors (e.g., DisplayPort (DP), such as a DP 1.4A (+MST), an eDP 1.41, an HDMI 2.1, and/or a 4K30 multi-model DP 1.2 (+MST) connector), and/or other I/O 1825 elements, components, or features.

The SoC(s) 1804 can include in-machine networking capability using, for example, Ethernet (e.g., automotive Ethernet), SERDES, controller area network (CAN), FlexRay, local interconnect network (LIN), low voltage differential signaling (LVDS), media oriented system transport (MOST), another networking type, and/or a combination thereof. For example, the SoC(s) 1804 can include an RJ45 connector with up to 10 GbE, a 1 GbE connector, and/or other networking connector types.

The SoC(s) 1804 can include one or more digital signal processors (DSPs) 1843. For example, the DSP(s) 1843 can include a dedicated or specialized microprocessor chip optimized for digital signal processing—such as in audio signal processing, telecommunications, digital image processing, RADAR, SONAR, LiDAR, and/or other sensor processing, speech recognition, and/or other applications.

The SoC(s) 1804 can include one or more video encoders 1819 and/or one or more video decoders 1821. For example, the video encoder(s) 1819 can include a hardware-based (e.g., as part of the GPU(s) 1808) video encoder (e.g., supporting H.264, H.265, etc., and being HEVC compliant, such as NVIDIA's NVENC) that can process image inputs (e.g., as YUV, RGB, etc.) to generate a video bit stream. The video decoder(s) 1821 can include a video decoder engine that can provide fully-accelerated hardware video decoding capabilities (e.g., supporting decoding of bitstreams in various formats, such as AV1, H.264, H.265, VP8, VP9, MPEG-1, MPEG-2, MPEG-4, VC-1, etc., and being HEVC compliant, such as NVIDIA's NVDEC). In some examples, the video decoder(s) 1821 can be hardware-based (e.g., as part of the GPU(s) 1808).

The SoC(s) 1804 can include one or more general compute acceleration clusters (GCAC(s)) 1829. For example, the GCAC(s) 1829 can include various processor types that can be used to accelerate compute, such as one or more vector microcode processors (VMPs) 1833, one or more multi-threaded processing clusters (MPCs) 1831, one or more programmable macro arrays (PMA(s)) 1835, and/or one or more other processor types. For example, the GCAC(s) 1829 can include a PMA 1835, two VMPs 1833, and 2 MPCs 1831.

The SoC(s) 1804 can include one or more vector microcode processors (VMPs) 1833. The VMP(s) 1833, in implementations, can include a wide vector (very long instruction word (VLIW) and single instruction multiple data (SIMD)) machine with performing various operations, such as short integral type operations common in computer vision and deep learning algorithms.

The SoC(s) 1804 can include one or more multi-threaded processing clusters (MPCs) 1831. The MPC(s) 1831 can include a processing cluster that be, in implementations, more versatile than a GPU, and with higher efficiency than a CPU. For example, the MPC(s) 1831 can include a multi-threaded processor that allows multiple threads to share resources and execute instructions concurrently.

The SoC(s) 1804 can include one or more programmable macro arrays (PMA(s)) 1835. The PMA(s) 1835 can include a coarse-grained reconfigurable architecture (CGRA) dataflow machine, having a unique architecture that delivers strong performance on dense computer vision and deep learning algorithms that can be unachievable in classic digital signal processing (DSP) architectures.

The SoC(s) 1804 can include one or more display processing units (DPUs) 1845 for performing hardware-accelerated image processing. For example, the DPU(s) 1845 can retrieve pixel data from memory 1815 and send it to a display peripheral through standard interfaces. As such, the DPU(s) 1845 can handle display processing and rendering for in-machine and/or on-machine displays.

The SoC(s) 1804 can include one or more application processing units (APUs) 1839. For example, the APU(s) 1839 can include a quad or dual-core processor with 48 KB/32 KB L1 cache with parity and ECC, along with a 1 MB L2 cache with ECC. The APU(s) 1839 can support NEON instructions and single and double precision floating point operations.

The SoC(s) 1804 can include one or more real-time processing units (RTPUs) 1869. The RTPU(s) 1869 can include a dual-core processor with 32 KB/32 KB L1 cache, and 256 KB TCM with ECC. The RTPU(s) 1869 can support single and double precision floating point operations.

The SoC(s) 1804 can include one or more built-in self-test (BIST) components 1837. For example, the BIST component(s) 1837 can include memory BIST (MBIST) to test memories of the system and/or logic BIST (LBIST) to test logic of the system. The BIST components 1837 can include embedded logic for directly testing logic and/or memory of the system.

The SoC(s) 1804 can include one or more dynamically reconfigurable processors (DRPs) 1871. For example, the DRP(s) 1871 can be used for accelerating various computing operations. For example, the DRP(s) 1871 can be combined, in implementations, with a MAC unit for use as an AI accelerator. In implementations, the DRP(s) 1871 can execute applications while dynamically switching the circuit connection configuration of the arithmetic units (e.g., ALUs) on the chip at each operating clock according to the content to be processed. Since only the necessary arithmetic circuits are used, the DRP(s) 1871 can consume less power than with CPU processing and can achieve higher speed. Furthermore, compared to CPUs, where frequent external memory accesses due to cache misses and other causes will degrade performance, the DRP(s) 1871 can build the necessary data paths in hardware ahead of time, resulting in less performance degradation and less variation in operating speed (jitter) due to memory accesses. The DRP(s) 1871 can include a dynamic loading function that switches the circuit connection information each time the algorithm changes, enabling processing with limited hardware resources, even in robotic/automotive applications that require processing of multiple algorithms.

In some implementations, the accelerator(s) 1814 can include an OpenCV accelerator for speeding up processing of OpenCV, an open-source industry standard library for computer vision processing. In some implementations, the combination of one or more DRP(s) 1871 deployed as an AI accelerator along with an OpenCV accelerator(s) can enhance AI computing and image processing algorithms, enabling complex and compute-heavy operations such as Visual simultaneous localization and mapping (SLAM).

In contrast to conventional systems, by providing a CPU complex, GPU complex, and a hardware acceleration cluster, the technology described herein allows for multiple neural networks to be performed simultaneously (e.g., at least partially in parallel) and/or sequentially, and for the results to be combined together to enable Level 2-5 autonomous driving functionality and/or autonomous robotics movement, control, planning, and/or navigation operations. In addition, because the SoC(s) 1804 can include various compute engines (e.g., processors 1810, CPUs 1806, GPU(s) 1808, accelerator(s) 1814, etc.), tasks can be distributed between and among the compute engines, in some instances without common cause failures due to the discrete footprint of the compute engines. Further, because the SoC(s) 1804 can include a dedicated safety processor(s) 1813 (or safety island 1813), critical safety or redundant operations can be performed without common cause failures from the main processing components or compute engines of the SoC(s) 1814. Due to these features, the SoC(s) 1804 and/or the underlying systems of the machine 1800 can be capable of satisfying higher levels of safety—such as automotive safety integrity level (ASIL) D from the ISO 26262 standard.

Figure 18E:
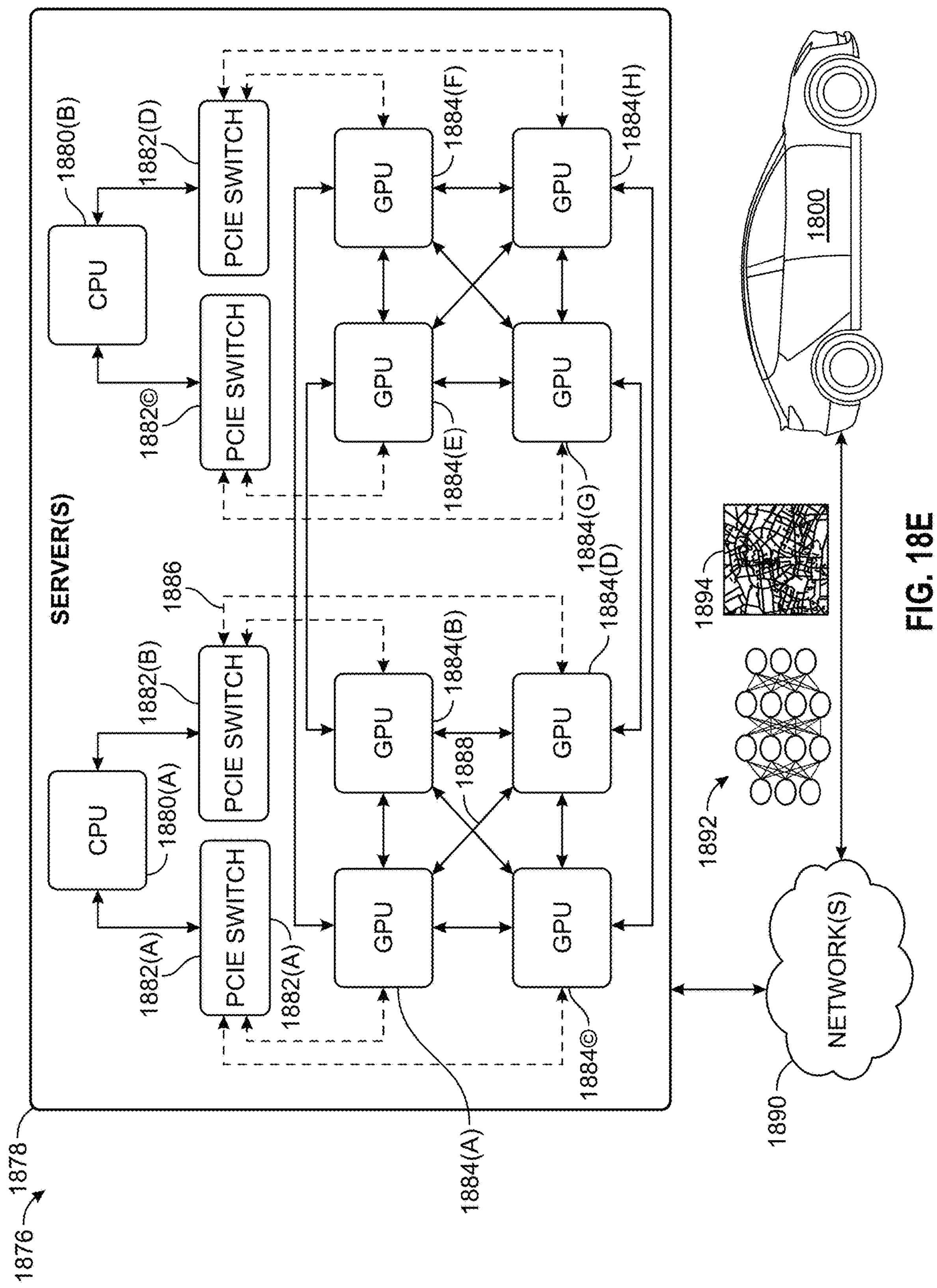
FIG. 18E is a system diagram for communication between cloud-based server(s) and an example autonomous or semi-autonomous vehicle, robot, and/or other machine type, in accordance with at least some implementations of the present disclosure.

FIG. 18E is a system diagram for communication between a cloud-based server(s) (e.g., in a data center, such as those described herein) and the example autonomous or semi-autonomous vehicle or machine 1800 of FIG. 18A, in accordance with some implementations of the present disclosure. The system 1876 can include a server(s) 1878, a network(s) 1890, and a machine(s) 1800. The server(s) 1878 can include a plurality of GPUs 1884(A)-1884(H) (collectively referred to herein as GPUs 1884), switches 1882(A)-1882(H) (such as PCIe 4.0/5.0/etc. switches, M.2 slots, thunderbolt, USB4, NVIDIA's NVLink, NVIDIA's NVSwitch, GPUDirect RDMA, GPUDirect Storage, ultra accelerator Link (UALink), etc.), CPUs 1880(A)-1880(B) (collectively referred to herein as CPUs 1880), accelerators, and/or other processor types. The GPUs 1884, the CPUs 1880, and the PCIe switches can be interconnected with high-speed interconnects such as, for example and without limitation, NVLink interfaces 1888 developed by NVIDIA and/or PCIe connections 1886 (and/or ultra accelerator Link (UALink)). In some examples, the GPUs 1884 are connected via NVLink and/or NVSwitch SoC and the GPUs 1884 and the PCIe switches 1882 are connected via PCIe interconnects. Although eight GPUs 1884, two CPUs 1880, and two PCIe switches are illustrated, this is not intended to be limiting. Depending on the implementation, each of the server(s) 1878 can include any number of GPUs 1884, CPUs 1880, and/or PCIe switches. For example, the server(s) 1878 can each include eight, sixteen, thirty-two, and/or more GPUs 1884.

The server(s) 1878 can receive, over the network(s) 1890 and from the machine(s) 1800, sensor data indicating information about new or previously unexplored locations, and/or sensor data indicating changes to previously seen/stored locations (e.g., unexpected or changed road conditions, such as recently commenced road-work). The server(s) 1878 can transmit, over the network(s) 1890 and to the machine(s) 1800, neural networks 1892, updated neural networks 1892, map information 1894, etc., including information regarding traffic and road conditions. The updates to the map information 1894 can include updates for the HD map 1822, SD map, navigation map, etc., such as information regarding construction sites, potholes, detours, flooding, and/or other obstructions. In some examples, the neural networks 1892, the updated neural networks 1892, the map information 1894, and/or the other information can have resulted from new training and/or experiences represented in data received from any number of machine(s) 1800 in the environment, and/or based on training performed at a datacenter (e.g., using the server(s) 1878 and/or other servers).

The server(s) 1878 can be used to train machine learning models (e.g., neural networks) based on training data. The training data can be generated by the machine(s) 1800, and/or can be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training can be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models can be used by the machine(s) 1800 (e.g., transmitted to the machine(s) 1800 over the network(s) 1890, and/or the machine learning models can be used by the server(s) 1878 to remotely monitor and/or control the machine(s) 1800.

In some examples, the server(s) 1878 can receive data from the machine(s) 1800 and apply the data to up-to-date real-time neural networks for real-time intelligent inferencing. The server(s) 1878 can include deep-learning supercomputers and/or dedicated AI computers powered by GPU(s) 1884, such as a DGX and DGX Station machines developed by NVIDIA. However, in some examples, the server(s) 1878 can include deep learning infrastructure that use only CPU-powered datacenters.

The deep-learning infrastructure of the server(s) 1878 can be capable of fast, real-time inferencing, and can use that capability to evaluate and verify the health of the processors, software, and/or associated hardware in the machine 1800. For example, the deep-learning infrastructure can receive periodic updates from the machine 1800, such as a sequence of images and/or objects that the machine 1800 has located in that sequence of images (e.g., via computer vision and/or other machine learning object classification techniques). The deep-learning infrastructure can run its own neural network to identify the objects and compare them with the objects identified by the machine 1800 and, if the results do not match and the infrastructure concludes that the AI in the machine 1800 is malfunctioning, the server(s) 1878 can transmit a signal to the machine 1800 instructing a fail-safe computer of the machine 1800 to assume control, notify the passengers, and complete a safety maneuver or operation—such as to slow down, hand control back to a driver, come to a stop, and/or pull over/shut down.

For inferencing, the server(s) 1878 can include the GPU(s) 1884 and one or more programmable inference accelerators (e.g., NVIDIA's TensorRT). The combination of GPU-powered servers and inference acceleration can make real-time responsiveness possible. In other examples, such as where performance is less critical, servers powered by CPUs, FPGAs, and other processors can be used for inferencing.

Computing Ecosystem for Generating, Training, and Deploying AI

Figure 19:
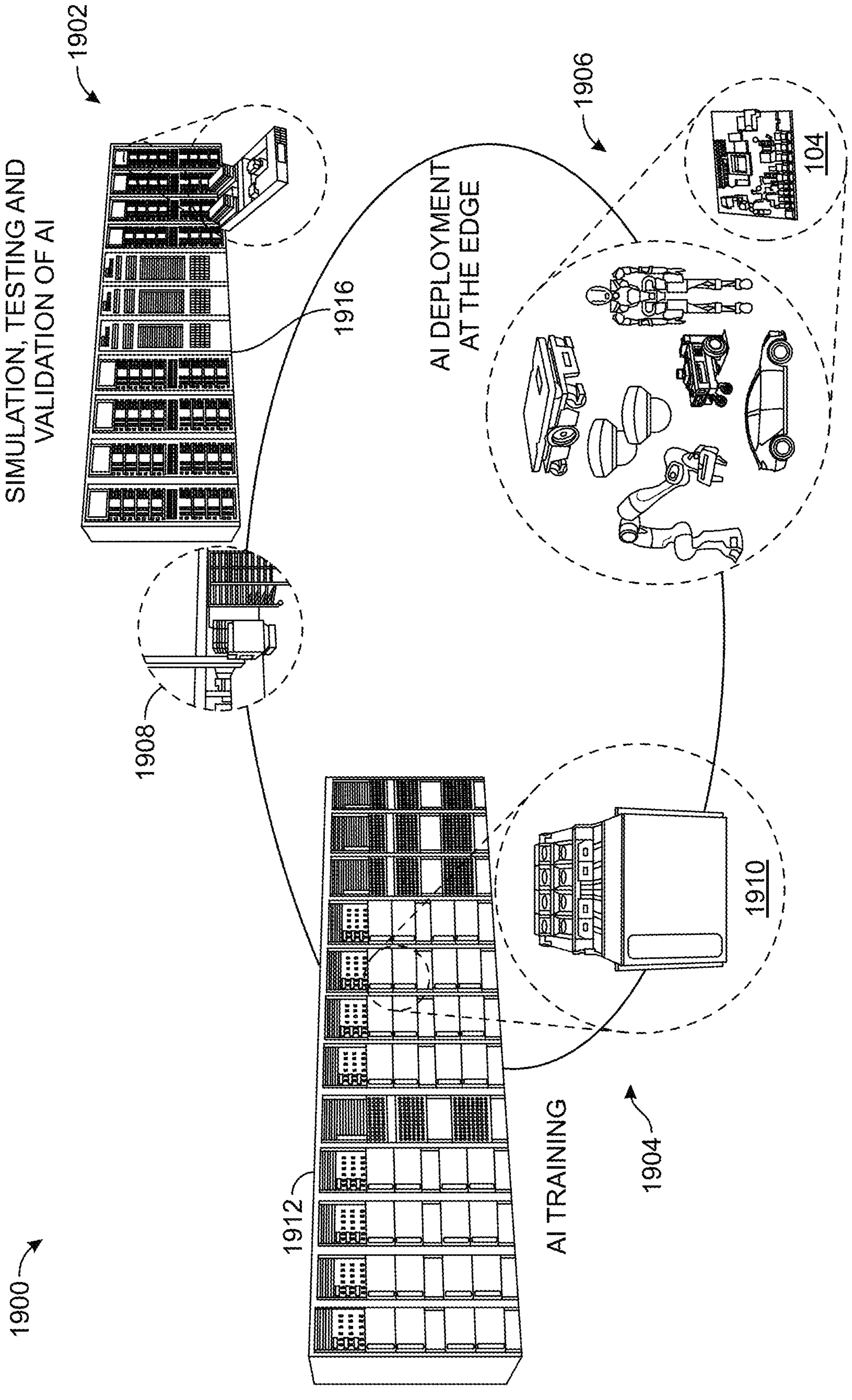
FIG. 19 is a system diagram illustrating a three computer ecosystem, including a computing system for generating or creating artificial intelligence (AI), such as AI training and validation data, a computing system for training artificial intelligence, and a computing system deploying the AI at the edge, in accordance with at least some implementations of the present disclosure.

FIG. 19 is a system diagram illustrating a three computer ecosystem 1900, including a first computing system 1902 for generating or creating artificial intelligence (AI)—such as AI training and validation data, a second computing system 1904 for training artificial intelligence, and a third computing system 1906 (which can include or correspond to the SoC(s) 1804 of FIGS. 18A-18E) deploying the AI at the edge, in accordance with at least some implementations of the present disclosure. For example, to develop and deploy embodied or physical AI, the three computer ecosystem 1900 can be used, including three accelerated computer systems to handle physical AI training, simulation, and runtime (e.g., edge deployment). These systems can generate training data for and train multimodal foundation models (and/or other model types) using scalable, physically based simulations of the machine(s) 1800 and their worlds. By doing so, simulation of machine(s) 1800 can be performed at scale, allowing for refinement, testing, and optimization of skills (e.g., robot skills) in a virtual world (e.g., using NVIDIA's OMNIVERSE) that mimics the laws of physics-helping to reduce real-world data acquisition costs and ensuring the machine(s) 1800 can perform safely in controlled settings.

The computing system 1904 (e.g., NVIDIA's DGX Platform) can be used to train and fine-tune powerful foundation and generative AI models. Models, such as general purpose foundation models (e.g., NVIDIA's Project GROOT), can be used to enable robots and other machine(s) 1800 to understand natural language and emulate movements by observing human actions. The computing system 1904 can include a platform that incorporates software, infrastructure, and expertise in a modern, unified AI development and training solution. The computing system 1904 can include individual computing devices 1910 (e.g., NVIDIA's DGX B200, H200, etc.) and/or any number of computing devices 1910 in a data center infrastructure 1912 (e.g., NVIDIA's DGX SuperPOD).

For example, the individual computing devices 1910 can include GPUs (e.g., 8 GPUs with 1,440 GB total GPU memory) and CPUs (e.g., 2 CPUs with 112 cores total, 2.1 GHz, or 4 GHz (with boost)) that provide upwards of 72 petaFLOPS for training and 144 petaFLOPS for inference. The computing devices 1910 can include memory (e.g., 4 TB memory, and storage (e.g., OS storage of 2×1.9 TB NVMe M.2, and internal storage of 8×3.84 TB NVMe U.2). The computing devices 1910 can include various networking and network management components, such as OSFP ports (e.g., 4 OSFP ports) serving single-port smart host channel adapters (e.g., 8 single port ConnextX-7 virtual protocol interconnects (VPIs)), providing up to 400 GB/s Infiniband/Ethernet. The computing devices 1910 can further include, e.g., dual port quad small form-factor pluggable (QSFFP) data processing units (DPUs) (e.g., 2 dual-port QSFP112 DPUs-such as NVIDIA's BlueField-3 DPUs), providing up to 400 Gb/s InfiniBand/Ethernet. The computing device(s) 1910 can include an onboard network interface card (NIC) (e.g., 10 Gb/s onboard NIC with RJ45), a dual-port Ethernet NIC (e.g., 100 GB/s dual-port Ethernet NIC), and/or a host baseboard management controller (MBC) (e.g., with RJ45). In some implementations, the NICs used for the computing device(s) 1910 can include SuperNICs (e.g., NVIDIA's ConnectX-8 SuperNIC) to provide up to 800 Gb/s of data throughput for in-network computing acceleration engines to deliver the performance and robust feature set needed to power trillion-parameter scale AI factories and scientific computing workloads. In other implementations, the computing device(s) 1910 can include a smart host channel adapter (HCA) (e.g., NVIDIA's ConnectX-7) to provide ultra-low latency, 400 Gb/s throughput for in-network computing acceleration engines.

The data center infrastructure 1912 can include any number of the computing devices 1910, along with an operating system (OS) (e.g., DGX OS extensions for Linux distributions) to maximize system uptime, security, and reliability, network/storage acceleration libraries and management to accelerate end-to-end infrastructure performance, cluster management to scale and manage one node (e.g., one computing device 1910) to thousands, job scheduling and orchestration to ensure hassle-free execution of every developer's job, AI workflow management and machine learning operations (MLOps) to move more models from prototype to production, and enterprise software to speed developer success.

The computing system 1902 (e.g., NVIDIA's OVX servers) can provide a development and simulation platform for testing and optimizing physical AI with APIs and frameworks for simulation (e.g., NVIDIA's DriveSIM, ISAAC Sim, ISAAC Gym, ISAAC Labetc). The computing system 1902 allows developers to use simulation frameworks to simulate and validate robot models, and/or to generate massive amounts of physically-based synthetic data to bootstrap model training. The computing system 1902 can support learning frameworks that power robot reinforcement learning and imitation learning, to accelerate robot policy training and refinement. For example, the computing system 1902 can be used to generate any number of simulations 1908—such as within NVIDIA's OMNIVERSE. The computing system 1902 can be used optimized for accelerating an entire software stack, from training, fine-tuning, and deploying generative AI to powering industrial digitalization within a content collaboration platform of APIs, software developer kits (SDKs), and services that allow for integration of OpenUSD, ray-tracing rendering technologies (e.g., NVIDIA's RTX), and generative physical AI into existing software tools and simulation workflows for, e.g., industrial and robotics use cases (e.g., NVIDIA's OMNIVERSE). As such, the computing system 1902 can host or support a native OpenUSD software platform enabling enterprises to connect 3D pipelines and develop advanced, real-time 3D applications for industrial digitalization. With powerful ray-tracing-accelerated AI and graphics capabilities, the computing system 1902 delivers powerful performance for workloads like extended reality (XR), multi-user design collaboration, and digital twins. This allows creation of physically accurate models with high-fidelity ray-traced and path-traced rendering of materials, operation of large-scale, AI-enabled simulations, and generation of photorealistic 3D synthetic data for training. The computing system 1902 can include individual computing devices 1914 (e.g., NVIDIA's OVX L40S Server) and/or any number of computing devices 1914 in a data center infrastructure 1916 (e.g., NVIDIA's OVX Systems).

The computing device(s) 1914 (which can include a server) can include CPUs (e.g., 2 CPUs with 32 cores each), and GPUs (e.g., 4 or 8 GPUs, each including 48 GB GDDR6 with ECC memory, 864 GB/s memory bandwidth, PCIe Gen4×16: 64 GB/s bidirectional interconnect interface, 18,176 CUDA cores, 142 ray tracing (RT) cores, and 568 tensor cores). The computing devices 1914 can include various networking and network management components, such as smart host channel adapters (HCA) (e.g., 2 or 4 single port ConnextX-7 at 200 Gb/s each, providing up to 800 Gb/s Infiniband/Ethernet), one or more DPUs (e.g., a dual-port QSFP112 DPUs—such as an NVIDIA BlueField-3 DPU), providing up to 400 Gb/s InfiniBand/Ethernet. In some implementations, the NICs used for the computing device(s) 1914 can include SuperNICs (e.g., NVIDIA's ConnectX-8 SuperNIC) to provide up to 800 Gb/s of data throughput for in-network computing acceleration engines to deliver the performance and robust feature set needed to power trillion-parameter scale AI factories and scientific computing workloads. In other implementations, the computing device(s) 1914 can include a smart host channel adapter (HCA) (e.g., NVIDIA's ConnectX-7) to provide ultra-low latency, 400 Gb/s throughput for in-network computing acceleration engines. The computing device(s) 1914 can include a host memory (e.g., 384 Gb DDR5 ECC for 4 GPUs, or 768 Gb DDR5 ECC for 8 GPUs), and can include a dual in-line memory module (DIMM) slot(s), a host boot drive (e.g., 1 TB NVMe), and/or a host storage (e.g., 2 4 TB NVMe).

Similar to the data center infrastructure 1912, the data center infrastructure 1916 can allow for any number of computing device(s) 1914 to be combined in cluster configuration according to a reference architecture.

The computing system 1906 can be used to deploy trained AI models on a runtime computer—such as the SoC(s) 1804 described herein. For example, these computing systems 1906 can be designed for compact, on-board computing needs, including an ensemble of models for control policy, vision and language models, etc., deployed on a power-efficient on-board edge computing system 1906. Details of components, features, and capabilities of the computing system 1906 can be described in more detail herein with respect to FIGS. 18A-18E.

Example Generative Models

In at least some implementations, language models, such as large language models (LLMs), vision language models (VLMs), multi-modal language models (MMLMs), vision-language-action (VLA) models, and/or other types of generative artificial intelligence (AI) can be implemented. These models can be capable of understanding, summarizing, translating, and/or otherwise generating text (e.g., natural language text, code, etc.), images, video, computer aided design (CAD) assets, OMNIVERSE and/or METAVERSE file information (e.g., in USD format, such as OpenUSD), and/or the like, based on the context provided in input prompts or queries. These language models can be considered "large," in implementations, based on the models being trained on massive datasets and having architectures with large number of learnable network parameters (weights and biases)—such as millions or billions of parameters. The LLMs/VLMs/MMLMs/etc. can be implemented for summarizing textual data, analyzing and extracting insights from data (e.g., textual, image, video, etc.), and generating new text/image/video/etc. in user specified styles, tones, and/or formats. The LLMs/VLMs/MMLMs/etc. of the present disclosure can be used exclusively for text processing, in implementations, whereas in other implementations, multi-modal LLMs can be implemented to accept, understand, and/or generate text and/or other types of content like images, audio (sounds, synthetic speech, etc.), 2D and/or 3D data (e.g., in USD formats), and/or video. For example, vision language models (VLMs), or more generally multi-modal language models (MMLMs), can be implemented to accept image, video, sensor, audio, textual, 3D design (e.g., CAD), and/or other inputs data types and/or to generate or output image, video, audio, textual, 3D design, and/or other output data types.

Various types of LLMs/VLMs/MMLMs/etc. architectures can be implemented in various implementations. For example, different architectures can be implemented that use different techniques for understanding and generating outputs—such as text, audio, video, image, 2D and/or 3D design or asset data, etc. In some implementations, LLMs/VLMs/MMLMs/etc. architectures such as recurrent neural networks (RNNs) or long short-term memory networks (LSTMs) can be used, while in other implementations transformer architectures—such as those that rely on self-attention and/or cross-attention (e.g., between contextual data and textual data) mechanisms—may be used to understand and recognize relationships between words or tokens and/or contextual data (e.g., other text, video, image, design data, USD, etc.). One or more generative processing pipelines that include LLMs/VLMs/MMLMs/etc. can also include one or more diffusion block(s) (e.g., denoisers). The LLMs/VLMs/MMLMs/etc. of the present disclosure can include encoder and/or decoder block(s). For example, discriminative or encoder-only models like BERT (Bidirectional Encoder Representations from Transformers) can be implemented for tasks that involve language comprehension such as classification, sentiment analysis, question answering, and named entity recognition. As another example, generative or decoder-only models like GPT (Generative Pretrained Transformer) can be implemented for tasks that involve language and content generation such as text completion, story generation, and dialogue generation. LLMs/VLMs/MMLMs/etc. that include both encoder and decoder components like T5 (Text-to-Text Transformer) can be implemented to understand and generate content, such as for translation and summarization. These examples are not intended to be limiting, and any architecture type-including but not limited to those described herein—may be implemented depending on the particular implementation and the task(s) being performed using the LLMs/VLMs/MMLMs/etc.

In various implementations, the LLMs/VLMs/MMLMs/etc. can be trained using unsupervised learning, in which an LLMs/VLMs/MMLMs/etc. learns patterns from large amounts of unlabeled text/audio/video/image/design/USD/etc. data. Due to the extensive training, in implementations, the models can not require task-specific or domain-specific training. LLMs/VLMs/MMLMs/etc. that have undergone extensive pre-training on vast amounts of unlabeled data can be referred to as foundation models and can be adept at a variety of tasks like question-answering, summarization, filling in missing information, translation, image/video/design/USD/data generation. Some LLMs/VLMs/MMLMs/etc. can be tailored for a specific use case using techniques like prompt tuning, fine-tuning, retrieval augmented generation (RAG), adding adapters (e.g., customized neural networks, and/or neural network layers, that tune or adjust prompts or tokens to bias the language model toward a particular task or domain), and/or using other fine-tuning or tailoring techniques that optimize the models for use on particular tasks and/or within particular domains.

In some implementations, the LLMs/VLMs/MMLMs/etc. of the present disclosure can be implemented using various model alignment techniques. For example, in some implementations, guardrails can be implemented to identify improper or undesired inputs (e.g., prompts) and/or outputs of the models. In doing so, the system can use the guardrails and/or other model alignment techniques to either prevent a particular undesired input from being processed using the LLMs/VLMs/MMLMs/etc., and/or preventing the output or presentation (e.g., display, audio output, etc.) of information generating using the LLMs/VLMs/MMLMs/etc. In some implementations, one or more additional models—or layers thereof—may be implemented to identify issues with inputs and/or outputs of the models. For example, these "safeguard" models can be trained to identify inputs and/or outputs that are "safe" or otherwise okay or desired and/or that are "unsafe" or are otherwise undesired for the particular application/implementation. As a result, the LLMs/VLMs/MMLMs/etc. of the present disclosure can be less likely to output language/text/audio/video/design data/USD data/etc. that can be offensive, vulgar, improper, unsafe, out of domain, and/or otherwise undesired for the particular application/implementation.

In some implementations, the LLMs/VLMs/etc. can be configured to or capable of accessing or using one or more plug-ins, application programming interfaces (APIs), databases, data stores, repositories, etc. For example, for certain tasks or operations that the model is not ideally suited for, the model can have instructions (e.g., as a result of training, and/or based on instructions in a given prompt) to access one or more plug-ins (e.g., 3rd party plugins) for help in processing the current input. In such an example, where at least part of a prompt is related to restaurants or weather, the model can access one or more restaurant or weather plug-ins (e.g., via one or more APIs) to retrieve the relevant information. As another example, where at least part of a response requires a mathematical computation, the model can access one or more math plug-ins or APIs for help in solving the problem(s), and can then use the response from the plug-in and/or API in the output from the model. This process can be repeated—e.g., recursively—for any number of iterations and using any number of plug-ins and/or APIs until a response to the input prompt can be generated that addresses each ask/question/request/process/operation/etc. As such, the model(s) can not only rely on its own knowledge from training on a large dataset(s), but also on the expertise or optimized nature of one or more external resources—such as APIs, plug-ins, and/or the like.

In some implementations, multiple language models (e.g., LLMs/VLMs/MMLMs/etc., multiple instances of the same language model, and/or multiple prompts provided to the same language model or instance of the same language model can be implemented, executed, or accessed (e.g., using one or more plug-ins, user interfaces, APIs, databases, data stores, repositories, etc.) to provide output responsive to the same query, or responsive to separate portions of a query. In at least one implementation, multiple language models e.g., language models with different architectures, language models trained on different (e.g. updated) corpuses of data can be provided with the same input query and prompt (e.g., set of constraints, conditioners, etc.). In one or more implementations, the language models can be different versions of the same foundation model. In one or more implementations, at least one language model can be instantiated as multiple agents—e.g., more than one prompt can be provided to constrain, direct, or otherwise influence a style, a content, or a character, etc., of the output provided. In one or more example, non-limiting implementations, the same language model can be asked to provide output corresponding to a different role, perspective, character, or having a different base of knowledge, etc.—as defined by a supplied prompt.

In any one of such implementations, the output of two or more (e.g., each) language models, two or more versions of at least one language model, two or more instanced agents of at least one language model, and/or two more prompts provided to at least one language model can be further processed, e.g., aggregated, compared or filtered against, or used to determine (and provide) a consensus response. In one or more implementations, the output from one language model—or version, instance, or agent—maybe be provided as input to another language model for further processing and/or validation. In one or more implementations, a language model can be asked to generate or otherwise obtain an output with respect to an input source material, with the output being associated with the input source material. Such an association can include, for example, the generation of a caption or portion of text that is embedded (e.g., as metadata) with an input source text or image. In one or more implementations, an output of a language model can be used to determine the validity of an input source material for further processing, or inclusion in a dataset. For example, a language model can be used to assess the presence (or absence) of a target word in a portion of text or an object in an image, with the text or image being annotated to note such presence (or lack thereof). Alternatively, the determination from the language model can be used to determine whether the source material should be included in a curated dataset, for example and without limitation.

Figure 20:
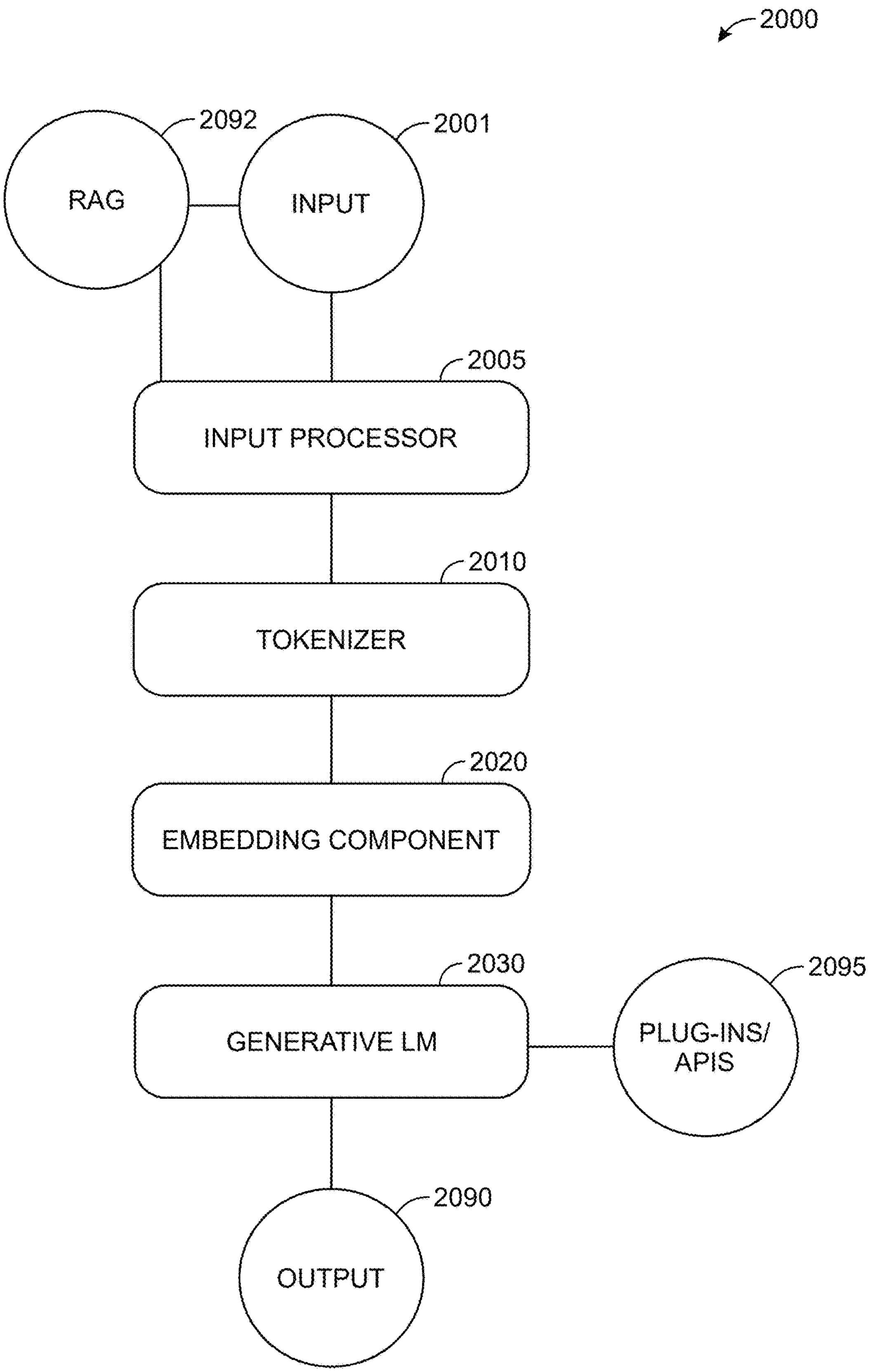
FIG. 20 is a block diagram of an example computing system for generative artificial intelligence (AI), in accordance with at least some implementations of the present disclosure.

FIG. 20 is a block diagram of an example generative language model system 2000 suitable for use in implementing at least some implementations of the present disclosure. In the example illustrated in FIG. 20, the generative language model system 2000 includes a retrieval augmented generation (RAG) component 2092, an input processor 2005, a tokenizer 2010, an embedding component 2020, plug-ins/APIs 2095, and a generative language model (LM) 2030 (which can include an LLM, a VLM, a MMLM, a VLA model, etc.).

At a high level, the input processor 2005 can receive an input 2001 including text and/or other types of input data (e.g., audio data, video data, image data, sensor data (e.g., LiDAR, RADAR, ultrasonic, etc.), 3D design data, CAD data, universal scene descriptor (USD) data—such as OpenUSD, etc.), depending on the architecture of the generative LM 2030 (e.g., LLM/VLM/MMLM/etc.). In some implementations, the input 2001 includes plain text in the form of one or more sentences, paragraphs, and/or documents. Additionally, or alternatively, the input 2001 can include numerical sequences, precomputed embeddings (e.g., word or sentence embeddings), and/or structured data (e.g., in tabular formats, JSON, or XML). In some implementations in which the generative LM 2030 is capable of processing multi-modal inputs, the input 2001 can combine text (or can omit text) with image data, audio data, video data, design data, USD data, and/or other types of input data, such as but not limited to those described herein. Taking raw input text as an example, the input processor 2005 can prepare raw input text in various ways. For example, the input processor 2005 can perform various types of text filtering to remove noise (e.g., special characters, punctuation, HTML tags, stopwords, portions of an image(s), portions of audio, etc.) from relevant textual content. In an example involving stopwords (common words that tend to carry little semantic meaning), the input processor 2005 can remove stopwords to reduce noise and focus the generative LM 2030 on more meaningful content. The input processor 2005 can apply text normalization (TN), for example, by converting all characters to lowercase, removing accents, and/or or handling special cases like contractions or abbreviations to ensure consistency (e.g., converting ¬° to one quarter). Similarly, the input processor 2005 and/or a post-processor can perform inverse text normalization (ITN) in order to convert plain language back to canonical or other forms (e.g., to convert one quarter to ¬°). These are just a few examples, and other types of input and/or output processing can be applied.

In some implementations, a RAG component 2092 (which can include one or more RAG models, and/or can be performed using the generative LM 2030 itself) can be used to retrieve additional information to be used as part of the input 2001 or prompt. RAG can be used to enhance the input to the LLM/VLM/MMLM/etc. with external knowledge, so that answers to specific questions or queries or requests are more relevant—such as in a case where specific knowledge is required. The RAG component 2092 can fetch this additional information (e.g., grounding information, such as grounding text/image/video/audio/USD/CAD/etc.) from one or more external sources, which can then be fed to the LLM/VLM/MMLM/etc. along with the prompt to improve accuracy of the responses or outputs of the model.

For example, in some implementations, the input 2001 can be generated using the query or input to the model (e.g., a question, a request, etc.) in addition to data retrieved using the RAG component 2092. In some implementations, the input processor 2005 can analyze the input 2001 and communicate with the RAG component 2092 (or the RAG component 2092 can be part of the input processor 2005, in implementations) in order to identify relevant text and/or other data to provide to the generative LM 2030 as additional context or sources of information from which to identify the response, answer, or output 2090, generally. For example, where the input indicates that the user is interested in a desired tire pressure for a particular make and model of vehicle, the RAG component 2092 can retrieve—using a RAG model performing a vector search in an embedding space, for example—the tire pressure information or the text corresponding thereto from a digital (embedded) version of the user manual for that particular vehicle make and model. Similarly, where a user revisits a chatbot related to a particular product offering or service, the RAG component 2092 can retrieve a prior stored conversation history—or at least a summary thereof—and include the prior conversation history along with the current ask/request as part of the input 2001 to the generative LM 2030.

The RAG component 2092 can use various RAG techniques. For example, naive RAG can be used where documents are indexed, chunked, and applied to an embedding model to generate embeddings corresponding to the chunks. A user query can also be applied to the embedding model and/or another embedding model of the RAG component 2092 and the embeddings of the chunks along with the embeddings of the query can be compared to identify the most similar/related embeddings to the query, which can be supplied to the generative LM 2030 to generate an output.

In some implementations, more advanced RAG techniques can be used. For example, prior to passing chunks to the embedding model, the chunks can undergo pre-retrieval processes (e.g., routing, rewriting, metadata analysis, expansion, etc.). In addition, prior to generating the final embeddings, post-retrieval processes (e.g., re-ranking, prompt compression, etc.) can be performed on the outputs of the embedding model prior to final embeddings being used as comparison to an input query.

As a further example, modular RAG techniques can be used, such as those that are similar to naive and/or advanced RAG, but also include features such as hybrid search, recursive retrieval and query engines, StepBack approaches, sub-queries, and hypothetical document embedding.

As another example, Graph RAG can use knowledge graphs as a source of context or factual information. Graph RAG can be implemented using a graph database as a source of contextual information sent to the LLM/VLM/MMLM/etc. Rather than (or in addition to) providing the model with chunks of data extracted from larger sized documents—which can result in a lack of context, factual correctness, language accuracy, etc.—graph RAG can also provide structured entity information to the LLM/VLM/MMLM/etc. by combining the structured entity textual description with its many properties and relationships, allowing for deeper insights by the model. When implementing graph RAG, the systems and methods described herein use a graph as a content store and extract relevant chunks of documents and ask the LLM/VLM/MMLM/etc. to answer using them. The knowledge graph, in such implementations, can contain relevant textual content and metadata about the knowledge graph as well as be integrated with a vector database.

In some implementations, the graph RAG can use a graph as a subject matter expert, where descriptions of concepts and entities relevant to a query/prompt can be extracted and passed to the model as semantic context. These descriptions can include relationships between the concepts. In other examples, the graph can be used as a database, where part of a query/prompt can be mapped to a graph query, the graph query can be executed, and the LLM/VLM/MMLM/etc. can summarize the results. In such an example, the graph can store relevant factual information, and a query (natural language query) to graph query tool (NL-to-Graph-query tool) and entity linking can be used. In some implementations, graph RAG (e.g., using a graph database) can be combined with standard (e.g., vector database) RAG, and/or other RAG types, to benefit from multiple approaches.

In any implementations, the RAG component 2092 can implement a plugin, API, user interface, and/or other functionality to perform RAG. For example, a graph RAG plug-in can be used by the LLM/VLM/MMLM/etc. to run queries against the knowledge graph to extract relevant information for feeding to the model, and a standard or vector RAG plug-in can be used to run queries against a vector database. For example, the graph database can interact with a plug-in's REST interface such that the graph database is decoupled from the vector database and/or the embeddings models.

The tokenizer 2010 can segment the (e.g., processed) text data into smaller units (tokens) for subsequent analysis and processing. The tokens can represent individual words, subwords, characters, portions of audio/video/image/etc., depending on the implementation. Word-based tokenization divides the text into individual words, treating each word as a separate token. Subword tokenization breaks down words into smaller meaningful units (e.g., prefixes, suffixes, stems), enabling the generative LM 2030 to understand morphological variations and handle out-of-vocabulary words more effectively. Character-based tokenization represents each character as a separate token, enabling the generative LM 2030 to process text at a fine-grained level. The choice of tokenization strategy can depend on factors such as the language being processed, the task at hand, and/or characteristics of the training dataset. As such, the tokenizer 2010 can convert the (e.g., processed) text into a structured format according to tokenization schema being implemented in the particular implementation.

The embedding component 2020 can use any known embedding technique to transform discrete tokens into (e.g., dense, continuous vector) representations of semantic meaning. For example, the embedding component 2020 can use pre-trained word embeddings (e.g., Word2Vec, GloVe, or FastText), one-hot encoding, Term Frequency-Inverse Document Frequency (TF-IDF) encoding, one or more embedding layers of a neural network, and/or otherwise.

In some implementations in which the input 2001 includes image data/video data/etc., the input processor 2005 can resize the data to a standard size compatible with format of a corresponding input channel and/or can normalize pixel values to a common range (e.g., 0 to 1) to ensure a consistent representation, and the embedding component 2020 can encode the image data using any known technique (e.g., using one or more convolutional neural networks (CNNs) to extract visual features). In some implementations in which the input 2001 includes audio data, the input processor 2005 can resample an audio file to a consistent sampling rate for uniform processing, and the embedding component 2020 can use any known technique to extract and encode audio features—such as in the form of a spectrogram (e.g., a mel-spectrogram). In some implementations in which the input 2001 includes video data, the input processor 2005 can extract frames or apply resizing to extracted frames, and the embedding component 2020 can extract features such as optical flow embeddings or video embeddings and/or can encode temporal information or sequences of frames. In some implementations in which the input 2001 includes multi-modal data, the embedding component 2020 can fuse representations of the different types of data (e.g., text, image, audio, USD, video, design, etc.) using techniques like early fusion (concatenation), late fusion (sequential processing), attention-based fusion (e.g., self-attention, cross-attention), etc.

The generative LM 2030 and/or other components of the generative LM system 2000 can use different types of neural network architectures depending on the implementation. For example, transformer-based architectures such as those used in models like GPT can be implemented, and can include self-attention mechanisms that weigh the importance of different words or tokens in the input sequence and/or feedforward networks that process the output of the self-attention layers, applying non-linear transformations to the input representations and extracting higher-level features. Some non-limiting example architectures include transformers (e.g., encoder-decoder, decoder only, multi-modal), RNNs, LSTMs, fusion models, diffusion models, cross-modal embedding models that learn joint embedding spaces, graph neural networks (GNNs), hybrid architectures combining different types of architectures adversarial networks like generative adversarial networks or GANs or adversarial autoencoders (AAEs) for joint distribution learning, linear-time sequence modeling with selective state space modeling (SSM) architectures (e.g., Mamba LLM architectures), and/or others. As such, depending on the implementation and architecture, the embedding component 2020 can apply an encoded representation of the input 2001 to the generative LM 2030, and the generative LM 2030 can process the encoded representation of the input 2001 to generate an output 2090, which can include responsive text and/or other types of data.

As described herein, in some implementations, the generative LM 2030 can be configured to access or use—or capable of accessing or using—plug-ins/APIs 2095 (which can include one or more plug-ins, application programming interfaces (APIs), databases, data stores, repositories, etc.). For example, for certain tasks or operations that the generative LM 2030 is not ideally suited for, the model can have instructions (e.g., as a result of training, and/or based on instructions in a given prompt, such as those retrieved using the RAG component 2092) to access one or more plug-ins/APIs 2095 (e.g., 3rd party plugins) for help in processing the current input. In such an example, where at least part of a prompt is related to restaurants or weather, the model can access one or more restaurant or weather plug-ins (e.g., via one or more APIs), send at least a portion of the prompt related to the particular plug-in/API 2095 to the plug-in/API 2095, the plug-in/API 2095 can process the information and return an answer to the generative LM 2030, and the generative LM 2030 can use the response to generate the output 2090. This process can be repeated—e.g., recursively—for any number of iterations and using any number of plug-ins/APIs 2095 until an output 2090 that addresses each ask/question/request/process/operation/etc. from the input 2001 can be generated. As such, the model(s) can not only rely on its own knowledge from training on a large dataset(s) and/or from data retrieved using the RAG component 2092, but also on the expertise or optimized nature of one or more external resources—such as the plug-ins/APIs 2095.

In some implementations, one or more transformer engines (TEs) can be implemented. The transformer engine can use micro-tensor scaling to optimize performance and accuracy—such as to enable 16-bit floating point (FP16), 8-bit floating point (FP8), and/or 4-bit floating point (FP4) artificial intelligence processing. For example, the transformer engine can use 16-bit or 8-bit floating point precision, and an 8-bit or 4-bit floating point data format combined with software algorithms for increasing AI performance and capabilities. By reducing math operations to 8-bits or 4-bits, the TE allows for training larger networks faster without compromising accuracy. For example, the TEs can include a library for accelerating transformer models on processing devices-such as GPUs—to provide better performance with lower memory utilization in both training and inference. When the TE is combined with other technologies, such as high-speed interconnects between nodes (e.g., using switches—such as NVLink or ultra accelerator Link (UALink) Switches) and tensor cores (which enable mixed-precision computing, such as micro-scaling precision support), server clusters can be more capable of training enormous networks (e.g., billions of parameters) at high speeds. As such, tensor core precisions of FP64, TF32, BF16, FP16, FP8, INT8, FP6, and FP4 can be supported, as well as CUDA core precisions of FP64, FP32, FP16, and BF16.

These and other architectures for LLMs/VLMs/MMLMs/VLAs/etc. described herein are meant simply as examples, and other suitable architectures can be implemented within the scope of the present disclosure.

Example Computing Device

Figure 21:
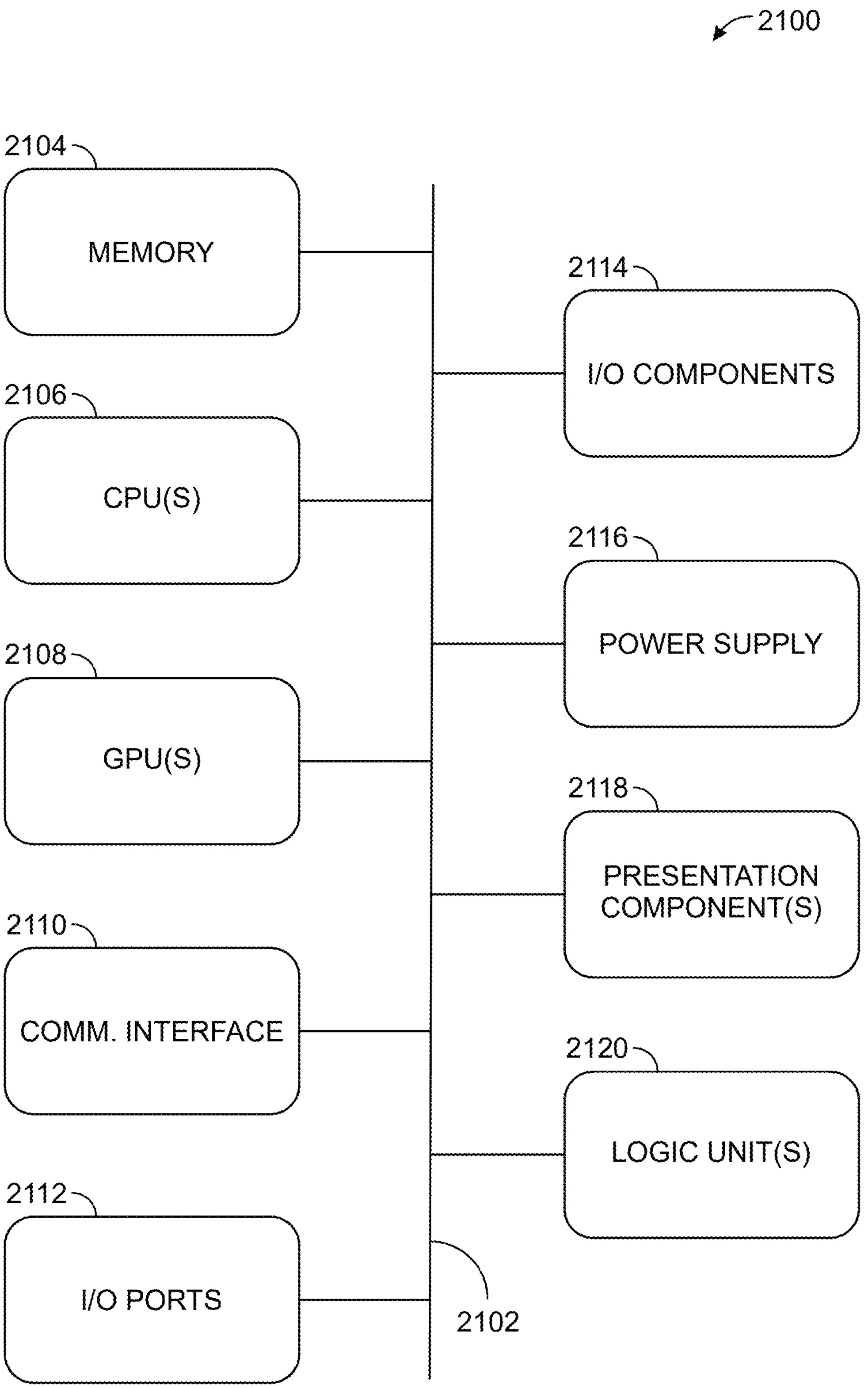
FIG. 21 is a block diagram of an example computing device, in accordance with at least some implementations of the present disclosure.

FIG. 21 is a block diagram of an example computing device(s) 2100 suitable for use in implementing some implementations of the present disclosure. Computing device 2100 can include an interconnect system 2102 that directly or indirectly couples the following devices: memory 2104, one or more central processing units (CPUs) 2106, one or more graphics processing units (GPUs) 2108, a communication interface 2110, input/output (I/O) ports 2112, input/output components 2114, a power supply 2116, one or more presentation components 2118 (e.g., display(s), speaker(s), etc.), and one or more logic units 2120. In at least one implementation, the computing device(s) 2100 can include one or more virtual machines (VMs), and/or any of the components thereof can include virtual components (e.g., virtual hardware components). For non-limiting examples, one or more of the GPUs 2108 can include one or more vGPUs, one or more of the CPUs 2106 can include one or more vCPUs, and/or one or more of the logic units 2120 can include one or more virtual logic units. As such, a computing device(s) 2100 can include discrete components (e.g., a full GPU dedicated to the computing device 2100), virtual components (e.g., a portion of a GPU dedicated to the computing device 2100), or a combination thereof.

Although the various blocks of FIG. 21 are shown as connected via the interconnect system 2102 with lines, this is not intended to be limiting and is for clarity only. For example, in some implementations, a presentation component 2118, such as a display device, can be considered an I/O component 2114 (e.g., if the display is a touch screen). As another example, the CPUs 2106 and/or GPUs 2108 can include memory (e.g., the memory 2104 can be representative of a storage device in addition to the memory of the GPUs 2108, the CPUs 2106, and/or other components). As such, the computing device of FIG. 21 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 21.

The interconnect system 2102 can represent one or more links or busses, such as an address bus, a data bus, a control bus, or a combination thereof. The interconnect system 2102 can include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some implementations, there are direct connections between components. As an example, the CPU 2106 can be directly connected to the memory 2104. Further, the CPU 2106 can be directly connected to the GPU 2108. Where there is direct, or point-to-point connection between components, the interconnect system 2102 can include a PCIe link to carry out the connection. In these examples, a PCI bus need not be included in the computing device 2100.

The memory 2104 can include any of a variety of computer-readable media. The computer-readable media can be any available media that can be accessed by the computing device 2100. The computer-readable media can include both volatile and nonvolatile media, and removable and non-removable media. By way of example, and not limitation, the computer-readable media can include computer-storage media and communication media.

The computer-storage media can include both volatile and nonvolatile media and/or removable and non-removable media implemented in any method or technology for storage of information such as computer-readable instructions, data structures, program modules, and/or other data types. For example, the memory 2104 can store computer-readable instructions (e.g., that represent a program(s) and/or a program element(s), such as an operating system. Computer-storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computing device 2100. As used herein, computer storage media does not include signals per se.

The computer storage media can embody computer-readable instructions, data structures, program modules, and/or other data types in a modulated data signal such as a carrier wave or other transport mechanism and includes any information delivery media. The term "modulated data signal" can refer to a signal that has one or more of its characteristics set or changed in such a manner as to encode information in the signal. By way of example, and not limitation, the computer storage media can include wired media such as a wired network or direct-wired connection, and wireless media such as acoustic, RF, infrared and other wireless media. Combinations of any of the above should also be included within the scope of computer-readable media.

The CPU(s) 2106 can be configured to execute at least some of the computer-readable instructions to control one or more components of the computing device 2100 to perform one or more of the methods and/or processes described herein. The CPU(s) 2106 can each include one or more cores (e.g., one, two, four, eight, twenty-eight, seventy-two, etc.) that are capable of handling a multitude of software threads simultaneously. The CPU(s) 2106 can include any type of processor, and can include different types of processors depending on the type of computing device 2100 implemented (e.g., processors with fewer cores for mobile devices and processors with more cores for servers). For example, depending on the type of computing device 2100, the processor can be an Advanced RISC Machines (ARM) processor implemented using Reduced Instruction Set Computing (RISC) or an x86 processor implemented using Complex Instruction Set Computing (CISC). The computing device 2100 can include one or more CPUs 2106 in addition to one or more microprocessors or supplementary co-processors, such as math co-processors.

In addition to or alternatively from the CPU(s) 2106, the GPU(s) 2108 can be configured to execute at least some of the computer-readable instructions to control one or more components of the computing device 2100 to perform one or more of the methods and/or processes described herein. One or more of the GPU(s) 2108 can be an integrated GPU (e.g., with one or more of the CPU(s) 2106 and/or one or more of the GPU(s) 2108 can be a discrete GPU. In implementations, one or more of the GPU(s) 2108 can be a coprocessor of one or more of the CPU(s) 2106. The GPU(s) 2108 can be used by the computing device 2100 to render graphics (e.g., 3D graphics) or perform general purpose computations. For example, the GPU(s) 2108 can be used for General-Purpose computing on GPUs (GPGPU). The GPU(s) 2108 can include hundreds or thousands of cores that are capable of handling hundreds or thousands of software threads simultaneously. The GPU(s) 2108 can generate pixel data for output images in response to rendering commands (e.g., rendering commands from the CPU(s) 2106 received via a host interface). The GPU(s) 2108 can include graphics memory, such as display memory, for storing pixel data or any other suitable data, such as GPGPU data. The display memory can be included as part of the memory 2104. The GPU(s) 2108 can include two or more GPUs operating in parallel (e.g., via a link). The link can directly connect the GPUs (e.g., using NVLink, ultra accelerator Link (UALink), etc.) or can connect the GPUs through a switch (e.g., using NVSwitch). When combined together, each GPU 2108 can generate pixel data or GPGPU data for different portions of an output or for different outputs (e.g., a first GPU for a first image and a second GPU for a second image). Each GPU can include its own memory, or can share memory with other GPUs.

In addition to or alternatively from the CPU(s) 2106 and/or the GPU(s) 2108, the logic unit(s) 2120 can be configured to execute at least some of the computer-readable instructions to control one or more components of the computing device 2100 to perform one or more of the methods and/or processes described herein. In implementations, the CPU(s) 2106, the GPU(s) 2108, and/or the logic unit(s) 2120 can discretely or jointly perform any combination of the methods, processes and/or portions thereof. One or more of the logic units 2120 can be part of and/or integrated in one or more of the CPU(s) 2106 and/or the GPU(s) 2108 and/or one or more of the logic units 2120 can be discrete components or otherwise external to the CPU(s) 2106 and/or the GPU(s) 2108. In implementations, one or more of the logic units 2120 can be a coprocessor of one or more of the CPU(s) 2106 and/or one or more of the GPU(s) 2108.

Examples of the logic unit(s) 2120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Deep Learning Accelerator Clusters (XNNs), Neural Processing Units (NPUs), Neural Network Accelerators (NNAs), Programmable Vision Accelerators (PVAs)—which can include one or more direct memory access (DMA) systems, one or more vision or vector processing units (VPUs), one or more pixel processing engines (PPEs)—e.g., including a 2D array of processing elements that each communicate north, south, east, and west with one or more other processing elements in the array, one or more decoupled accelerators or units (e.g., decoupled lookup table (DLUT) accelerators or units), etc., Vision Processing Units (VPUs), Optical Flow Accelerators (OFAs), Field Programmable Gate Arrays (FPGAs), Neuromorphic Chips, Quantum Processing Units (QPUs), Associative Process Units (APUs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 2110 can include one or more receivers, transmitters, and/or transceivers that allow the computing device 2100 to communicate with other computing devices via an electronic communication network, included wired and/or wireless communications. The communication interface 2110 can include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more implementations, logic unit(s) 2120 and/or communication interface 2110 can include one or more data processing units (DPUs) to transmit data received over a network and/or through interconnect system 2102 directly to (e.g., a memory of) one or more GPU(s) 2108.

The I/O ports 2112 can allow the computing device 2100 to be logically coupled to other devices including the I/O components 2114, the presentation component(s) 2118, and/or other components, some of which can be built in to (e.g., integrated in) the computing device 2100. Illustrative I/O components 2114 include a microphone, mouse, keyboard, joystick, game pad, game controller, satellite dish, scanner, printer, wireless device, etc. The I/O components 2114 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 2100. The computing device 2100 can be include depth cameras, such as stereoscopic camera systems, infrared camera systems, RGB camera systems, touchscreen technology, and combinations of these, for gesture detection and recognition. Additionally, the computing device 2100 can include accelerometers or gyroscopes (e.g., as part of an inertia measurement unit (IMU)) that allow detection of motion. In some examples, the output of the accelerometers or gyroscopes can be used by the computing device 2100 to render immersive augmented reality or virtual reality.

The power supply 2116 can include a hard-wired power supply, a battery power supply, or a combination thereof. The power supply 2116 can provide power to the computing device 2100 to allow the components of the computing device 2100 to operate.

The presentation component(s) 2118 can include a display (e.g., a monitor, a touch screen, a television screen, a heads-up-display (HUD), other display types, or a combination thereof), speakers, and/or other presentation components. The presentation component(s) 2118 can receive data from other components (e.g., the GPU(s) 2108, the CPU(s) 2106, DPUs, etc.), and output the data (e.g., as an image, video, sound, etc.).

Example Network Environments

Network environments suitable for use in implementing implementations of the disclosure can include one or more client devices, servers, network attached storage (NAS), other backend devices, and/or other device types. The client devices, servers, and/or other device types (e.g., each device) can be implemented on one or more instances of the computing device(s) 2100 of FIG. 21—e.g., each device can include similar components, features, and/or functionality of the computing device(s) 2100. In addition, where backend devices (e.g., servers, NAS, etc.) are implemented, the backend devices can be included as part of a data center (such as, but not limited to, those described herein).

Components of a network environment can communicate with each other via a network(s), which can be wired, wireless, or both. The network can include multiple networks, or a network of networks. By way of example, the network can include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) can provide wireless connectivity.

Compatible network environments can include one or more peer-to-peer network environments—in which case a server can not be included in a network environment—and one or more client-server network environments—in which case one or more servers can be included in a network environment. In peer-to-peer network environments, functionality described herein with respect to a server(s) can be implemented on any number of client devices.

In at least one implementation, a network environment can include one or more cloud-based network environments, a distributed computing environment, a combination thereof, etc. A cloud-based network environment can include a framework layer, a job scheduler, a resource manager, and a distributed file system implemented on one or more of servers, which can include one or more core network servers and/or edge servers. A framework layer can include a framework to support software of a software layer and/or one or more application(s) of an application layer.

The software or application(s) can respectively include web-based service software or applications. In implementations, one or more of the client devices can use the web-based service software or applications (e.g., by accessing the service software and/or applications via one or more application programming interfaces (APIs)). The framework layer can be, but is not limited to, a type of free and open-source software web application framework such as that can use a distributed file system for large-scale data processing (e.g., “big data”).

A cloud-based network environment can provide cloud computing and/or cloud storage that carries out any combination of computing and/or data storage functions described herein (or one or more portions thereof). Any of these various functions can be distributed over multiple locations from central or core servers (e.g., of one or more data centers that can be distributed across a state, a region, a country, the globe, etc.). If a connection to a user (e.g., a client device) is relatively close to an edge server(s), a core server(s) can designate at least a portion of the functionality to the edge server(s). A cloud-based network environment can be private (e.g., limited to a single organization), can be public (e.g., available to many organizations), and/or a combination thereof (e.g., a hybrid cloud environment).

The client device(s) can include at least some of the components, features, and functionality of the example computing device(s) 2100 described herein with respect to FIG. 21. By way of example and not limitation, a client device can be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a talking kiosk, a remote control, an appliance, a consumer electronic device, a workstation, an edge device, any combination of these delineated devices, or any other suitable device.

Example Clauses

Some implementations relate to a system, including one or more processors to allocate, via a firmware interface, a local memory region in a local memory of a hardware accelerator bound to an external memory region, the allocation returning a device pointer corresponding to a binding, the binding tracked using a resource identifier in a resource table corresponding with a non-privileged execution context. In some implementations, the processors to provide the device pointer to a memory region accessible to the non-privileged execution context for at least one subsequent construction of at least one command buffer identifying the binding of the local memory region to the external memory region.

Some implementations relate to a system, the one or more processors are to construct, in the external memory region of the hardware accelerator, the at least one command buffer including at least one command identifying the device pointer corresponding to the binding of the local memory region to the external memory region. Some implementations relate to a system, the one or more processors are to cause execution of the at least one command using the external memory region via the local memory region by a direct memory access (DMA) controller using the at least one command buffer, the at least one command corresponds to at least one of (i) reading data from the external memory region into the local memory region, or (ii) writing data from the local memory region to the external memory region.

Some implementations relate to a system, allocating includes providing, via the firmware interface, a request to allocate the local memory region in the local memory of the hardware accelerator and bind the local memory region to the external memory region. In some implementations, allocating includes receiving, via the firmware interface, the device pointer corresponding to the binding of the local memory region to the external memory region. In some implementations, the request is generated by a privileged execution context as a firmware-level configuration command using a firmware access application programming interface (API), and the firmware-level configuration command identifies the binding of the local memory region to the external memory region.

Some implementations relate to a system, the at least one command buffer includes descriptor data identifying the device pointer, and the descriptor data is updated, prior to execution, to identify a memory access path from the external memory region via the local memory region, and the memory access path corresponds to a patched physical address in the local memory region identified for the execution of at least one command. Some implementations relate to a system, the device pointer corresponds to an address indirection including the binding of the local memory region to the external memory region, the address indirection identified by a DMA controller to perform at least one memory access command during execution.

Some implementations relate to a system, the one or more processors are to construct or receive, in the external memory region of the hardware accelerator, a second command buffer including at least one second command identifying a resource corresponding to the local memory region. In some implementations, the processors are to provide, to a submission queue corresponding with the non-privileged execution context, submission information for the second command buffer. In some implementations, the processors are to provide, to a signaling interface corresponding with the submission queue, a submission indicator corresponding to the submission information. In some implementations, the processors are to cause execution of the second command buffer by at least one hardware component of the hardware accelerator.

Some implementations relate to a system, the one or more processors are to prior to allocating the local memory region, determine whether a previously allocated local memory region bound to the external memory region exists for the non-privileged execution context. In some implementations, the processors are to in response to determining that the previously allocated local memory region exists, increment a reference count corresponding to the binding. In some implementations, the processors are to in response to determining that the previously allocated local memory region does not exist, transmit, to the firmware interface, a request to allocate the local memory region in the local memory of the hardware accelerator bound to the external memory region in accordance with at least one access policy.

Some implementations relate to a system, the one or more processors are to decrement the reference count corresponding to the binding in response to a release request. In some implementations, the processors are to release the local memory region in response to determining that the reference count satisfies a release condition.

Some implementations relate to a system, the one or more processors are to initiate a flush operation to transfer data from the local memory region to the external memory region in response to a flush request, the flush operation occurs in response to a user context switch or initiate an invalidate operation marking data stored in the local memory region as invalid in response to an invalidate request to trigger reinitialization of the local memory region during a subsequent access. In some implementations, initialization of the local memory region with data from the external memory region and flushing of the local memory region to the external memory region occur in response to the user context switch, and the flushing is further performable in response to an explicit request.

Some implementations relate to a system, the binding is established in accordance with at least one access policy, the at least one access policy including a first policy to initialize the local memory region with data from the external memory region or a second policy to flush data from the local memory region to the external memory region during release. Some implementations relate to a system, the firmware interface maintains at least two concurrent bindings of a plurality of local memory regions to corresponding a plurality of external memory regions for the non-privileged execution context.

Some implementations relate to a system, the firmware interface includes a compatibility layer configured to translate memory allocation and at least one access request from at least one software application implemented for a version of the hardware accelerator, the compatibility layer updating at least one request to invoke the allocation of the local memory region and the binding to the external memory region via the firmware interface. Some implementations relate to a system, the at least one command buffer includes descriptor data identifying the device pointer, and the descriptor data is modified, by firmware, to identify a source address and a destination address for a DMA transaction by a DMA controller, the source address or destination address corresponding to the local memory region and the external memory region bound by the device pointer, the descriptor data including a transfer size and at least one access policy.

Some implementations relate to a system-on-a-chip (SoC), including processing circuitry to transmit, via a firmware interface, a request to allocate a local memory region in a local memory of a hardware accelerator and bind the local memory region to an external memory region. In some implementations, the processing circuitry to receive, via the firmware interface, a device pointer corresponding to the binding of the local memory region to the external memory region, the binding tracked using a resource identifier in a resource table corresponding with a non-privileged execution context. In some implementations, the processing circuitry store the device pointer in a memory region accessible to a non-privileged execution context for at least one subsequent construction of at least one command buffer identifying the binding of the local memory region to the external memory region.

Some implementations relate to a method, including allocating, by one or more processors via a firmware interface, a local memory region in a local memory of a hardware accelerator bound to an external memory region, the allocation returning a device pointer corresponding to a binding, the binding tracked using a resource identifier in a resource table corresponding with a non-privileged execution context. In some implementations, the method includes providing, by the one or more processors, the device pointer to a memory region accessible to the non-privileged execution context for at least one subsequent construction of at least one command buffer identifying the binding of the local memory region to the external memory region.

Some implementations relate to a method, further including constructing, by the one or more processors in the external memory region of the hardware accelerator, the at least one command buffer including at least one command identifying the device pointer corresponding to the binding of the local memory region to the external memory region. Some implementations relate to a method, further including causing, by the one or more processors, execution of the at least one command using the external memory region via the local memory region by a direct memory access (DMA) controller using the at least one command buffer, the at least one command corresponds to at least one of (i) reading data from the external memory region into the local memory region, or (ii) writing data from the local memory region to the external memory region.

Some implementations relate to a method, allocating includes providing, via the firmware interface, a request to allocate the local memory region in the local memory of the hardware accelerator and bind the local memory region to the external memory region. In some implementations, allocating includes receiving, via the firmware interface, the device pointer corresponding to the binding of the local memory region to the external memory region. In some implementations, the request is generated by a privileged execution context as a firmware-level configuration command using a firmware access application programming interface (API), and the firmware-level configuration command identifies the binding of the local memory region to the external memory region.

Some implementations relate to a system, the one or more processors are to execute operations including a system for managing memory persistence using firmware-level resource tracking, a system for binding one or more local memory regions to one or more DRAM-backed regions via the firmware interface, a system for allocating one or more memory regions using one or more access policies, a system for inserting one or more flush or invalidate operations in accordance with DRAM persistence, a system for storing one or more device pointers for command buffer reuse, a system implementing one or more multi-model language models (MMLMs), a system implementing one or more large language models (LLMs), a system implementing one or more small language models (SLMs), a system implementing one or more vision language models (VLMs), a system for generating synthetic data, a system for generating synthetic data using AI, a control system for an autonomous or semi-autonomous machine, a perception system for an autonomous or semi-autonomous machine, a system for performing digital twin operations, a system for performing light transport simulation, a system for performing remote operations, a system implemented using an edge device, a system implemented using a robot, a system for performing conversational AI operations, a system incorporating one or more virtual machines (VMs), a system implemented at least partially in a data center, or a system implemented at least partially using cloud computing resources.

Some implementations relate to a system, including one or more processors to construct, in memory, a command buffer including at least one command identifying at least one resource. In some implementations, the processors to provide, to a submission queue corresponding with a non-privileged execution context, submission information of the command buffer. In some implementations, the processors to provide, to a signaling interface corresponding with the submission queue, a submission indicator corresponding to the submission information. In some implementations, the processors to cause execution of the command buffer by at least one hardware component of a hardware accelerator, the command buffer identifying the at least one resource.

Some implementations relate to a system, including one or more processors to construct, in memory of a hardware accelerator, a command buffer including a plurality of commands, at least one command of the plurality commands identifies at least one resource via a resource identifier in a resource table inaccessible to a non-privileged execution context. In some implementations, the processors to provide, to at least one submission interface corresponding with the non-privileged execution context, submission information of the command buffer and a submission indicator corresponding to the submission information. In some implementations, the processors to cause execution of the command buffer by a firmware component to (i) initiate execution of the plurality of commands in order of placement in the command buffer and (ii) issue at least one subsequent command for execution prior to completion of at least one previously issued command based on an availability of the at least one resource.

The disclosure can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure can be practiced in a variety of system configurations, including hand-held devices, consumer electronics, general-purpose computers, more specialty computing devices, etc. The disclosure can also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" can include only element A, only element B, only element C, element A and element B, element A and element C, element B and element C, or elements A, B, and C. In addition, "at least one of element A or element B" can include at least one of element A, at least one of element B, or at least one of element A and at least one of element B. Further, "at least one of element A and element B" can include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

What is claimed is:

1. A system, comprising:

one or more processors to:

allocate, via a firmware interface, a local memory region in a local memory of a hardware accelerator bound to an external memory region, the allocation returning a device pointer corresponding to a binding, the binding tracked using a resource identifier in a resource table corresponding with a non-privileged execution context; and provide the device pointer to a memory region accessible to the non-privileged execution context for at least one subsequent construction of at least one command buffer identifying the binding of the local memory region to the external memory region.

2. The system of claim 1, wherein the one or more processors are to:

construct, in the external memory region of the hardware accelerator, the at least one command buffer comprising at least one command identifying the device pointer corresponding to the binding of the local memory region to the external memory region.

3. The system of claim 2, wherein the one or more processors are to:

cause execution of the at least one command using the external memory region via the local memory region by a direct memory access (DMA) controller using the at least one command buffer, wherein the at least one command corresponds to at least one of (i) reading data from the external memory region into the local memory region, or (ii) writing data from the local memory region to the external memory region.

4. The system of claim 1, wherein allocating comprises:

providing, via the firmware interface, a request to allocate the local memory region in the local memory of the hardware accelerator and bind the local memory region to the external memory region; and receiving, via the firmware interface, the device pointer corresponding to the binding of the local memory region to the external memory region;

wherein the request is generated by a privileged execution context as a firmware-level configuration command using a firmware access application programming interface (API), and the firmware-level configuration command identifies the binding of the local memory region to the external memory region.

5. The system of claim 1, wherein the at least one command buffer comprises descriptor data identifying the device pointer, and wherein the descriptor data is updated, prior to execution, to identify a memory access path from the external memory region via the local memory region, and wherein the memory access path corresponds to a patched physical address in the local memory region identified for the execution of at least one command.

6. The system of claim 1, wherein the device pointer corresponds to an address indirection comprising the binding of the local memory region to the external memory region, the address indirection identified by a DMA controller to perform at least one memory access command during execution.

7. The system of claim 1, wherein the one or more processors are to:

construct or receive, in the external memory region of the hardware accelerator, a second command buffer comprising at least one second command identifying a resource corresponding to the local memory region;

provide, to a submission queue corresponding with the non-privileged execution context, submission information for the second command buffer;

provide, to a signaling interface corresponding with the submission queue, a submission indicator corresponding to the submission information; and cause execution of the second command buffer by at least one hardware component of the hardware accelerator.

8. The system of claim 1, wherein the one or more processors are to:

prior to allocating the local memory region, determine whether a previously allocated local memory region bound to the external memory region exists for the non-privileged execution context;

in response to determining that the previously allocated local memory region exists, increment a reference count corresponding to the binding; and in response to determining that the previously allocated local memory region does not exist, transmit, to the firmware interface, a request to allocate the local memory region in the local memory of the hardware accelerator bound to the external memory region in accordance with at least one access policy.

9. The system of claim 8, wherein the one or more processors are to:

decrement the reference count corresponding to the binding in response to a release request; and release the local memory region in response to determining that the reference count satisfies a release condition.

10. The system of claim 1, wherein the one or more processors are to:

initiate a flush operation to transfer data from the local memory region to the external memory region in response to a flush request, wherein the flush operation occurs in response to a user context switch; or initiate an invalidate operation marking data stored in the local memory region as invalid in response to an invalidate request to trigger reinitialization of the local memory region during a subsequent access;

wherein initialization of the local memory region with data from the external memory region and flushing of the local memory region to the external memory region occur in response to the user context switch, and wherein the flushing is further performable in response to an explicit request.

11. The system of claim 1, wherein the binding is established in accordance with at least one access policy, the at least one access policy comprising a first policy to initialize the local memory region with data from the external memory region or a second policy to flush data from the local memory region to the external memory region during release.

12. The system of claim 1, wherein the firmware interface maintains at least two concurrent bindings of a plurality of local memory regions to corresponding a plurality of external memory regions for the non-privileged execution context.

13. The system of claim 1, wherein the firmware interface comprises a compatibility layer configured to translate memory allocation and at least one access request from at least one software application implemented for a version of the hardware accelerator, the compatibility layer updating at least one request to invoke the allocation of the local memory region and the binding to the external memory region via the firmware interface.

14. The system of claim 1, wherein the at least one command buffer comprises descriptor data identifying the device pointer, and wherein the descriptor data is modified, by firmware, to identify a source address and a destination address for a DMA transaction by a DMA controller, the source address or destination address corresponding to the local memory region and the external memory region bound by the device pointer, the descriptor data comprising a transfer size and at least one access policy.

15. The system of claim 1, wherein the one or more processors are to execute operations comprising:

a system for managing memory persistence using firmware-level resource tracking;

a system for binding one or more local memory regions to one or more DRAM-backed regions via the firmware interface;

a system for allocating one or more memory regions using one or more access policies;

a system for inserting one or more flush or invalidate operations in accordance with DRAM persistence;

a system for storing one or more device pointers for command buffer reuse;

a system implementing one or more multi-model language models (MMLMs);

a system implementing one or more large language models (LLMs);

a system implementing one or more small language models (SLMs);

a system implementing one or more vision language models (VLMs);

a system for generating synthetic data;

a system for generating synthetic data using AI;

a control system for an autonomous or semi-autonomous machine;

a perception system for an autonomous or semi-autonomous machine;

a system for performing digital twin operations;

a system for performing light transport simulation;

a system for performing remote operations;

a system implemented using an edge device;

a system implemented using a robot;

a system for performing conversational AI operations;

a system incorporating one or more virtual machines (VMs);

a system implemented at least partially in a data center; or a system implemented at least partially using cloud computing resources.

16. A system-on-a-chip (SoC), comprising:

processing circuitry to:

transmit, via a firmware interface, a request to allocate a local memory region in a local memory of a hardware accelerator and bind the local memory region to an external memory region;

receive, via the firmware interface, a device pointer corresponding to the binding of the local memory region to the external memory region, the binding tracked using a resource identifier in a resource table corresponding with a non-privileged execution context; and store the device pointer in a memory region accessible to a non-privileged execution context for at least one subsequent construction of at least one command buffer identifying the binding of the local memory region to the external memory region.

17. A method, comprising:

allocating, by one or more processors via a firmware interface, a local memory region in a local memory of a hardware accelerator bound to an external memory region, the allocation returning a device pointer corresponding to a binding, the binding tracked using a resource identifier in a resource table corresponding with a non-privileged execution context; and providing, by the one or more processors, the device pointer to a memory region accessible to the non-privileged execution context for at least one subsequent construction of at least one command buffer identifying the binding of the local memory region to the external memory region.

18. The method of claim 17, further comprising:

constructing, by the one or more processors in the external memory region of the hardware accelerator, the at least one command buffer comprising at least one command identifying the device pointer corresponding to the binding of the local memory region to the external memory region.

19. The method of claim 18, further comprising:

causing, by the one or more processors, execution of the at least one command using the external memory region via the local memory region by a direct memory access (DMA) controller using the at least one command buffer, wherein the at least one command corresponds to at least one of (i) reading data from the external memory region into the local memory region, or (ii) writing data from the local memory region to the external memory region.

20. The method of claim 17, wherein allocating comprises:

providing, via the firmware interface, a request to allocate the local memory region in the local memory of the hardware accelerator and bind the local memory region to the external memory region; and receiving, via the firmware interface, the device pointer corresponding to the binding of the local memory region to the external memory region;

wherein the request is generated by a privileged execution context as a firmware-level configuration command using a firmware access application programming interface (API), and the firmware-level configuration command identifies the binding of the local memory region to the external memory region.

* * * * *